United States Patent
Byker et al.

(10) Patent No.: US 7,538,931 B2
(45) Date of Patent: May 26, 2009

(54) LIGAND EXCHANGE THERMOCHROMIC SYSTEMS CONTAINING EXCHANGE METALS

(75) Inventors: Harlan J. Byker, West Olive, MI (US); Paul H. Ogburn, Jr., Hudsonville, MI (US); Douglas A. Vander Griend, Grand Rapids, MI (US); Derick D. Winkle, Holland, MI (US)

(73) Assignee: Pleotint, L.L.C., West Olive, MI (US)

( * ) Notice: Subject to any disclaimer, the term of this patent is extended or adjusted under 35 U.S.C. 154(b) by 0 days.

(21) Appl. No.: 11/849,642

(22) Filed: Sep. 4, 2007

(65) Prior Publication Data

US 2008/0106781 A1 May 8, 2008

Related U.S. Application Data

(60) Provisional application No. 60/841,827, filed on Sep. 1, 2006.

(51) Int. Cl.
*G02F 1/01* (2006.01)
(52) U.S. Cl. ........................... 359/288; 359/289
(58) Field of Classification Search ................. 359/288, 359/289
See application file for complete search history.

(56) References Cited

U.S. PATENT DOCUMENTS

| | | |
|---|---|---|
| 2,710,274 A | 6/1955 | Kuehl |
| 3,192,101 A | 6/1965 | Koenig |
| 3,236,651 A | 2/1966 | Marks et al. |
| 3,445,291 A | 5/1969 | Stein |
| 3,723,349 A | 3/1973 | Heseltine et al. |

(Continued)

FOREIGN PATENT DOCUMENTS

EP 0356116 2/1990

(Continued)

OTHER PUBLICATIONS

Arutjunjan, R. et al., "Smart Thermochromic Glazing for Energy Saving Window Applications," Poster Session Abstract 8, The Fourth International Conference on Advanced Optical Materials and Devices, Tartu, Estonia (Jul. 6-Sep. 2004).

(Continued)

*Primary Examiner*—William C Choi
(74) *Attorney, Agent, or Firm*—Thompson Hine LLP

(57) ABSTRACT

Ligand exchange of thermochromic, LETC, systems exhibiting a reversible change in absorbance of electromagnetic radiation as the temperature of the system is reversibly changed are described. The described LETC systems include one or more than one transition metal ion, which experiences thermally induced changes in the nature of the complexation or coordination around the transition metal ion(s) and, thereby, the system changes its ability to absorb electromagnetic radiation as the temperature changes.

In accordance with one aspect of the present invention, a thermochromic system is disclosed comprising a first metal ion and a second metal ion and at least one ligand that complexes with the first metal ion to form a LeMLC and complexes with the second metal ion to form a HeMLC wherein an increase in temperature of the system results in a reversible net increase in its ability to absorb light energy in the 400 nm to 1400 nm range due to the ligand transferring from the first metal ion to the second metal ion.

10 Claims, 58 Drawing Sheets

U.S. PATENT DOCUMENTS

| | | | |
|---|---|---|---|
| 3,816,335 | A | 6/1974 | Evans |
| 4,575,259 | A | 3/1986 | Bacci et al. |
| 4,970,315 | A | 11/1990 | Schmidhalter |
| 5,159,057 | A | 10/1992 | Perry |
| 5,240,897 | A | 8/1993 | Braun et al. |
| 6,084,702 | A * | 7/2000 | Byker et al. ............... 359/288 |
| 6,362,303 | B1 | 3/2002 | Byker et al. |
| 6,446,402 | B1 | 9/2002 | Byker et al. |
| 6,620,872 | B2 | 9/2003 | Fisher |
| 6,665,107 | B2 | 12/2003 | Forgette et al. |
| 6,737,159 | B2 | 5/2004 | Garrett et al. |
| 6,737,418 | B2 | 5/2004 | Hogenkamp et al. |
| 6,998,072 | B2 | 2/2006 | Welch et al. |
| 7,179,535 | B2 | 2/2007 | Fisher |
| 7,256,296 | B2 | 8/2007 | Diamond et al. |
| 2006/0159874 | A1 | 7/2006 | Koran et al. |

FOREIGN PATENT DOCUMENTS

| | | |
|---|---|---|
| JP | 2004-359623 | 12/2004 |

OTHER PUBLICATIONS

Kojima, K. et al., "Pressure and Temperature Effects on Octahedral-Tetrahedral Equilibria in Pyridine Solutions of Some Cobalt(II) Halides. II," *Bull. Chem. Soc. Jpn.*, vol. 57, No. 3, pp. 879-880 (Mar. 1984).

Yanush, O.V. et al., "Laminated Glass with Variable Transmission for Daylight Regulation," Glass Processing Days, Conference Proceedings, pp. 815-817, Seventh International Conference (Jun. 18-21, 2001).

Halopenen, I. et al., "Smart Laminated Glasses for Regulation of Lighting," Glass Processing Days, Conference Proceedings, pp. 324-326, Sixth International Conference (Jun. 13-16, 1999).

Srivastava, J. et al., "Synthesis of Polyacrylic Acid Based Thermochromic Polymers," *Proc. of SPIE*, vol. 5062, pp. 111-115 (2003).

Kojima, K. et al., "Pressure and Temperature Effects on Octahedral-Tetrahedral Equilibria in Pyridine Solutions of Some Cobalt(II) Halides," *Bull. Chem. Soc. Jpn.*, vol. 56, No. 3, pp. 684-688 (Mar. 1983).

Griffiths, T.R. et al., "Effects of Cations upon Absorption Spectra Part 4. -Octahedral-Tetrahedral Equilibria between Chloro-nickel(II) Complexes in Ethylene Glycol and Glycerol," *Trans. Faraday Soc.*, 65, pp. 3179-3186 (1969).

Griffiths, T.R. et al., "Effects of Cations upon Absorption Spectra Part 2. -Formation of Tetrahedral Tetrachloronickelate(II) in Aqueous Solutions," *Trans. Faraday Soc.*, 65, pp. 1727-1733 (1969).

Gill, Naida S. et al., "Complex Halides of the Transition Metals. Part I. Tetrahedral Nickel Complexes," *J. Chem. Soc.*, pp. 3397-4007 (1959).

Sunamoto, J. et al., "Solvochromism and Thermochromism of Cobalt(II) Complexes Solubilized in Reversed Micelles," *Bulletin of the Chemical Society of Japan*, vol. 51, No. 11, pp. 3130-3135 (Nov. 1978).

Marinkovic, M. et al., "Thermochromic complex compounds in phase change materials: Possible application in an agricultural greenhouse," *Solar Energy Materials and Solar Cells*, 51, pp. 401-411 (1998).

Arutjunjan, R.E. et al., "Thermochromic Glazing for 'Zero Net Energy' House," Glass Processing Days, Conference Proceedings, pp. 299-301, Eighth International Conference (Jun. 15-18, 2003).

Rozova, K.B. et al., Abstract for "Sun screening thermochromic glazing materials," TsNIIEP, USSR. Svetotekhnika (1986), (10), 12-14. CODEN: SVETAG ISSN: 0039-7067. Journal written in Russian. CAN 107:30324 AN 1987:430324 CAPLUS.

Greenberg, C., "Chromogenic Materials (Thermochromic)," *Kirk-Othmer Encyclopedia of Chemical Technology 4th Edition*, vol. 6, pp. 337-343, John Wiley & Sons.

Sone, K. et al., *Inorganic Thermochromism*, pp. 1-71, Springer-Verlag (1987).

Angell, C.A., "Octahedral-Tetrahedral Coordination Equilibria of Nickel (II) and Copper (II) in Concentrated Aqueous Electrolyte Solutions," *Journal of the American Chemical Society*, 88 (22), pp. 5192-5198 (Nov. 20, 1966).

Day, J.H., "Thermochromism of Inorganic Compounds," *Chemical Reviews*, vol. 68, No. 6, pp. 649-657 (Nov. 25, 1968).

Scaife, D.E. et al., "Influence of Temperature on Some Octahedral-Tetrahedral Equilibria in Solution," *Inorganic Chemistry*, vol. 6, No. 2, pp. 358-365 (Feb. 1967).

Sunamoto, J. et al., "Formation of Polynuclear Cupric Halides in Cationic Reversed Micelles," *Inorganic Chemisry*, vol. 19, No. 12, pp. 3668-3673 (1980).

Sunamoto, J. et al., "Reversed Micelles to Mimic the Active Site of Metalloenzymes," *Inorganica Chimica Acta*, 92, pp. 159-163 (1984).

Katzin, L.I., "Energy Value of the Octahedral-Tetrahedral Coordination Change," *The Journal of Chemical Physics*, vol. 35, No. 2, pp. 467-472 (Aug. 1961).

Sestili, L. et al., "Formation Equilibria of Pseudotetrahedral Co(II) Halogenocomplexes in Acetonitrile," *J. Inorg. Nucl. Chem.*, No. 32, pp. 1997-2008 (1970).

*Kirk-Othmer Encyclopedia of Chemical Technology Third Edition*, vol. 6, "Chromogenic Materials (Electro-, Thermo-) Electrochromic and Thermochromic," pp. 129-142, John Wiley & Sons (1979).

International Search Report of the International Searching Authority regarding International Application No. PCT/US2007/077385 (Feb. 4, 2008).

Written Opinion of the International Searching Authority regarding International Application No. PCT/US2007/077385 (Feb. 4, 2008).

Long, G.J. et al., "Transition Metal Chemistry of Quinuclidinone-Containing Ligands. III. Electronic and Structural Properties of Several Transition Metal Complexes Containing *trans*-2-(2'-Quinolyl)methylene-3-quinuclidinone," *Inorganic Chemistry*, vol. 13, No. 2, pp. 270-278 (XP-002465696) (1974).

Kuroiwa, K. et al., "Heat-Set Gel-like Networks of Lipophilic Co(II) Triazole Complexes in Organic Media and Their Thermochromic Structural Transitions," *Journal of the American Chemical Society*, vol. 126, pp. 2016-2021 (XP-002465697) (2004).

* cited by examiner

Figure 47. Ratio of $K_{eq}(85C)$ to $K_{eq}(25C)$ as a Function of $\Delta H^\circ$ Figure 48. Influence of $\Delta S^\circ$ on Absorbance vs. Temperature Figure 49. Temperature Dependence of Absorbance for Various Ratios, R, of $[H\varepsilon L_T]/[M_T]$ Figure 50. Transmission of SRT™ Vertically Positioned Windows Based on Time of Day and Direction

LIGAND EXCHANGE THERMOCHROMIC SYSTEMS CONTAINING EXCHANGE METALS

CROSS REFERENCE TO RELATED APPLICATION

This application claims the benefit of U.S. Provisional Application Ser. No. 60/841,827 filed on Sep. 1, 2006, the contents of which are hereby incorporated by reference.

DEFINITION OF TERMS/ABBREVIATIONS $(4\text{-MeOPh})_2\text{PO}_2^- = $ bis(4-methoxyphenyl)phosphinate
18-crown-6=1,4,7,10,13,16-hexaoxacyclooctadecane
1-EtBIMZ=1-ethyl-1H-benzimidazole
1-MeBIMZ=1-methyl-1H-benzimidazole
4-(3-PhPr)Pyr=4-(3-phenylpropyl)pyridine)
acac=acetylacetonate
BIMZ=benzimidazole
$Bu_3PO$=tributylphosphine oxide
$CF_3COOLi$=lithium trifluoroacetate
Di-TMOLP=di-trimethylolpropane
DMSO=dimethylsulphoxide
DP=dipyridyl=2,2'-bipyridine
EG=ethylene glycol
EXM=Exchange Metal
HεL=high molar absorption coefficient ligand=high epsilon ligand
HεMLC=high molar absorption coefficient MLC=high epsilon MLC
LETC=ligand exchange thermochromic(s)
LεL=low molar absorption coefficient ligand=low epsilon ligand
LεMLC=low molar absorption coefficient MLC=low epsilon MLC
m=molal=moles of solute per kilogram of solvent
M=molar=moles of solute per liter of solution
Me=metal ion
MLC=metal—ligand complex
N-Bu-di(1-MeBIMZ-2-yl-methyl)amine=N,N-bis[(1-methyl-1H-benzimidazol-2-yl)methyl]butanamine
NIR=near infrared
nm=nanometer
NPG=neopentyl glycol=2,2-dimethylpropane-1,3-diol
N—Pr-dipicolylamine=N,N-bis(pyridine-2-ylmethyl)propan-1-amine
N—Pr-DPamine=N-propyl-N-pyridin-2-ylpyridin-2-amine
$Ph_3P=PPh_3$=triphenylphosphine
PVB=poly(vinyl butyral)
R/O=Ring Opening TC Compound
SRT™=sunlight responsive thermochromic
TBABr=tetrabutylammonium bromide
TBACl=tetrabutylammonium chloride
TBAI=tetrabutylammonium iodide
TC=thermochromic(s)
$TEACl.H_2O$=tetraethylammonium chloride monohydrate
TMEDA=N,N,N',N'-tetramethylethylenediamine
TMOLP=trimethylolpropane=2-ethyl-2-(hydroxymethyl)propane-1,3-diol
TTCTD=1,4,8,11-tetrathiacyclotetradecane
UV=ultraviolet
Y=% white light transmission based on 220 exposure of a $D_{65}$ light source
ε=molar absorption coefficient=molar absorptivity, in liters/(mole*cm)
γ-BL=gamma-butyrolactone
λ=wavelength in nanometers

BACKGROUND

Many chromogenic phenomena are known in which a change in color or a change in light absorption results from some action or stimulus exerted on a system. The most common chromogenic phenomena are electrochromics, (EC), photochromics, (PC), and thermochromics, (TC). Many phenomena are also known in which optical changes, like light scattering or diffuse reflection changes, take place as a result of some action or stimulus exerted on a system. Unfortunately, referring to these as chromic phenomena has led to a fair amount of confusion in the past. We prefer to distinguish light scattering systems from chromogenic systems by referring to the light scattering phenomena as a phototropic, thermotropic or electrotropic phenomena. This distinction and other distinctions are elaborated on below.

In general, and especially for the sake of the patent application, the terms used for an optical phenomena, should relate to the direct, primary action causing the phenomena. For example, modern day electrochromic systems generally involve electrochemical oxidation and reduction reactions. Thus an electrical process directly causes materials to change their light absorbing or light reflecting properties. Alternatively, electrical energy can also be used to generate heat or light and this heat or light, in turn, may be used to affect a thermochromic or a photochromic change. However, the indirect use of electricity should not make these electrochromic phenomena. For example, a thermochromic layer may increase in temperature and light absorption when in contact with a transparent conductive layer which is resistively heated by passing electricity through the transparent conductive layer. However, in accordance with the terminology used herein, this is still a thermochromic device and should not be called an electrochromic device. Also, just because an electric light produced UV radiation that caused a color change by a photochemical reaction, like the ring opening of a spirooxazine compound, that would not make such a procedure a demonstration of electrochromics.

A similar distinction should be made with a thermochromic layer that is responsive to sunlight as described in U.S. Pat. Nos. 6,084,702 and 6,446,402. The thermochromic layer may be heated by absorbing sunlight or being in contact with another layer that absorbs sunlight. Here sunlight exposure changes the color and/or the amount of light absorbed by the thermochromic layer. However, this is still a thermochromic phenomenon because a heat induced temperature change causes the chromogenic change and the same change takes place when the layer is heated by other means. The absorbed photons from the sun are only converted to heat and do not directly cause a photochromic change. Accordingly, the term photochromics should be reserved for systems in which the absorption of a photon directly causes a photochemical or photophysical reaction which gives a change in color or a change in the system's ability to absorb other photons.

In addition to chromogenic systems, there are a variety of systems with reversible changes in light scattering. The more widely studied light scattering systems include: (1) lower critical solution temperature, LCST, polymeric systems; (2) polymer dispersed liquid crystal, PDLC, systems; (3) polymer stabilizer cholesteric texture, PSCT, systems and (4) thermoscattering, TS, systems. Additional description of these and other light scattering phenomena may be found in U.S. Pat. No. 6,362,303. In the past, several of these phenomena have been called thermochromic and even electrochromic. From our standpoint these phenomena are neither thermochromic nor electrochromic since the word chroma relates to color and the intensity and quality of color. These are better termed thermotropic or electrotropic to help indicate the change in state that takes place.

Definitions rarely cover every eventuality, especially when it comes to borderline cases. Hence electrochemical systems that change from colorless and non-light scattering to specularly reflecting are still generally termed electrochromic because of the electrochemical nature of these processes. Also, some thermochromic systems involve changes between liquid and solid phases and could conceivably be called thermotropic systems. But these systems have dramatic changes in light absorption and are still termed thermochromic. On the other side, some reversible light scattering systems may have some spectral selectivity to the light scattering and hence give rise to some color appearance. Yet the primary change is between light scattering and non-light scattering states. Even the change in some systems from colorless and non-light scattering to a frosted, diffusely reflecting and white appearance might suggest a color change to the color white. However, we still term these tropic and not chromic changes.

In summary, systems without any substantial change in light scattering, that primarily involve a change in color, intensity of color or absorption of light, as well as those electrochemical and thermochemical phenomena that give a change in specular reflectance, are herein understood to be chromic or chromogenic phenomena. One of these chromic phenomena—thermochromics, as defined herein, is the subject of the present invention.

Many thermochromic materials and phenomena are known. These include reversible and irreversible changes in optical character. A well known thermochromic phenomena, for use with windows, involves metal oxide thin films. Most notably films of $VO_2$, and doped versions thereof, are known to reversibly change their specular reflectance in the NIR with changes in temperature. Thermochromic processes with changes in light absorption are observed when heating causes: (1) an increase in the amount of ring opening of certain spiro compounds; (2) the dissociation of certain anions from certain triarylmethane dyes or (3) the dissociation of certain "dimeric" substances into highly absorbing "monomeric" free radicals. Thermochromic phenomena are also involved in phase change systems which change from highly absorbing to colorless or nearly colorless when certain pH indicators change their association with certain weak acids during a melting or solidification process.

Still other reversible thermochromic systems involve thermally induced changes in the way ligands associate with transition metal ions. The present application discloses particularly useful versions of these metal-ligand thermochromic systems and combinations of these systems with other thermochromic systems.

SUMMARY

In accordance with one aspect of the present invention, a thermochromic system is disclosed comprising a first metal ion and a second metal ion and at least one ligand that complexes with the first metal ion to form a LeMLC and the complexes with the second metal ion for form a HeMLC wherein an increase in temperature of the system results in a reversible net increase in its ability to absorb light energy in the 400 nm to 1400 nm range due to the ligand transferring from the first metal ion to the second metal ion. The thermochromic systems of the present application are, herein, termed: ligand exchange thermochromic, LETC, systems. LETC systems have thermochromic activity which results in a reversible change in absorbance of electromagnetic radiation as the temperature of the system is reversibly changed. That the change is reversible means that the amount of change in absorbance remains fairly consistent, for both the increase and decrease in absorbance throughout a given temperature range, on repeated temperature cycling, for some useful number of cycles. The thermochromic systems of this invention have a reversible, net increase in their ability to absorb light energy in the visible and/or NIR range as the temperature of the system is increased and a net decrease in their ability to absorb light energy in the visible and/or NIR range as the temperature of the system decreases for temperatures within the active range of the system. The active temperature range of the system is determined by the thermodynamic properties of the LETC reactions. For many of our applications the active temperature range includes 0 to 100 degrees Celsius.

LETC systems comprise one or more than one transition metal ion, which experiences thermally induced changes in the nature of the complexation or coordination around the transition metal ion(s) and thereby the system changes its ability to absorb electromagnetic radiation as the temperature changes.

In accordance with particularly useful systems described herein, the electromagnetic radiation, for which absorbance changes occur, is in the visible and NIR portions of the electromagnetic spectrum. Some of the systems described herein also exhibit changes in absorbance in the ultraviolet. The change in light absorption on heating of the LETC systems generally results in a change from one color to another color and/or a darkening of the color of the system. However, if the increase in light absorption is predominantly in the NIR, the LETC system may still be very useful even though little or no visual color change occurs.

The term visible light generally applies to that portion of the electromagnetic spectrum sensed by the human eye. While some definitions might limit the terms "light" and/or "photon" to the visible portion of a spectrum produced by a source of electromagnetic radiation, for the purposes of this patent application, the terms "light" and "photon" also apply to the near ultraviolet and near infrared portions of the spectra, incident on the earth's surface, from sources of electromagnetic radiation like the sun. The wavelengths of ultraviolet light of interest are from about 280 nanometers to about 400 nanometers. The wavelengths of the visible light of interest are from about 400 nanometers to about 700 nanometers. The wavelengths of NIR light of interest for our LETC systems are from about 700 nanometers to about 1400 nanometers. Thus the visible through NIR range wherein reversible net light energy absorbance increases are of interest is from about 400 nm to about 1400 nm.

The energy of each photon is inversely proportional to its wavelength and is determined by Planck's constant multiplied by the frequency of that photon. As a LETC system is heated, at least one light absorbing species decreases in concentration thereby decreasing the system's ability to absorb photons related to its absorption spectra. At the same time, at least one light absorbing species increases in concentration thereby increasing the system's ability to absorb photons related to its absorption spectra. The ratio of the amount of energy absorbed to the amount incident on the system depends on several factors including (1) the absorption spectra of the LETC system at a given temperature; (2) the intensity and spectral distribution of the light source and (3) the exposure time.

For certain LETC systems disclosed and for the particular applications thereof, as the temperature of the LETC system increases there is an increase in the ratio of [the total energy per unit time of all visible and NIR electromagnetic radiation, (photons), absorbed by the system] to [the total energy per unit time of all visible and NIR electromagnetic radiation, (photons), incident on the system] from a broad band source of electromagnetic radiation incident on the system. For particularly useful applications of the LETC systems or layers disclosed herein, there is a net increase in the ability of the system to absorb incident visible and NIR sunlight power, (or energy over time), as the temperature of the system increases. In most cases, this means that the LETC systems become darker in color as the temperature of the systems increase.

The LETC systems may be liquid solutions, solid polymer layers, or semi-solid polymer layers, physical gels or chemical gels.

The present application discloses LETC systems, ligands, particularly useful compositions and combinations of LETC systems.

The present application describes high performance TC systems based on iron, cobalt, nickel and copper ions with a variety of ligands.

The present application describes LETC systems with advantageous ratios of ligand to metal ion concentrations and particularly useful systems with respect to the choice of solvent and/or polymer matrix.

The present application discloses high performance TC systems in combination with a seal which minimizes the ingress of oxygen.

LETC systems by themselves and in combination with other thermochromic systems and compositions are disclosed.

Also described herein are processes for producing thermochromic layers and novel structures for the use of LETC systems in various applications.

Described herein are applications of LETC systems in variable light transmission windows for residential and commercial buildings including skylights and atrium glazing and variable light absorption windows for boats, ships, aircraft and motor vehicles including moon roofs and sun roofs. The windows may include artful designs of different colored LETC systems like a variable light transmission stained glass window.

The systems disclosed herein are particularly useful in providing the thermochromic activity in the inventions disclosed in U.S. Pat. Nos. 6,084,702 and 6,446,402, the contents of which are hereby incorporated by reference.

TC Systems and MLC Systems

Thermochromic systems that involve reversible changes in the association of ligands with transition metals have been described previously. Many of these, along with other types of inorganic thermochromic materials, are described in "Inorganic Thermochromism" by K. Sone and Y. Fukuda, Springer-Verlag (1987) and the references therein.

Other literature that describes thermochromics involving transition metal ions is found in:

Jesse Day, "Chromogenic Materials, Electrochromic and Thermochromic" in Kirk-Othmer Encyclopedia of Chemical Technology 3$^{rd}$ Edition Volume 6, pp 129-142, John Wiley and Sons (1979).

Charles Greenberg, "Chromogenic Materials (Thermochromic)" Kirk-Othmer Encyclopedia of Chemical Technology 4$^{th}$ Edition Volume 6, pp 337-343, John Wiley and Sons.

"Thermochromism of Inorganic Compounds", J. H. Day, Chemical Reviews 68, 649-657 (1968)

There is extensive literature on MLC's apart from TC technology; see for example:

"Inorganic Electronic Spectroscopy" by A. B. P. Lever, Elsevier Publishing Co. (1968) and (1984).

"Comprehensive Coordination Chemistry: Synthesis, Reactions, Properties & Applications of Coordination Compounds" Editors R. D. Gillard and G. Wilkinson, Elsevier Ltd. (1987)

"Comprehensive Coordination Chemistry TI From Biology to Nanotechnology", Editors J. A. McClevety and T. A Meyer, Elsevier Ltd. (2004)

DETAILED DESCRIPTION

Figure 1:
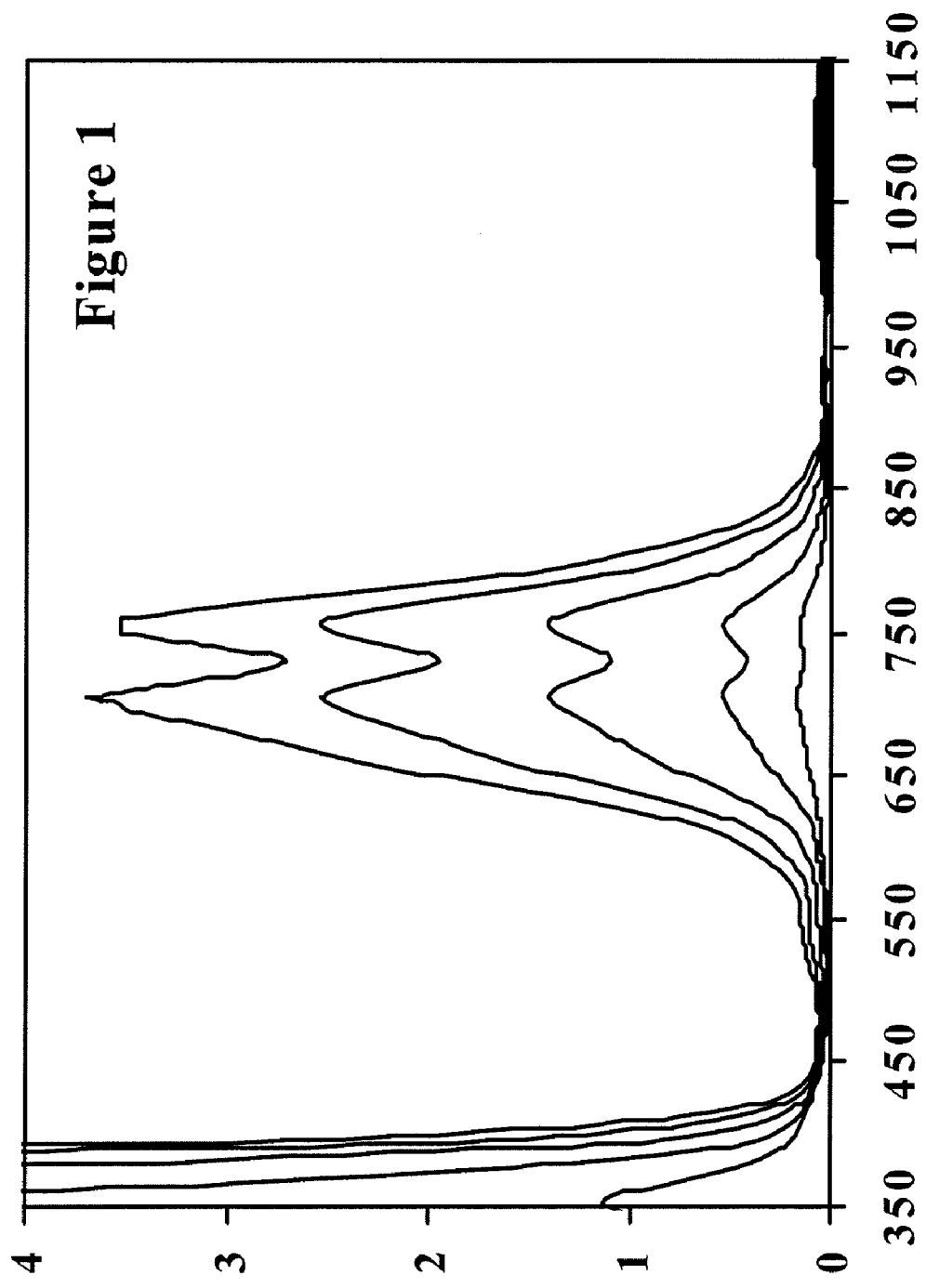
FIG. 1-46 are absorption spectra for the systems described in Examples 1-46, respectively.
Figure 2:
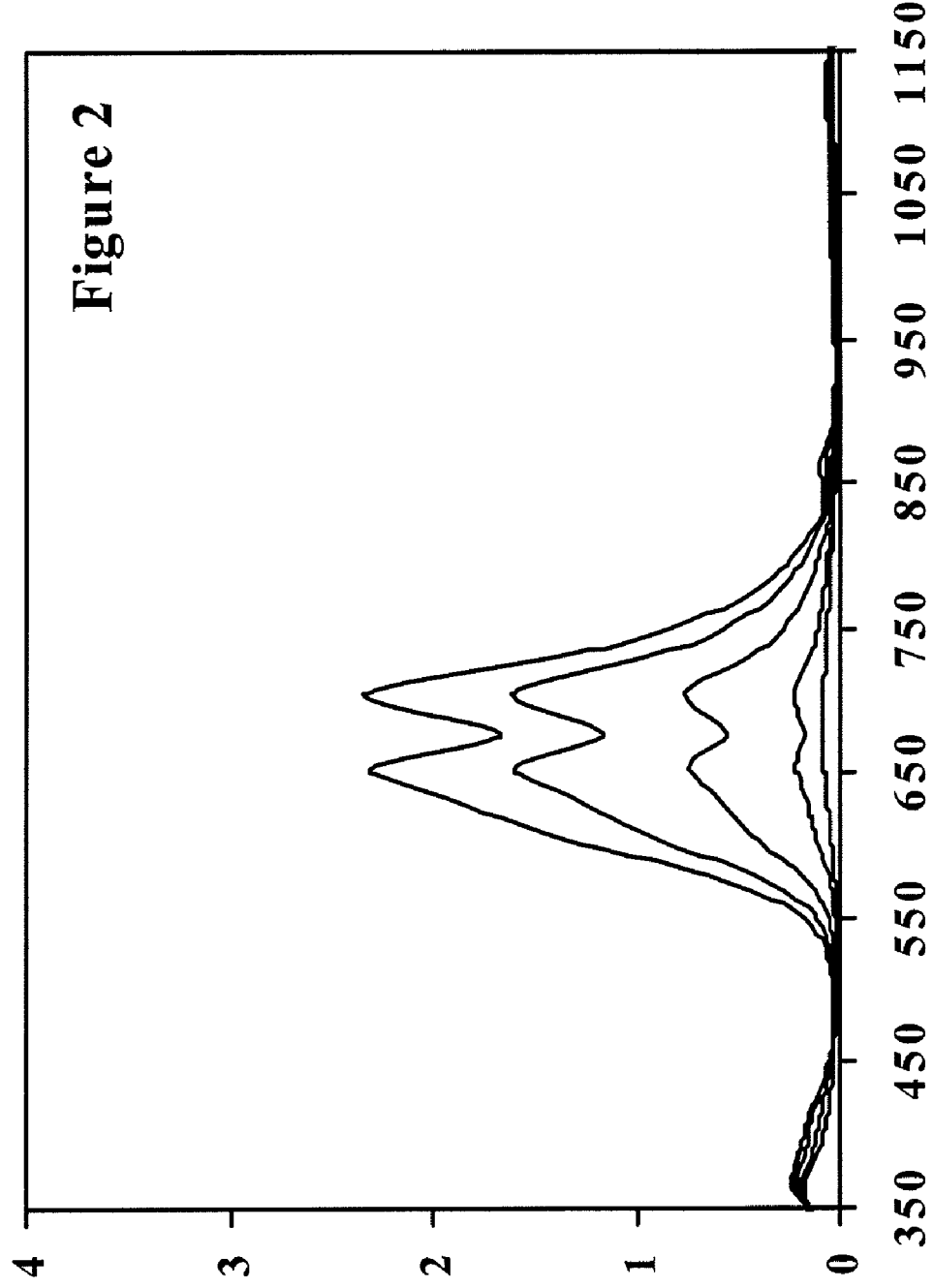

The term "substituted" as in "substituted alkyl" and the like, means that in the group in question, at least one hydrogen atom bound to a carbon atom is replaced with one or more substituent groups, such as hydroxy, alkoxy, alkylthio, phosphino, amino, halo, silyl, and the like. When the term "substituted" introduces a list of possible substituted groups, it is intended that the terms apply to every member of that group.

The term "alkyl" as used herein refers to a branched or unbranched saturated hydrocarbon group typically although not necessarily containing 1 to about 20 carbon atoms, more particularly containing 1 to about 6 carbon atoms. The term "aryl" as used herein refers to a group containing an aromatic ring. Aryl groups herein include groups containing a single aromatic ring or multiple aromatic rings that are fused together, linked covalently, or linked to a common group such as a methylene or ethylene moiety. In particular embodiments, aryl substitutents include 6 to about 50 atoms other than hydrogen, typically 6 to about 20 atoms other than hydrogen. Furthermore, the term "aralkyl" refers to an alkyl group substituted with an aryl group typically containing from 7 to 20 carbon atoms.

The terms "heterocycle" and "heterocyclic" refer to a cyclic group, including ring-fused systems, including heteroaryl groups as defined below, in which one or more carbon atoms in a ring is replaced with a heteroatom—that is, an atom other than carbon, such as nitrogen, oxygen, sulfur, phosphorus, boron or silicon. Heterocycles and heterocyclic groups include saturated and unsaturated moieties, including heteroaryl groups as defined below. The term "heteroaryl" refers to an aryl group that includes one or more heteroatoms in the aromatic ring.

LETC activity is observed when a temperature change causes the association of ligands with transition metal ions to change or exchange in such a way that a variation in the UV, visible and/or the NIR light absorption of the system occurs giving a reversible net increase in the system's ability to absorb visible and/or NIR light energy as the temperature is increased. A LETC system includes, at least, one type of transition metal ion and at least two types of ligands. Unless the ligands function as the entire solvent, the system also includes some other type of solvent for the transition metal ion and the ligands so that they are together in a liquid or a solid solution.

The solvent may be an aqueous, nonaqueous or ionic liquid; a plasticizer; a polymer; some additive(s) dissolved in a polymer; the matrix portion or phase of an organic, inorganic or hybrid gel; the liquid portion or phase of a gel; or some combination of these acting as co-solvents. The solution may be a free flowing or a viscous liquid, a non free flowing or thixotropic gel, or a solid or a semi-solid polymer. All of these solvents provide enough mobility for the ligands to transfer in and out of coordination with transition metal ions.

The present application describes various LETC systems in which remarkable amounts of transition metal salts, ligand salts, non-ionic ligands and other key additives are all dissolved at the same time in solid polymer layers and remain in solution over the temperature range of interest of use. Not only can such solutions be prepared, but select systems have been discovered that neither form precipitates nor do the layers develop haze over prolonged periods at elevated temperatures, during numerous temperature cycles or during extensive exposure to sunlight or simulated sunlight.

In the LETC systems of interest, transition metal ions in solution are either solvated, complexed, coordinated or ligated by ions and/or molecules. The ions and/or molecules in the primary coordination sphere of the metal ion are often referred to as ligands. For the purpose of the present application, any ion or molecule that either solvates, complexes, coordinates, ligates or directly interacts with a metal ion, in such a way that it impacts the light absorption character of the system, is referred to as a ligand. Also any transition metal ion in solution is considered to be in a complex or coordination compound even if the coordinating power of the solvent or other ligands is relatively weak. Typically, the transition metal is in the form of a cation.

When a transition metal ion is surrounded by certain ligands, a "metal—ligand complex", (MLC), may be formed which has low molar absorptivity throughout the visible and NIR range. This MLC is, herein, referred to as a "low $\epsilon$ MLC", (L$\epsilon$MLC). When the same transition metal ion is surrounded by other ligands, a MLC may be formed which has a higher level of molar absorptivity somewhere in the visible and NIR spectral region. This MLC is, herein, referred to as a "high $\epsilon$ MLC", (H$\epsilon$MLC). The L$\epsilon$MLC and the H$\epsilon$MLC may absorb at the same or some of the same wavelengths or at substantially different wavelengths. Both the L$\epsilon$MLC and the H$\epsilon$MLC generally absorb fairly strongly in the UV, and while changes in the amount and the wavelengths of UV light absorbed may be useful aspects of the LETC process the primary applications involve changes in the visible and NIR absorption ability. The $\epsilon$ in these designations refers to the molar absorption coefficient or molar absorptivity of the MLC in solution. The units of liters/(mole*cm) are used for $\epsilon$. H$\epsilon$MLC's have an $\epsilon$ of greater than or equal to 50 liters/(mole*cm) at some or at least one wavelength between 400 nm and 1400 nm. L$\epsilon$MLC's have an $\epsilon$ of less than 50 liters/(mole*cm) for all wavelengths between 400 nm and 1400 nm.

Any ligand in a L$\epsilon$MLC is, herein, referred to as a low $\epsilon$ ligand, L$\epsilon$L. Any ligand in a H$\epsilon$MLC is, herein, referred to as a high $\epsilon$ ligand, H$\epsilon$L. When a ligand is not coordinated to a transition metal in a L$\epsilon$MLC or a H$\epsilon$MLC, the determination of whether or not the ligand is a L$\epsilon$L or H$\epsilon$L is not so clear sometimes. Thus for the sake of the present disclosure, the determination of ligand type is made by the side on which the ligand appears in the main or predominant equilibrium reaction equation of the LETC system. A ligand, not coordinated to a metal ion, that appears on the same side of an equilibrium equation as the L$\epsilon$MLC(s) is a H$\epsilon$L. A ligand, not coordinated to a metal ion, that appears on the same side of an equilibrium equation as the H$\epsilon$MLC(s) is a L$\epsilon$L. This is illustrated by the following equation:

$$\text{L}\epsilon\text{MLC} + y\text{H}\epsilon\text{L} \rightleftharpoons \text{H}\epsilon\text{MLC} + x\text{L}\epsilon\text{L} \qquad (1)$$

wherein x and y are numeric variables that designate the number of L$\epsilon$L and H$\epsilon$L, respectively. While most ligands are predominately used as a H$\epsilon$L or predominately used as a L$\epsilon$L, there are exceptions which will be illustrated in the section below on "LETC Reaction Equilibria" and in Table 27.

We understand that a LETC process occurs, as the temperature is raised, because a decrease in L$\epsilon$MLC concentration and an increase in H$\epsilon$MLC concentration takes place by a change in association of the ligands with the transition metal ion(s) in the MLC(s). Thus, an increase in temperature causes the number of transition metal ions in L$\epsilon$MLC(s) to decrease and the number of transition metal ions in H$\epsilon$MLC(s) to increase. This results in a decrease in absorption at the wavelengths absorbed by the L$\epsilon$MLC and an increase in absorption at wavelengths absorbed by the H$\epsilon$MLC. For the LETC systems described herein, the result of these MLC transformations is a reversible, net increase in the system's ability to absorb sunlight energy as the temperature is increased.

Some thermochromic systems in the literature are based on the reversible loss and gain of water by a thermochromic layer. However, in accordance with certain aspects of the present invention, unless otherwise specified, the water content of the LETC systems of the present invention is kept as low as is reasonably possible. Also, whether or not water is present, it is believed that the LETC processes described herein occur just because of the rearrangements in the way ions and molecules associate and not due to materials lost from or gained by the system. Thus, in accordance with certain aspects of the present invention, all of the active ingredients in the TC system remain in the same solution or layer throughout the operation or use of the system.

For discussions of thermodynamics, molar absorption coefficients, etc. it is convenient to use concentrations in molarity. For molarity we use the definition: "moles of solute per liter of solution" and designate molarity with the symbol, "M". However, for making up practical formulations it is often convenient to use molality. The molality is independent of temperature whereas molarity is affected by the thermal expansion of the solution. For molality we use the definition: "moles of solute per kilogram of solvent" and designate molality with the symbol, "m". If concentration is reported in molality, the value for this concentration in molarity for this solution may be determined by measuring the total volume of the solution after it is prepared.

The components of a LETC system include one or more than one type of transition metal ion, one or more than one type of L$\epsilon$L, one or more than one type of H$\epsilon$L and a solvent which provides the medium for the exchange process. The solvent itself may act as a L$\epsilon$L or H$\epsilon$L. Alternatively, the L$\epsilon$L's and/or the H$\epsilon$L's may be a part of the solvent system that helps solubilize other constituents.

Transition Metal Ions

Described herein are many particularly useful LETC systems based on complexes with first row transition metals ions. LETC systems comprising Fe(II), Co(II), Ni(II) and/or Cu(II) ions are disclosed herein. In LETC systems, the transition metal ions are considered electron acceptors. This means that the transition metal ions associate with electron donors in the sense that Lewis acids associate with Lewis bases. This is distinguished from the situation of complete electron transfer to an acceptor in which the acceptor is reduced.

Useful transition metal ion concentrations depend on (1) the desired levels of absorbance and absorbance change, (2) the path length, (layer thickness), of the LETC system, (3) the $\epsilon$ of the L$\epsilon$MLC and (4) the $\epsilon$ of the H$\epsilon$MLC. If the $\epsilon$ of the L$\epsilon$MLC is sufficiently low that its absorbance can be ignored, and $A(T_H, \lambda)$ is the desired absorbance at a higher temperature of operation, $(T_H)$, at a particular $\lambda$, then the metal ion concentration, (in moles per liter), must be equal to or greater than $A(T_H, \lambda)/(\epsilon(H\epsilon MLC, \lambda)*b)$. Where b is the path length or layer thickness in centimeters and $\epsilon(H\epsilon MLC, \lambda)$ is the molar absorption coefficient of the H$\epsilon$MLC in liter/(mole*cm) at $\lambda$. For example, if an $A(T_H, \lambda)=1$ is desired at an elevated temperature, the $\epsilon$ of the H$\epsilon$MLC is 250 liters/(mole*cm) at $\lambda$ and the desired layer thickness is 0.05 cm, then the minimum transition metal ion concentration would be 0.08M, for the unlikely event that all the transition metal ion could be shifted into the H$\epsilon$MLC. In practice the transition metal ion concentration would have to be higher than 0.08M and preferably would be greater than or equal to 1.5 times the minimum.

Generally, if the $\epsilon$ of the L$\epsilon$MLC is not too high and a thin TC layer is desired, (as it normally is), then metal ion concentration is made as high as possible while still leaving opportunity to provide enough H$\epsilon$L to give a ratio of $[H\epsilon L_T]/[Me_T]$ greater than 4, where the brackets are used to designate concentration and the subscript T designates the total concentration, in any form in the system, in moles per liter. Thus $[H\epsilon L_T]$ and $[Me_T]$ are the total concentrations of various types of H$\epsilon$L's and various types of Me in the system that could potentially participate in H$\epsilon$MLC's. The upper limit of transition metal ion concentration is determined to some extent by the solubility limit of the transition metal ions in the system, but more often by the solubility limit of the H$\epsilon$L and/or the L$\epsilon$L in the system. For most applications it is desirable that the system remain free of precipitates and haze at all temperatures of use, throughout the useful life of the thermochromic system.

Sources of transition metal ions include: hydrated and anhydrous salts of first row transition metal ions. Other sources are anhydrous complexes and complexes in which the transition metal has a coordination number of four or six in the complex. Particularly useful anions for the transition metal salts and complexes are halides, carboxylates, nitrate, perchlorate, tetrafluoroborate, phosphinates, hexafluorophosphate, hexafluoroarsenate, trifluoromethanesulfonate, bis(trifluoromethane)sulfonamide, tosylates and tetraarylborates.

Sources of transition metal ions include but are not limited to: chromium(III) chloride hexahydrate, cobalt(II) bromide, cobalt(II) chloride, cobalt(II) chloride hexahydrate, cobalt(II) iodide, cobalt(II) nitrate hexahydrate, cobalt(II) tetrafluoroborate hexahydrate, copper(II) acetate monohydrate, copper(II) bromide, copper(II) bromide dihydrate, copper(II) chloride, copper(II) chloride dihydrate, copper(II) nitrate hemipentahydrate, copper(II) perchlorate hexahydrate, copper(II) trifluoroacetate hydrate, iron(II) bromide, iron(II) tetrafluoroborate, manganese(II) bromide, manganese(II) nitrate hexahydrate, nickel(II) bis(diisobutyldithiophosphinate), nickel(II) bromide, nickel(II) bromide hexahydrate, nickel(II) carbonate hexahydrate, nickel(II) chloride hydrate, nickel(II) cyclohexanebutyrate, nickel(II) iodide, nickel(II) iodide hexahydrate, nickel(II) nitrate hexahydrate, nickel(II) perchlorate hexahydrate, nickel(II) tetrafluoroborate hexahydrate Particularly useful sources of transition metal ions that are complexes include without limitation:
bis(1-ethyl-1H-benzimidazole)diiodonickel(II);
bis(acetylacetonato)nickel(II);
copper bis(6,6,7,7,8,8,8-heptafluoro-2,2-dimethyl-3,5-octanedionate);
copper(II) hexafluoroacetylacetonate hydrate;
dibromo(1'-ethyl-1-methyl-1H,1'H-2,4'-bibenzimidazole) nickel(II);
dibromo[2,2'-propane-2,2-diylbis(1-pentyl-1H-benzimidazole)]nickel(II);
dibromo {6-methyl-N-[(6-methylpyridin-2-yl)methyl]-N-pyridin-2-ylpyridin-2-amine}nickel(II);
dibromo[N-butyl-1-ethyl-N-(1-ethyl-1H-benzimidazol-2-yl)-1H-benzimidazol-2-amine]nickel(II);
dibromo(N-butyl-N-pyridin-2-ylpyridin-2-amine)nickel(II);
dibromo(N-pyridin-2-ylpyridin-2-amine)nickel(II);
dibromobis[1-(3-phenylpropyl)-1H-imidazole]nickel(II);
dibromobis(1-ethyl-1H-benzimidazole)nickel(II);
dibromobis(1-pentyl-1H-benzimidazole)nickel(II);
dibromobis(2,2-dimethylpropane-1,3-diol)nickel(II);
dibromobis[2-ethyl-2-(hydroxymethyl)propane-1,3-diol] nickel(II);
dibromobis(triphenylphosphine)nickel(II);
dibromotris(2,2-dimethylpropane-1,3-diol)nickel(II);
diiodobis[1-(3-phenylpropyl)-1H-imidazole]nickel(II);
diiodobis[2-ethyl-2-(hydroxymethyl)propane-1,3-diol] nickel(II);
diiodobis(tricyclohexylphosphine)nickel(II);
diiodobis(triphenylphosphine)cobalt(II);
diiodobis(triphenylphosphine)nickel(II);
lithium tetrabromonickelate(II);
nickel(II) bromide-(2-methoxyethyl ether complex);
nickel(II) bromide-(ethylene glycol dimethyl ether complex);
tetrabutylammonium tetrabromonickelate(II);
tetrabutylammonium tetrachloronickelate(II);
tetrabutylammonium tetraiodonickelate(II);
tetraethylammonium tetrabromocobaltate(II);
tetraethylammonium tetrabromonickelate(II);
tetrabutylammonium triiodo[4-(3-phenylpropyl)pyridine] nickelate (II); and
tetrabutylammonium triiodo(triphenylphosphine)nickelate (II).

The use of metal complexes can be advantageous because just the act of preparing complexes often improves the purity of these sources of transition metal ions. Many simple transition metal salts contain traces of hydroxides, oxides and oxyhydroxides that cause haziness in thermochromic systems prepared from these salts. Complex formation often largely eliminates or avoids these impurities. Also, many of the non-ligating impurities which might be present in a batch of ligand material are often excluded when the complex is formed in the process of synthesizing the complex. Thus ligands added as part of a complex are often more pure than ligands added directly to the rest of the system. While complexes, once prepared, may be further purified, surprisingly we have discovered that just preparing the complexes often eliminates many of the impurity issues that might otherwise detract from preparing stable, high performance thermochromic systems. In addition, these complexes are often less hygroscopic than most simple metal salts which assists in preparing systems with low water content. Even complexes that are hygroscopic are often less prone to forming hydroxides, oxides and oxyhydroxides during storage as compared to metal salts like e.g. simple halide salts. Significant advantages are also realized with the use of complexes since these complexes are usually more readily dispersed and dissolved in polymers in the LETC layer production process. This facilitates the production of uniform composition and uniform performance layers especially in the extrusion processes preferred for making LETC layers.

Types of Ligands in LETC Systems

In LETC systems, the ligands serve as electron donors. This means that the ligands associate with transition metals in the sense that Lewis bases associate with Lewis acids. This is distinguished from the situation of complete electron transfer from a donor in which the donor is oxidized. A definition for HϵL's and LϵL's is given above. However, a molecule or ion may be a HϵL under one set of conditions and a LϵL under another set of conditions, and of course vice versa. Thus one must look at the main or predominant equilibrium reaction equation of a LETC system to see if the ligand is a LϵL or a HϵL.

A given ligand may coordinate to a metal ion at one or more than one site around the metal ion. Ligands that coordinate in a single site are referred to as monodentate and ligands that coordinate in multiple sites are referred to as polydentate. As the names signify, bidentate, tridentate, tetradentate and hexadentate ligands coordinate in two, three, four and six sites, respectively.

Figure 4:
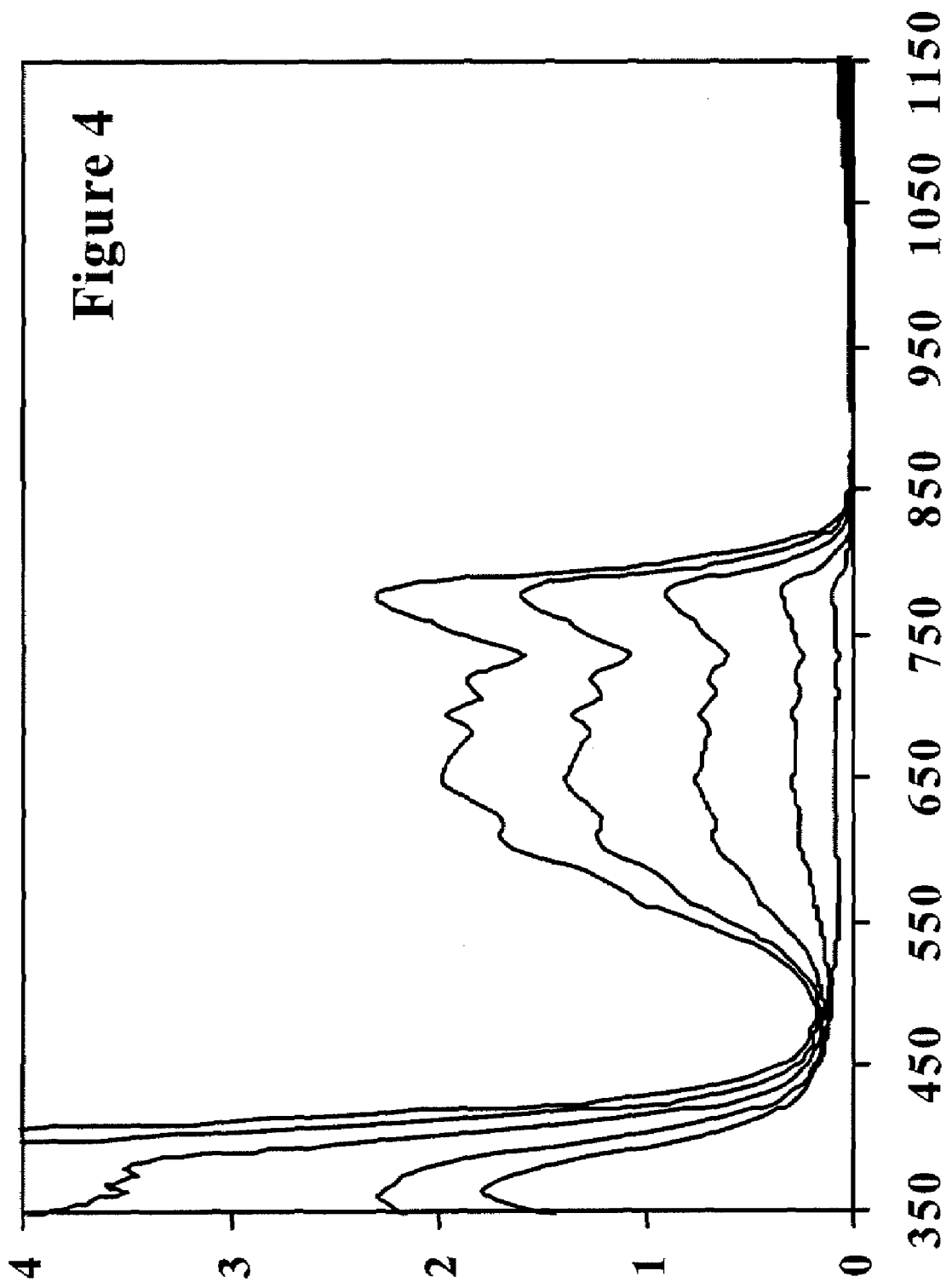
Figure 5:
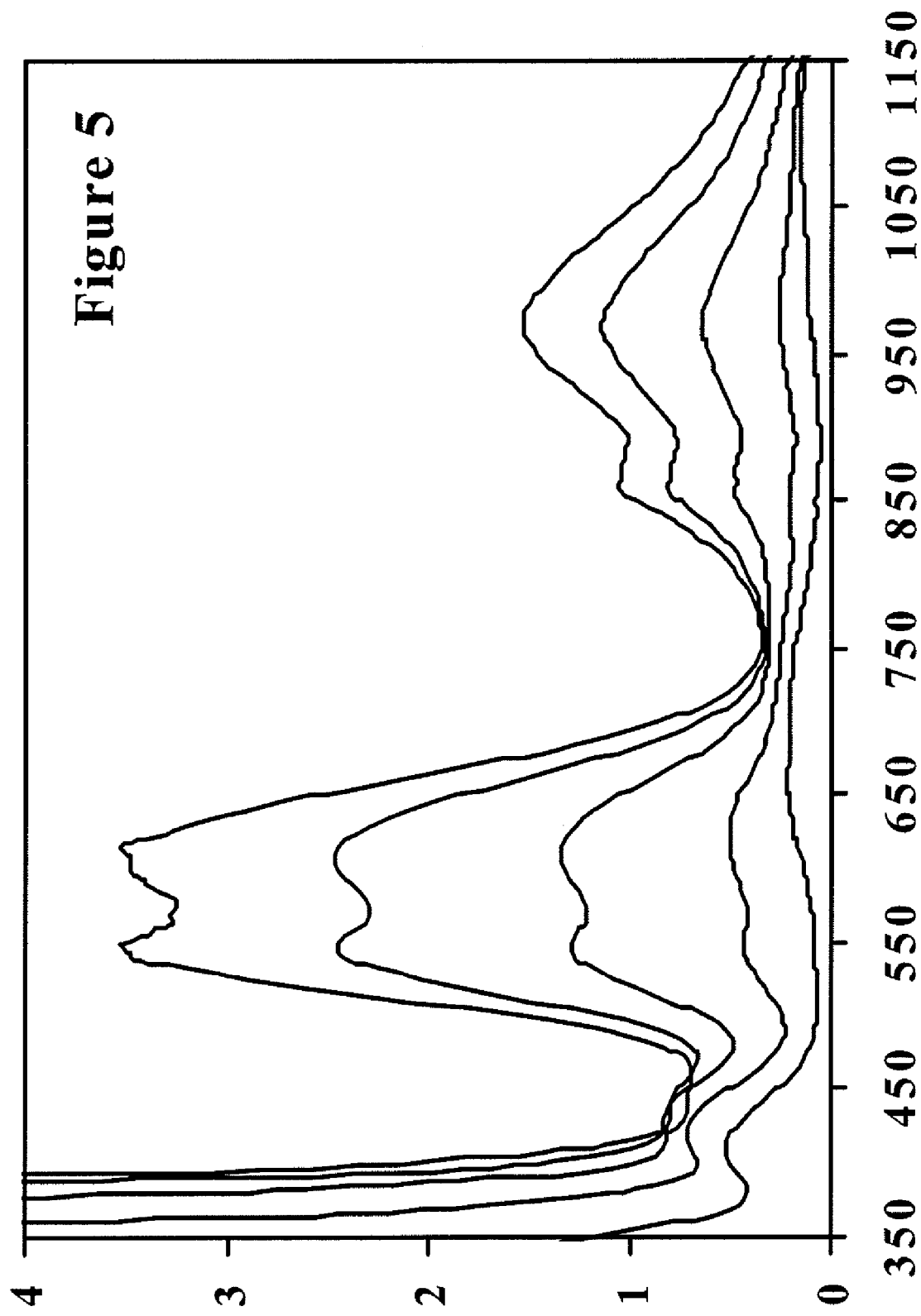
Figure 6:
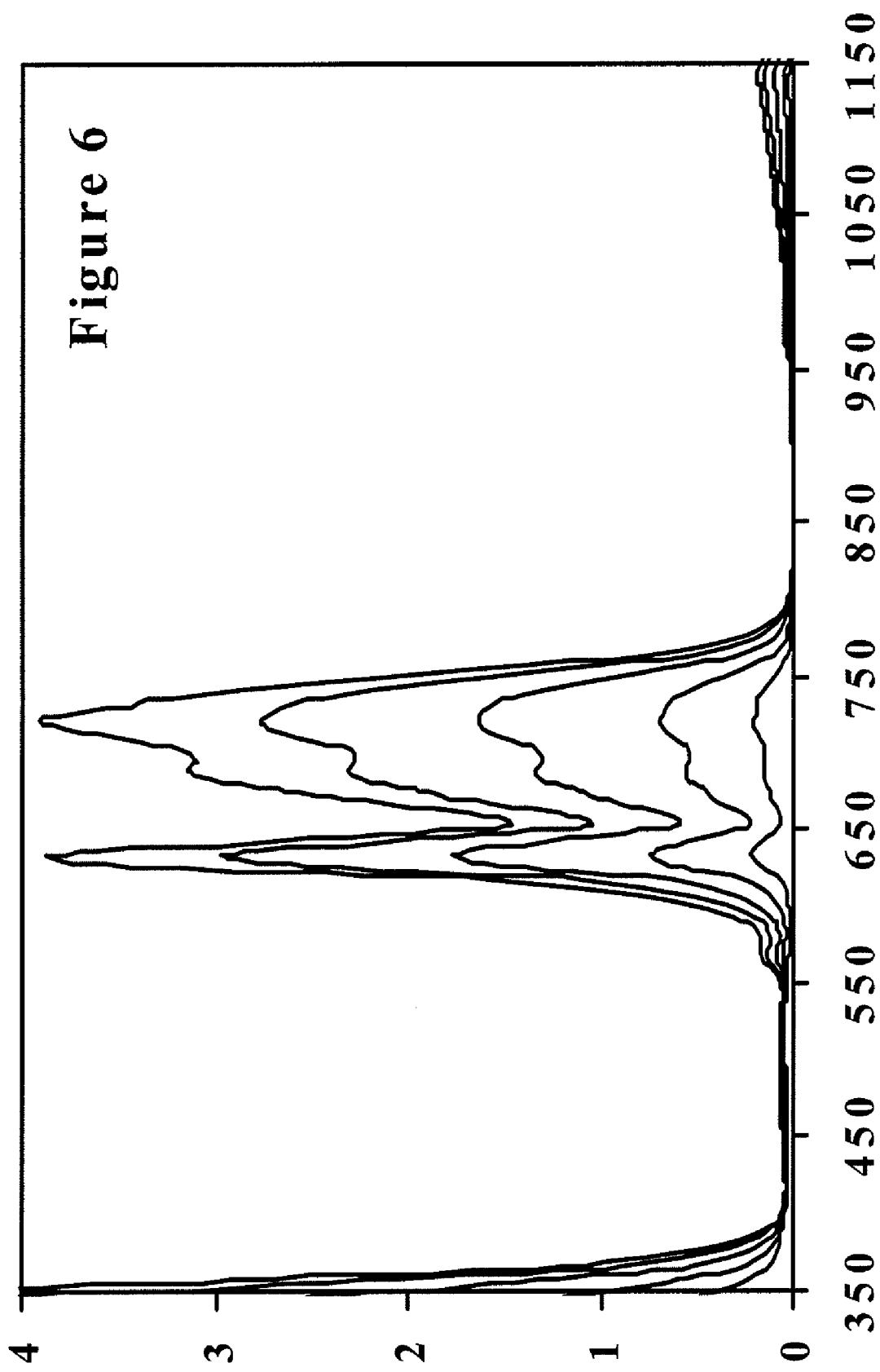
Figure 7:
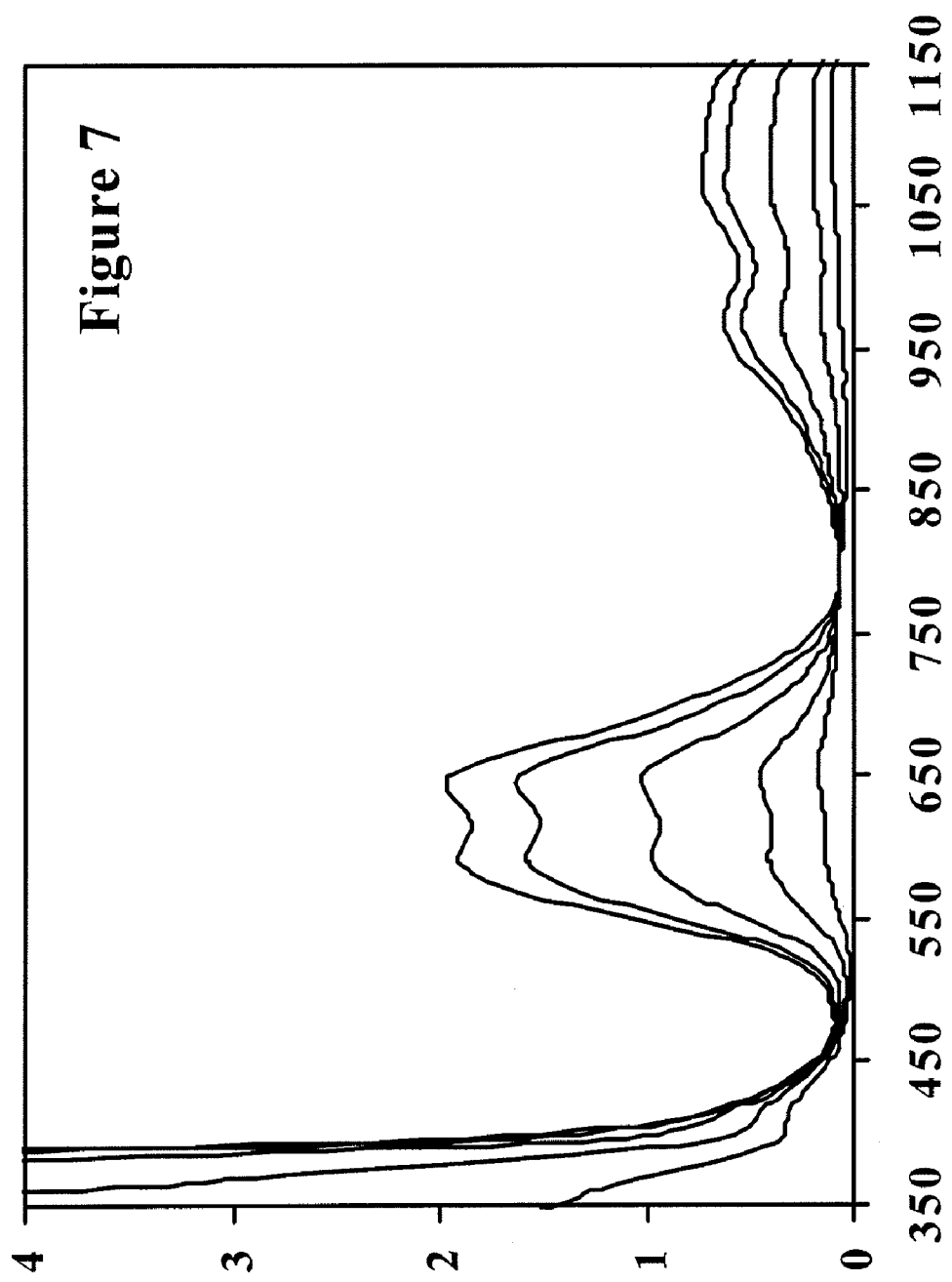
Figure 8:
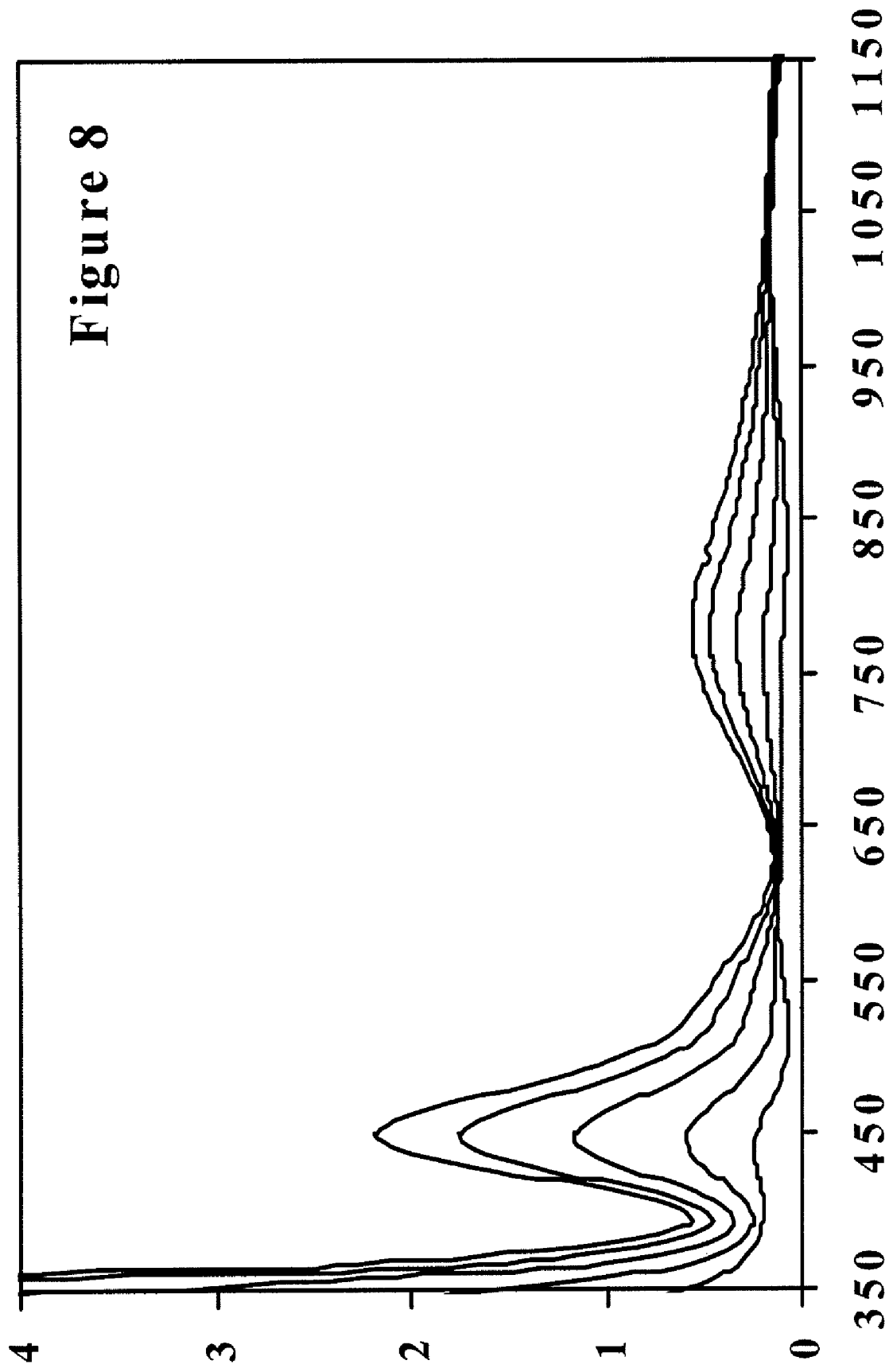
Figure 9:
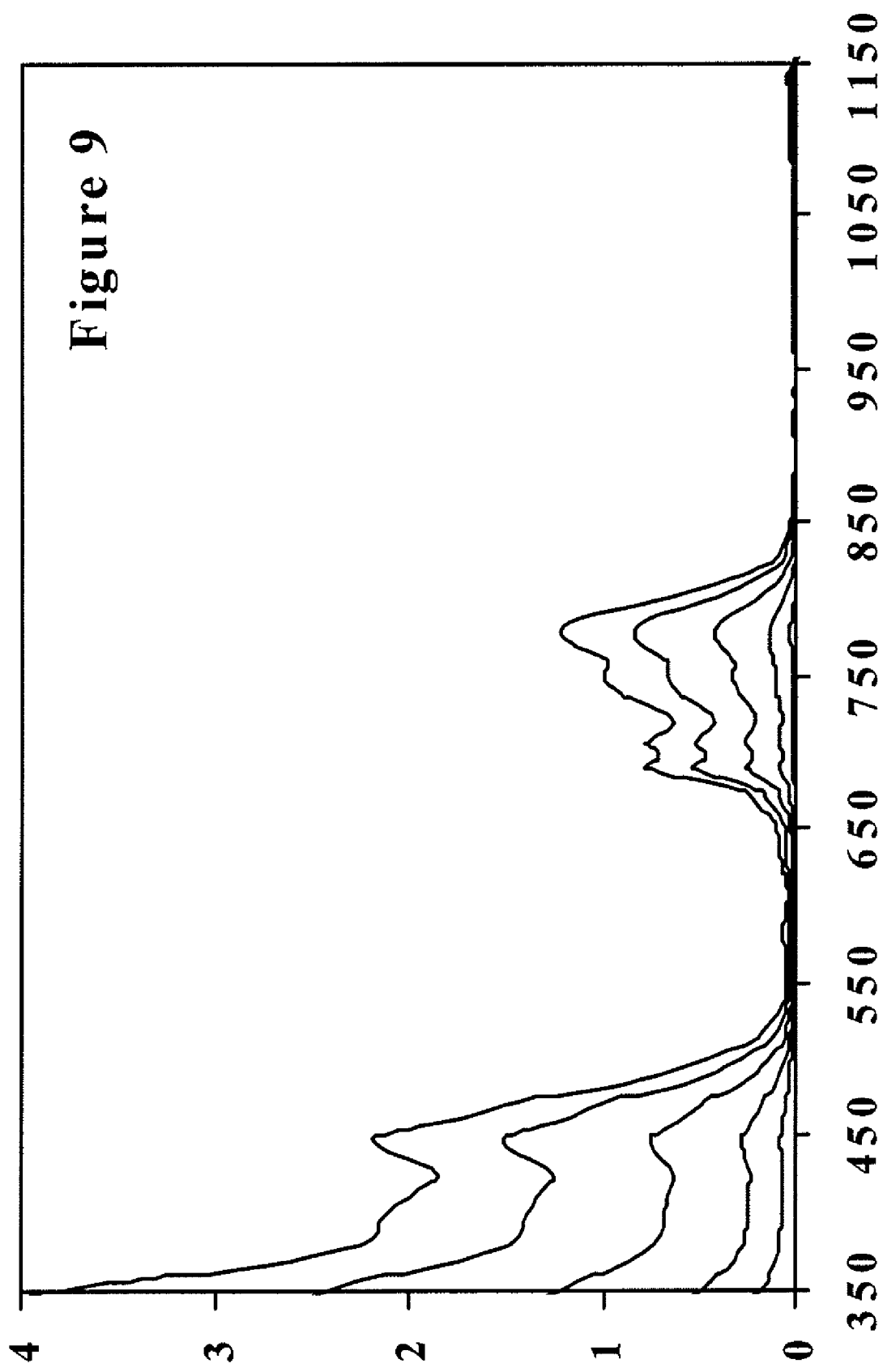
Figure 27:
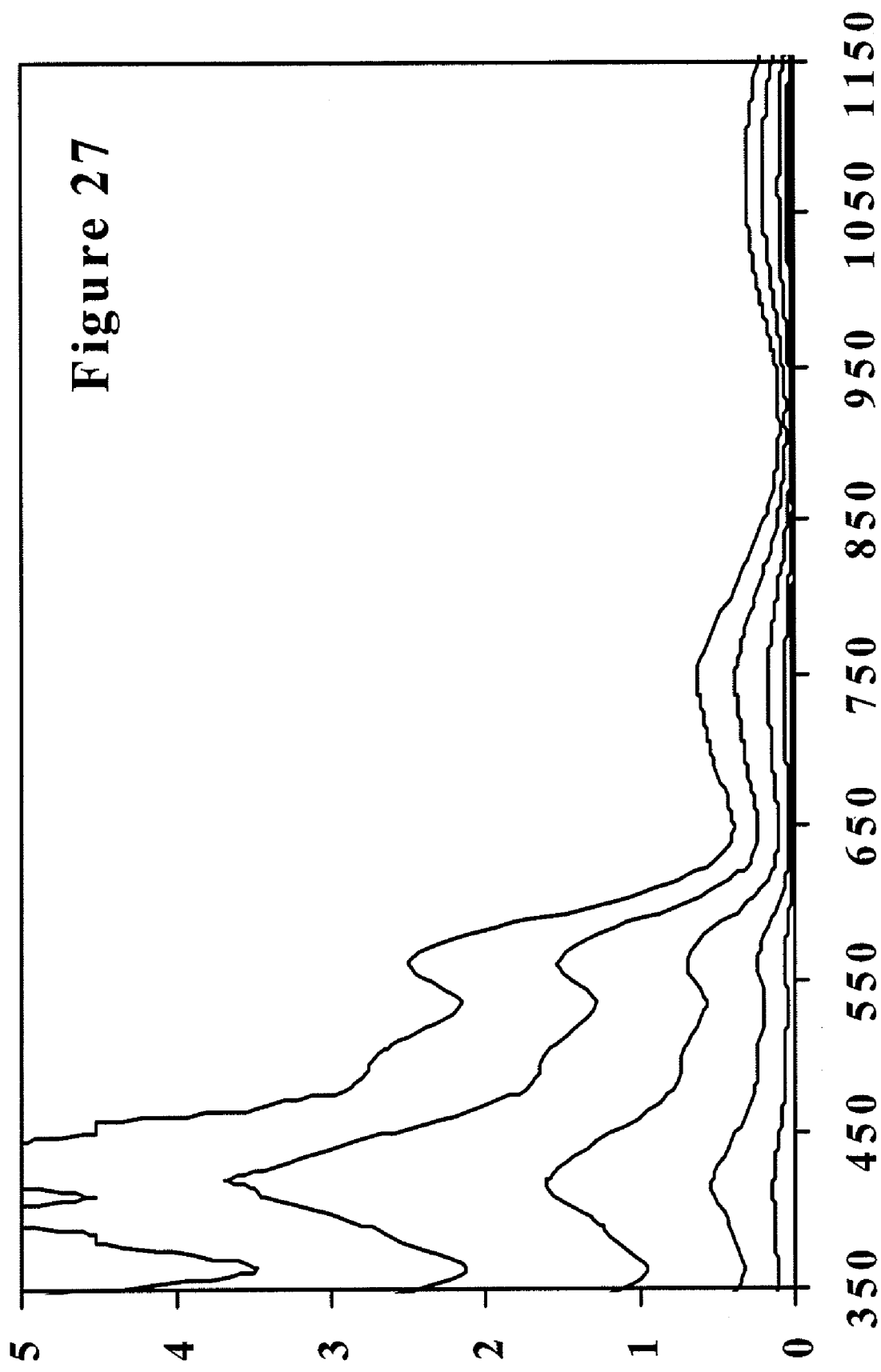
Figure 28:
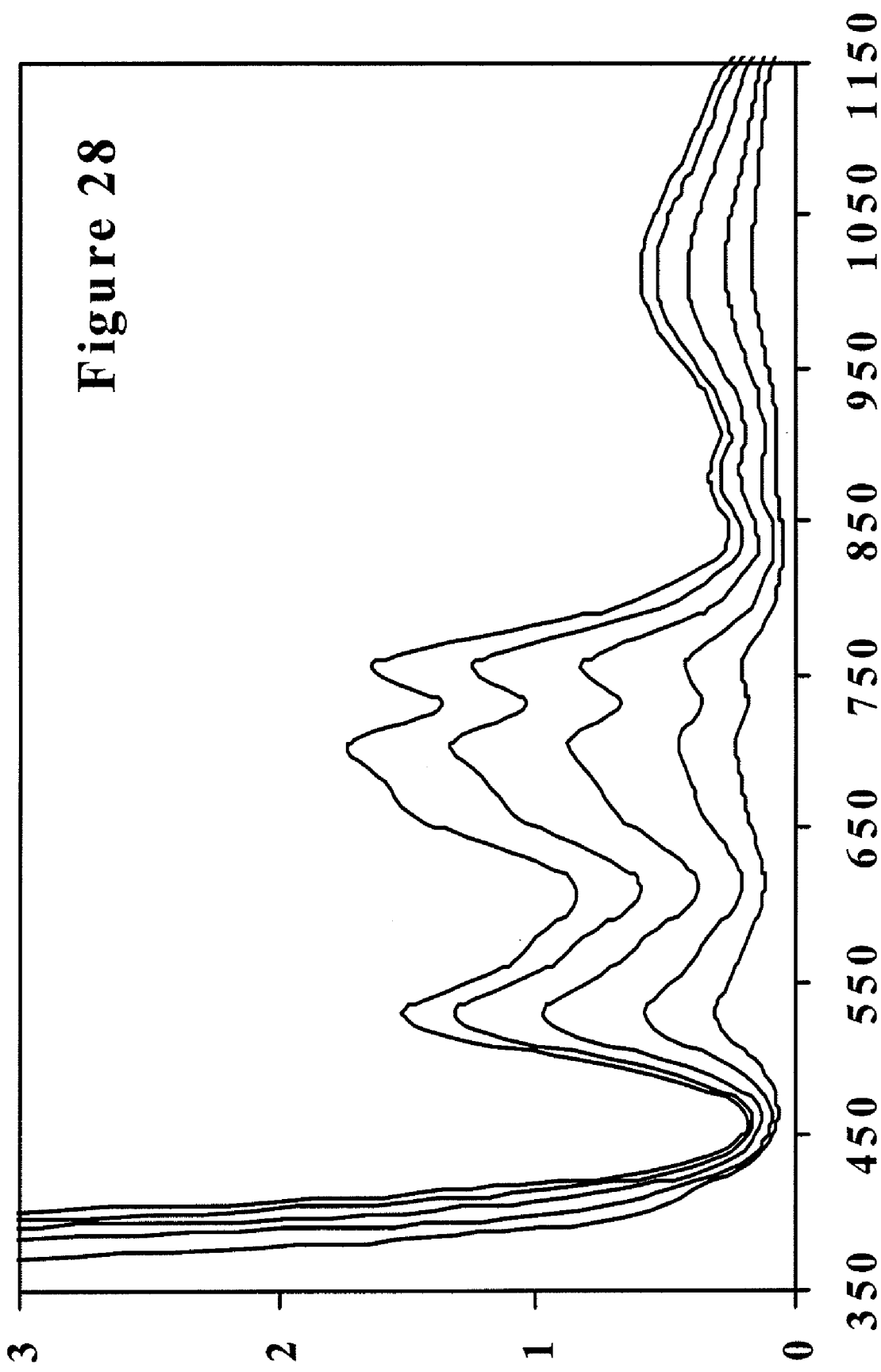

Metal ions may be coordinated by ligands of a single type like many well known hexa-aquo coordinated ions in which six water molecules surround a metal ion or when four of a single type of halide anions surround a metal ion as in a tetrahalo-metalate complex. These are known as homoleptic complexes. However, many heteroleptic, (mixed ligand), complexes are known where two or more different ligand types coordinate to the same metal ion at the same time. For example, a heteroleptic complex is formed when the ligands around a single metal ion consist of two iodide ions and two molecules of some type of phosphine compound which coordinates to metal ions through phosphorus. This is illustrated for increases in concentration with increasing temperature for Co(II)I$_2$(Ph$_3$P)$_2$ in FIG. 9 and for Ni(II)I$_2$(Ph$_3$P)$_2$ in FIG. 27. Another example is iodide ions and trifluoroacetate ions coordinated at the same time to Co(II) ions as shown in FIG. 4. Many other TC systems that involve heteroleptic HϵMLC's are listed in Table 27.

LϵL

The best LϵL's promote the formation of LϵMLC's with the least amount of absorbance, (lowest ϵ's), and help promote the highest positive values of ΔH° and ΔS° for the LETC reaction, (as discussed later). They also help solubilize other system components and help provide desirable physical properties to TC layers when the layer involves a polymeric material which comprises the rest of the TC system.

Hydroxyl groups attached to carbon provide LϵL functionality. The MLC's, formed by coordination of ligands to transition metals through hydroxyl groups, tend to have some of the lowest values for ϵ throughout the visible light wavelength range. In general, the useful LϵL's for LETC systems include water, diols, triols or polyols. Water is a useful LϵL or co-LϵL when Fe(II) and/or Cu(II) ions are used in the LETC system. While water is a useful LϵL with regard to good thermochromic performance with other transition metal ions, it is to be avoided or limited to low conentrations in most LETC systems because of its relatively low boiling point and its reactive nature.

Some diols that are useful as LϵL's are represented by the following structure:

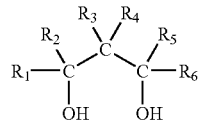

wherein R$_1$, R$_2$, R$_3$, R$_4$, R$_5$ and R$_6$ are independently selected from straight, branched, substituted or unsubstituted alkyl; substituted or unsubstituted aryl; or substituted or unsubstituted aralkyl. Some specific examples of the above structure are: 1,3-Cyclohexanediol; 1,1-Bis(hydroxymethyl)cyclopropane; 2,2-Bis(hydroxymethyl)propionic acid; 2,2-Dibutyl-1,3-propanediol; 2,2-Diethyl-1,3-propanediol; 2,2,4-Trimethyl-1,3-pentanediol; 2,4-Dimethyl-2,4-pentanediol; 2,4-Pentanediol; 2-Bromo-2-nitro-1,3-propanediol; Serinol; 2-Butyl-2-Ethyl-1,3-propanediol; 2-Ethyl-1,3-hexanediol; 2-Methyl-1,3-propanediol; 2-Methyl-2,4-pentanediol; 2-Methyl-2-propyl-1,3-propanediol; 2-Methylenepropane-1,3-diol; 2-Phenyl-1,3-propanediol; Cyclohex-3-ene-1,1-diyldimethanol; 3-Methyl-1,3-butanediol; 3-Methyl-2,4-heptanediol; [2-(2-phenylethyl)-1,3-dioxane-5,5-diyl] dimethanol; Neopentyl Glycol; and Trimethylolpropane allyl ether.

Some triols that are useful as LϵL's are represented by the following structure:

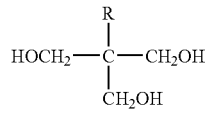

wherein R is selected from straight, branched, substituted or unsubstituted alkyl; substituted or unsubstituted aryl; substituted or unsubstituted aralkyl; a nitro group; or a substituted or unsubstituted amino group. Some specific examples of the above structure are: 2,2'-(propane-1,3-diyldiimino)bis[2-(hydroxymethyl)propane-1,3-diol]; 2-[bis(2-hydroxyethyl) amino]-2-(hydroxymethyl)propane-1,3-diol; Dipentaerythritol; Pentaerythritol; 2-(bromomethyl)-2-(hydroxymethyl) propane-1,3-diol; 2-(hydroxymethyl)-2-propylpropane-1,3-diol; 2-(hydroxymethyl)-2-methylpropane-1,3-diol; 2-(hydroxymethyl)propane-1,3-diol; 2-(hydroxymethyl)-2-nitropropane-1,3-diol; Trimethylolpropane; 2-amino-2-(hydroxymethyl)propane-1,3-diol.

Depending on the transition metal ion, the HϵL's, the liquid or polymer solvent used in the LETC system, the following list of LϵL's may also be useful: Di(Trimethylolpropane); L-Fucose; meso-Erythritol; N-propyl-N-pyridin-2-ylpyridin-2-amine; Poly(vinylbutyral); Poly(vinylpyrrolidone); Tetrahydrofurfuryl alcohol; Tetrahydropyran-2-methanol; Triethanolamine; 1,2,4-Butanetriol; 1,2-phenylenedimethanol; 1,2-Hexanediol; 1,2-Propanediol; cis,cis-1,3,5-Cyclohexanetriol; 1,3,5-Pentanetriol; 2,5-bis(hydroxymethyl)-1,4-dioxane-2,5-diol; 1,4-Butanediol; 1,4-Cyclohexanediol; 18-Crown-6; 2,3-Dimethyl-2,3-butanediol; 2-Phenyl-1,2-Propanediol; 3-(Diethylamino)-1,2-propanediol; 2-ethyl-2-(hydroxymethyl)butane-1,4-diol; 3,3-Dimethyl-1,2-butanediol; 3-Hydroxypropionitrile; 3-Methyl-1,3,5-Pentanetriol; 3-Phenoxy-1,2-Propanediol; 4-Hydroxy-4-methyl-2-pentanone; 3-Phenyl-1-propanol; (5-methyl-1,3-dioxan-5-yl)

methanol; Bis(methylsulfinyl)methane; Butyl sulfoxide; Diethylene glycol; Diethylformamide; Hexamethylphosphoramide; 3,3'-oxydipropane-1,2-diol; Dimethyl sulfoxide; Ethanol; Ethylene Glycol; Glycerol; Glycolic Acid; 3-(2-methoxyphenoxy)propane-1,2-diol; Lithium Salicylate; Lithium Trifluoroacetate; N,N-Dimethylformamide; 1,1,3,3-Tetramethylurea; 2,2-dimethylpropan-1-ol; Pentaethylene glycol; Pentaerythritol ethoxylate; tetrahydrothiophene 1-oxide; Tributylphosphine oxide; Trimethylolpropane ethoxylate; Trimethylolpropane propoxylate; Triphenylphosphine oxide.

When the transition metal ion is Ni(II) and the use of water as a L∈L is problematic, α and especially β diols are useful L∈L's. A diol is an α diol when two hydroxyl groups are present on adjacent carbons like in 2,3-butantediol. A diol is a β diol when two hydroxyl groups are present on carbons separated by an additional carbon like in 1,3-butanediol. In many cases, these α and β diols act as bidentate ligands and they are more useful than triols because the diols, especially β diols, give higher positive values of $\Delta H°$ and $\Delta S°$ for LETC reactions involving Ni(II) ions and most H∈L's. In most cases the triols act as tridentate ligands and occasionally they are as useful as diols with Ni(II) based systems because lower concentrations of triols are required which may result in easier processing of the systems which involve polymer layers.

In general, triols are useful L∈L's for Co(II) ions in applications where the use of water is problematic. Triols may be more useful than diols with Co(II) because the tridentate nature of the triols allows them to better compete for complexation of Co(II) ions and thus form higher performance TC systems which also comprise most H∈L's of interest for use with Co(II) ions. With Co(II), the amount of diol required to compete with most H∈L's is too high for most practical applications involving LETC systems in polymer layers. If the concentration requirement for L∈L is too high, either that amount of L∈L is above the solubility limit or it is difficult to uniformly disperse in the LETC layer. Alternatively, too much L∈L may make it difficult to produce a LETC film or sheet, by e.g., extrusion, because of poor physical properties like softness, tackiness, streaks and non-uniform thickness.

L∈L character may also be provided by the hydroxyl groups on various polyol polymers like hydroxyethyl cellulose, hydroxypropyl cellulose, poly(vinyl butyral), poly(vinyl alcohol) and poly(hydroxyalkylmethacrylates and acrylates). Some of these polymers even provide P diol type functionality.

Acceptable concentrations of L∈L's are determined by the concentrations of the transition metal ions and the ratio of H∈L's to transition metal ions. The temperature range of the application and the effectiveness of the L∈L, (i.e. the stability constant for the formation of the L∈MLC), are also important in determining useful concentrations. A specific L∈L and its concentration are often chosen such that the absorbance of the LETC layer is less than 0.2 at 25 C and the absorbance still increases to greater than 0.8 at 85 C. These absorbance changes are for the active wavelength range, (at least at one of the $\lambda_{max}$ values), of a H∈MLC in the LETC system.

H∈L

Particularly useful H∈L's include the halides: chloride, bromide and iodide and pseudohalides like cyanate, thiocyanate, selenocyanate, azide and cyanide. Other particularly useful H∈L's include molecules or ions which coordinate to transition metal ions through nitrogen, oxygen, phosphorus, sulfur and/or selenium. The preferred H∈L's are those which provide for the highest ∈ for the H∈MLC formed and those which participate in equilibrium reactions with the transition metal ions and the L∈L's wherein there are high positive values of $\Delta H°$ and $\Delta S°$ for the overall LETC reaction. Described herein are particularly high performance LETC systems involving iodide ions as a H∈L. High performance LETC systems are also disclosed wherein phosphine molecules which coordinate through a phosphorus are used as H∈L's. Examples of these phosphine compounds include ethyldiphenylphosphine, triphenylphosphine and tricyclohexylphosphine. Particularly high performance LETC systems involve phosphinates as H∈L's. Particularly high performance LETC systems are also described involving phosphine compounds and iodide in combination and these H∈L's in combination with other H∈L's. The present application describes LETC systems in which a H∈L is a five membered, heterocyclic, organic ring compound which coordinates to a transition metal through nitrogen. These ligands have advantages over six membered ring compounds which coordinate through nitrogen in that they are more likely to allow TC activity at 550 nm, which is near the peak of human eye sensitivity for light. Other advantages of various ligands are described below.

Not only do iodide and phosphine compounds like $Ph_3P$ and other triaryl, trialkyl mixed aryl/alkyl phosphines, when used together, form H∈MLC's with large values of ∈, we have discovered a special effect where an excess of $Ph_3P$ can minimize or eliminate undesirable residual color in a TC layer produced with these ligands. Presumably this is because the phosphine compound sequesters a small amount of residual $I_2$ and thus prevents the appearance of a yellow color due to free iodine. This free iodine may be the result of air oxidation of iodide during processing and this problem is mitigated when an excess of a phosphine compound is present. This synergistic effect with or without the use of seals to minimize the ingress of oxygen has allowed for the use and production of these high performance, LETC systems. In addition, it has been discovered that even when the phosphine compound is not intended to be used as a ligand, that an amount of phosphine compound less than stoichiometric to the amount of transition metal ion can be used when iodide is a used as a ligand. Even these small amounts of phosphine compound are useful to mitigate the effects of residual color formation during processing of these TC systems into layers.

Useful concentrations for H∈L's are largely dependent on the transition metal ion concentrations used in the LETC system. Generally it is useful to have a H∈L concentration as high as is chemically possible and/or economically possible. Specifically it is useful that the concentration ratio for the H∈L's to transition metal ions be greater than 4 and in many cases that the ratio be greater than 7. This is the ratio for the total concentration of all H∈L's, $[H∈L_T]$, to the total concentration of all transition metal ions, $[Me_T]$, which together could potentially be involved in forming H∈MLC's. The advantages of high ratios of H∈L's to metal ions are discussed below.

Ligands containing a nitrogen-containing 5- or 6-membered heterocyclic compound that coordinates through the nitrogen atom to the nitrogen transition metal ion in an H∈MLC formed between the transition metal ion and the ligand are particularly useful. Examples of these ligands include those having the following structure:

wherein $X_1$ and $X_3$ are each independently selected from the group consisting of C, C—R, N, and N—R; $X_2$ is C or C—R; $X_4$ is C, C—R, N, N—R, O, S or Se; $X_5$ is C, N, S, C—R, each R is independently selected from the group consisting of hydrogen, substituted or unsubstituted straight or branched alkyl, substituted or unsubstituted aryl, aralkyl, and combinations thereof, provided that optionally two or more R groups may be joined to form one or more substituted or unsubstituted fused saturated or unsaturated ring systems.

Certain HeL's ligands coordinate more strongly and form coordination compounds that absorb at certain desirable wavelengths, especially in the 550 nm region, when there is a nitrogen in a 5 membered ring. Some of these HeL's that are imidazoles, oxazoles, thiazoles or selenazoles are represented by the following structure:

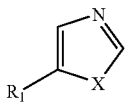

wherein X=N—H, N—R, O, S, or Se and wherein R and $R_1$ are independently chosen from straight or branched, substituted or unsubstituted alkyl; substituted or unsubstituted aryl; or substituted or unsubstituted aralkyl.

Some of these HeL's that are pyrazoles, isoxazoles, isothiazoles, or isoselenazoles are represented by the following structure:

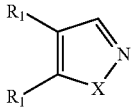

wherein X=N—H, N—R, O, S, or Se and wherein R, $R_1$ and $R_2$ are independently chosen from straight or branched, substituted or unsubstituted alkyl; substituted or unsubstituted aryl; or substituted or unsubstituted aralkyl.

Some of these HeL's that are benzimidazoles, benzoxazoles, benzothiazoles, or benzoselenazoles are represented by the following structure:

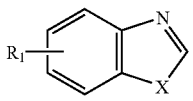

wherein X=N—H, N—R, O, S, or Se and wherein R and $R_1$ are independently chosen from straight or branched, substituted or unsubstituted alkyl; substituted or unsubstituted aryl; or substituted or unsubstituted aralkyl.

Some of these HeL's that are indazoles, benzisoxazoles, benzoisothiazoles, or benzoisoselenazoles are represented by the following structure:

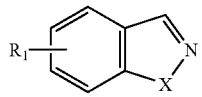

wherein X=N—H, N—R, O, S, or Se and wherein R and $R_1$ are independently chosen from straight or branched, substituted or unsubstituted alkyl; substituted or unsubstituted aryl; or substituted or unsubstituted aralkyl.

Other HeL's that coordinate to transition metals though a nitrogen in a five membered ring are imidazo[1,5-a]pyridine; imidazo[1,2-a]pyridine; 1,2,4-triazolo[1,5-a]pyrimidine; 2,1,3-Benzothiadiazole; 5-azabenzimidazoles; and 4-azabenzimidazoles.

Bidentate HeL's in which heterocyclic nitrogen containing groups are bridged by alkyl, amine, amine-methylene or benzene as a spacer are represented by the following structure:

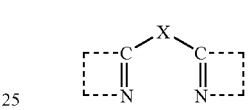

$X = (CH_2)_n$ n = 1 to 4,

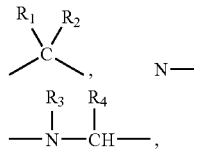 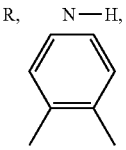

wherein R, $R_1$, $R_2$, $R_3$, and $R_4$ are independently chosen from straight or branched, substituted or unsubstituted alkyl; substituted or unsubstituted aryl; or substituted or unsubstituted aralkyl.

and wherein each

independently represents a nitrogen-containing five or six membered ring and in certain cases is independently chosen from substituted or unsubstituted imidazole, pyridine, benzimidazole, benzothiazole, indazole, pyrazole, etc.

HeL's that function as tridentate ligands that coordinate with 3 nitrogens are represented by the following structure:

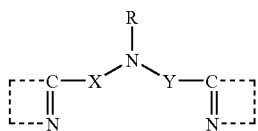

wherein X and Y are independently chosen from $(CH_2)_n$ n=1 to 3; R=straight or branched, substituted or unsubstituted alkyl; substituted or unsubstituted aryl; or substituted or unsubstituted aralkyl;

and each

independently represents a nitrogen-containing five or six membered ring and in certain cases is independently chosen from substituted or unsubstituted imidazole, pyridine, benzimidazole, benzothiazole, indazole, pyrazole, etc.

HεL's that can coordinate in multiple bidentate configurations are represented by the following structure:

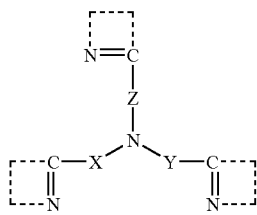

wherein only 1 or 2 of X, Y and Z are $(CH_2)_n$ n=1 to 2 and the others are a direct bond between N and the ring C, and each

independently represents a nitrogen-containing five or six membered ring and in certain cases is independently chosen from substituted or unsubstituted imidazole, pyridine benzimidazole, benzothiazole, indazole, pyrazole, etc.

HεL's that are ortho hindered pyridines are represented by the following structure:

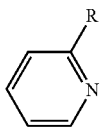

wherein R=halide; substituted or unsubstituted, straight or branched alkyl; substituted or unsubstituted aryl; or substituted or unsubstituted aralkyl.

HεL's that function as bidentate ligands via an amine type nitrogen and an imine type nitrogen are represented by the following structure:

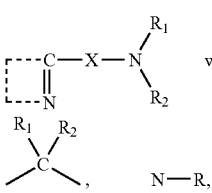

wherein $X = (CH_2)_n$ n = 1 to 4, and R, $R_1$, $R_2$, $R_3$, and $R_4$ are independently chosen from substituted or unsubstituted, straight or branched alkyl; substituted or unsubstituted aryl; or substituted or unsubstituted aralkyl;

and

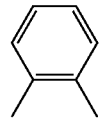

each independently represents a nitrogen-containing five or six membered ring and in certain cases is independently chosen from substituted or unsubstituted imidazole, pyridine, benzimidazole, benzothiazole, indazole, pyrazole, etc.

In many of the structures above,

may be replaced by —$NR_1R_2$ where $R_1$ and $R_2$ are independently chosen from substituted or unsubstituted, straight or branched alkyl; substituted or unsubstituted aryl; or substituted or unsubstituted aralkyl.

HεL's that coordinate via a mercapto group and an imine type nitrogen are represented by the following structure:

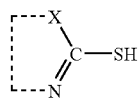

wherein X=N—H, N—R, O, S, or Se and R=substituted or unsubstituted, straight or branched alkyl; substituted or unsubstituted aryl; or substituted or unsubstituted aralkyl.

HεL's that are phosphine compounds are represented by the following structure:

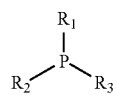

wherein $R_1$, $R_2$ and $R_3$ are independently selected from alkyl, cycloalkyl, or substituted or unsubstituted aryl.

In many cases, HεMLC's that involve the ligands with the structures above, also involve halides or pseudohalides in the same HεMLC's. Other useful HεL's are given in the key section of Table 27.

Solvents

In LETC systems, any solvent that provides for and maintains the dissolution of the metal salt complexes and ligands, allows for the change or exchange of ligands to take place and does not detract from the reversibility or stability of the system is acceptable. Some of the solvents that we have found, which meet these criteria, are liquids at 25 C. These include polar organic solvents like acetonitrile, glutaronitrile, 3-methoxypropionitrile, sulfolane, 1,1,3,3-tetramethylurea, dimethylsufoxide, hexamethylphosphoramide, ϵ-caprolactone, dimethylformamide, ethylene glycol, and propylene glycol. In many cases it is effective to have a relatively indifferent solvent with respect to metal ion complexation like propylene carbonate or γ-BL so that the LETC equilibrium is established largely by the interaction of the LϵL's, the HϵL's and the transition metal ions dissolved in the solvent.

Other effective solvents, that are polymers, include poly (vinylalcohol); copolymers of poly(vinylalcohol) with vinyl acetate, methylmethacrylate, ethylene and the like; poly(vinyl acetals) including poly(vinyl butyral); cellulose acetates; urethanes; hydroxyalkylcelluloses; hydroxy-substituted polyacrylates like poly(hydroxyethyl methacrylate) and poly (1-glycerol methacrylate); poly(2-ethyl-2-oxazoline); poly (N-vinylpyrrolidone); poly(vinyl methyl ether); polyacrylamide; poly(N,N-dimethylacrylamide); polyvinylpyridines and various copolymers which involve these polymer functionalities. Also useful are solvent systems which involve a combination of one or more than one of the solvents, which are liquids at 25 C, dissolved in a polymer. Particularly useful are polymers that form solutions of LETC systems that will not flow under the influence of gravity alone in the temperature range of 0 to 100 Celsius. Polymers that form solutions of LETC systems that are solids in the temperature range of 0 to 100 Celsius are particularly useful.

The solvent may also be the solid matrix portion and/or the liquid solution portion of a gel. In a "chemical gel" there is a liquid phase and a solid matrix phase. The solid matrix phase may be an inorganic polymer like in a common sol-gel or it may be an organic polymer which is crosslinked or a star polymer which forms a three dimensional network. The liquid phase for a LETC system is preferably one or more of the liquids at 25 C listed above. The gel may be a chemical gel including a "molecular gel" or a physical gel. For a more detailed discussion of gels see: Electrochimica Acta 46, 2015-2022 (2001).

In principle, the solvent may be a molten salt including a low temperature or room temperature ionic liquid.

Certain LϵL's, especially diols, triols and polyols, are effective in promoting solubility of other materials in the LETC system. Also, some of these LϵL's are good plasticizers for the polymers that serve as cosolvents and matricies in LETC systems.

Types of MLC's

The spectra of many MLC's are relatively well understood; see for example "Inorganic Electronic Spectroscopy" by A. B. P. Lever, Elsevier Publishing Co. (1968) and (1984) and "Inorganic Chemistry", 3$^{rd}$ Edition, by G. L. Miessler and D. A. Tarr, Prentice Hall (2004). Generally when a set of ligands coordinates at six sites around the metal ion, the MLC has lower molar absorptivity values in the visible and NIR. This ligand configuration may be referred to as hexa-coordinate and generally gives the complex an octahedral or nearly octahedral configuration. Often, there are some relatively strong absorbances in the UV even with hexacoordinate complexes due to charge transfer type absorptions. However, absorbances due to transitions of electrons between molecular orbitals of predominately metal d-orbital character in octahedral MLC's are generally quite weak. Furthermore, the photons capable of causing such electronic transitions are almost exclusively in the visible and NIR. Whether or not a set of ligands gives rise to a hexa-coordinate or octahedral configuration, if a MLC which decreases in concentration on heating has an ϵ of less than or equal to 50 liters/(mole*cm) throughout the visible and NIR range of 400 nm to 1400 nm, then it is hereby defined as a LϵMLC.

Generally when a set of ligands coordinates at four sites around the metal ion, the MLC has a higher molar absorptivity in the visible and/or NIR. This ligand configuration may be referred to as tetra-coordinate and generally gives the complex a tetrahedral configuration, a square planar configuration or distorted versions thereof sometimes referred to as pseudo tetrahedral or pseudo square planar. Generally, the higher molar absorptivity of these complexes is due to more highly allowed electronic transitions between molecular orbitals of predominately metal d-orbital character. Occasionally the tetra-coordinate complexes have very strong absorbances due to charge transfer transitions in the visible portion of the spectrum and we have discovered that these can be used to great advantage in LETC systems. Whether or not a set of ligands gives rise to a tetra-coordinate configuration, if the MLC that increases in concentration on heating has an ϵ of greater than 50 liters/(mole*cm) anywhere in the visible or NIR region then it is hereby defined as a HϵMLC.

Given the definitions above for LϵMLC's and HϵMLC's, a few LETC thermochromic systems of interest actually function by having one HϵMLC change into another HϵMLC. In one system like this, the HϵMLC that dominates at lower temperatures absorbs mainly in the NIR and the HϵMLC that dominates at high temperatures absorbs mainly in the visible portion of the spectrum. See Table 27, entry 359.

Another system like this has a HϵMLC that dominates at lower temperatures with a modest absorptivity in the visible and has a HϵMLC that dominates at high temperatures with a higher absorptivity in the NIR. See Table 27, entries 406, 457, 861 and 901.

Apart from octahedral and tetrahedral configurations, MLC's are known in which three, five, seven, eight or even more sites around a metal ion are coordinated. In these cases, we use the same criteria as above to distinguish between them as LϵMLC's and HϵMLC's.

LϵMLC's include $Cu(H_2O)_6^{2+}$ and $Fe(H_2O)_6^{2}$. LϵMLC's include Ni(II) and Co(II) coordinated by diols, triols or polyols. Some LϵMLC's are coordination compounds with likely formulas: $Ni(TMOLP)_2^{2+}$, $Ni(2\text{-(hydroxymethyl)-2-methyl-propane-1,3-diol})_2^{2+}$, $Ni(cis,cis\text{-1,3,5-cyclohexanetriol})_2^{2+}$, $Ni(NPG)_3^{2+}$, $Ni(2,4\text{-dimethyl-2,4-pentanediol})_3^{2+}$, $Ni(3\text{-methyl-1,3,5-pentanetriol})_2^{2+}$, $Ni(poly(vinyl\ butyral))^{2+}$, $Co(TMOLP)_2^{2+}$, $Co(NPG)_3^{2+}$, $Co(2,4\text{-dimethyl-2,4-pentanediol})_3^{2+}$, $Co(cis,cis\text{-1,3,5-cyclohexanetriol})_2^{2+}$, $Co(poly(vinyl\ butyral))^{2+}$. In addition LϵMLC's are useful when diols, triols and polyols are at least partially coordinated to the transition metal ions as is often the case with Ni(II) based systems that also contain nitrogen based ligands.

Some HϵMLC's include $FeBr_4^{2-}$; $CoCl_3(S)^-$; $CoBr_3(S)^-$; $CoI_3(S)^-$; $NiCl_3(S)^-$; $NiBr_3(S)^-$; $NiI_3(S)^-$; $CoCl_4^{2-}$; $CoBr_4^{2-}$; $CoI_4^{2-}$; $NiCl_4^{2-}$; $NiBr_4^{2-}$; $NiI_4^{2-}$; $Cu(S)_2Cl_4^{2-}$; complexes of Co(II), Ni(II), or Cu(II) with ligands which coordinate to metal ions through pseudohalides, nitrogen, oxygen, phosphorus, sulfur or selenium; and complexes of Co(II), Ni(II), or Cu(II) with combinations of halides or pseudohalides and ligands which coordinate to metal ions through nitrogen, oxygen, phosphorus, sulfur or selenium. The nitrogen, oxygen, sulfur and selenium may be neutral in charge or they may have a formal negative charge, (i.e. they may be part of an anion). In the above formulas, (S), represents a solvent molecule, a hydroxyl group or an unknown ligand. One, two, three or four halides of the same type or of two or more types, (e.g. both bromide and iodide), may be coordinated to the same metal ion at the same time. Some HeMLC's involve Co(II) or Ni(II) coordinated to ligands based on pyridine derivatives, pyridazines, dipyridyl derivatives, dipyridylamines, imidazoles, bisimidazoles, indazoles, pyrazoles, benzimidazoles, bisbenzimidazoles, phosphines, phosphinates, thiols, thiol ethers and especially these ligands in combination with chloride, bromide and/or iodide. HeMLC's include complexes with ligands that may be mono, bi, tri or tetradentate.

HeMLC's include complexes with ligands based on nitrogen as a heteroatom in a five membered, organic, ring compounds. Nitrogen based ligands in five membered rings have been discovered to form LETC systems with higher performance, more desirable wavelengths of activity, especially in the 550 nm region and/or they are lower cost than many ligands based on nitrogen as a heteroatom from six membered, organic, ring compounds. Cost considerations aside, these advantages may be due to less steric hinderance for involvement by nitrogen from five membered ring compounds versus those in six membered ring compounds. On the other hand for providing absorption peaks in certain other wavelength regions HeMLC's involving ligands with nitrogens in six membered rings are still useful. Also, we have discovered HeMLC's with absorption peaks at desirable wavelengths that involve ligands with nitrogens in six membered rings like pyridine which have a substituent in a position ortho to the nitrogen. These ligands coordinate to transition metals with a strength that makes them desirable for combining with other HeMLC's that form in the same solution and give TC activity over the same temperature range. In addition, these ortho substituted pyridine and pyridine like ligands are less likely to participate in LeMLC's than unhindered versions thereof and this results in lower ε's for the LeMLC's. Quinoline and it derivatives are naturally ortho substituted pyridines and thus are effective in forming HeMLC's with these advantages.

Table 1 shows the HeMLC's for thermochromic systems where the HeMLC's are based on just Ni(II) ions, a few nitrogen containing ligands and bromide. With good LeL's in these TC systems, we obtain large absorbance increases with increasing temperature over the range 25 C to 105 C are obtained. Remarkably, these absorbance increases have $\lambda_{max}$'s that range all the way from 435 nm to 781 nm.

TABLE 1

| Most Likely HeMLC | $\lambda_{max}$ values (nm) | $\lambda_{max}$ values (nm) | $\lambda_{max}$ values (nm) |
|---|---|---|---|
| Ni(N—Pr-dipicoylamine)Br⁻ | 435 | 523 | 717 |
| Ni(N-Bu-di(1-MeBIMZ-2-ylmethyl)amine)Br⁻ | 450 | 544 | 781 |
| Ni(N—Pr-DPamine)Br₂ | 502 | 557 | |
| Ni(2,2'-propane-2,2-diylbis(1-propyl-1H-benzimidazole)Br₂ | 503 | 568 | |
| Ni(2,2'-methylenedipyridine)Br₂ | 520 | | |
| Ni(2,2'-ethane-1,2-diyldipyridine)Br₂ | 548 | 610 | |
| Ni(2,2'-propane-1,3-diyldipyridine)Br₂ | 556 | 636 | |
| Ni(1-EtBIMZ)₂Br₂ | 580 | | |
| Ni(4-(3-PhPr)Pyr)Br₃⁻ | 631 | | |
| Ni(isoquinoline)Br₃⁻ | 633 | | |
| Ni(1-EtBIMZ)Br₃⁻ | 640 | | |
| Ni(ROH)Br₃⁻ | 659 | | |
| NiBr₄²⁻ | 706 | 757 | |

Many more examples of LETC systems, with activity at a wide variety of wavelengths, are given in Table 27.

LETC Reaction Equilibria

Some generalized ligand exchange reactions with monodentate, bidentate, and tridentate LeL's are given by the following equations:

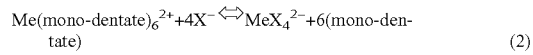

$$\text{Me(mono-dentate)}_6^{2+} + 4X^- \rightleftharpoons \text{MeX}_4^{2-} + 6(\text{mono-dentate}) \quad (2)$$

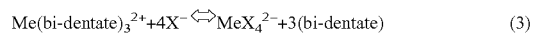

$$\text{Me(bi-dentate)}_3^{2+} + 4X^- \rightleftharpoons \text{MeX}_4^{2-} + 3(\text{bi-dentate}) \quad (3)$$

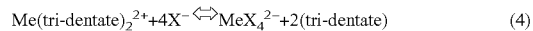

$$\text{Me(tri-dentate)}_2^{2+} + 4X^- \rightleftharpoons \text{MeX}_4^{2-} + 2(\text{tri-dentate}) \quad (4)$$

For the present disclosure all of the LETC equilibria reactions are written such that the LeMLC is on the left and HeMLC is on the right of the mass balance, equilibrium equation. In equilibria reactions (2) through (4), X⁻ is a HeL and the metal ion is changing from hexa-coordinate to tetra-coordinate. The change from hexa to tetra-coordinate is useful but is not required in LETC systems.

As used herein, transition metal ions in solution are always considered to be complexed or ligated, since even when free in solution, transition metal ions are considered to be coordinated by the solvent. However, ligands may participate in a complex or they may be free in solution where the ligands are not coordinated but are simply solvated. Thus, with many LETC systems like those above, the ligand exchange is simply between one type of LeL either being ligated to a metal ion or being free in solution and one type of HeL either being free in solution or being ligated to a metal ion. A specific example of just one of the types of equilibrium reactions that fit the above description is given below:

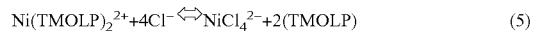

$$\text{Ni(TMOLP)}_2^{2+} + 4\text{Cl}^- \rightleftharpoons \text{NiCl}_4^{2-} + 2(\text{TMOLP}) \quad (5)$$

(light green) (blue)

NiCl₄²⁻ is a well know MLC from the literature and it is a HeMLC. Ni(TMOLP)₂²⁺ is a LeMLC. It is unlikely that the reaction in equation 5 proceeds in a single step. However in many cases the observed changes in absorbance with temperature point to a main or predominant overall reaction like that shown in equation (5).

Under some conditions with, for example, a cobalt-halide system, the observed spectral changes point to equilibria that are bit less straight forward. In the specific case in equation (6) below, the LeL, 1,3-butanediol, of the LeMLC may remain partially coordinated to the Co(II) and thus participate in the HeMLC. This is represented by the 1,3-butanediol$_{mono}$ in the formula below. For the sake of convenience, the partially coordinated diol is now said to be a HeL. The bromide, on the other hand, is the primary HeL and when the bromide is not coordinated to the Co(II) it appears on the same side of the equation as the LeMLC, Co(1,3-butanediol$_{bi}$)₃²⁺.

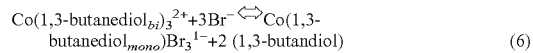

$$\text{Co(1,3-butanediol}_{bi})_3^{2+} + 3\text{Br}^- \rightleftharpoons \text{Co(1,3-butanediol}_{mono})\text{Br}_3^{1-} + 2 (1,3\text{-butanediol}) \quad (6)$$

(light pink) (blue)

Here the term 1,3-butanediol$_{bi}$ is used to designate the 1,3-butanediol as acting as a bidentate ligand and the term 1,3-butanediol$_{mono}$ is used designate a 1,3-butanediol molecule still attached to the Co(II) but now in a monodentate fashion where essentially one hydroxyloxygen is still coordinated.

More involved LETC reaction equilibria yet are represented by the following equations:

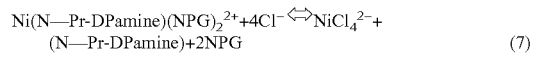

$$\text{Ni(N—Pr-DPamine)(NPG)}_2^{2+} + 4\text{Cl}^- \rightleftharpoons \text{NiCl}_4^{2-} + (\text{N—Pr-DPamine}) + 2\text{NPG} \quad (7)$$

$$\text{Ni(N—Pr-DPamine)}_3{}^{2+}+4\text{Cl}^- \Longleftrightarrow \text{NiCl}_4{}^{2-}+3\text{N—Pr-DPamine} \quad (8)$$

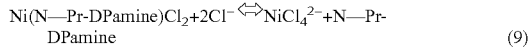

$$\text{Ni(N—Pr-DPamine)Cl}_2+2\text{Cl}^- \Longleftrightarrow \text{NiCl}_4{}^{2-}+\text{N—Pr-DPamine} \quad (9)$$

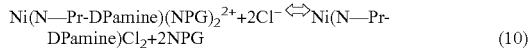

$$\text{Ni(N—Pr-DPamine)(NPG)}_2{}^{2+}+2\text{Cl}^- \Longleftrightarrow \text{Ni(N—Pr-DPamine)Cl}_2+2\text{NPG} \quad (10)$$

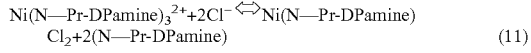

$$\text{Ni(N—Pr-DPamine)}_3{}^{2+}+2\text{Cl}^- \Longleftrightarrow \text{Ni(N—Pr-DPamine)Cl}_2+2(\text{N—Pr-DPamine}) \quad (11)$$

From the best of our understanding of this system, Ni(N—Pr-DPamine)(NPG)$_2{}^{2+}$ and Ni(N—Pr-DPamine)$_3{}^{2+}$ are possible LϵMLC's. The amount of each of these LϵMLC's present depends on the relative amounts of Ni(II) and especially the relative amounts of NPG and N—Pr-DPamine to each other and to the amount of Ni(II). However, the spectra at lower temperatures do not appear to show the presence of Ni(NPG)$_3{}^{2+}$ when there is one N—Pr-DPamine per Ni(II) present. This is the case even with an excess of NPG present. This is unfortunate in that the absorption coefficient for Ni(N—Pr-DPamine)(NPG)$_2{}^{2+}$ is somewhat higher than that of Ni(NPG)$_3{}^{2+}$. This is very similar to the absorbance shown in FIG. 18 at 25 C in the 550 nm to 775 nm region for the very similar LETC system with Ni(II), N—Pr-DPamine, bromide and TMOLP. LϵMLC's like Ni(N—Pr-DPamine)(NPG)$_2{}^{2+}$ result in more absorbance or a darker color than desired at lower temperatures even though the system has reasonably good performance otherwise due to a significant increase in absorbance or a darkening in color as the temperature increases.

In the system of equations (7)-(11), NPG is a LϵL and chloride is a HϵL. N—Pr-DPamine is both a LϵL and a HϵL. NiCl$_4{}^{2-}$ and Ni(N—Pr-DPamine)Cl$_2$ are HϵMLC's. With properly chosen levels of chloride, NPG and N—Pr-DPamine, either NiCl$_4{}^{2-}$ is the main HϵMLC formed on heating or it is possible that heating results in an absorbance increase that can be attributed almost exclusively to the complex: Ni(N—Pr-DPamine)Cl$_2$. Remarkably, these HϵMLC's can also form simultaneously on heating over the same temperature range with the properly chosen concentrations and ratios of the materials in equations (7)-(11). Despite the rather complicated equilibria possible, this system illustrates the diverse performance possible when concentrations and concentration ratios are judiciously adjusted.

As shown above, a ligand that is primarily used as a HϵL may remain in place in the LϵMLC. This is the case with many heterocyclic ligands in which nitrogen is the heteroatom. For example, solutions of Ni(II) with bromide and 1-EtBIMZ, appear to form two different HϵMLC's each of which is a different shade of blue. One of these complexes is believed to have two bromides and two of the benzimidazoles coordinated to the nickel and has significant absorbance at 550 nm. The other is believed to have three bromides and one benzimidazole coordinated to Ni(II) and has little absorbance at 550 nm. Addition of a good LϵL like TMOLP to a solution containing either or both of these complexes decreases the intensity of the blue color. However, a small, (but significant with regard to overall performance), absorption peak at about 640 nm remains even with a large excess of TMOLP. An absorption peak with this shape and apparent molar absorptivity is not present for Ni(II) complexed with TMOLP alone or when Ni(II) and bromide are present with or without TMOLP. This suggests that at least one, difficult to displace, molecule of 1-EtBIMZ is present in the LϵMLC. While the 1-EtBIMZ is present in the LϵMLC, it is designated as a LϵL. Heating a system with appropriate ratios and amounts of Ni(II), bromide, 1-EtBIMZ and TMOLP contained in an indifferent solvent or polymer matrix gives a change from light blue to various shades of dark blue. This change in absorbance is presumed to be due to the increase in concentration of the HϵMLC's: Ni(1-EtBIMZ)$_2$Br$_2$ and/or Ni(1-EtBIMZ)Br$_3{}^-$. Depending on the relative concentrations of Ni(II), bromide and 1-EtBIMZ the presumed LETC reactions are those shown in equation (12) or (13) or a combination of these two reactions as shown in equation (14) below.

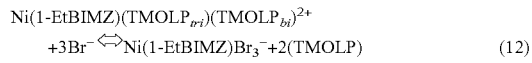

$$\text{Ni(1-EtBIMZ)(TMOLP}_{tri})(\text{TMOLP}_{bi})^{2+}+3\text{Br}^- \Longleftrightarrow \text{Ni(1-EtBIMZ)Br}_3{}^-+2(\text{TMOLP}) \quad (12)$$

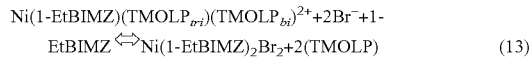

$$\text{Ni(1-EtBIMZ)(TMOLP}_{tri})(\text{TMOLP}_{bi})^{2+}+2\text{Br}^-+1\text{-EtBIMZ} \Longleftrightarrow \text{Ni(1-EtBIMZ)}_2\text{Br}_2+2(\text{TMOLP}) \quad (13)$$

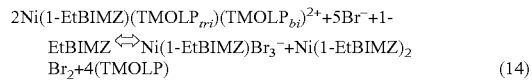

$$2\text{Ni(1-EtBIMZ)(TMOLP}_{tri})(\text{TMOLP}_{bi})^{2+}+5\text{Br}^-+1\text{-EtBIMZ} \Longleftrightarrow \text{Ni(1-EtBIMZ)Br}_3{}^-+\text{Ni(1-EtBIMZ)}_2\text{Br}_2+4(\text{TMOLP}) \quad (14)$$

TMOLP$_{tri}$ and TMOLP$_{bi}$ represent TMOLP acting as a tridentate ligand and as a bidentate ligand where only two of its hydroxyls are coordinated, respectively. The relative amount of Ni(1-EtBIMZ)$_2$Br$_2$ versus Ni(1-EtBIMZ)Br$_3{}^-$ may be adjusted by judicious choices of the relative amount of bromide vs. 1-EtBIMZ in the system. Large amounts of bromide relative to 1-EtBIMZ favor the formation of NiBr$_3$(1-EtBIMZ)$^-$, however even very large excesses of bromide do not result in the appearance of the spectra of species like NiBr$_3$(S)$^{1-}$ or NiBr$_4{}^{2-}$ when there is at least one 1-EtBIMZ molecule per Ni(II) ion present.

Many heteroleptic MLC's are known which involve two or more different ligands on the same transition metal ion, however very few reversible, solution based, thermochromic systems involving ligand exchange to form such heteroleptic MLC's have been previously disclosed. Two of these disclosed here are shown in the equations (12) and (13) and we have discovered many more of these systems which are disclosed in Table 27. Through the use of these systems, absorptions can be achieved throughout the visible and NIR range which is advantageous from an energy absorbing standpoint, especially for sunlight blocking applications.

Figure 18:
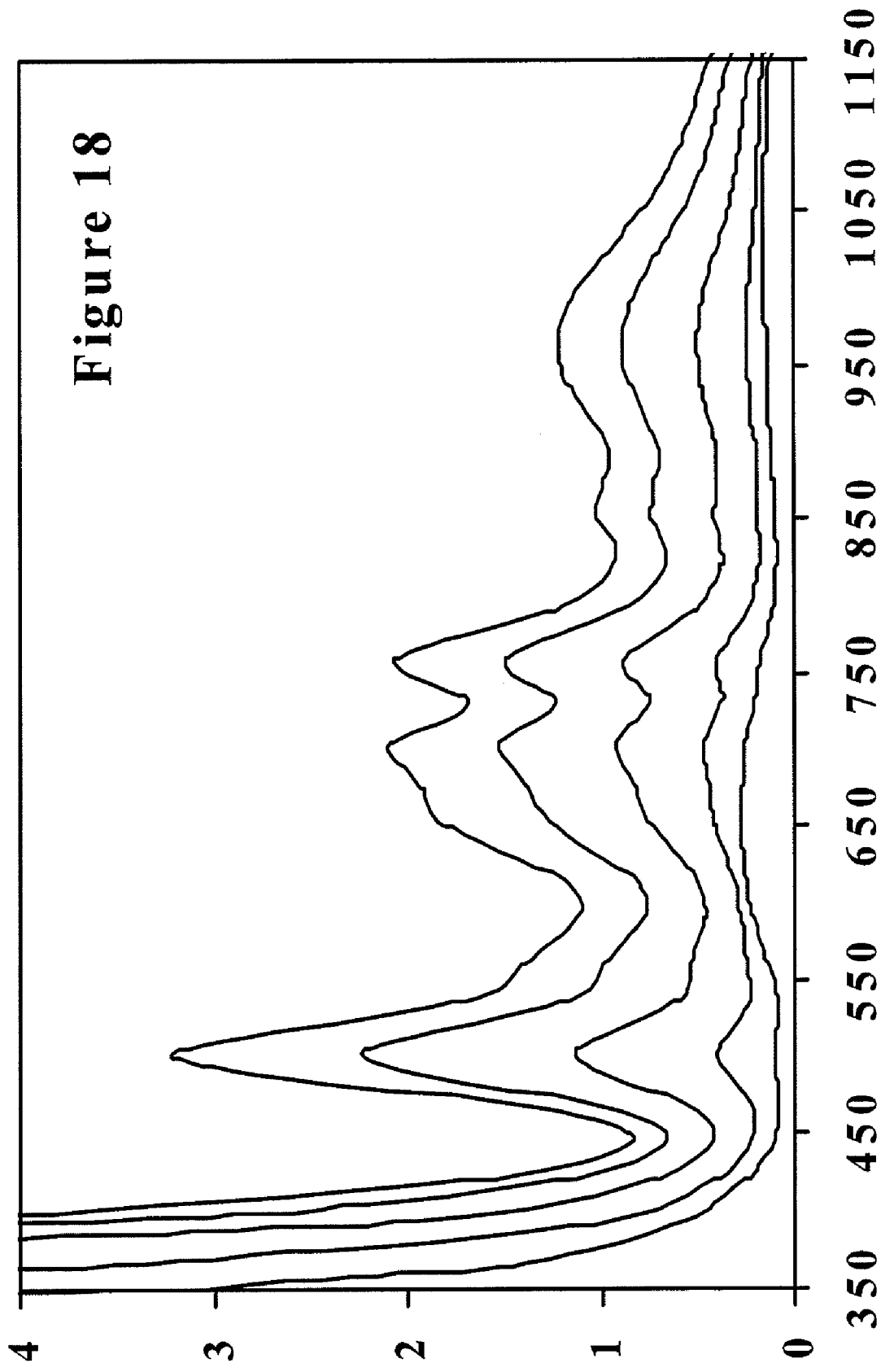
Figure 19:
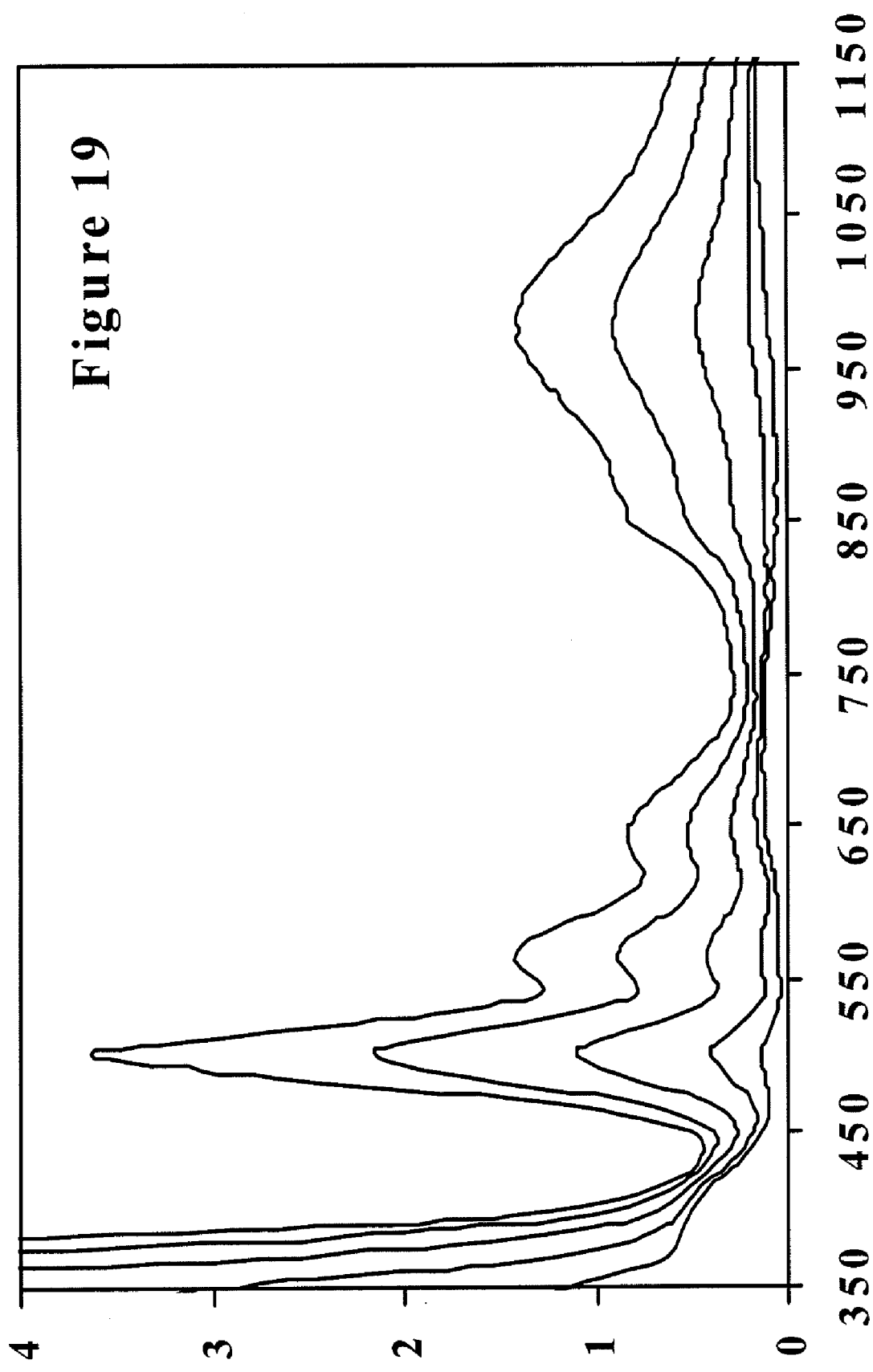
Figure 20:
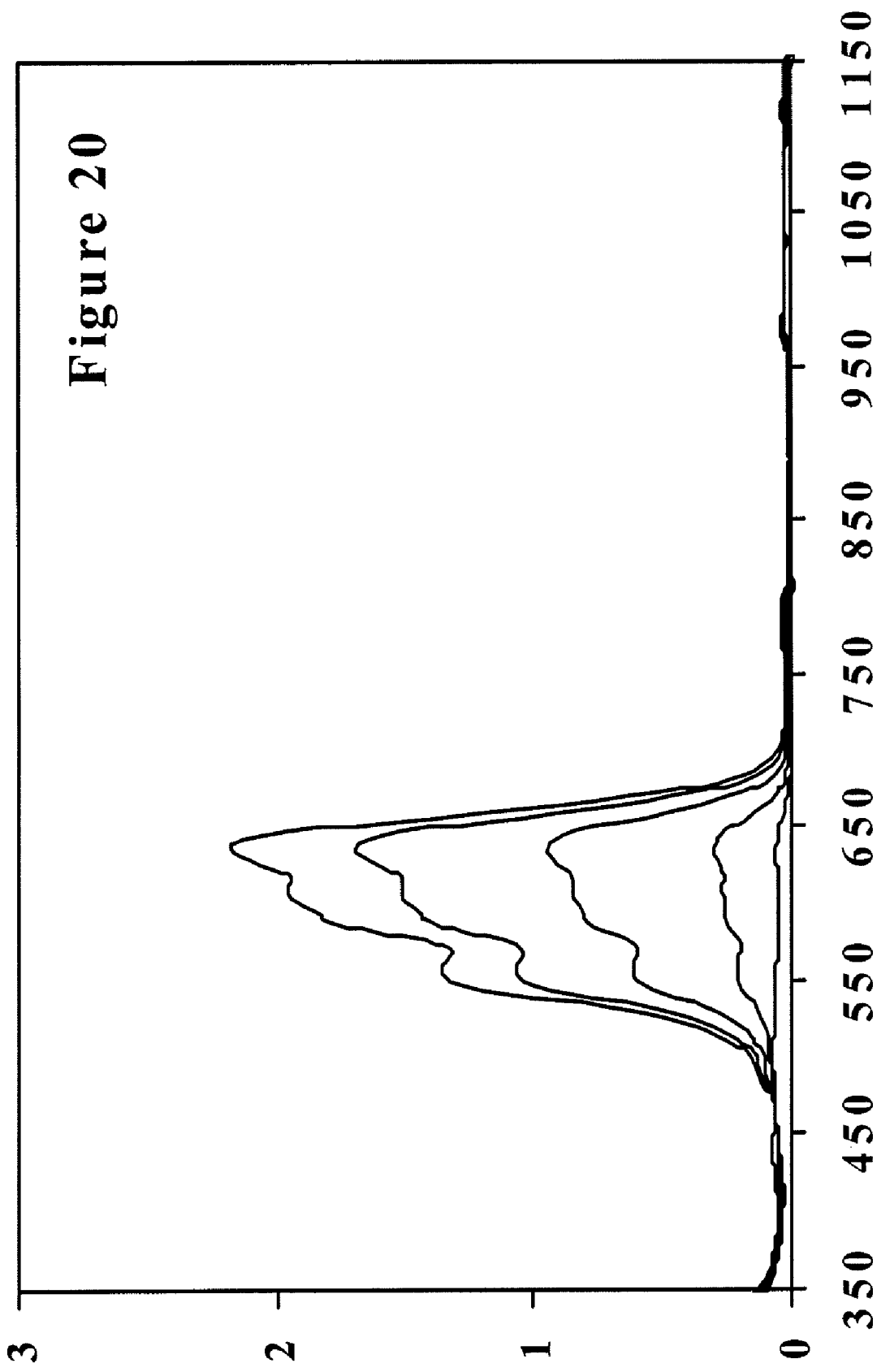
Figure 21:
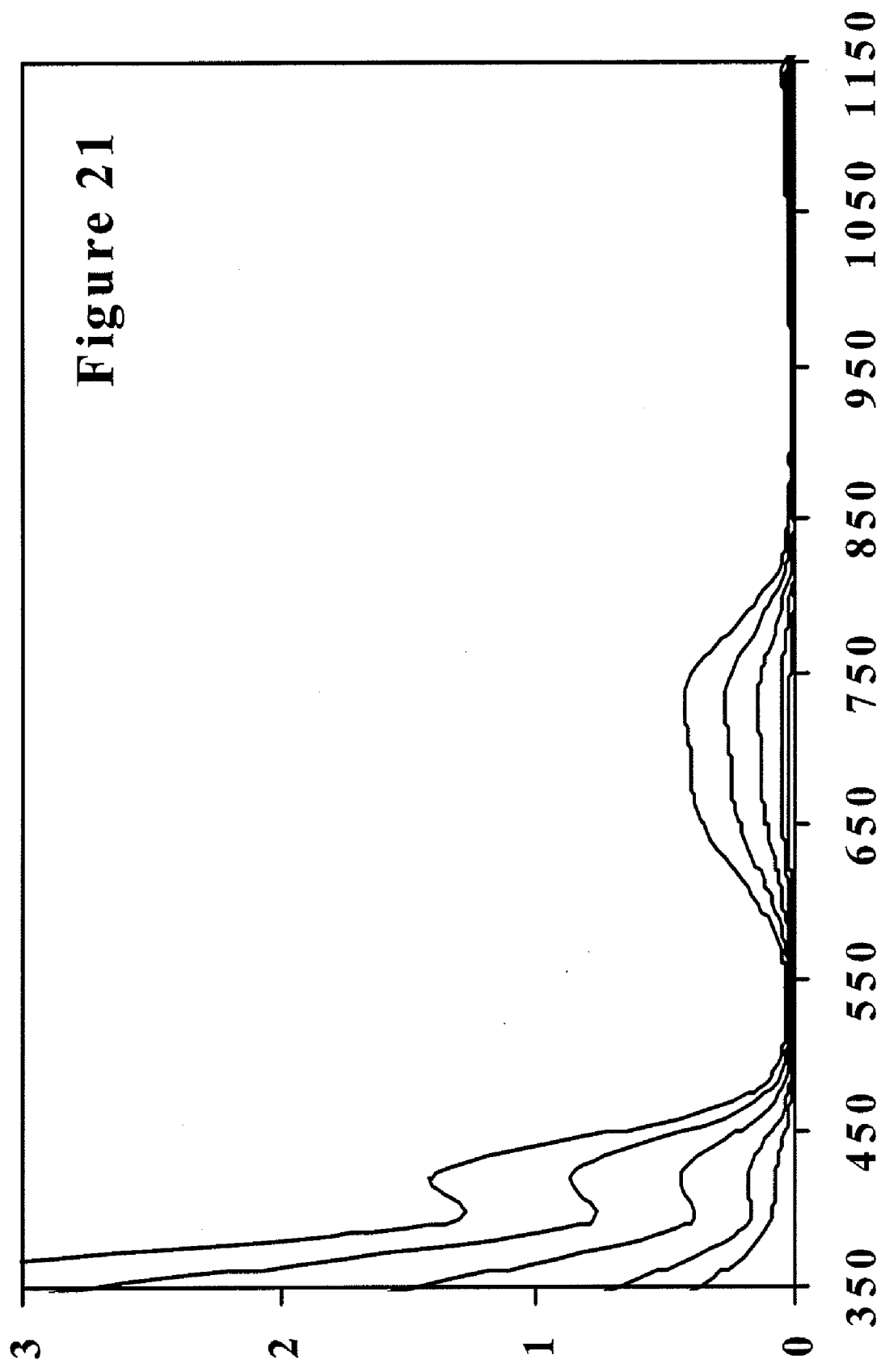
Figure 22:
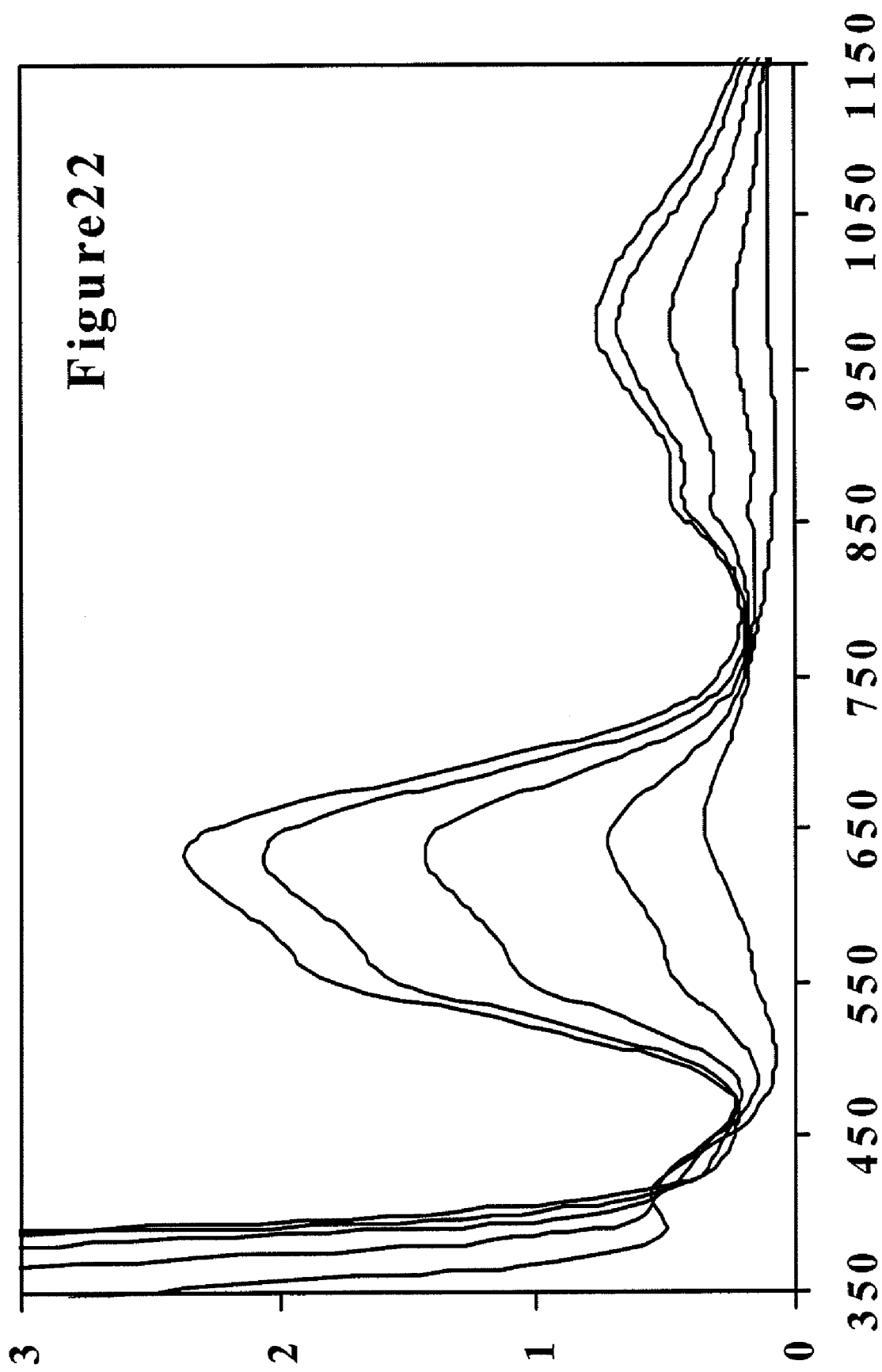
Figure 23:
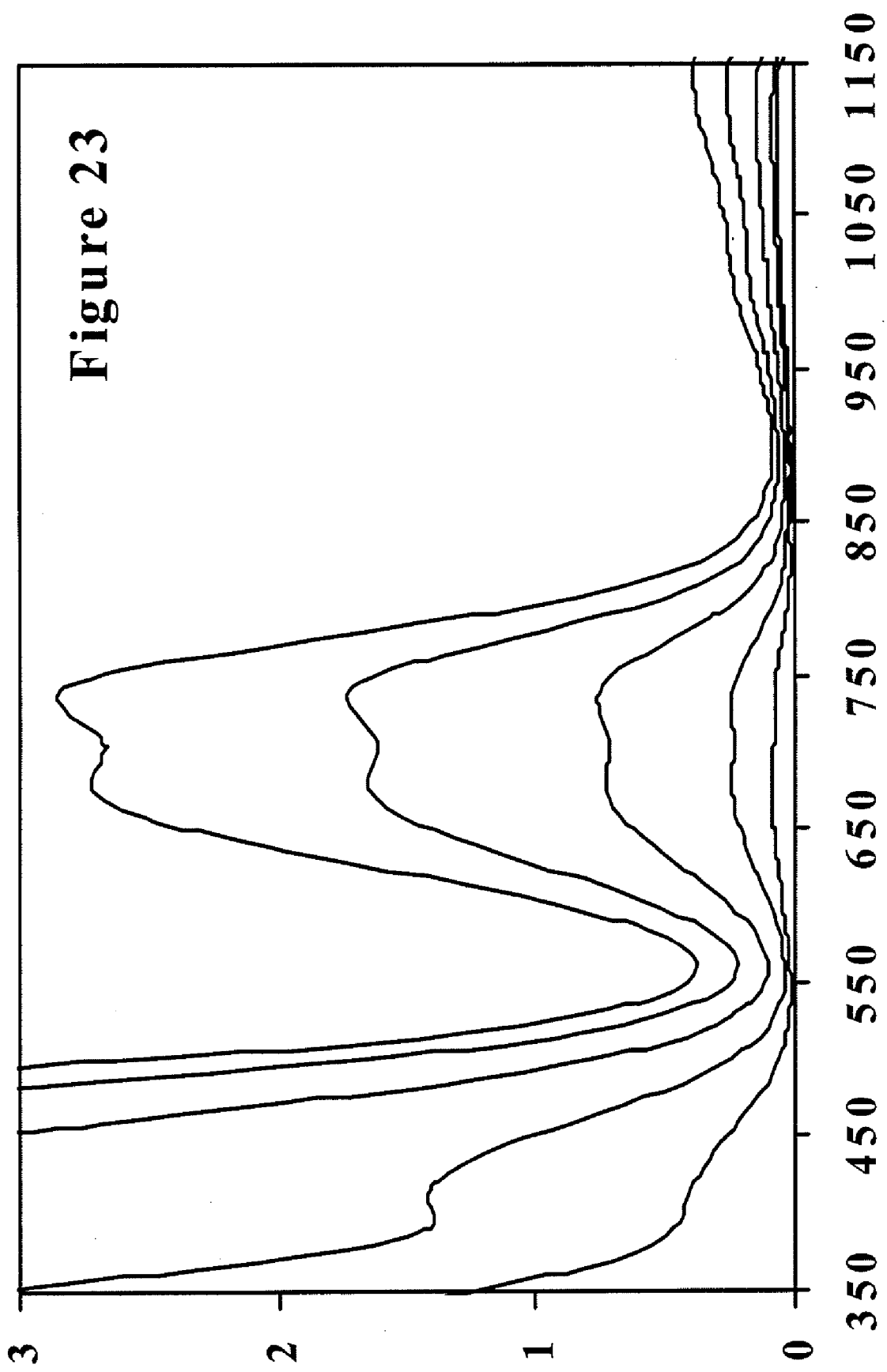
Figure 24:
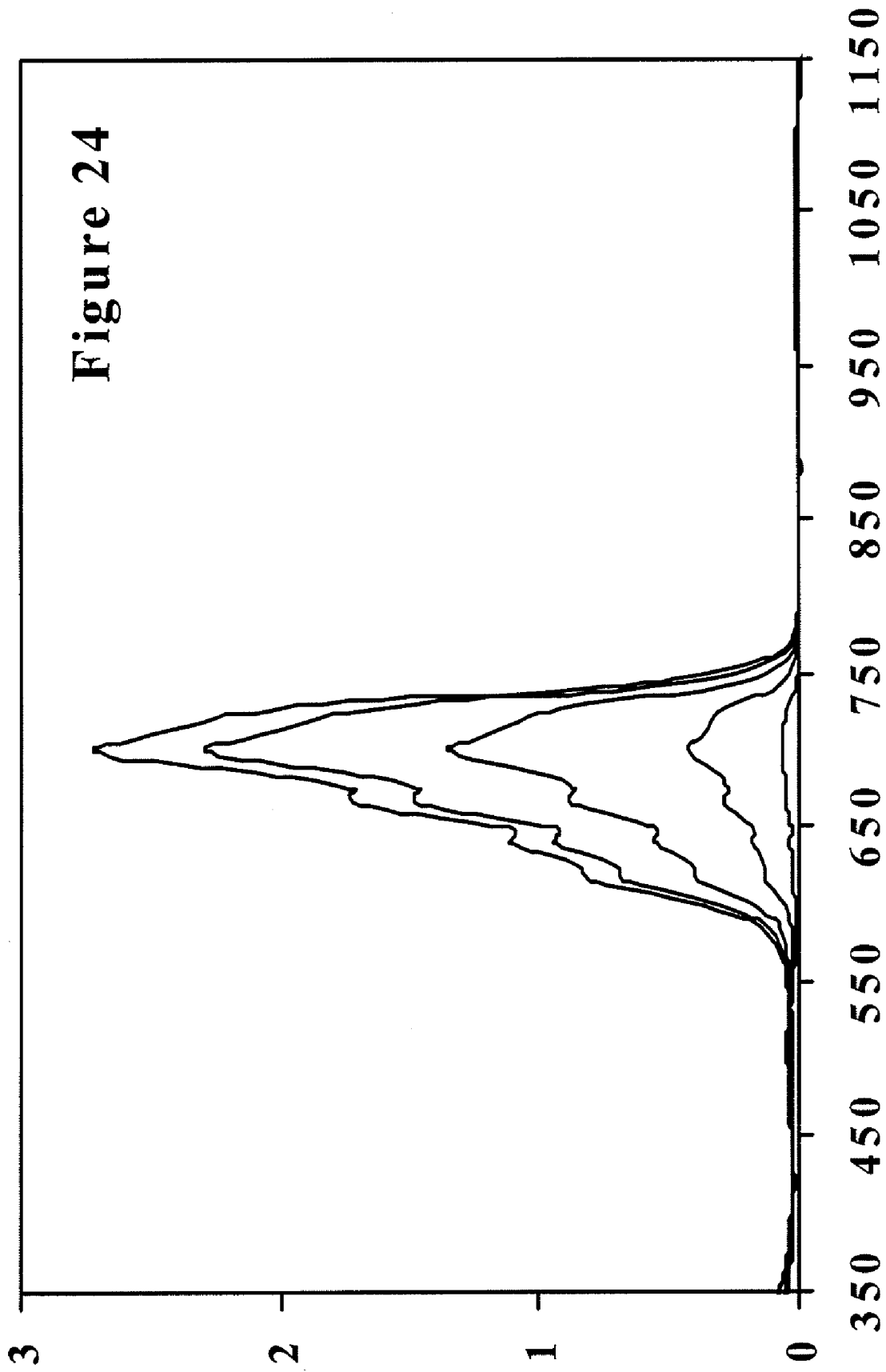
Figure 25:
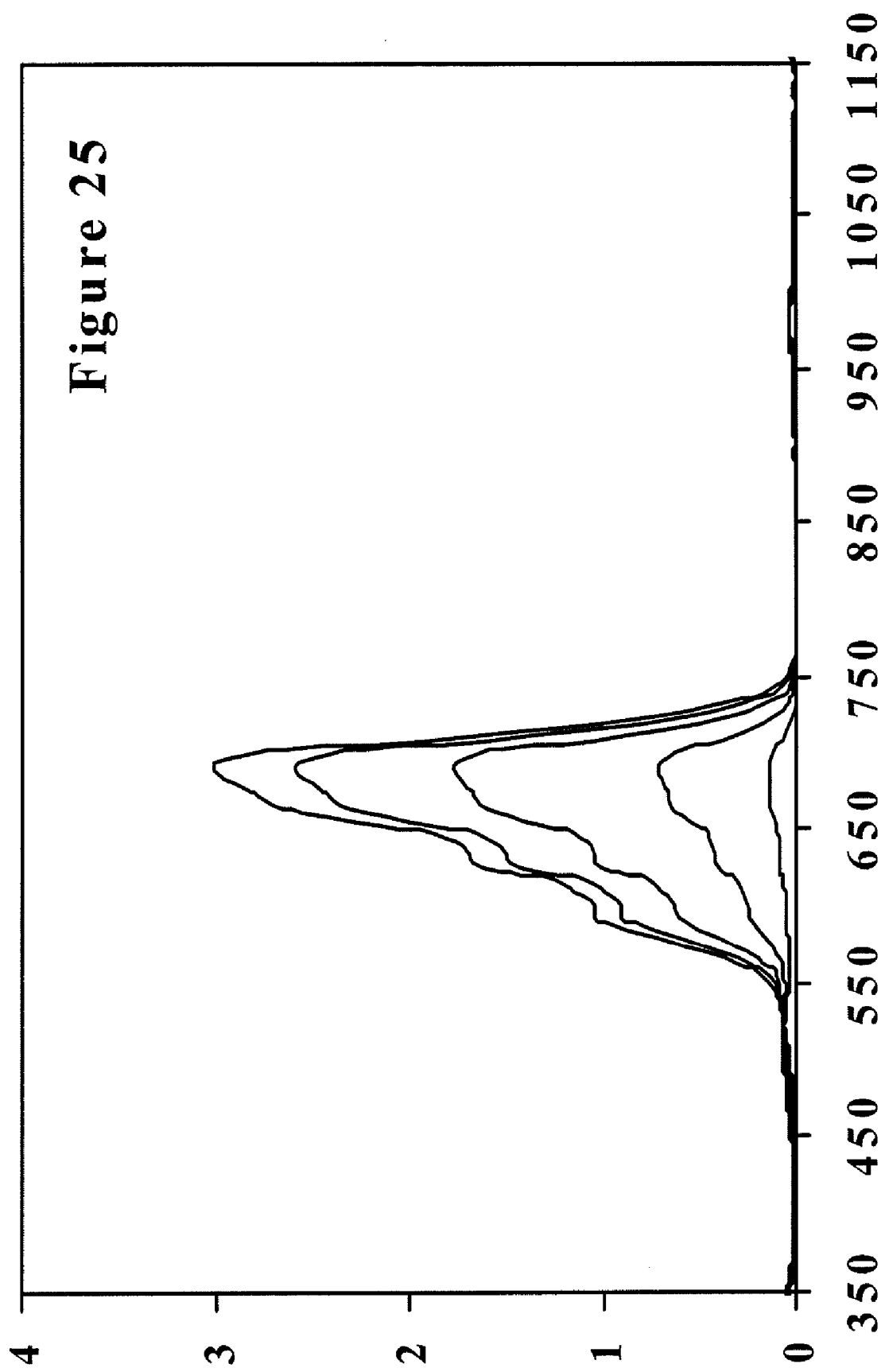
Figure 26:
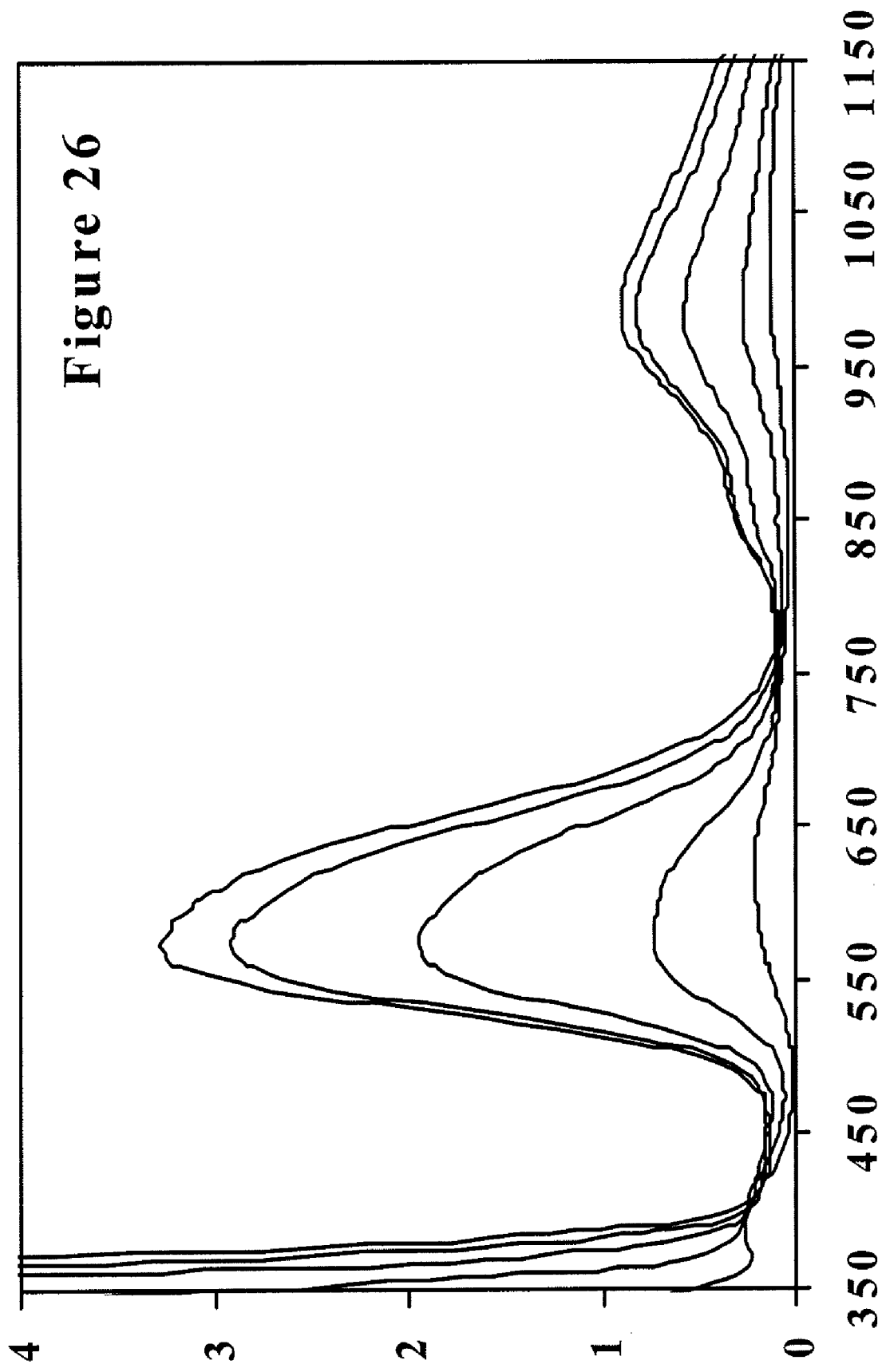

A number of our LETC systems give rise to multiple HϵMLC's from the heating of a single composition, even with only a single type of transition metal ion present. Another good example of this is seen with Ni(II), bromide, N—Pr-DPamine with various LϵL's. With the proper ratio of bromide to N—Pr-DPamine, heating the system gives rise simultaneously to absorption spectra consistent with the presence of Ni(N—Pr-2-DPamine)Br$_2$, NiBr$_3$(S)$^-$ and NiBr$_4{}^-$. This type of performance for a LETC system is shown in FIG. 18. The broad spectral changes that take place on heating systems like these have distinct advantages when there is a desire to relieve glare or reduce energy transmission throughout the visible and NIR regions. Broad changes also help provide valuable options for the color appearance of transmitted light. These systems that allow for multiple HϵMLC's to form in a single composition also provide opportunities to reduce the number of LETC layers required for many applications. Numerous other systems like this are disclosed in Table 27 and several of these systems are shown in FIGS. 4, 14, 17 and 28.

Figure 29:
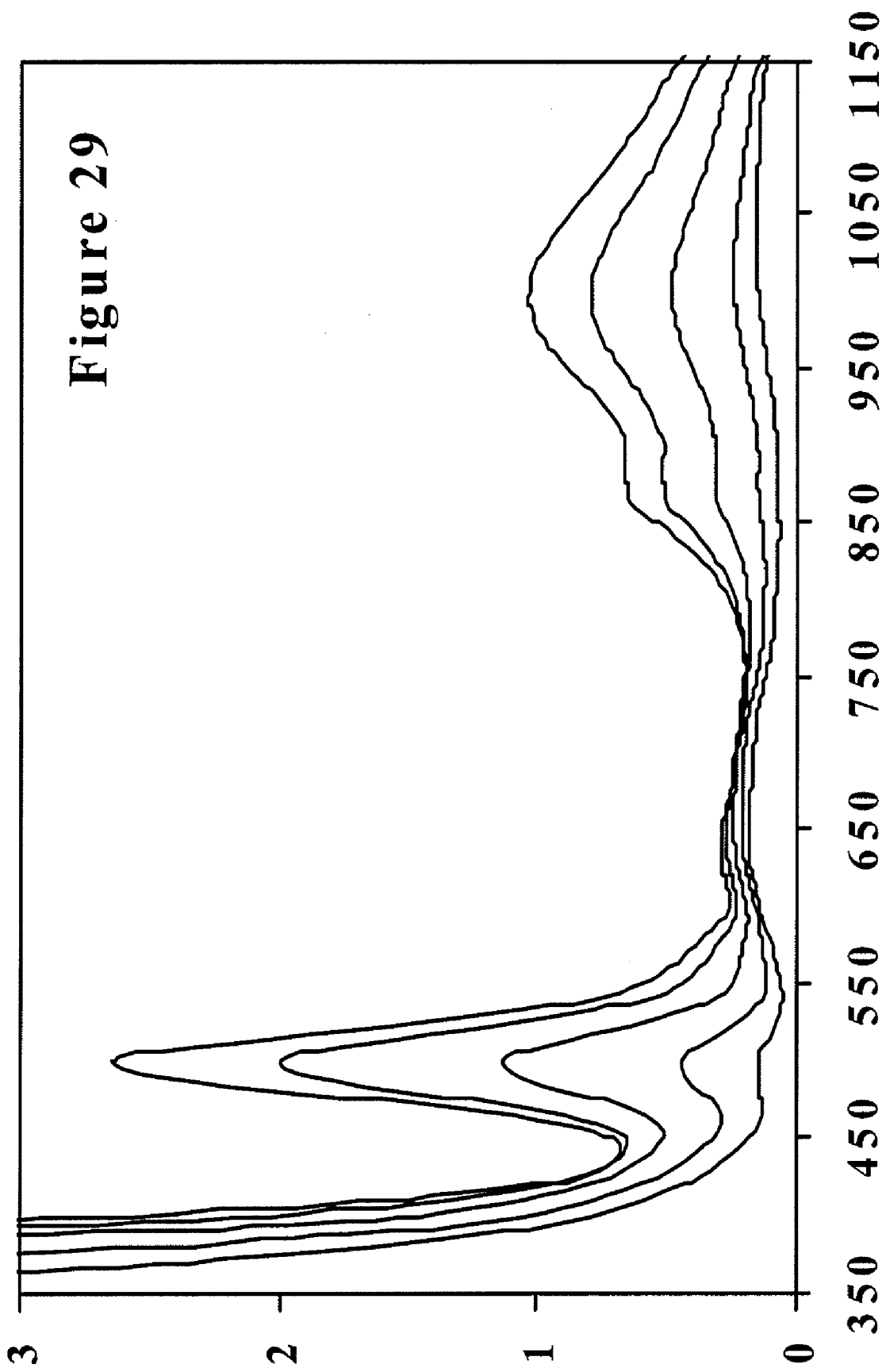
Figure 30:
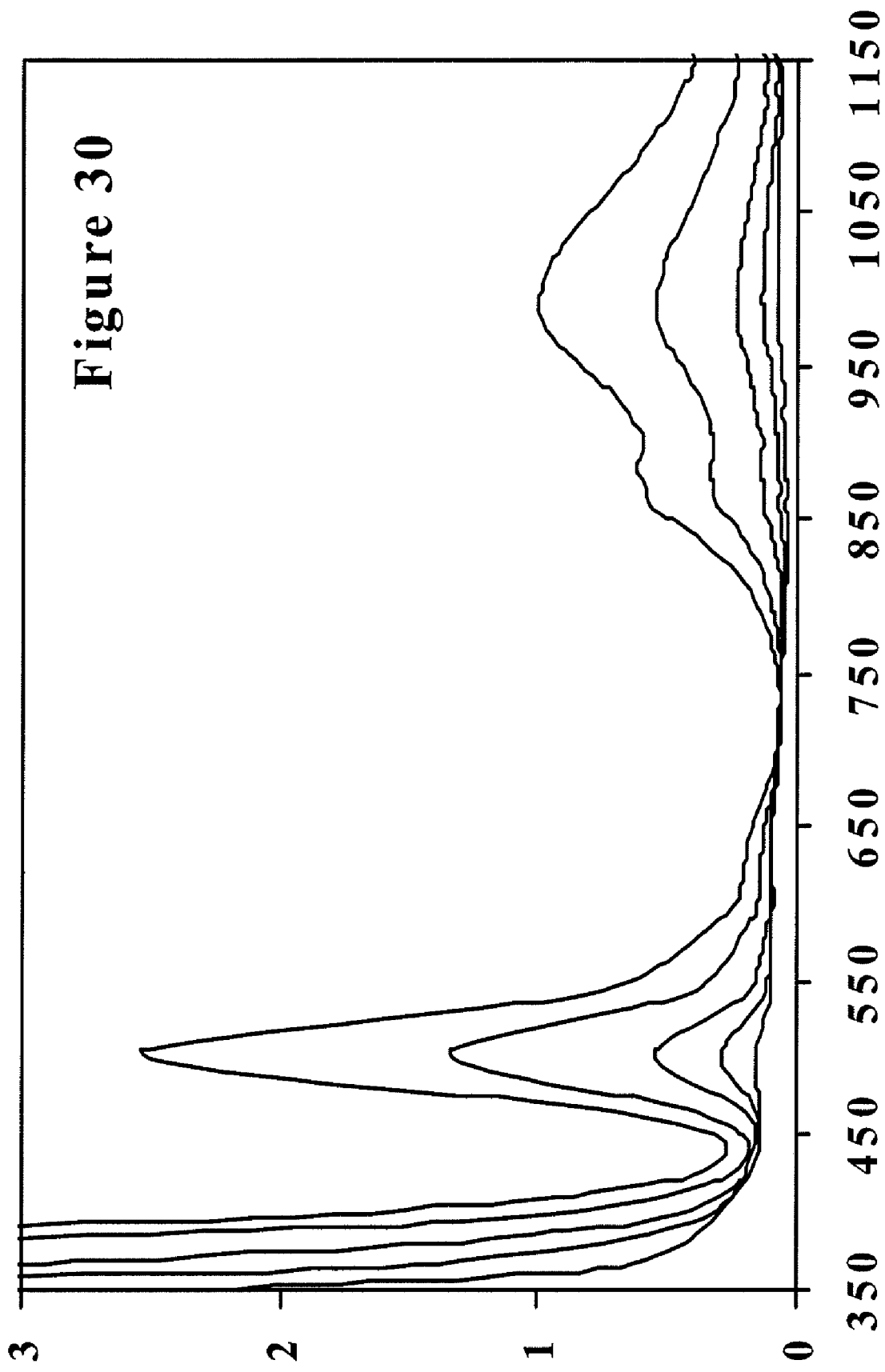

Once again, with systems like those in equations (12)-(14), a nitrogen containing ligand may be present in the LϵMLC's. When this is the case, the ϵ's of the LϵMLC are generally larger than if just hydroxyl groups are present around the metal ion. This higher level of absorptivity is a disadvantage for LETC systems where a large absorbance range is desired. This is because for many applications there is a desire to start with as little absorbance or as light a color as possible at low temperatures and still increase in absorbance or darken in color significantly on increasing the temperature. However, we have discovered several, nitrogen containing, ligands which do not participate well in a LeMLC. This effect is illustrated by comparing FIGS. 29 and 30. In FIG. 29 the nitrogen containing ligand 6-methyl-2,2'-dipyridyl is believed to participate in the LeMLC and give rise to the small but, troublesome absorbance between about 575 nm and 750 nm at 25 C. Addition of another methyl group to the ligand to give 6,6'-dimethyl-2,2'-dipyridyl decreases the absorbance between 575 nm and 750 nm as shown in FIG. 30. This is because the latter, nitrogen-containing ligand is more sterically challenged in trying to participate in the nominally octahedral configuration, while it still participates nicely in the nominally tetrahedral configuration around nickel with two bromide ions. Other nitrogen containing ligands with this advantage include 6-methyl-N-(6-methylpyridin-2-yl)-N-propylpyridin-2-amine, 6-butyl-6'-methyl-2,2'-bipyridine, 2,2'-propane-2,2-diylbis(1,3-benzothiazole), 2,2'-propane-2,2-diylbis(1-propyl-1H-benzimidazole), 2,2'-propane-2,2-diylbis(1-pentyl-1H-benzimidazole), several 6-alkylsubstituted dipyridylamines and to some extent most ortho substituted pyridines.

Many TC systems involving Ni(II), bromide and nitrogen based ligands have little absorbance between about 410 nm and 470 nm and thus they have a "valley" or a "well" in the absorption spectra in this wavelength range even at elevated temperatures. This valley or well makes these systems difficult to use in combination with other systems to achieve gray appearance in multilayer systems unless the system with which they are combined happens to absorb in the 410 nm to 470 nm region. A significant advantage is realized when there is at least some increase in absorbance in this range as the temperature increases. As illustrated especially in Examples 18, 36 and 40 and the corresponding figures, there is a TC phenomenon that we call "well-filling". In contrast, there are many systems without well-filling as exemplified by Examples 7, 13, 19 and 22. While for Examples 18, 36 and 40 there is no absorption peak in the 410 nm to 470 nm region, at least there is an increase in the absorbance in the valley or well. What the nitrogen based ligands, in each of these examples, have in common is a nitrogen as a heteroatom in a ring and they also have an amine nitrogen on a carbon alpha to the heteroatom nitrogen which is also the position on the heterocyclic ring that is ortho to the heteroatom. Thus it is believed that this nitrogen attached to a position ortho to a heteroatom nitrogen, simply called the "ortho-nitrogen" affect, is responsible for the well-filling effect. The systems in Examples 18, 36 and 40 are easier to combine into multilayer, gray systems especially with other systems or layers that have peaks in the 550 nm to 650 nm region which wavelengths also need to be attenuated to give a gray appearance.

With regard to well filling, it is useful to have thermochromic systems in which a HeMLC comprises chloride or bromide coordinated to Ni(II) along with another ligand such that the ratio of the HeMLC's maximum absorption coefficient in the 475 nm to 550 nm range to the HeMLC's minimum absorption coefficient in the 425 nm to 475 nm range is less than 4 to 1.

Figure 44:
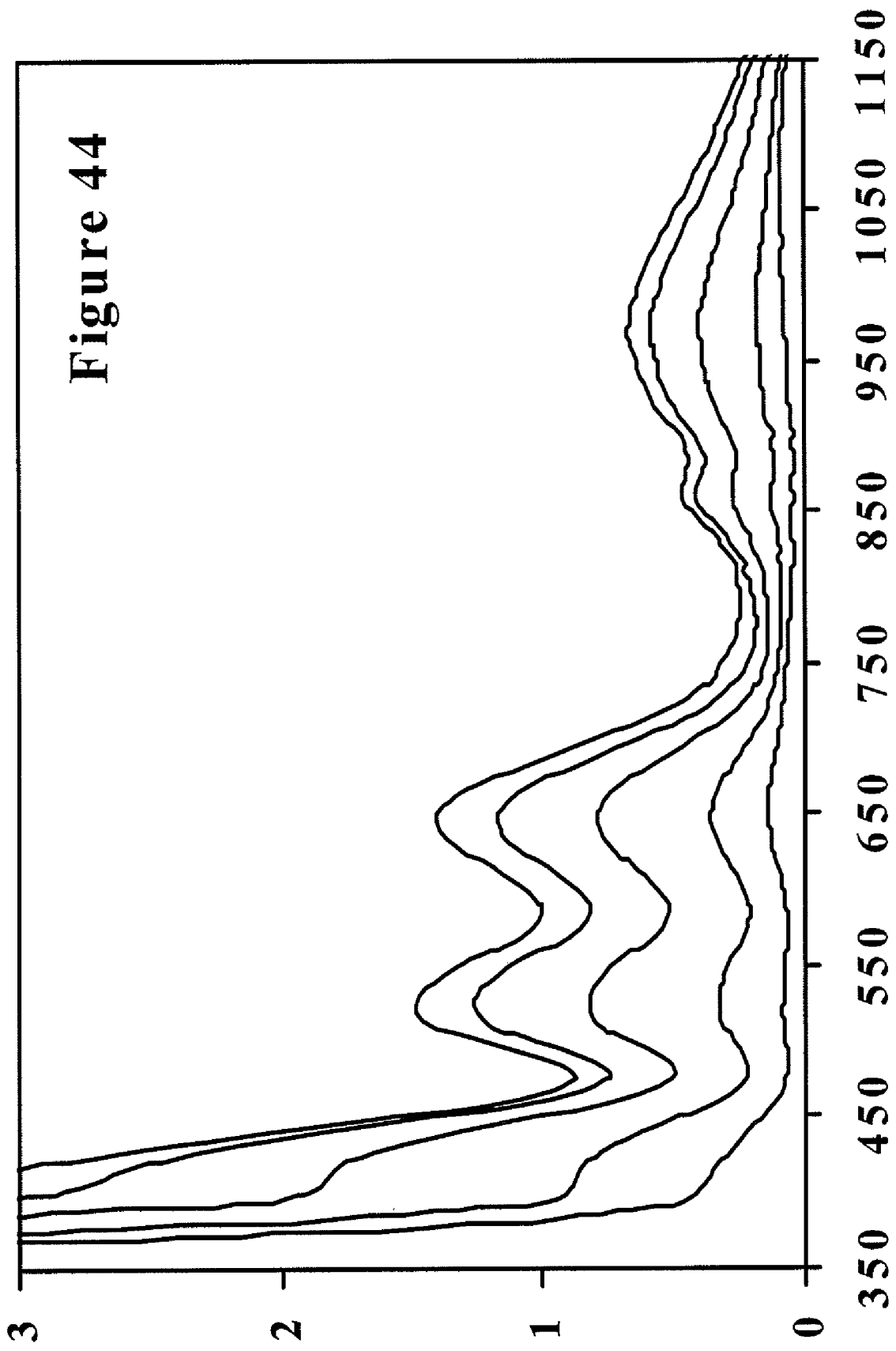
Figure 45:
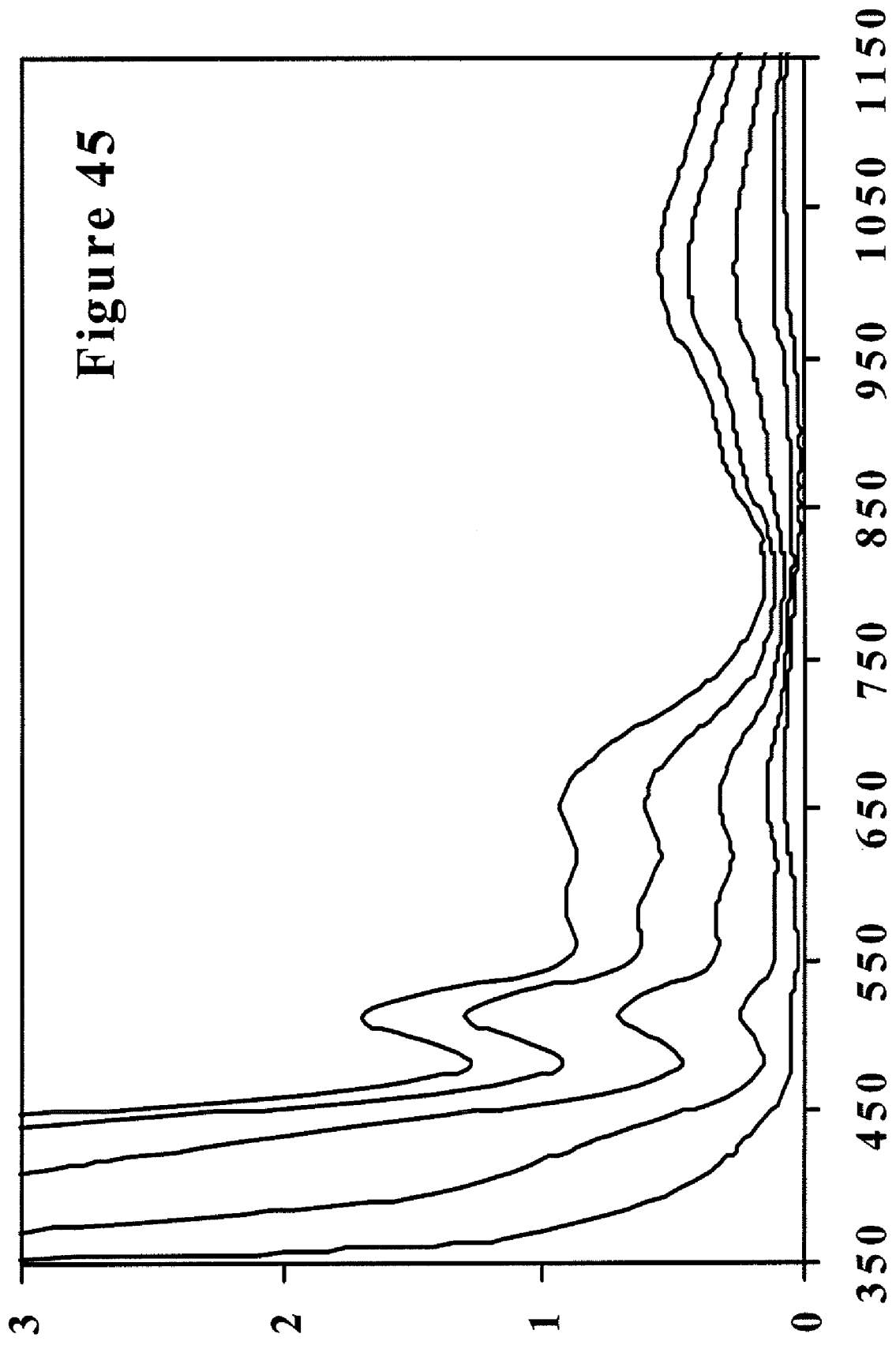
Figure 46:
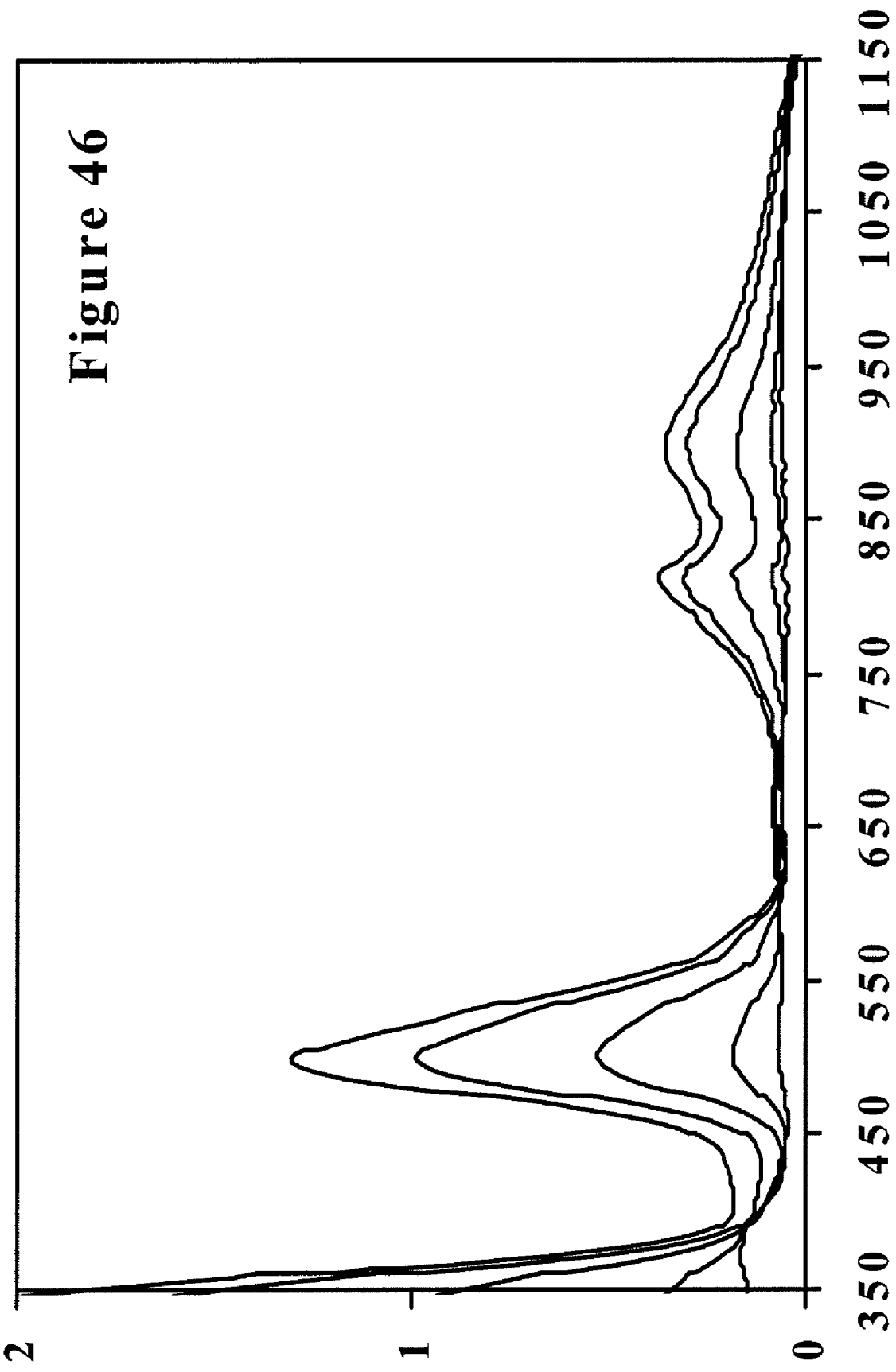

An interesting ligand and TC system is presented in FIG. 44. Here the nitrogen containing ligand appears that it might have the possibility of being tridentate. However the spectra of Ni(II) based systems with ligands that are believed to coordinate with three nitrogens plus one or two halides, like examples 8 and 33, have a main absorption peak at wavelengths between 430 nm and 460 nm. FIG. 44 shows an example of systems that have spectra more consistent with the ligand acting as two different bidentate nitrogen based ligands. This is observed even when there is only one of this ligand molecule per Ni(II) ion present in the system. This is believed to be due to the time dependent switching of the coordination of these types of ligands between one type of bidentate configuration and another bidentate configuration. In both bidentate cases, in this example, the coordination is believed to be completed by two bromide ions. Thus the spectra are consistent with (1) a dipyridyl amine with one methyl group-hindered pyridine and two bromides and (2) two pyridines connected in ortho positions by an amine-methylene bridge with the pyridine connected to the methylene group being methyl group hindered and two bromides. The absorptions in FIG. 44 between about 400 nm and 450 nm are believed to be more likely due to the ortho-nitrogen affect disclosed above than to any tridentate character of the 6-methyl-N-[(6-methylpyridin-2-yl)methyl]-N-pyridin-2-ylpyridin-2-amine ligand. This example discloses a remarkable LETC system in terms of a single system, with a single ligand other than halide, with good gray appearance, a large change in visible light transmission and little color sweep throughout the temperature range of 25 to 105 C. For the spectra in FIG. 44 we calculate Y to be 82.8, 52.8, 21.4, 9.7 and 6.2 at 25 C, 45 C, 65 C, 85 C and 105 C respectively. We also calculate c* to be 12.9, 17.9, 15.0, 9.7 and 5.7 at 25 C, 45 C, 65 C, 85 C and 105 C respectively.

Figure 3:
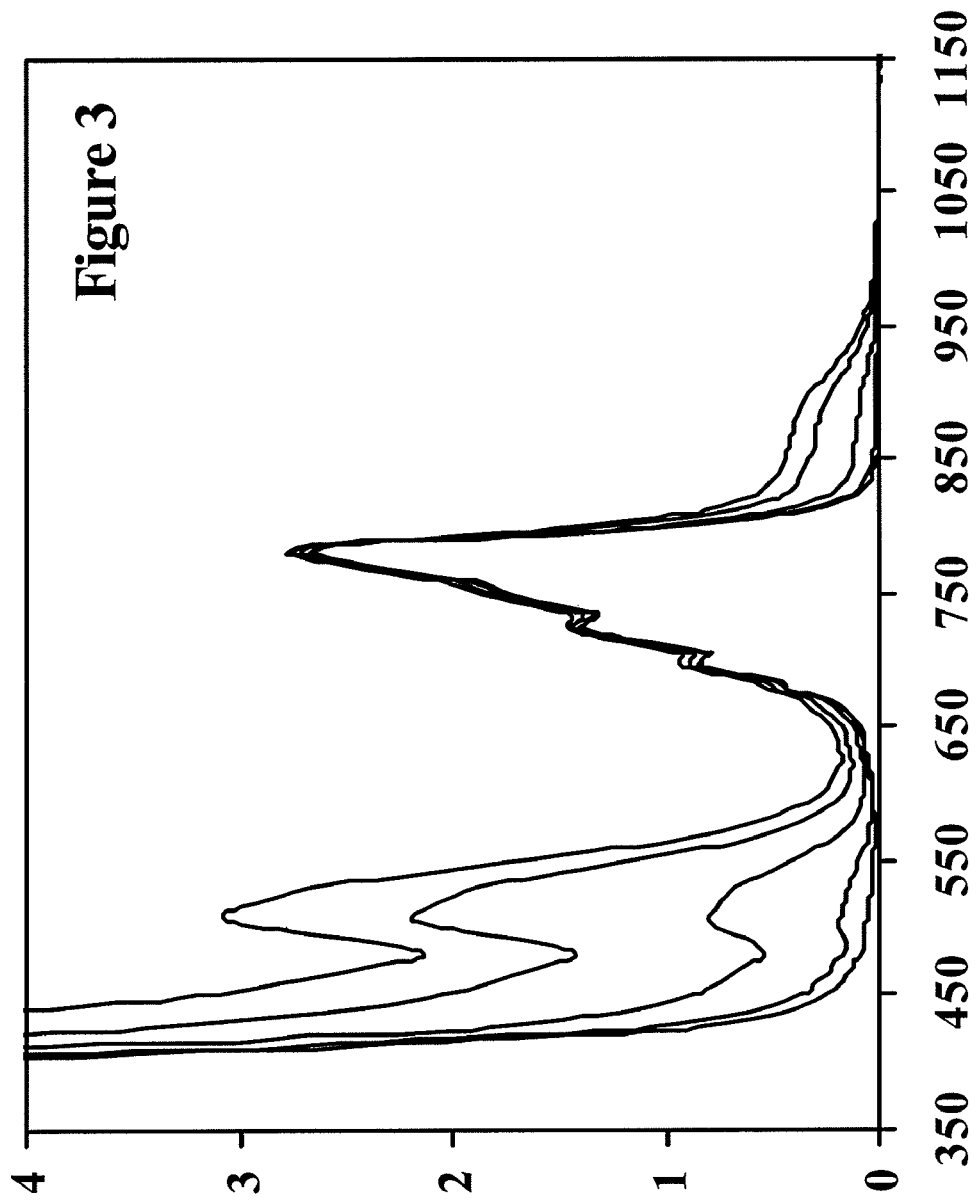

Multiple kinds of transition metal ions in the same LETC solution or layer can give rise to at least two types of useful behavior. One type is illustrated in FIG. 3 in which ions of one kind of metal are largely in a HeMLC throughout the temperature range of interest and ions of the other kind of metal switch from largely being in a LeMLC at lower temperatures to largely being in a HeMLC at a higher temperature. In FIG. 3 it appears that the Co(II) has a higher affinity for iodide and/or a lower affinity for TMOLP as spectral peaks consistent with $CoI_4^{2-}$ remain at nearly constant magnitude throughout the 25 to 105 degree Celsius range. On the other hand, the amount of Ni(II) coordinated by iodide appears to increase and the amount coordinated by TMOLP is believed to decrease as the temperature increases. The spectral peak with a $\lambda_{max}$ at about 508 nm is consistent with a charge transfer peak in the visible for $NiI_4^{2-}$. The system in FIG. 3 has significant advantages when used in Sunlight Responsive Thermochromic, SRT™, windows as the nearly temperature independent absorbance of $CoI_4^{2-}$ is largely in the NIR and causes the system to warm on sunlight exposure. The sun exposure induced temperature rise causes an increase in the concentration of $NiI_4^{2-}$ and a decrease in visible light transmission. Any other thermochromic layer in contact with a layer containing this system would also increase in temperature and broad visible light attenuation is possible just from direct sunlight exposure.

Figure 10:
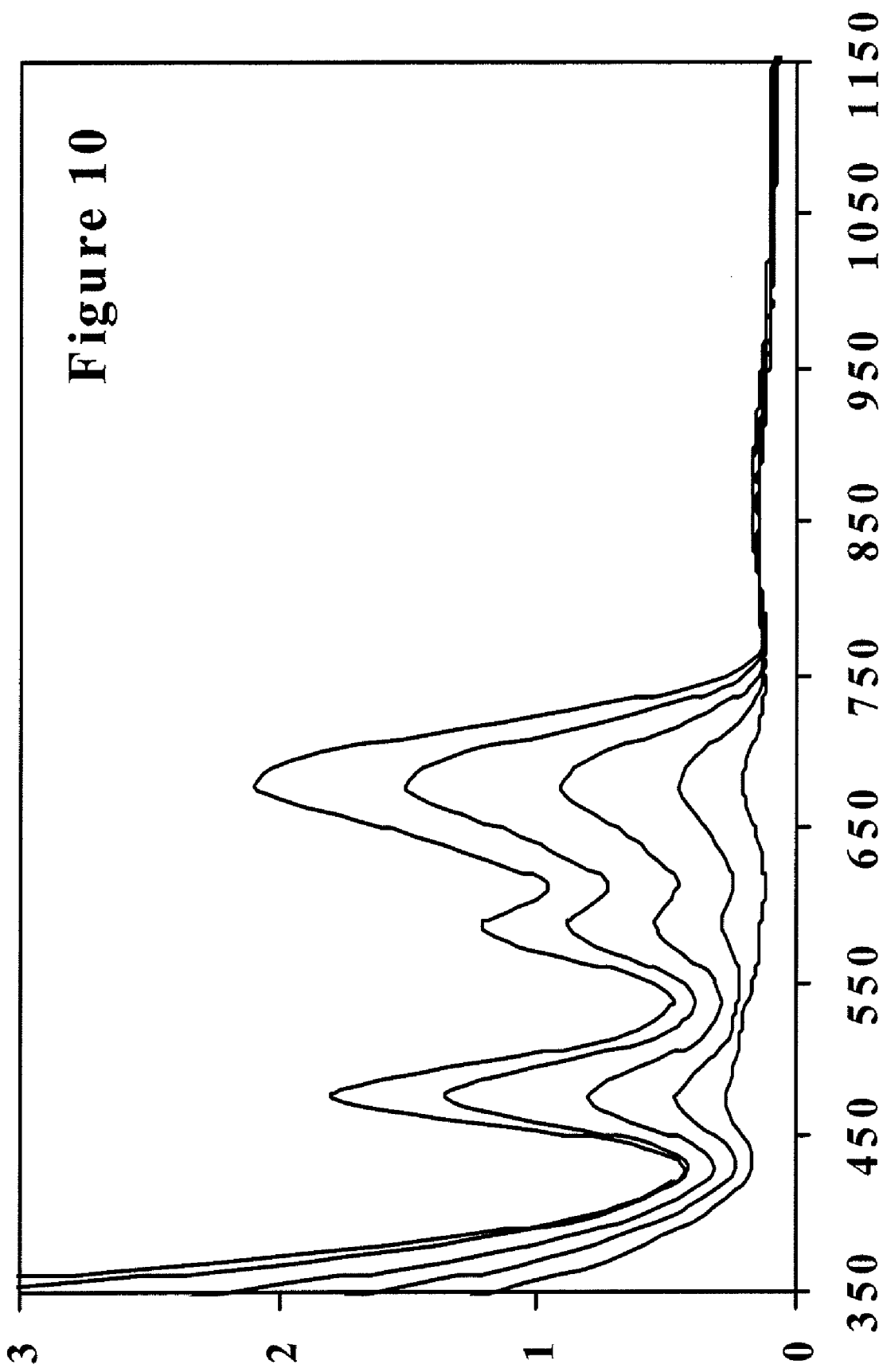

The other type of multiple metal ion system is shown in FIG. 10. This is an example of systems where the temperature dependence for the formation of completely different complexes, even involving different kinds of transition metal ions, allows for the simultaneous formation of multiple HeMLC's of the different kinds of transition metals ions over the same temperature range, in the same solution. Heating this system causes an increase in concentration for two HeMLC's at the same time. These HeMLC's might be $Co(glycerol_{mono})Cl_3^-$ and $Cu(glycerol_{di})Cl_4^{2-}$. The use of $ZnCl_2$ in this system is explained in the next paragraph.

Disclosed herein is yet another new type of thermochromic reaction. Here, ligands may exchange between being coordinated or ligated to a first kind of metal ion and being coordinated or ligated to a second kind of metal ion. The second kind of metal ion is a transition metal ion that forms a HϵMLC which includes a ligand previously associated with the first kind of metal ion. For the purposes of the present application, the first kind of metal ions are called exchange metals. The exchange metal may be a transition metal or another kind of metal. In "exchange metal" TC systems, ligands which are ligated or coordinated to one metal shift to being ligated or coordinated to another metal with changes in temperature. As the ligands shift from one kind of metal to another kind there are changes in the light absorption of the system. This is particularly effective when the MLC with one of the metals has a significantly lower molar absorptivity than the MLC with another metal for the same type of ligands or set of ligands. Zn(II) ions work well in exchange metal TC systems as the MLC's of Zn(II) often absorb little or no visible light and it has been discovered that the ligands in Zn(II) MLC's readily shift to other metal ions such as Co(II), Ni(II) and Cu(II) ions as the temperature of the system increases. Exchange metals function in place of or are used in combination with LϵL's.

Figure 11:
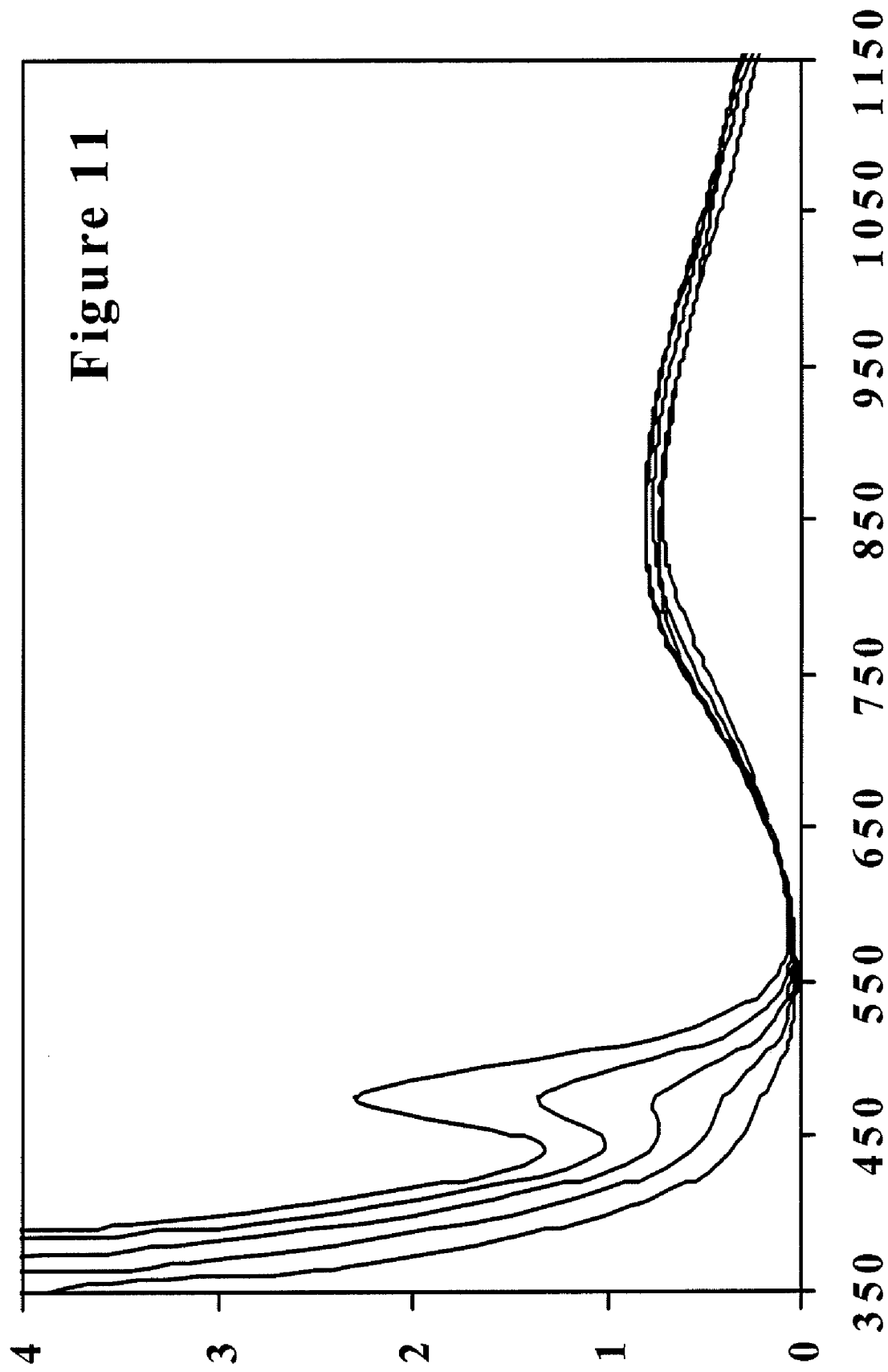
Figure 12:
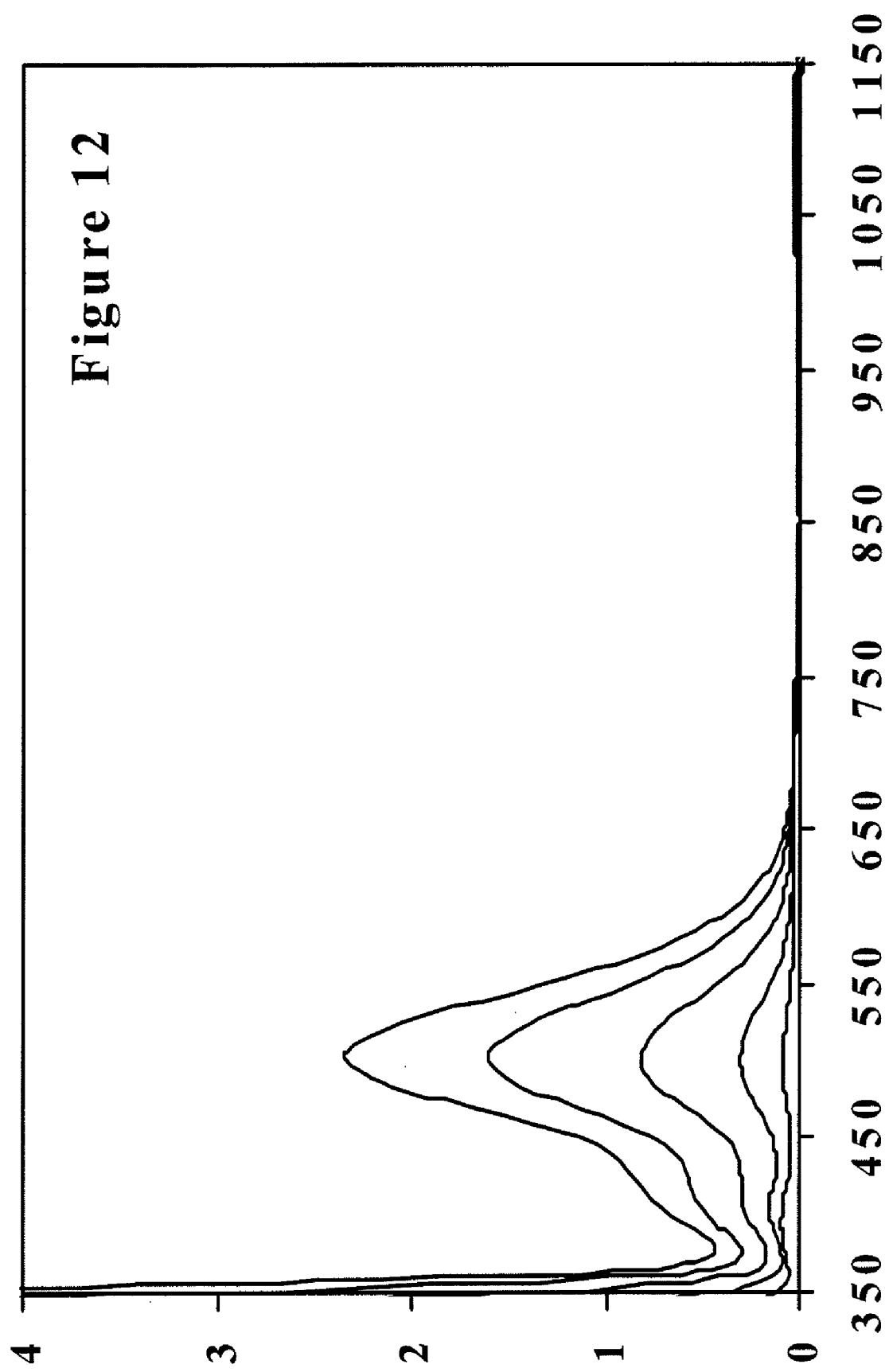
Figure 13:
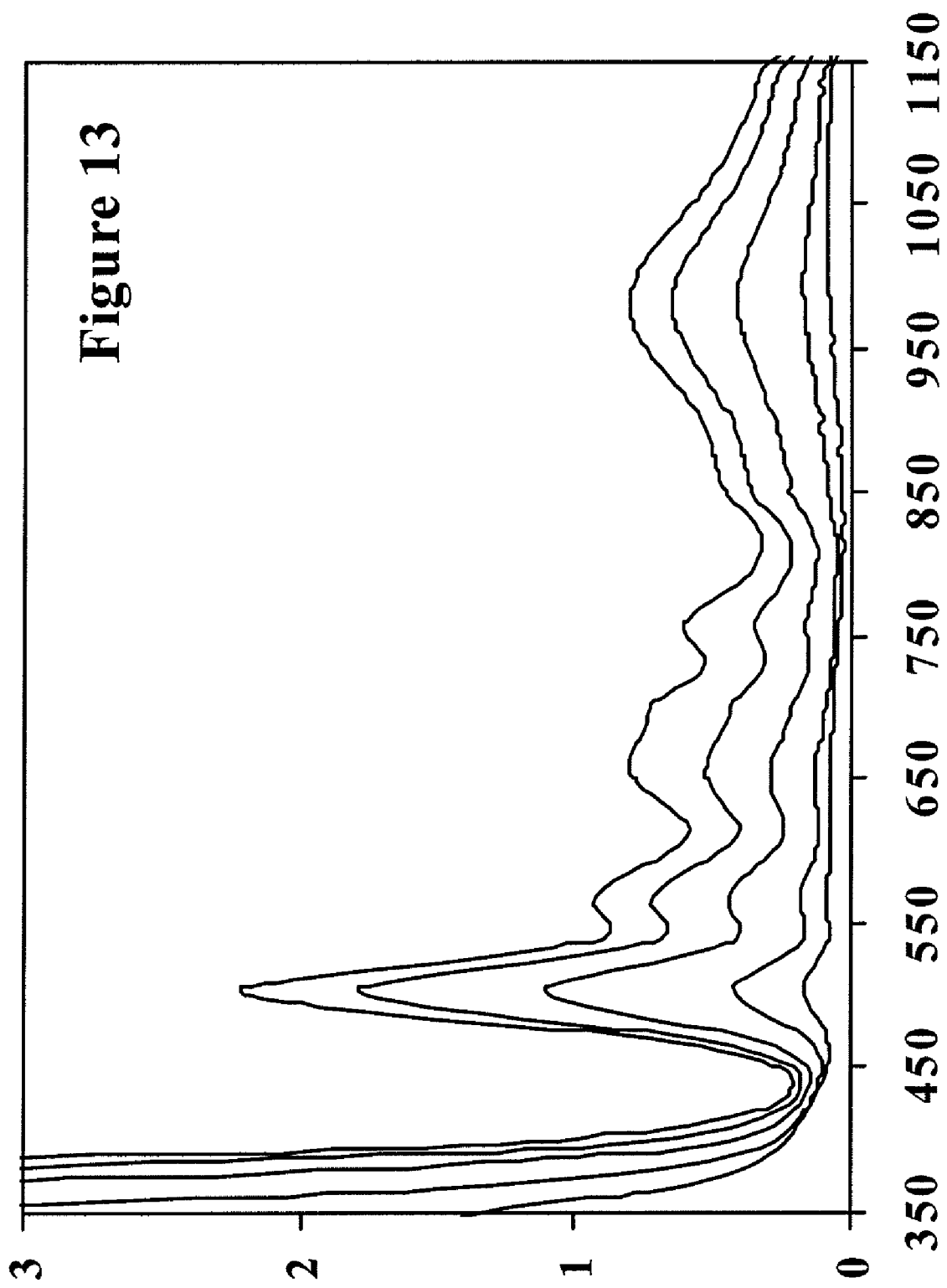
Figure 14:
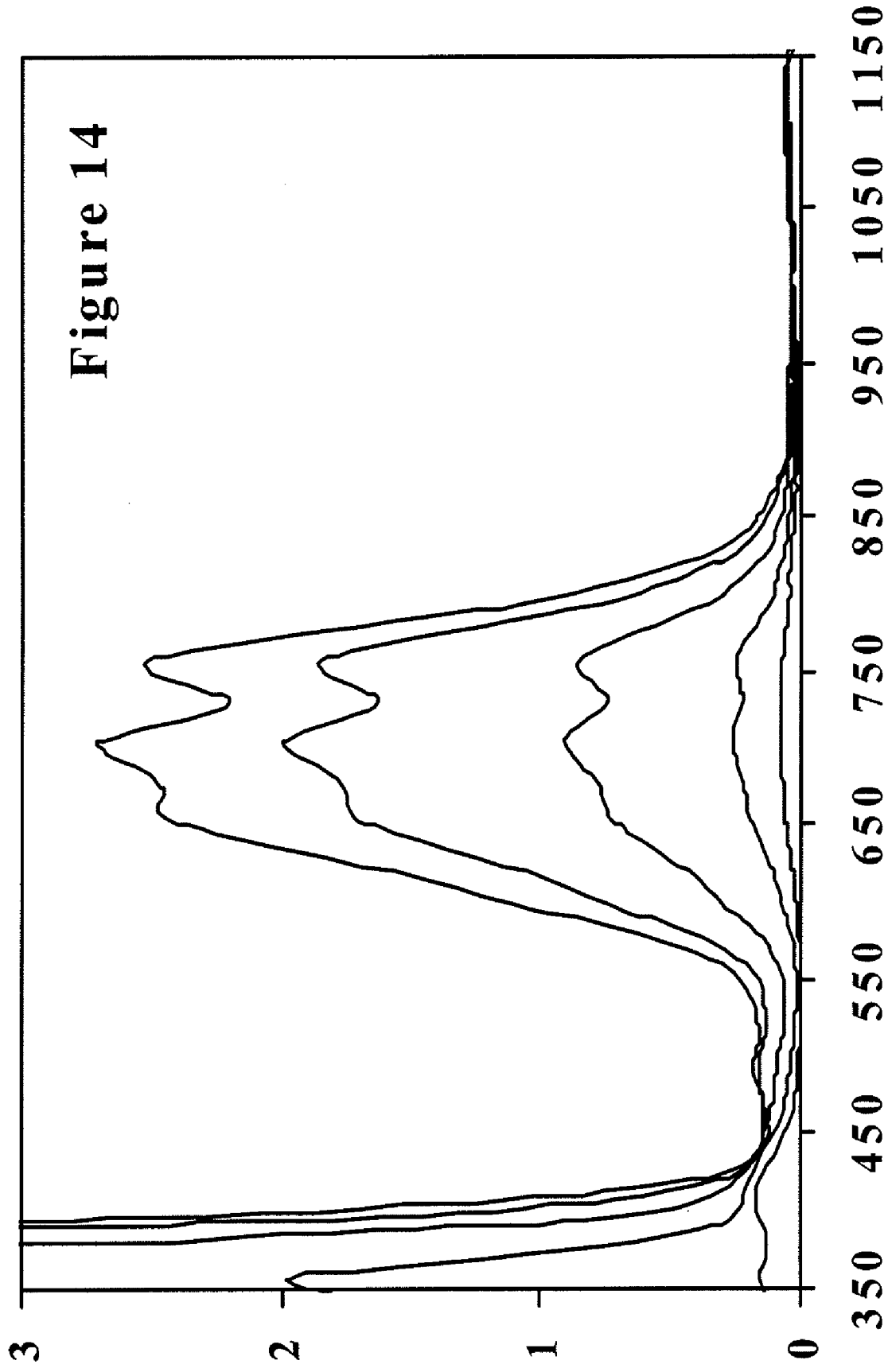
Figure 15:
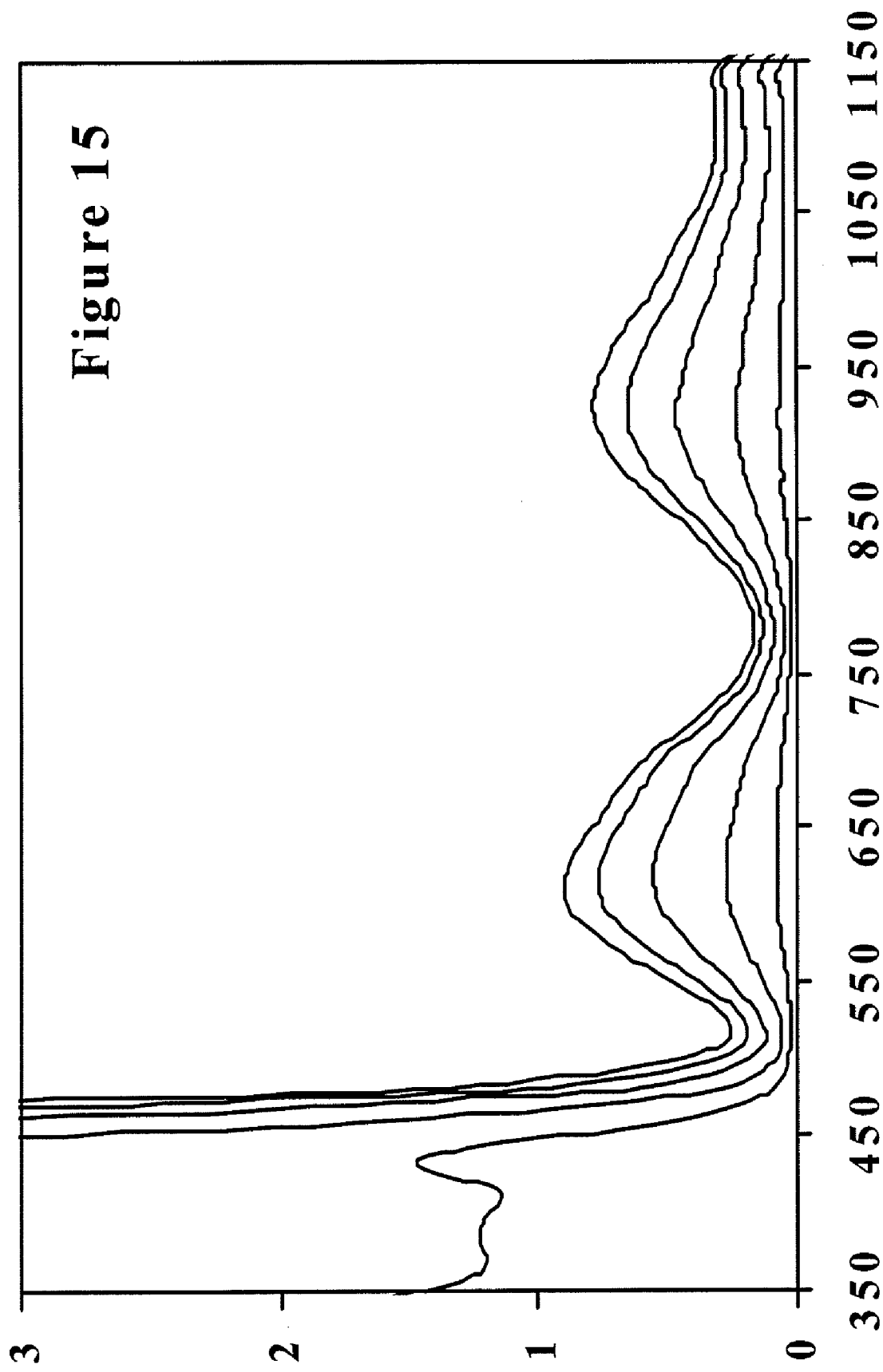
Figure 16:
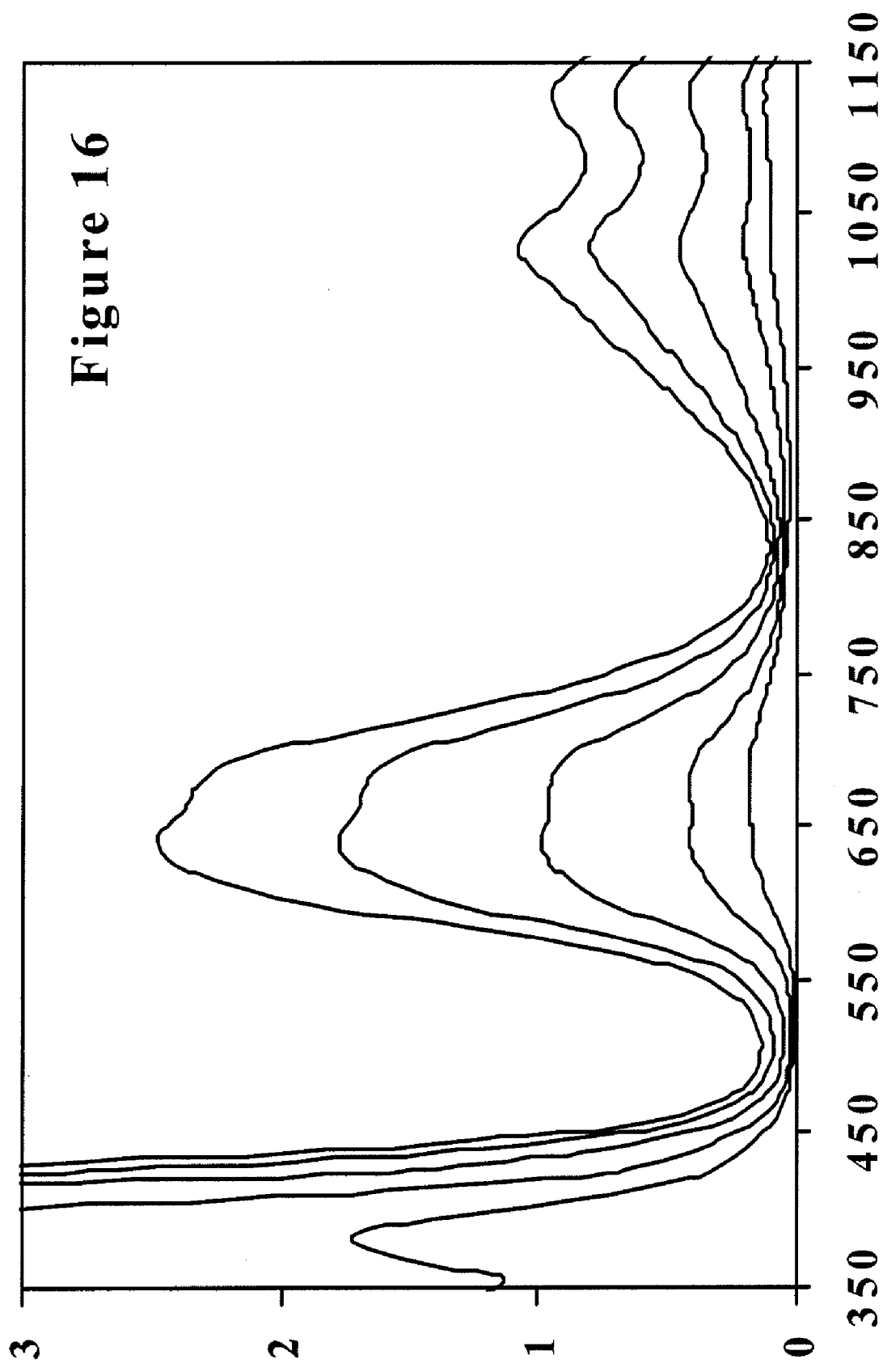
Figure 17:
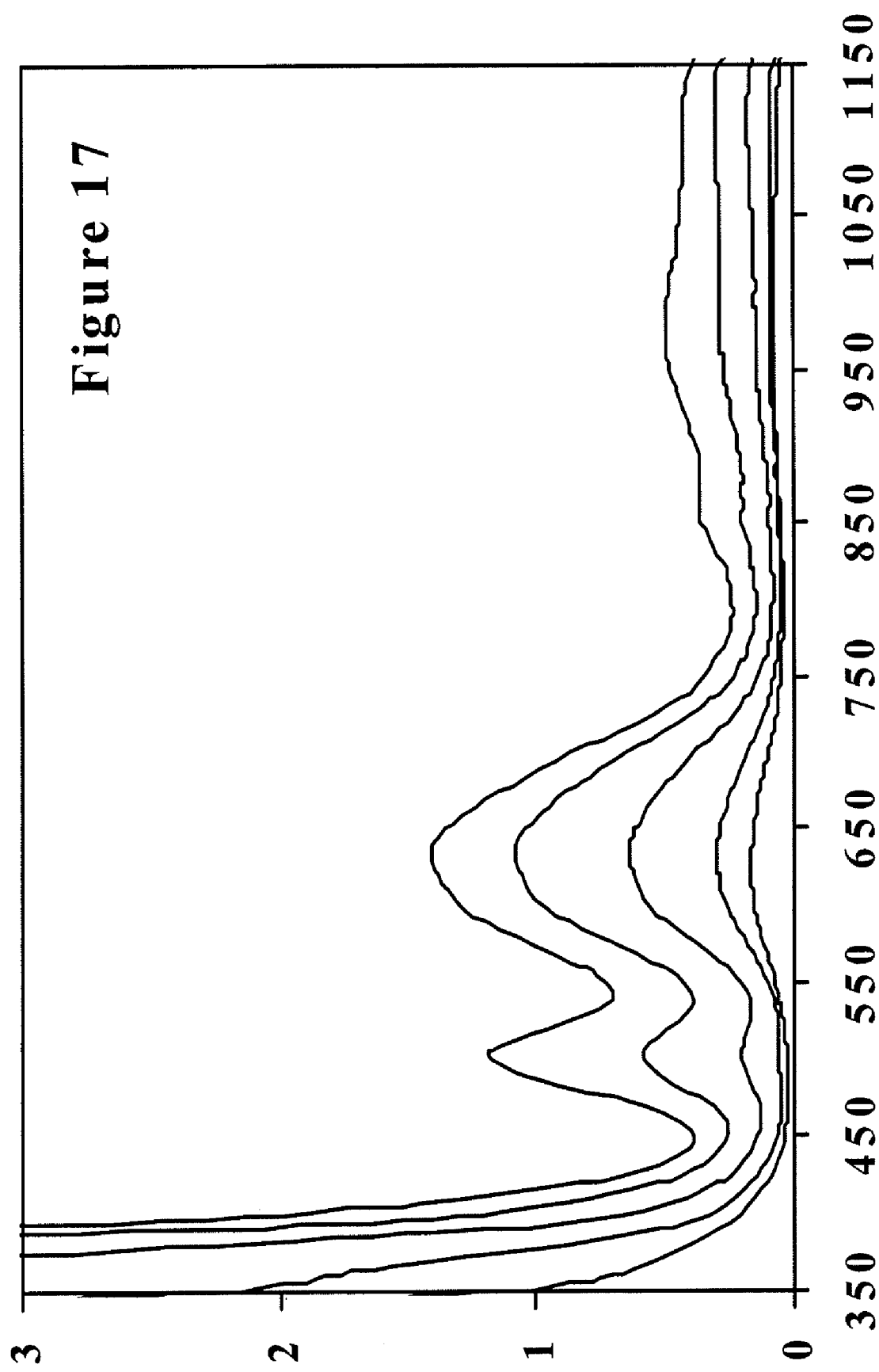

Another example of an exchange metal TC system is shown in FIG. 11 for the proposed equilibria:

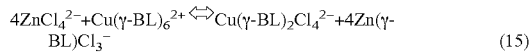
(15)

Once again the reversible, thermally induced shift in the equilibrium equation gives rise to a LETC process. In this case the chloride is still the HϵL since it is the ligand in the HϵMLC. In this case γ-BL is believed to play the role of the LϵL and the exchange metal ion is Zn(II). In the solution of FIG. 10, Zn(II) is also used but this time it is in combination with a LϵL, glycerol, to allow the simultaneous formation of HϵMLC's of two metals at once as described above.

Mn(II) is of particular interest as an exchange metal because even its tetrahedral MLC's have low molar absorption coefficients; see for example: F. A. Cotton et. al. J. Amer. Chem. Soc. 84, 167-172 (1962). Exchange metal type LETC systems that have been demonstrated or should be considered are based on Mn(II), Ni(II), Co(II), Sn(II), Cd(II), Cu(II), Al(III) and Sb(V). See Examples 179-188 and Table 12 for more details.

Figure 31:
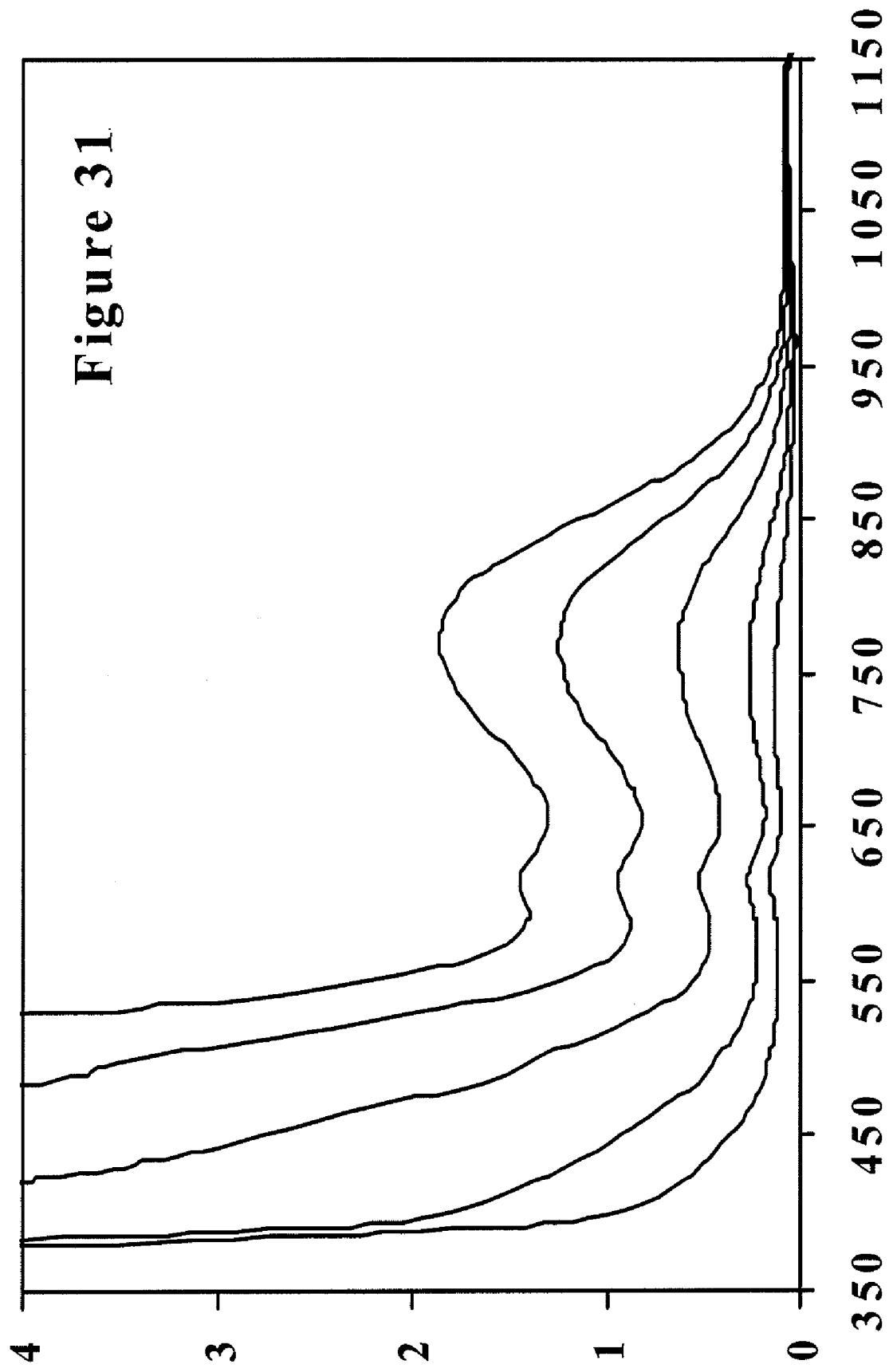
Figure 32:
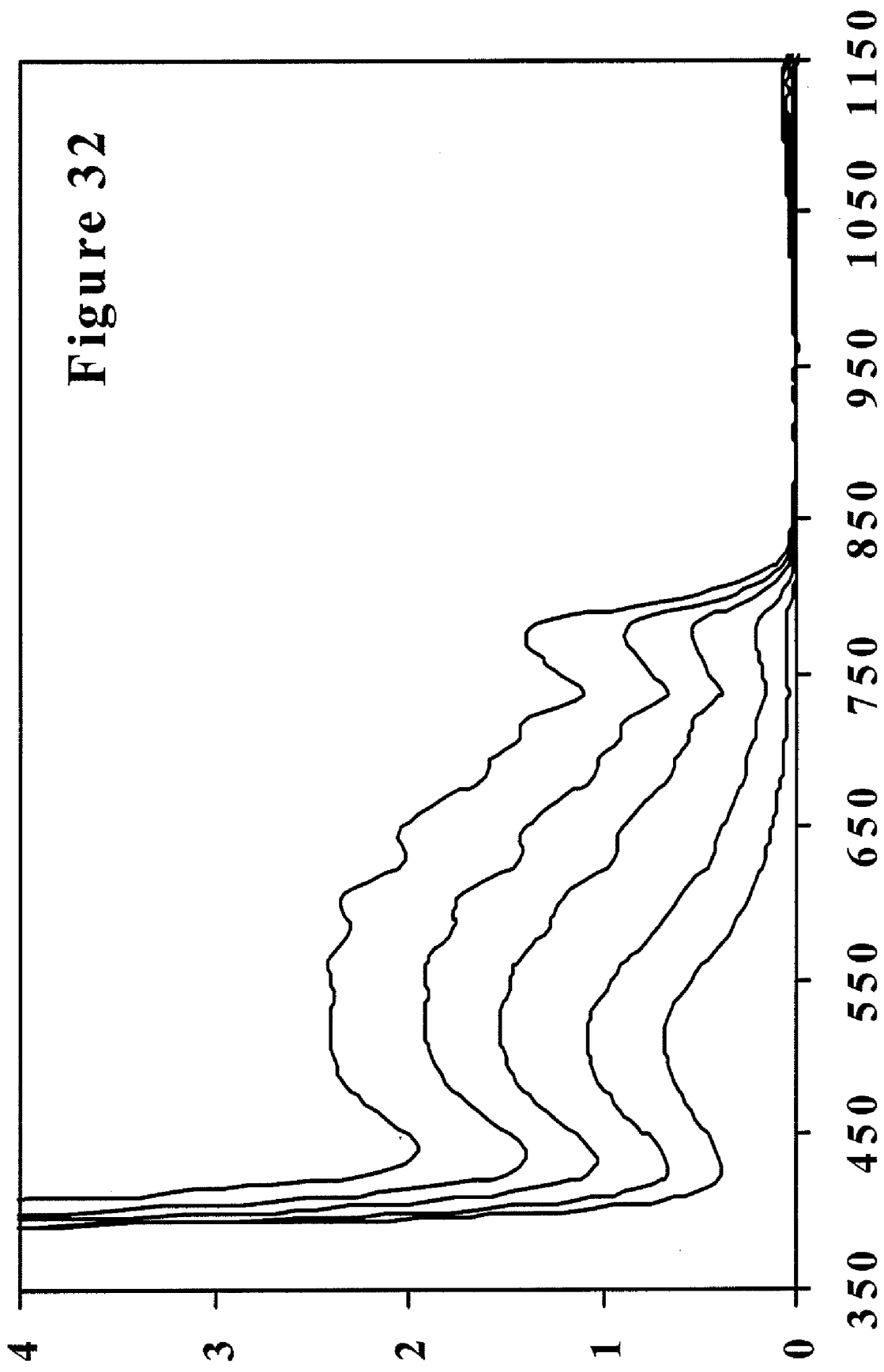
Figure 33:
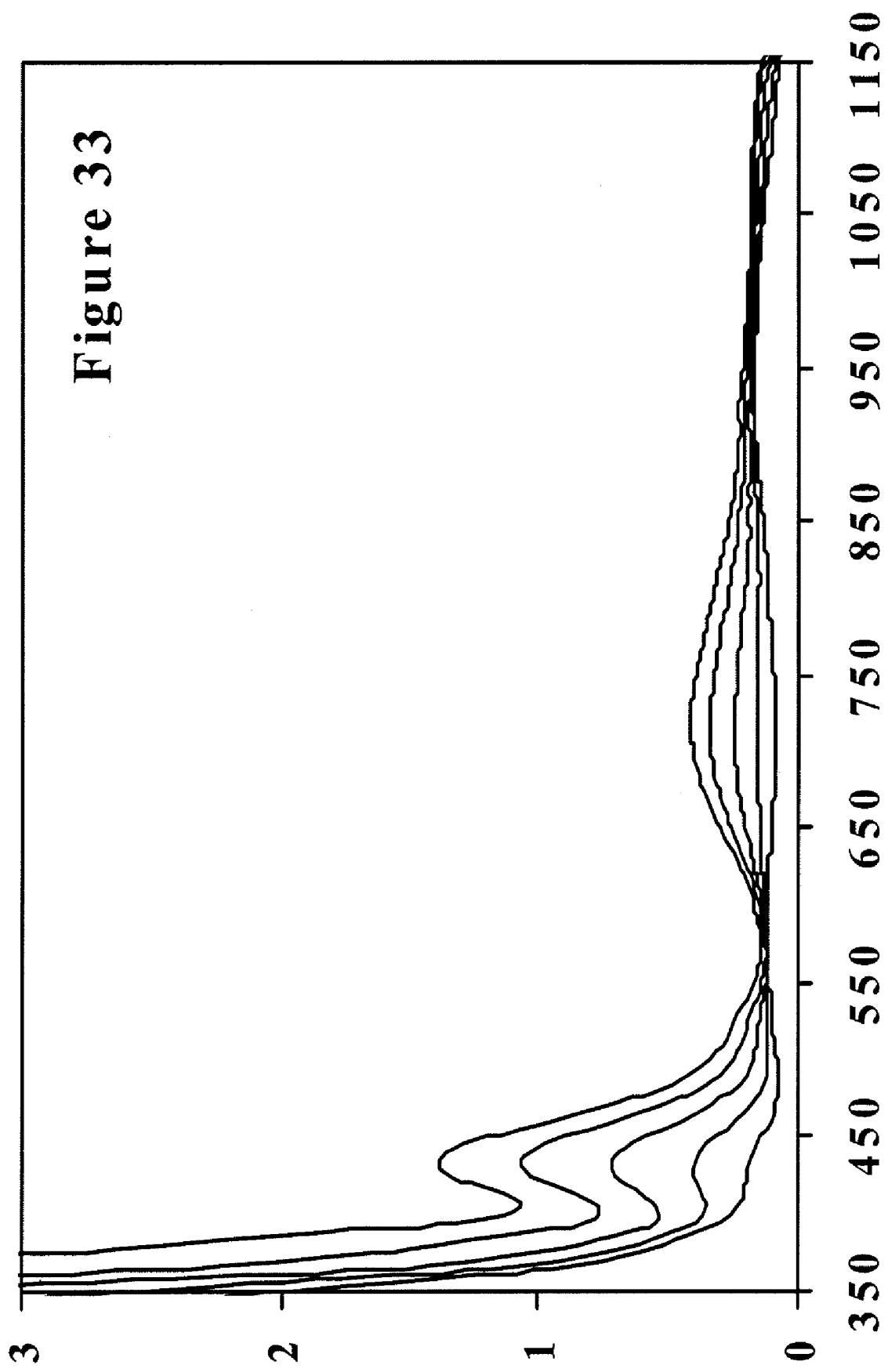
Figure 34:
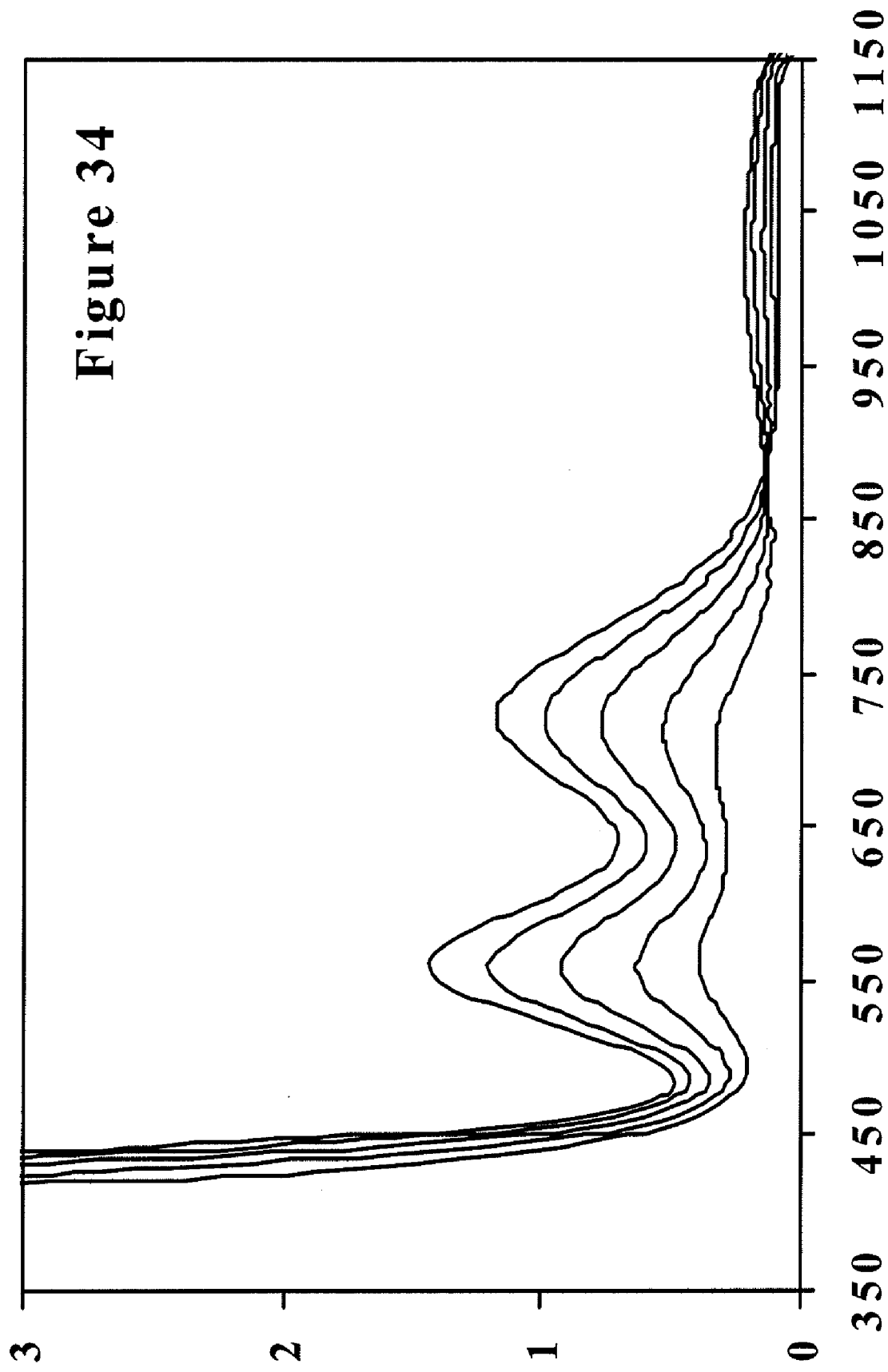
Figure 35:
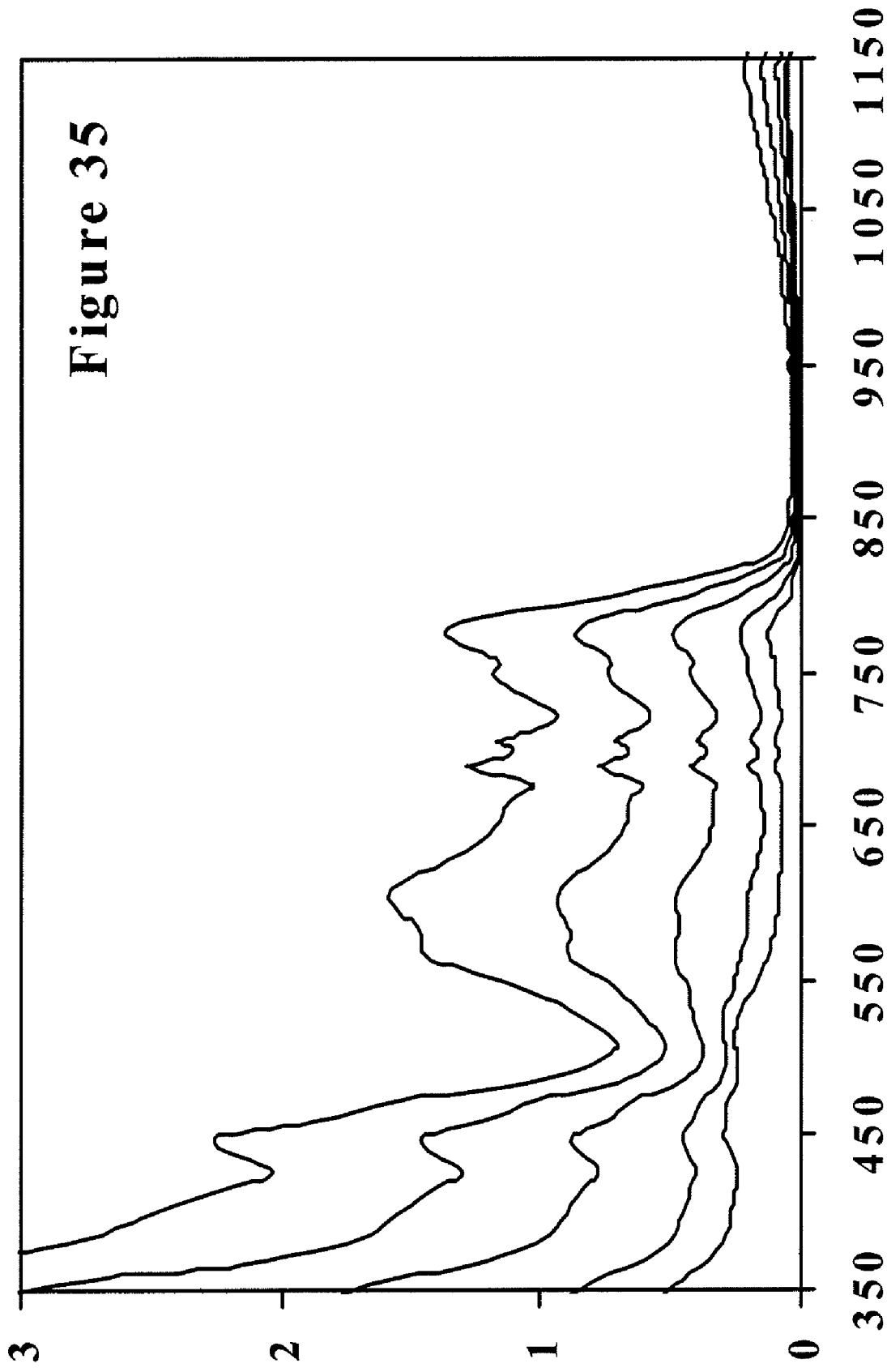
Figure 36:
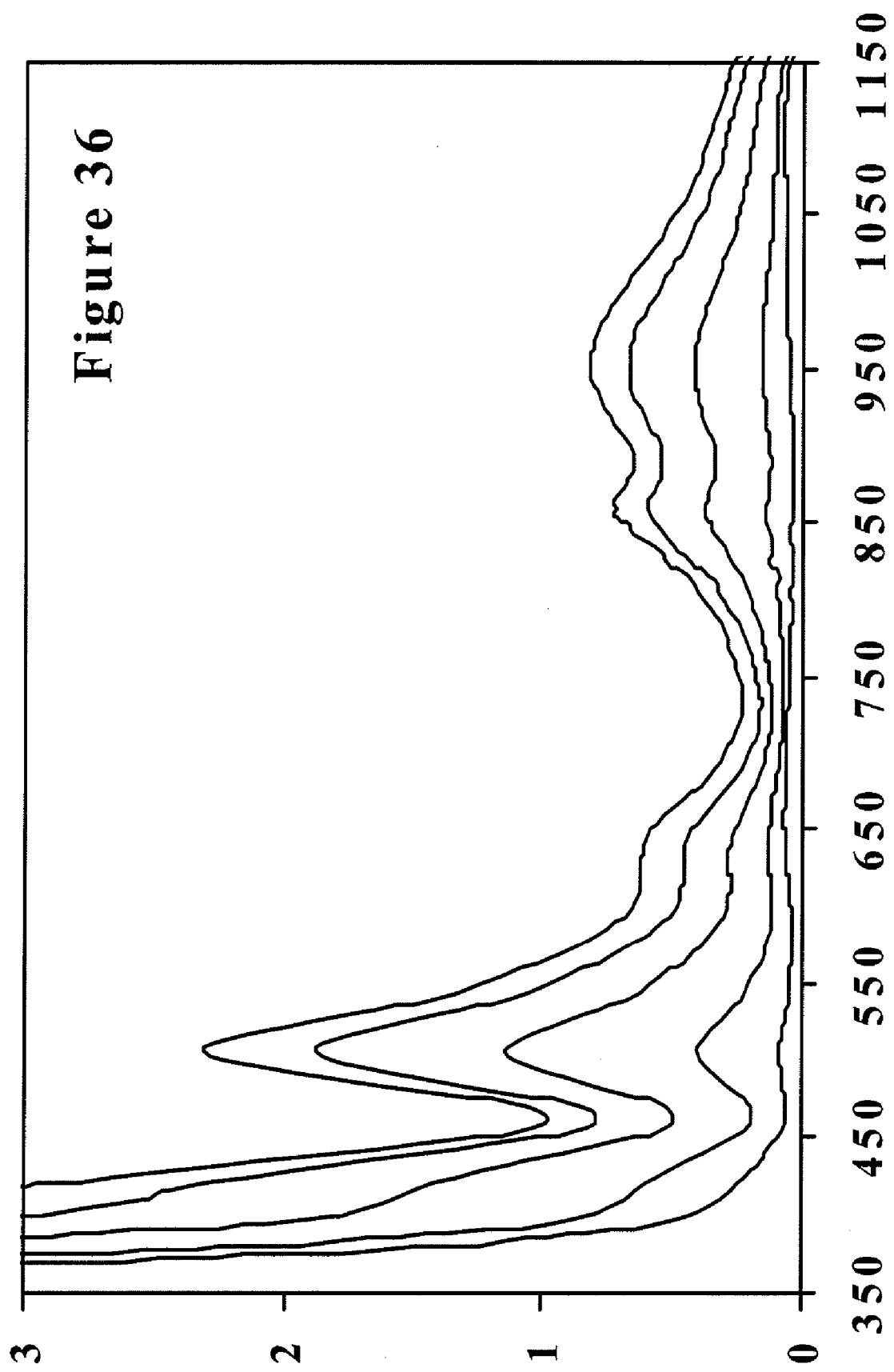
Figure 37:
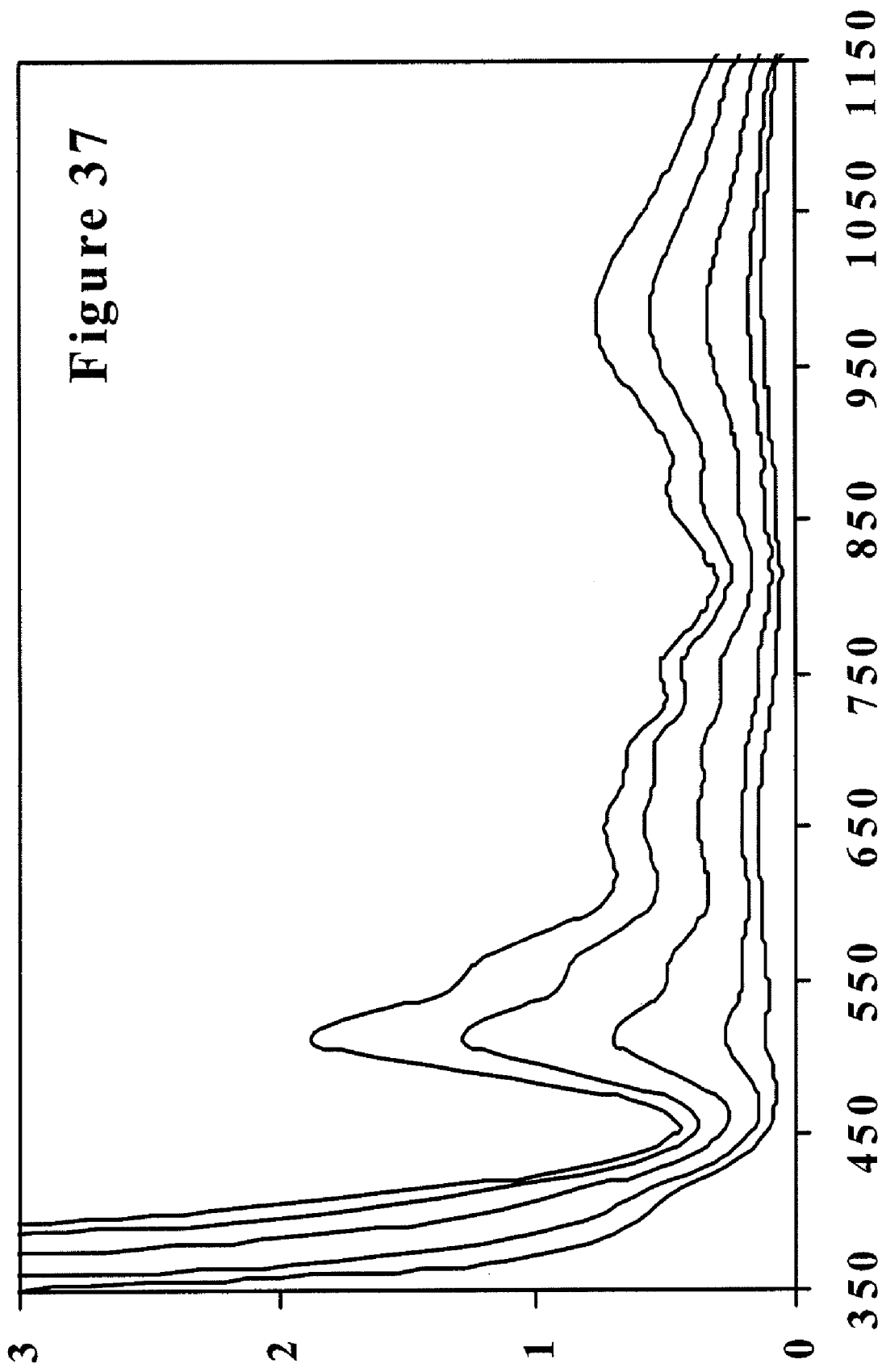
Figure 38:
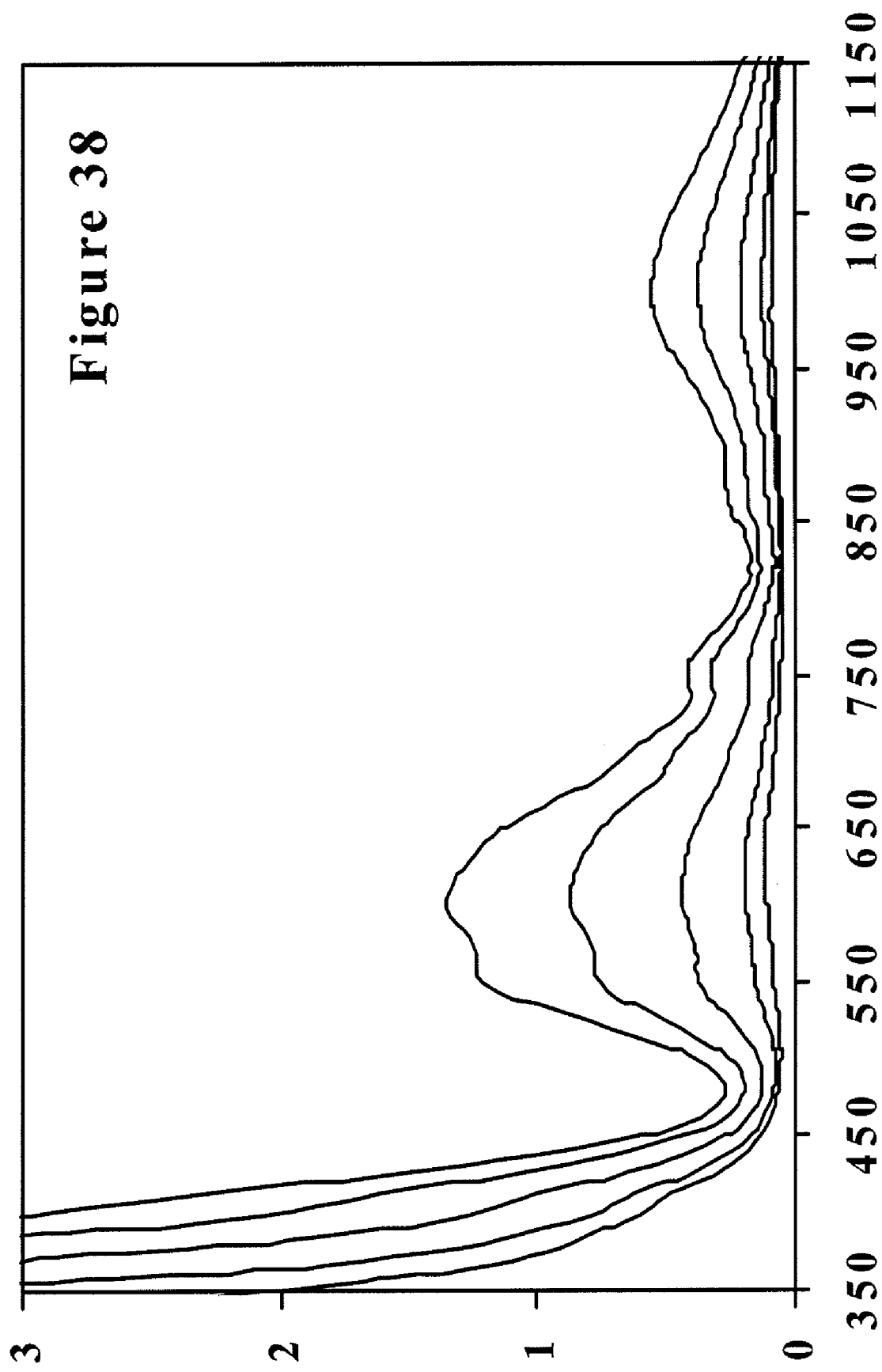
Figure 39:
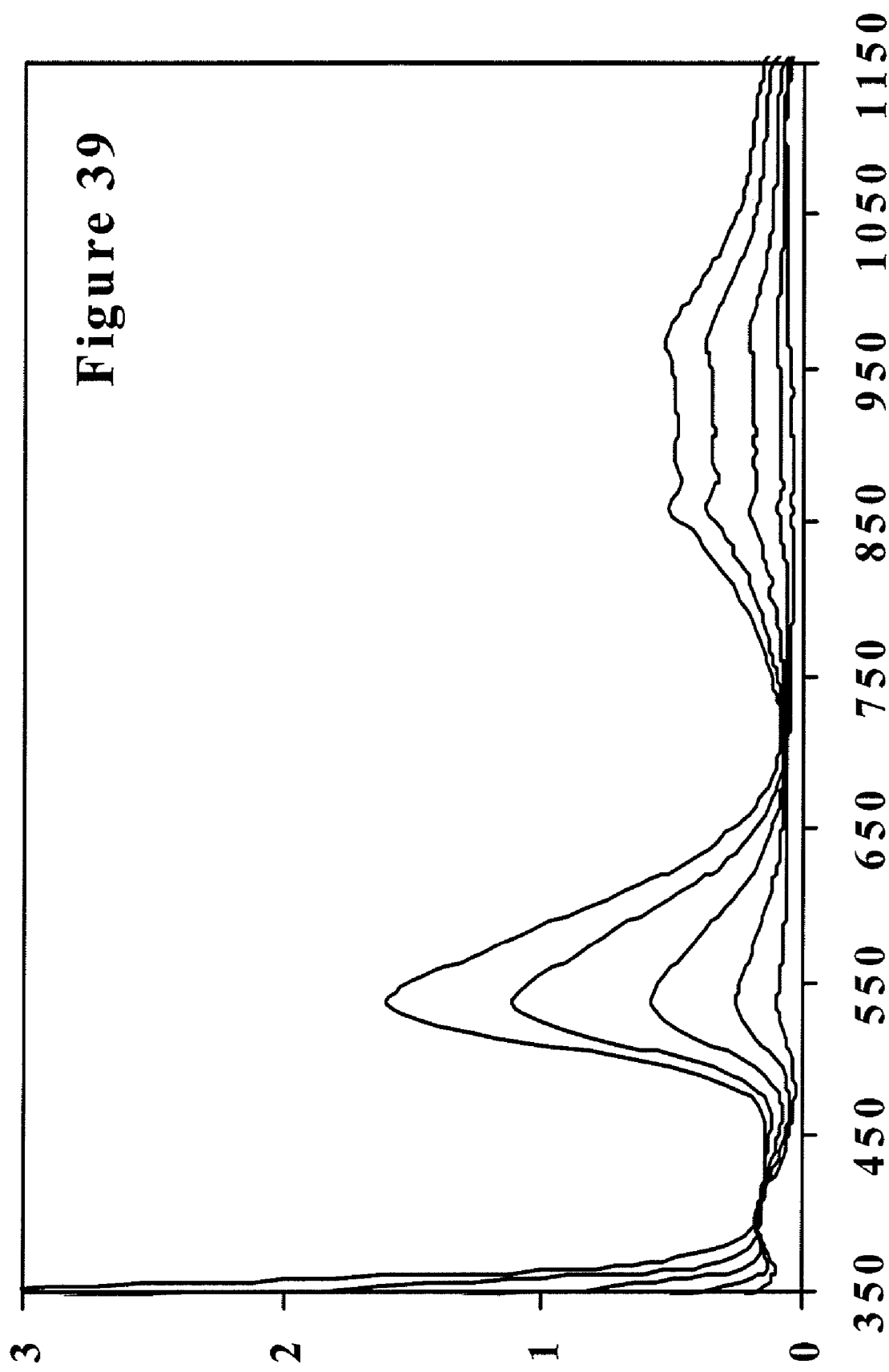
Figure 40:
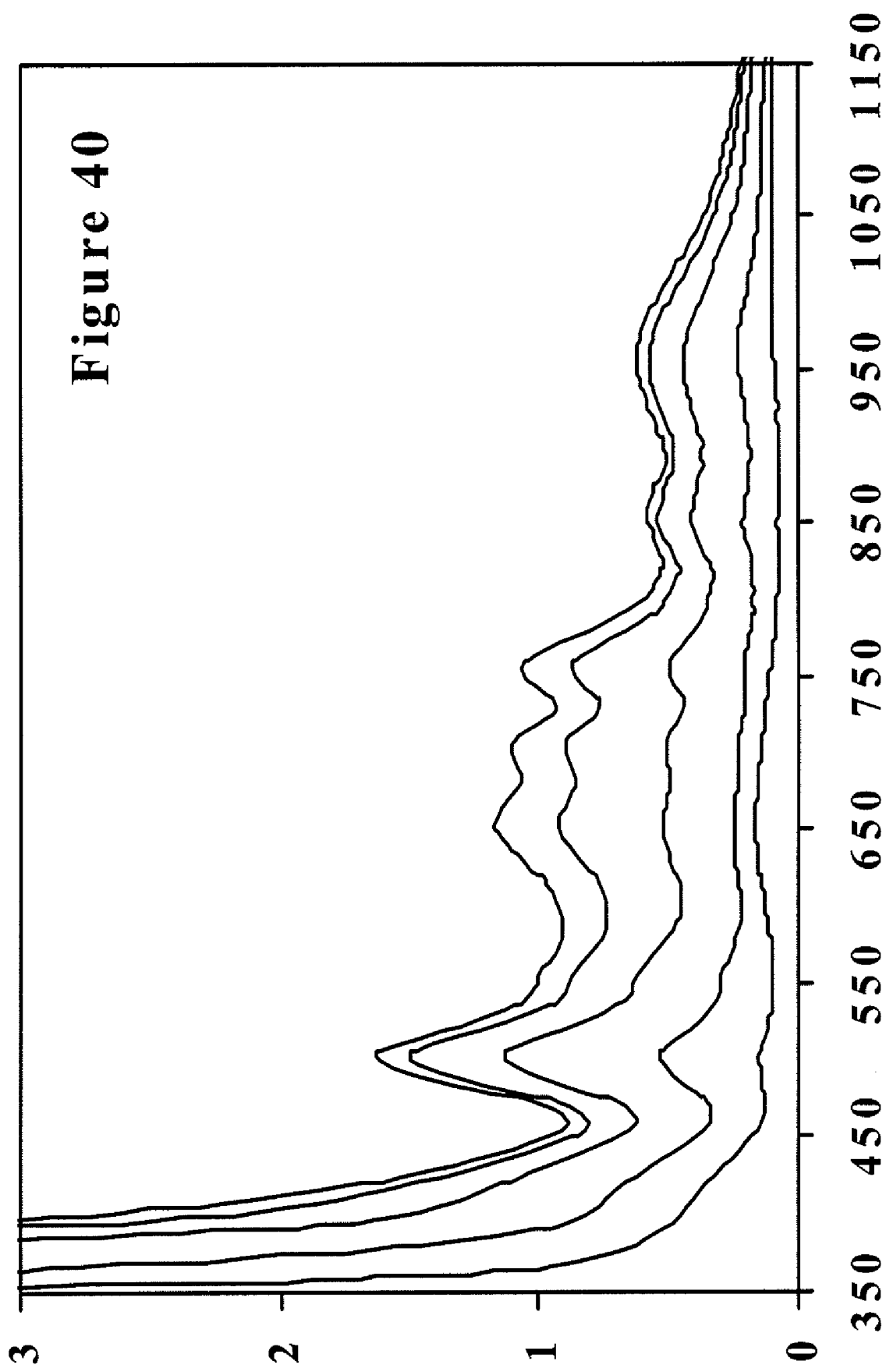
Figure 41:
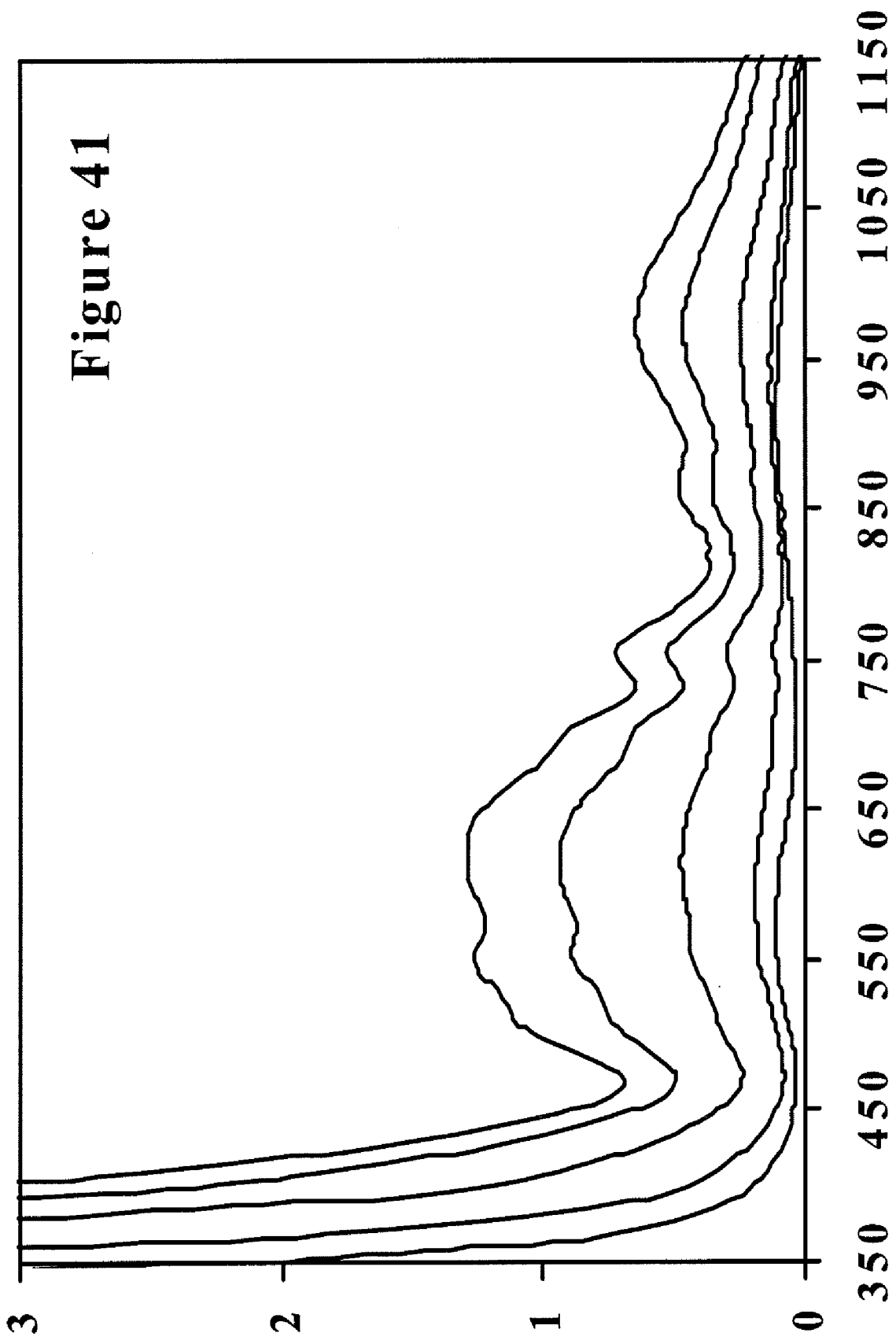

LETC systems can be combined with essentially any other thermochromic phenomena. A VO$_2$ or doped VO$_2$ film may be included on a substrate that is in contact with a LETC layer on the other side of the substrate. Alternatively, we have discovered that certain thermochromic materials like ring opening compounds are compatible with some LETC systems and remarkably they can even be incorporated into the same solution or layer. FIG. 31 shows the thermochromic performance for a LETC system in combination with a compound known as Oxford Blue and FIG. 32 shows the thermochromic performance for another LETC system in combination with a compound known as Ruby Red. Both of these materials are thermochromic based on a thermodynamic shift in the equilibrium between the ring-closed, colorless form and the ring-opened, highly absorbing form. Ruby Red and Oxford Blue are available from James Robinson LTD of Huddersfield, England and they are also available from Keystone Aniline Corporation of Chicago, Ill.

Thermodynamics of Reversible Equilibria

LETC processes involve reversible reactions in which the extent of the reaction, (or the position of the equilibrium), is determined by the thermodynamic parameters of the reaction, the temperature of the system and the total concentrations of each of the reactants/products in the system. One of the many types of LETC reactions, which are governed by a reversible thermodynamic equilibrium reaction, may be represented by the following equation:

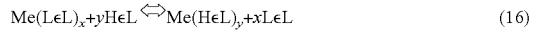
(16)

wherein x and y are numeric variables that designate the number of LϵL and HϵL, respectively. In order for the absorption of the system to increase with increasing temperature the equilibrium must shift to the right in equation (16) as the temperature increases. This would give a net increase in the light energy absorbed since the ϵ's for the complex Me(HϵL)$_y$ are larger than the ϵ's for the complex Me(LϵL)$_x$ at many wavelengths in the visible and/or NIR range for nearly all of the systems disclosed herein. In order for the reaction to be reversible the reaction must shift back to the left the same amount as the temperature drops back to its original value. The equilibrium constant for this reaction is given by:

$$K_{eq}=([Me(H\epsilon L)_y][L\epsilon L]^x)/([Me(L\epsilon L)_x][H\epsilon L]^y) \quad (17)$$

where the brackets are used to signify concentration, (although to be more accurate one could use activities). While the equilibrium constant is "constant" at a given temperature for wide variations in concentration, there is a different "constant" at each temperature. The temperature dependence of the equilibrium constant is determined by the standard free energy change, $\Delta G°$, of the reaction, which in turn is determined by the standard enthalpy change, $\Delta H°$, of the reaction. This can be seen from the following well known equations:

$$\Delta G°=\Delta H°-T\Delta S° \quad (18)$$

$$\Delta G°=-RT\ln K_{eq} \quad (19)$$

$$K_{eq}=\exp(-\Delta H°/RT)*\exp(\Delta S°/R) \quad (20)$$

Figure 47:
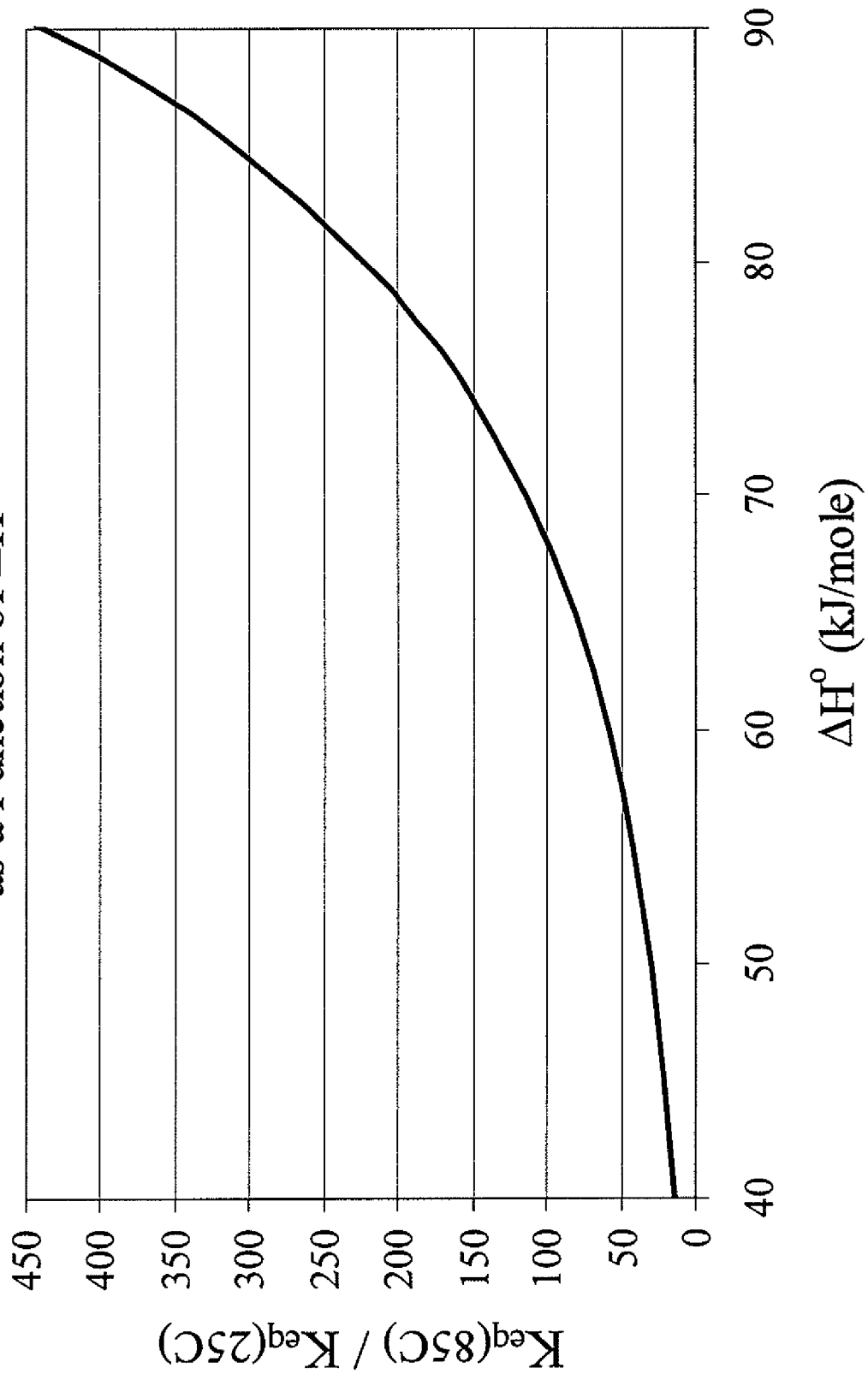
FIG. 47 is a plot of $K_{eq}$ (85 C) to $K_{eq}$ (25 C) as a function of $\Delta H°$.

For most of the LETC systems we have discovered, $\Delta H°$ of reaction is roughly constant over the temperature range of 0 to 100 Celsius. If we assume the value of $\Delta H°$ is actually constant over the temperature range of interest, then the magnitude of the change of $K_{eq}$ with temperature is dependent only on the magnitude of $\Delta H°$. Also, for the equilibrium to shift to the right and for the net sunlight energy absorbed by the system to increase with a temperature increase, $K_{eq}$ must increase. This can be seen from the mass balance in equation (16) where the [Me(HϵL)$_y$] must increase for the absorbance to increase. Given a constant total concentration of all the ingredients used to make up the system, the only way for the equilibrium to shift to the right is for the value of the equilibrium constant to increase; see equation (17). The value of $K_{eq}$ increases as the temperature increases only if $\Delta H°$ is positive as shown in equation (20). The larger the positive value of $\Delta H°$ for the equilibrium reaction the larger the increase in the value of $K_{eq}$, over a given temperature range, as shown by the following equations:

$$K_{eq}(T_H)=\exp(-\Delta H°/RT_H)*\exp(\Delta S°/R) \quad (21)$$

$$K_{eq}(T_L)=\exp(-\Delta H°/RT_L)*\exp(\Delta S°/R) \quad (22)$$

$$K_{eq}(T_H)/K_{eq}(T_L)=\exp((\Delta H°/R)*(1/T_L-1/T_H)) \quad (23)$$

where $T_H$ and $T_L$ are the high and low temperatures over which the LETC system is being evaluated. Equation (23) is independent of $\Delta S°$ and shows that the highest performance for a LETC system, in terms of the largest increase in light absorption, over a given temperature range, comes with the highest positive value of $\Delta H°$. This is supported by the graph in FIG. 47 which shows the increase in the ratio of equilibrium constant values for two different temperatures as a function of ΔH°. This is simply a graph of equation (23) for $T_H$ equal 85 C and $T_L$ equal 25 C, however it is a powerful illustration of the utility of having high ΔH° for LETC reactions.

Figure 48:
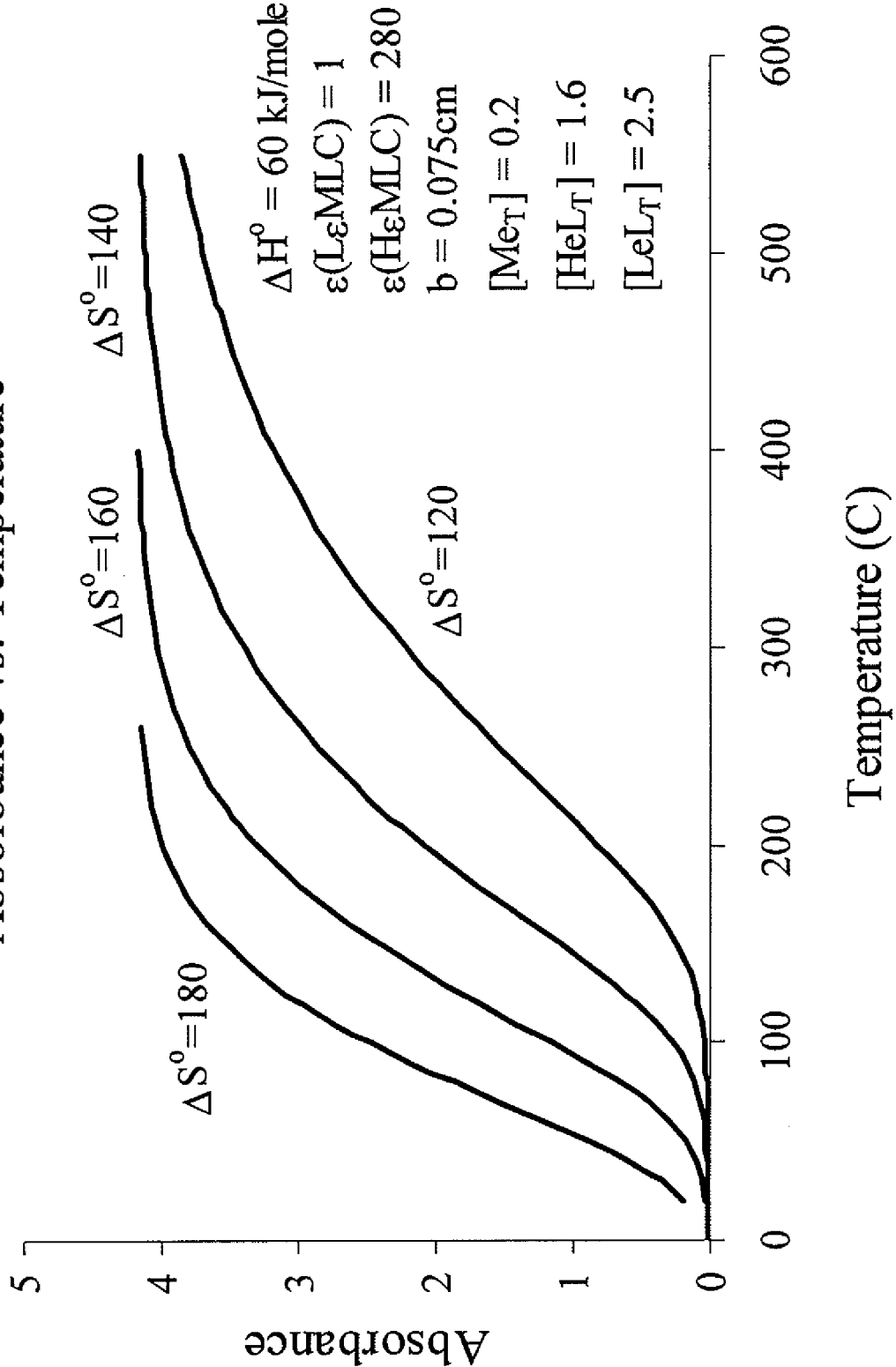
FIG. 48 shows the influence of $\Delta S°$ on Absorbance and Temperature.

However, the larger the positive value of ΔH°, at a given temperature and a given value of ΔS°, the smaller the value of $K_{eq}$. It may be possible to have such a large positive value of ΔH° giving such a small value of $K_{eq}$ that even a many fold increase in the value of $K_{eq}$ gives little or no observable light absorption change. This may happen because the $[Me(H\epsilon L)_y]$ is so low that even a many fold increase in $[Me(H\epsilon L)_y]$ with temperature is still a small concentration. Thus a large positive value of ΔS° is desirable, (if not necessary), in conjunction with a large, positive ΔH° if a reasonably low concentration of materials or a reasonably small path length, (layer thickness), is to be used. In essence, the ΔS° of the equilibrium reaction is important in that its value helps determine the position of the equilibrium at each temperature, while ΔH° determines the temperature dependence. FIG. 48 helps illustrate the influence of ΔS° on the effective temperature range for absorbance changes for LETC reactions like:

$$Me(L\epsilon L)_3 + 4H\epsilon L \rightleftharpoons Me(H\epsilon L)_4 + 3L\epsilon L \qquad (24)$$

FIG. 48 shows the absorbance calculated for a wavelength where the only $L\epsilon MLC \equiv Me(L\epsilon L)_3$ has as ε of 1 liters/mole*cm at a λmax of the HεMLC and the only $H\epsilon MLC \equiv Me(H\epsilon L)_4$ has an ε of 280 liters/mole*cm at a λmax of the HεMLC. The absorbance is calculated as a function of temperature by first calculating an equilibrium constant at each temperature based on the ΔS° values shown in FIG. 48 and a ΔH° of the reaction of 60 kJ/mol. Then the concentrations of $Me(L\epsilon L)_3$ and $Me(H\epsilon L)_4$ at each temperature are calculated based on the equilibrium constant and the values: $[Me_T]=0.2M$, $[H\epsilon L_T]=1.6M$ and $[L\epsilon L_T]=2.5M$. The concentrations of $Me(L\epsilon L)_3$ and $Me(H\epsilon L)_4$, the values of the ε's and a path length of 0.075 cm are used to determine absorbance values. FIG. 48 confirms that while the overall magnitude of the absorbance change with temperature is determined by the value ΔH°, the temperature range where this absorbance change takes place is highly dependent on ΔS°. FIG. 48 illustrates how important it is to find reversible equilibria reactions not only with large positive values of ΔH°, but also with appropriately large positive values of ΔS°, if LETC systems are to operate over especially useful temperature ranges like 0 C to 100 C.

The present application discloses many LETC systems in which not only are there large positive values for ΔH° and ΔS°, these values are such that there is significant thermochromic activity over the OC to 100 C temperature range. This has been done by choosing systems which combine transition metal ions, HεL's, LεL's and solvent systems to give the desirable values of ΔH° and ΔS° which allow for large absorbance changes over a desirable temperature range. In general a ΔH° value from 40 kJ/mol to about 90 kJ/mol for the reversible LETC reaction is useful. In general it is also useful that the value of ΔS° in J/mol*K be such that when the value in J/mol*K is divided by the value of ΔH° in kJ/mol, that the quotient be between 1.5 and 3.5 even though the units of this quotient may not be meaningful. Thus e.g. if ΔH° is 40 kJ/mol then it is desirable to have ΔS° between 60 J/mol*K and 140 J/mol*K. Once the system, with its thermodynamics, is chosen, we have discovered how to optimize the system even further by judicious choices of concentrations and ratios for the constituents involved, especially for relatively thin layers in polymers. This is illustrated in many of the examples and is discussed further below.

Figure 49:
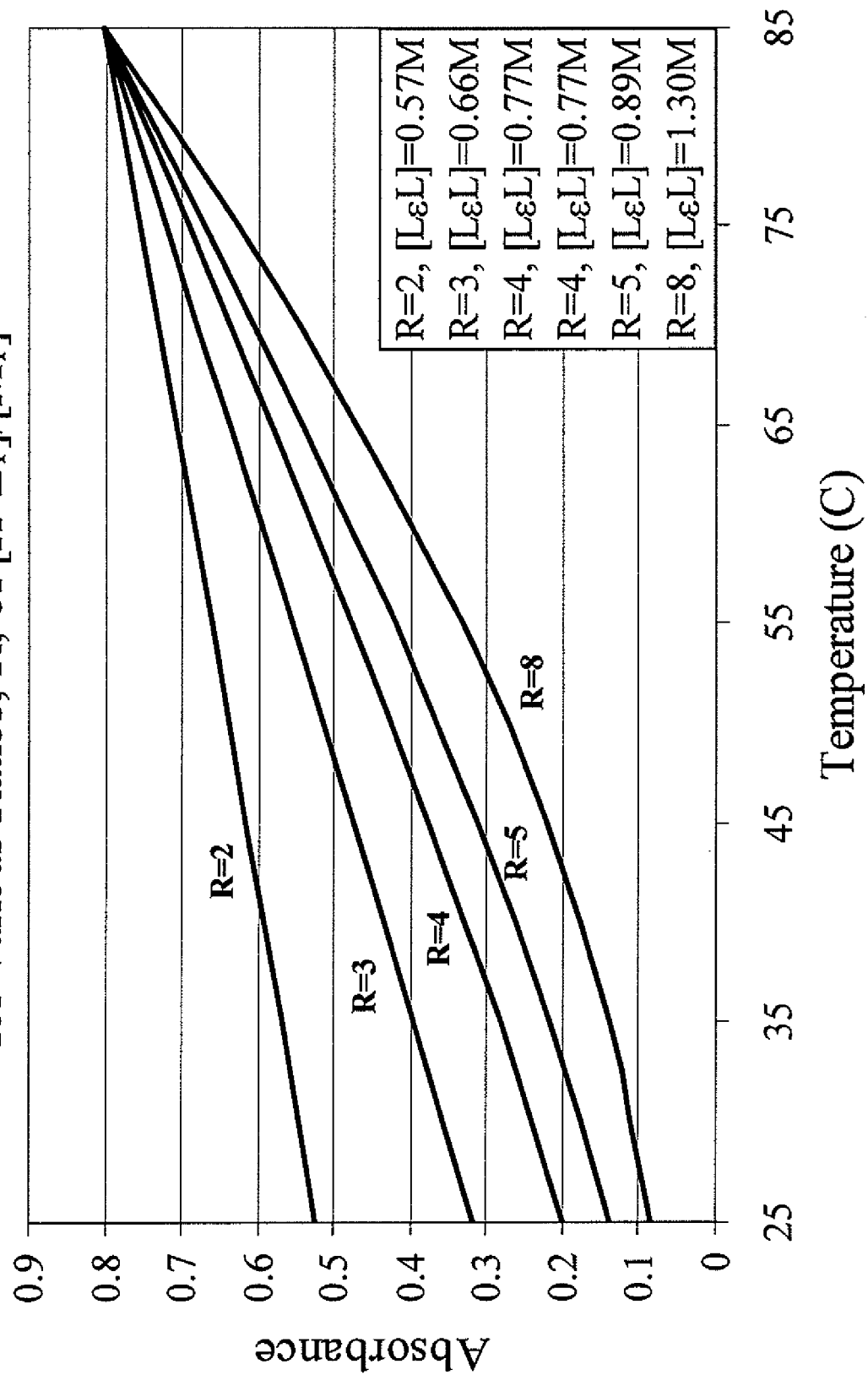
FIG. 49 shows the temperature dependence of Absorbance for various ratios of $[HeL_T]/[M_T]$.

Good performance for a chosen LETC system comes when the ratio of the total concentration of all HεL's to the total metal ion concentration, $[H\epsilon L_T]/[Me_T]$, is as high as possible. This is illustrated in FIG. 49 with a calculation based on a system with the following LETC equilibrium equation for a bidentate LεL and a monodentate HεL:

$$Me(L\epsilon L)_3 + 4H\epsilon L \rightleftharpoons Me(H\epsilon L)_4 + 3L\epsilon L \qquad (25)$$

The system is assumed to have the following very realistic parameters:

ΔH°=50 kJ/mol
ΔS°=110 J/mol*K
$\epsilon(Me(L\epsilon L)_3)=1$ l/mol*cm at $\lambda_{max}$ of HεMLC
$\epsilon(Me(H\epsilon L)_4)=280$ l/mol*cm at $\lambda_{max}$ of HεMLC
Layer Thickness=b=0.075 cm
$[Me_T]=0.2M$ Equation 25 is assumed to be the only equilibrium of interest, which may be nearly the case for many of our systems, especially those in an indifferent or poorly coordinating solvent. Also assumed are (1) all of the metal ions are present in the $L\epsilon MLC \equiv Me(L\epsilon L)_3$ or the $H\epsilon MLC \equiv Me(H\epsilon L)_4$; (2) all of the HεL's molecules are free in solution or part of the HεMLC; and (3) all of the LεL's molecules are free in solution or part of the LεMLC. The thermochromic behavior in many of the figures herein shows these assumptions to be reasonable.

For each ratio, R, of $[H\epsilon L_T]/[Me_T]$, the [LεL] was determined which would give the system an absorbance of A=0.8 at 85 C based on the above parameters, equilibrium equation and the equation:

$$A=\epsilon(Me(L\epsilon L)_3)*b*[Me(L\epsilon L)_3]+\epsilon(Me(H\epsilon L)_4)*b*[Me(H\epsilon L)_4] \qquad (26)$$

The value of $[H\epsilon L_T]$ is determined by the value of R being used and the specified $[Me_T]$. The [LεL] values that were determined and then used are shown in FIG. 49. Using these [LεL]'s, the absorbances at various temperatures throughout the 25 C to 85 C range were calculated for each ratio of $[H\epsilon L_T]/[Me_T]$. Then the absorbances versus temperature were plotted in FIG. 49. This graph shows that there is significant improvement in absorbance change over this temperature range as the ratio of $[H\epsilon L_T]/[Me_T]$ is increased even though the required amount of LεL also increases.

In many practical applications there is a desire to have a TC layer as thin as possible. LETC systems with thicknesses in the range of 0.02 to 0.5 cm with reasonable to excellent performance are disclosed herein. To achieve high performance in thin films a relatively high concentration of metal ions should be present. However, there is a trade-off between how high the metal ion concentration needs to be and the desire for a large ratio of $[H\epsilon L_T]$ to $[Me_T]$, especially when solubility limits are taken into account.

As discussed before, the theoretical minimum metal ion concentrations depend on (1) the desired level of absorbance at an elevated temperature and a particular wavelength or series of wavelengths, (2) the path length, (layer thickness), of the LETC system and (3) the ε of the HεMLC. If an absorbance of at least, $A(T_H, A)$, is desired at a higher temperature of operation at some A, then the minimum metal ion concentration must be greater than or equal to $A(T_H, \lambda)/(\epsilon(H\epsilon MLC, \lambda)*b)$; where b is the path length or layer thickness in centimeters. Practically, we have discovered that the preferred minimum $[Me_T]$ is 1.5 times the theoretical minimum.

By analogy to the previous analysis, the maximum $[Me_T]$ to be used is less than or equal to $A(T_L, \lambda)/(\epsilon(L\epsilon MLC, \lambda)*b)$. Thus useful transition metal ion concentrations are given by the following range:

$$A(T_L, \lambda)/(\epsilon(L\epsilon MLC, \lambda)*b) > [Me_T] > 1.5*(A(T_H, \lambda)/(\epsilon(H\epsilon MLC, \lambda)*b)) \qquad (27)$$

where $A(T_L, \lambda)$ is the desired absorbance at λ at some lower temperature, $T_L$, and $A(T_H, \lambda)$ is the desired absorbance at λ at some higher temperature, $T_H$.

Of course the total metal ion concentration, $[Me_T]$, is also constrained by the solubility limit of the LεMLC's and the HεMLC's in the system over the temperature range of operation as all of the Me in the system is either in LεMLC's or HεMLC's. The $[Me_T]$ is also constrained by the ability of the system to provide an adequate [HεL]. Thus the useful $[Me_T]$ is also determined by:

$$[Me_T] \leq 0.25 * (\text{solubility limit of } [H\epsilon L]) \tag{28}$$

Reasonably good, although still approximate, values for ε can be found with a known metal ion concentration and an appropriate excess of LεL or HεL so that essentially all of the metal is converted to or is present in the LεMLC or the HεMLC form. The measured absorbance divided by the path length and the total metal ion concentration provides useful values of ε(LεMLC) and of ε(HεMLC). The following approximate ε values, mostly in γ-BL, were determined by such a procedure and can be used to calculate maximum and minimum preferred $[Me_T]$ in a variety of LETC systems since the value of ε for coordination compounds is not particularly sensitive to the solvent involved:

TABLE 2

| LεMLC | $\lambda_{max}(\epsilon)$ | $\lambda_{max}(\epsilon)$ | $\lambda_{max}(\epsilon)$ | $\lambda_{max}(\epsilon)$ |
|---|---|---|---|---|
| Ni(NPG)$_3^{2+}$ | 395(7) | 660(3) | 720(3) | 1194(4) |
| Ni(TMOLP)$_2^{2+}$ | 383(6) | 630(2) | 711(2) | 1097(3) |
| Ni(water)$_6^{2+}$ | 396(6) | 661(2) | 726(3) | 1163(3) |
| Ni(DMSO)$_6^{2+}$ | 420(10) | 695(3) | 784(3) | 1177(3) |
| Co(EG)$_3^{2+}$ | 518(9) | | | |
| Co(γ-BL)$_x^{2+}$ | 518(11) | | | |
| Co(PC)$_x^{2+}$ | 516(10) | | | |
| Co(18-crown-6)$^{2+}$ | 519(8) | | | |
| Co(bis(methylsulfinyl methane)$_3^{2+}$ | 546(8) | | | |

$\lambda_{max}$ is a wavelength of maximum absorbance in nanometers
ε is the molar absorption coefficient in liters/(mole * cm)

Given the advantages of large ratios of $[H\epsilon L_T]/[Me_T]$, and the desire for high $[Me_T]$ and the desire for thin layer LETC systems, it becomes important to find highly soluble versions of HεL's. Fortunately, we have found that high, effective concentrations of halides in polymer systems may be achieved when ammonium and phosphonium cations that are tetrasubstituted are used. The substituents on nitrogen or phosphorus may be alkyl, aryl or combinations thereof.

After consideration of $[Me_T]$ and $[H\epsilon L_T]$, comes $[L\epsilon L_T]$. In fact, when high concentrations of $[Me_T]$ and $[H\epsilon L_T]$ are used, the limitation on the practicality of the system may depend on the solubility limit or physical properties imparted by the LεL(s). As long as the $[L\epsilon L_T]$ is below its solubility limit and the limit where physical properties of the system become unacceptable, the specific LεL and its concentration are preferably chosen such that the absorbance of the LETC system, (even when the system is a thin polymer layer), is less than 0.2 at 25 C while the absorbance still increases to greater than 0.8 at 85 C. These absorbances are for the active wavelength range of TC activity for the particular LETC system. These ranges of TC activity are illustrated in FIGS. 1-46 in liquid solution with a large, (1 cm), path length. However, more remarkable are the results in FIGS. 51-58 for polymer layers with thicknesses from 0.031 to 0.098 cm. Many more ranges of absorbance changes are given in Table 27.

Thus, a high metal ion concentration is desirable as long as it is possible to still have large a ratio of $[H\epsilon L_T]/[Me_T]$ and a concentration of LεL high enough to provide a desirable absorbance range. Another advantage of having large values for $[H\epsilon L_T]$ and $[L\epsilon L_T]$ can be seen by considering the mass balance and equilibrium equations below.

$$Me(L\epsilon L)_x + yH\epsilon L = Me(H\epsilon L)_y + xL\epsilon L \tag{29}$$

$$K_{eq} = ([Me(H\epsilon L)_y][L\epsilon L]^x)/([Me(L\epsilon L)_x][H\epsilon L]^y) \tag{30}$$

If the $[H\epsilon L_T]$ and $[L\epsilon L_T]$ are both large relative to $[Me_T]$, then the concentrations of free, non-coordinated HεL and

TABLE 3

| HεMLC | $\lambda_{max}(\epsilon)$ | $\lambda_{max}(\epsilon)$ | $\lambda_{max}(\epsilon)$ | $\lambda_{max}(\epsilon)$ | $\lambda_{max}(\epsilon)$ |
|---|---|---|---|---|---|
| CoCl$_4^{2-}$ | 635(475) | 670(660) | 695(810) | | |
| CoBr$_4^{2-}$ | 642(235) | 666(695) | 700(1025) | 724(1210) | |
| CoI$_4^{2-}$ | 696(410) | 724(775) | 782(1930) | | |
| Co(Bu$_3$PO)$_4^{2+}$ | 560(205) | 607(305) | 634(360) | | |
| Co(CF$_3$COO)$_4^{2-}$ | 535(125) | 572(175) | | | |
| Co(salicylate)$_4^{2-}$ | 538(235) | 577(360) | | | |
| Co((4-MeOPh)$_2$PO$_2$)$_2$ | 561(220) | 590(295) | 608(315) | 639(360) | |
| NiCl$_4^{2-}$ | 658(205) | 704(210) | | | |
| NiBr$_4^{2-}$ | 709(285) | 757(295) | | | |
| NiI$_4^{2-}$ | 508(1650) | 835(440) | | | |
| Ni(1-EtBIMZ)$_2$Br$_2$ | 580(220) | | | | |
| Ni(1-EtBIMZ)Br$_3^-$ | 640(255) | | | | |
| Ni(4-(3-PhPr)Pyr)Br$_3^-$ | 639(225) | | | | |
| Ni(N—Pr-dipicolylamine)Br$_2$ | 435(155) | 717(45) | | | |
| Ni(N-Bu-di(1-MeBIMZ-2-yl-methyl)amine)Br$_2$ | 448(140) | 770(35) | | | |
| Ni(Ph$_3$P)$_2$Br$_2$ | 590(195) | 911(250) | 1139(50) | | |
| Ni(Ph$_3$P)$_2$I$_2$ | 419(4520) | 498(1800) | 561(1730) | 709(345) | 747(410) |
| Ni(TTCTD)$^{2+}$ | 500(370) | | | | |

$\lambda_{max}$ is a wavelength of maximum absorbance in nanometers
ε is the molar absorption coefficient in liters/(mole * cm)

LeL change only a small amount during a temperature induced shift in equilibrium. Small percentage changes in concentration of non-coordinated LeL and HeL during a temperature induced shift in equilibrium corresponds with larger changes in [Me(HeL)$_y$] and [Me(LeL)$_x$] than would be achieved otherwise. Thus when the ratio of HeL to metal ion is large and at the same time there is a large and appropriate concentration of LeL one obtains the highest performance for the system over a given temperature range.

Polymers

In LETC systems, polymers may provide a variety of functions. They may serve as:
- a solvent or cosolvent
- an indifferent matrix for the rest of the system
- the solid phase of a gel
- some or all of the LeL character
- some or all of the HeL character
- a laminating material which may also provide shatter resistance
- TC or non-TC plastic substrates which may serve as window panes
- separator layers
- barrier layers
- sealants
- a combination of the above functions Polymers for TC Layers Sometimes polymer layers are referred to as films below a certain thickness and are referred to as sheets above that thickness. The LETC layers of the present invention may be films or sheets and may be free standing or suspended as a separate layer. Alternatively, the layers may be placed on a substrate or between substrates or be used to laminate substrates together. Remarkably, our LETC reactions take place in solid polymer based systems fast enough that there is essentially no lag time between the temperature change and the change in absorbance, at least on the time scale of 10 to 20 seconds.

Polymers for LETC layers include: poly(vinylalcohol), poly(vinyl butyral), poly(vinylethylene-co-vinylalcohol), poly(vinylacetate), poly(N-vinylpyrrolidone), urethanes, hydroxyalkylcelluloses, hydroxy-substituted acrylates and their copolymers. Other polymer possibilities include: poly(2-vinylpyridine), poly(1-glycerol methacrylate), cellulose carboxymethyl ether salt, cellulose hydroxyethyl ether, poly(2-ethyl-2-oxazoline), poly(hydroxyethyl methacrylate) and its copolymers, poly(vinyl methyl ether), polyacrylamide and poly(N,N-dimethylacrylamide).

One of the polymers, poly(vinyl butyral), (PVB), is made in multiple steps. Generally, polyvinylacetate is hydrolyzed to remove most of the acetyl groups and form polyvinylalcohol. Then most of the alcohol or hydroxyl groups are reacted with butyraldehyde to forms cyclic acetal groups. The PVB formed is thus a copolymer sometimes referred to as: poly(vinylbutyral-co-vinylalcohol-co-vinylacetate). PVB for many LETC systems has a high hydroxyl content and provides substantial LeL character. The cyclic acetal portion of the PVB acts as a good and indifferent solvent for many of the other constituents of the LETC system. Preferred hydroxyl content in this case is 18% or greater of that originally present in the poly(vinyl alcohol). For a few LETC systems where little LeL character is required, as for example with iodide and/or phosphine compounds as HeL's, PVB with lower hydroxyl content is may be used.

PVB is a useful polymer since it is well suited for use in lamination of glass sheets. However, in the presence of water and possible catalysts the acetal groups are subject to hydrolysis which would free butyraldehyde molecules. These molecules could subsequently react with monomeric LeL's which are β-diols. In this case it is preferred that water be removed as much a possible by pre-drying materials to be processed, venting during extrusion and/or drying of the LETC layer prior to subsequent use. Also, it is possible to use "monomeric" LeL's that are diols, triols or polyols that have β-diol functionality wherein one or both of the hydroxy groups is a secondary or a tertiary alcohol which helps prevent this "trans-acetalation" of the cyclic acetal moieties from the PVB to the other LeL's present. This is particularly important when the other LeL is more effective than the PVB at providing LeL character since the trans-acetalation process may decrease the overall amount of LeL character in the system. This is shown in the following undesirable reaction scheme:

Scheme 1

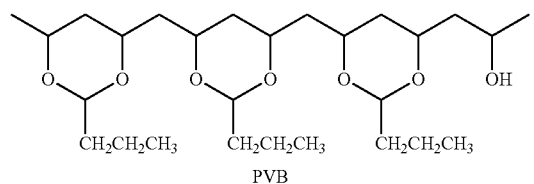

PVB

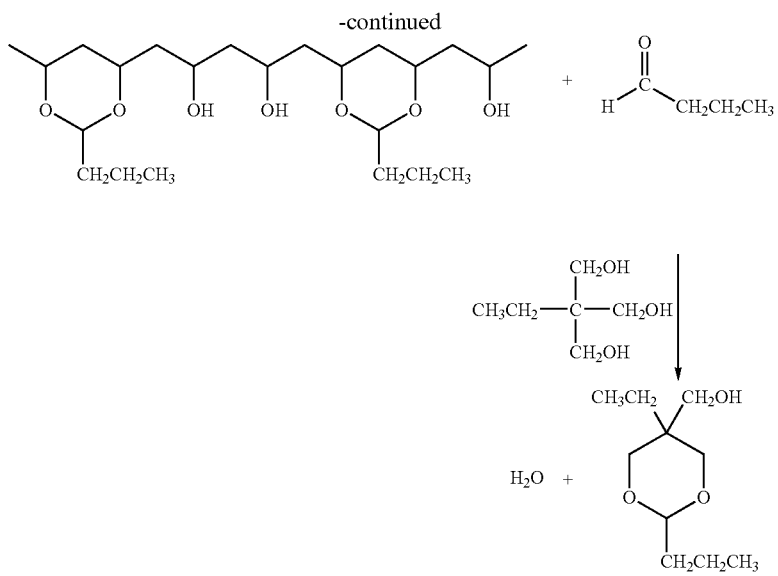

LETC layers, based on PVB as a polymer matrix, may be effectively mixed and extruded in one step using a twin screw extrusion system. This avoids a separate, potential costly or thermally damaging compounding step. The twin screw system allows mixing and dissolution of the LETC material in PVB and the use of a gear pump between the end of the extrusion barrel and a film forming die allows the production of high quality films. The materials may be pre-dried and the extruder may be vented to allow additional water and other gases to be removed from the polymer prior to and during production of LETC layers. The materials that are fed into an extruder may be purged with an inert gas like nitrogen or argon. However, a LETC layer in PVB may be produced without the need for inert atmosphere conditions in the feed process as long as the extruder and die temperatures are kept below 150 C. The use of processing temperatures below 150 C is particularly advantageous in systems where iodide and/or phosphine compounds are used as HeL's to prevent irreversible discoloration in the layer produced. Above this temperature, the performance of the LETC layer produced may be seriously compromised.

Substrates

A substrate may serve as a mechanical support for LETC system or layers when they are not free standing by themselves. However, substrates are not considered part of the LETC system unless the LETC system itself is a free standing plastic sheet. If a LETC system is soft and has little structural integrity, it may simply be coated on a substrate. Alternatively, a pair of substrates, generally each made out of the same material, may be laminated together with a LETC layer which comprises a polymer. Here the substrates provide mechanical support and provide a symmetrical configuration that is not prone to bowing on heating. Bowing is minimized when the thermal expansion coefficients of the substrates are the same or closely matched. The laminate formed by two substrates bonded together with a LETC layer may act a safety or impact resistant window pane. This is especially valuable for bullet resistant and hurricane resistant window panes. In a laminate configuration the substrates may act as barriers to the ingress of oxygen, water and other contaminates over the area of the LETC layer. To provide an overall barrier, the edges of the laminate may be sealed.

Useful substrates include plastics and glass. Useful plastics for use as substrates include acrylic and polycarbonate sheets. Useful glass sheets are float glass or drawn sheets. Useful glass sheets for use as substrates are ones that have been have been cut very cleanly or have edge treated by seaming, grinding, mechanical or flame polishing and/or "pencil" edging so they resist cracking when heated. Also useful are glass sheets which have been heat strengthened, heat tempered or chemically tempered so that they also resist cracking when heated, especially when non-uniformly heated.

An approach has been developed in which a PVB film is bonded on one side of a tempered or heat strengthened sheet of glass and a thin film of plastic film is bonded to the PVB to provide a good optical quality surface. Examples of the thin plastic films are polyester, poly(ester terephthalate), poly (acrylic) or poly(carbonate). The thin plastic film may have an "excited" surface or adhesion promoting coating on the side to be bonded to the PVB. Excited surfaces may be provided by plasma, corona or ozone treatment. The thin plastic film may optionally be coated with a low emissivity or NIR reflective coating on one or both of its surfaces. This structure was prepared with tempered glass and it withstood temperature ranges from −40 C to +100 C without warping, bowing or delaminating. Even a thermo-shock test on going directly from a freezer at −40 C to +100 C did not cause breakage or delamination. The combination of using tempered or heat strengthened glass, PVB with good thermal expansion/contraction characteristics and a thin plastic film with an excited surface has allowed for this advantageous light weight, low cost and highly durable structure.

Plasticizers

LETC systems, contained in polymers, benefit from the presence of plasticizers. The benefits include ease of processing in for example an extrusion process including lower extrusion temperature, lower torque and better mixing. Plasticizers increase ease of product handling as the layers produced with plasticizers are easier to roll-up and process later in, for example, a lamination process or a pre-lamination process.

The plasticizers may be any material known in the art of plastics and polymer processing as a good plasticizer for the particular polymer in which a LETC system is contained, as long as the plasticizer does not seriously degrade the performance or durability of the LETC system. For example, if the polymer is poly(vinyl butyral), conventional plasticizers are found in the art and include diesters of triethylene glycol, of tetraethylene glycol, of adipic acid or of phthalic acid.

Plasticizer character is also provided by materials not conventionally used as plasticizers. Thus, diols and triols, in the amount normally used to provide LeL character, are effective plasicizers. In addition, quaternary ammonium and quaternary phosphonium halides are also surprisingly good at plasticizing LETC polymer layers. These ligand-plasticizers are effective in plasticizing poly(vinyl butyral) so that it is easier to process into a film or sheet by extrusion at lower temperatures and the films or sheets are easier to process further especially when it comes to lamination of the LETC layer between sheets of glass or making a pre-laminate with a separator layer as described below.

Other unconventional plasticizers that not only help provide enhanced processing and desirable physical properties to the LETC layers produced may also provide enhanced solubility for LETC system components. These unconventionally plasticizers include solvents like: acetonitrile, glutaronitrile, 3-methoxypropionitrile, sulfolane, 1,1,3,3-tetramethylurea, dimethylsufoxide, hexamethylphosphoramide, propylene carbonate, γ-butyrolactone, δ-caprolactone and dimethylformamide.

While liquids may be used as plasticizers, we have found that there are times when it is useful to have a plasticizer that is a solid powder at room temperature. This allows the plasticizer to be physically mixed into the polymer resin without causing the mixture to become sticky and difficult to feed from a feed hopper into the feed throat of an extruder. Particularly useful materials that act as plasticizers and are solids at room temperature are the LeL diols and triols which are room temperature solids. Some of these with their melting points are given below.

TABLE 4

| Plasticizer/LeL | m.p. |
|---|---|
| pentaerythritol | 255-259 C. |
| 2-(hydroxymethyl)-2-methylpropane-1,3-diol | 200-203 C. |
| TMOLP | 60-62 C. |
| 2-(hydroxymethyl)-2-propylpropane-1,3-diol | 100-102 C. |
| cis,cis-1,3,5-cyclohexanetriol, dihydrate | 113 C. |
| NPG | 124-130 C. |
| 2,2-dibutyl-1,3-butanediol | 41-43 C. |
| 2,2-diethyl-1,3-butanediol | 59-61 C. |
| 2-butyl-2-ethyl-1,3-propanediol | 41-44 C. |

Stabilizers and Additives and Barriers

Stabilization of LETC systems involves preventing or minimizing degradation due to heat and/or light induced reactions of materials within the system or reactions with materials which come from the environment. Of course the best approach to stability is to find materials that are inherently high in stability and we have discovered numerous LETC systems with good to excellent inherent stability including certain systems involving Ni(II) coordinate by iodide and Ni(II) coordinated by iodide in combination with other ligands. Somewhat less desirable than good inherent stability is to provide barriers and seals against the ingress of things that contribute to degradation, especially oxygen, water and ultraviolet light. This approach is discussed below with regard to barriers and in the section on seals. Even less desirable, yet still an important approach, is to provide additives which help deal with degradation processes via competitive light absorption, tying up degradation products or inhibiting further degradation.

LETC systems described herein exhibit excellent inherent stability. Many of these systems have been exposed to temperatures of 80 C for more than 10,000 hours with little or no degradation. Also, thermal stabilizers have been found which are compatible with the LETC systems and provide enhanced thermal stability. These include antioxidants and free radical inhibitors such as the hindered phenols. Some useful thermal stabilizers include 2,6-di-tertbutyl-4-methylphenol, (BHT), Irganox® 245, Irganox® 1010, Irganox® 1035, Irganox® 1076 and Irganox® 5057. The Irganox® materials are available from Ciba Specialty Chemicals Corporation of Tarrytown, N.Y.

Photodegradation, especially from short wavelength light, (like UV and short wavelength visible light), is an issue for many chromogenic systems including at least some LETC systems. Short wavelength light may be blocked by an absorbing barrier placed between a vulnerable layer and a source of UV and short wavelength visible light like the sun. Multiple layers of LETC systems are used in some cases to achieve broad spectral coverage and a particular color appearance, especially a gray appearance. A highly advantageous configuration for the multilayer LETC systems is described below. This involves placing UV absorbing materials in a layer which itself is less vulnerable to photodegradation. This layer is then placed between a source of short wavelength light and layers which are more vulnerable to photodegradation. Other advantageous configurations involve a short wavelength light absorbing barrier being provided by a substrate layer or even by a separator layer placed between the light source and the more vulnerable layers. The advantages of these configurations should not be underestimated, especially when one considers the difficulty in providing effective light absorbing barriers for most chromogenic systems.

Short wavelength absorbing additives, sometime called "UV absorbers", may be divided into two groups. The first group includes materials which simply absorb short wavelength light. Materials of this group are ethyl-2-cyano-3,3-diphenylacrylate and (2-ethylhexyl)-3,3-diphenylacrylate available from BASF Corporation of Rensselaer, N.Y. as Uvinul 3035 and Uvinul 3039 respectively. The second group involves absorbers of short wavelength light which also function as stabilizers against the propagation of degradation initiated by light exposure. Materials of this group are hydroxybenzophenones, hydroxyphenylbenzotriazoles and hydroxyphenyltriazines. Examples of these materials sold under the trade names: Tinuvin® P, Tinuvin® 213, Tinuvin® 234, Tinuvin® 326, Tinuvin® 327, Tinuvin® 328, Tinuvin® 400, Tinuvin® 405 and Tinuvin® 479. These materials are available from Ciba Specialty Chemicals Corporation of Tarrytown, N.Y. Also useful are nickel salt stabilizers like dialkyldithiocarbamates which are good UV absorbers even though they are bit yellow in polymer films.

Also useful are nickel salt stabilizers like bis(dialkyldithiocarbamates)Ni(II) which are good UV absorbers even though they are bit yellow in polymer films. While these materials were generally considered to only be good absorbers, there is some literature to support the possibility that these material may also participate in stabilization by chemical means.

These short wavelength absorbing additives, not only promote stability as part of LETC system or layer, they can be added to a polymer like PVB and extruded in a film with excellent UV barrier properties. Barrier films with a cutoff of about 390 nm have been prepared with 0.5 weight % Tinuvin® 326 in an approximately 500 micron thick layer of Butvar® B-90 which was plasticized with tri(ethylene glycol) bis(2-ethylhexanoate). A cutoff of about 400 nm is obtained under similar conditions with 1 weight % Tinuvin® 326 in a similar film.

Any of the UV absorbing materials disclosed herein may be used as short wavelength absorbers in barrier layers, LETC layers, plastic substrates and separator layers. However, some of the second group UV stabilizer/absorber materials are somewhat effective at complexing to metal ions and these complexes are not always stable with time. Therefore when materials from the second group are added directly to LETC systems or layers it is useful to choose the materials which are sterically hindered against strong complex formation or are inherently poor complexing agents. The more useful materials from group two in this case are Tinuvin® 213 Tinuvin® 234 Tinuvin® 326, Tinuvin® 327, Tinuvin® 328, Tinuvin® 400, Tinuvin® 405 and Tinuvin® 479.

Figure 42:
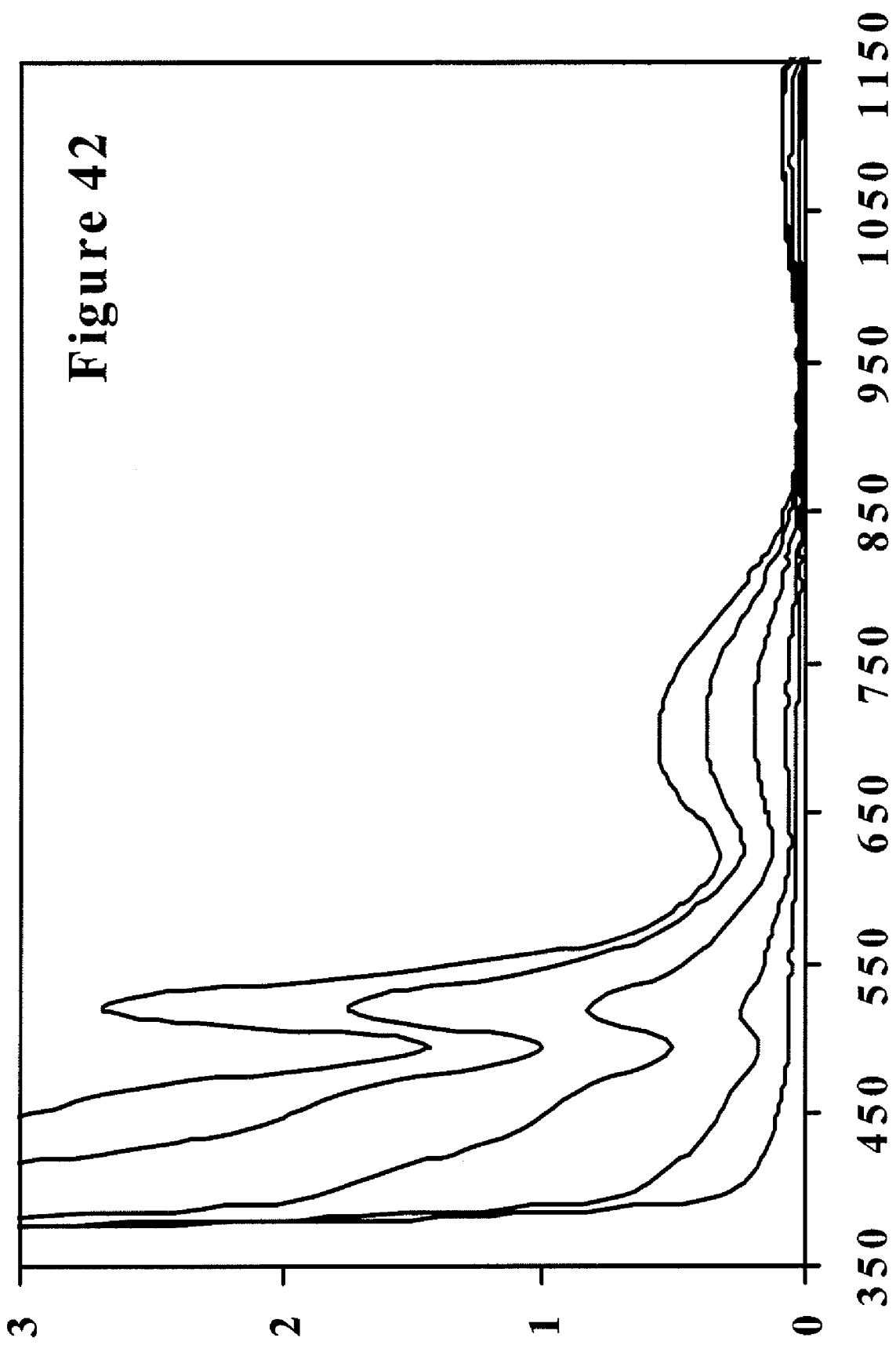
Figure 43:
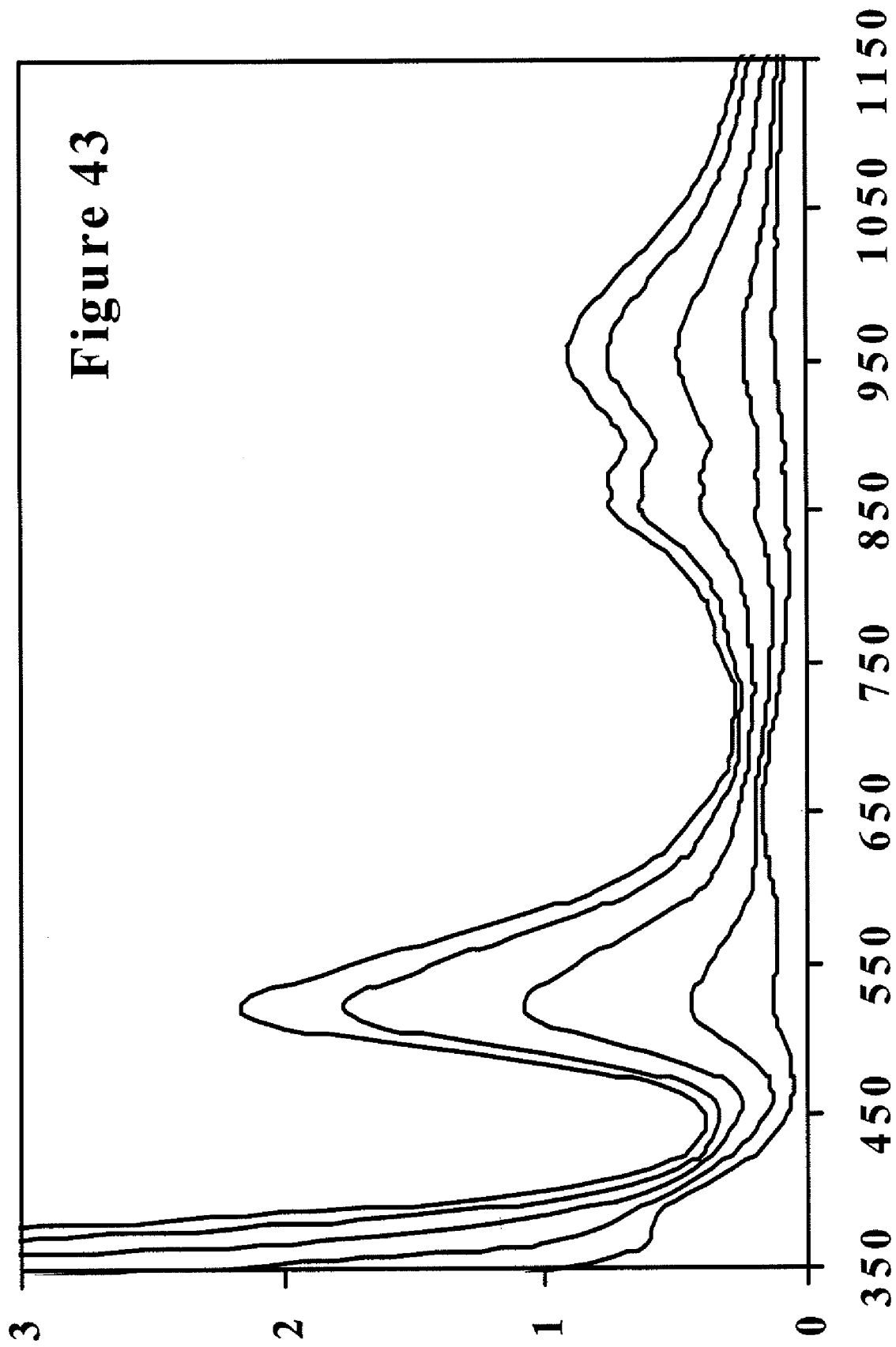

FIG. 42 is a good illustration of the addition of UV absorber/stabilizers directly to a LETC system. Here the Tinuvin® 405 does not appear to interfere by coordinating the Ni(II) ions. Also, FIG. 42 shows that the absorbance of the system is very high at wavelength shorter than about 380 nm. This system is thus a great barrier for any system that might be behind this system when it is exposed to sunlight.

Also effective in helping stabilize LETC systems and short wavelength absorbing barriers are light stabilizers that themselves are not very effective at absorbing short wavelength light. Preferred materials of this type are hindered amine light stabilizers, (HALS). Useful HALS include Tinuvin® 144, Tinuvin® 765 and Tinuvin® 770 available from Ciba Specialty Chemicals Corporation of Tarrytown, N.Y.

Figure 54:
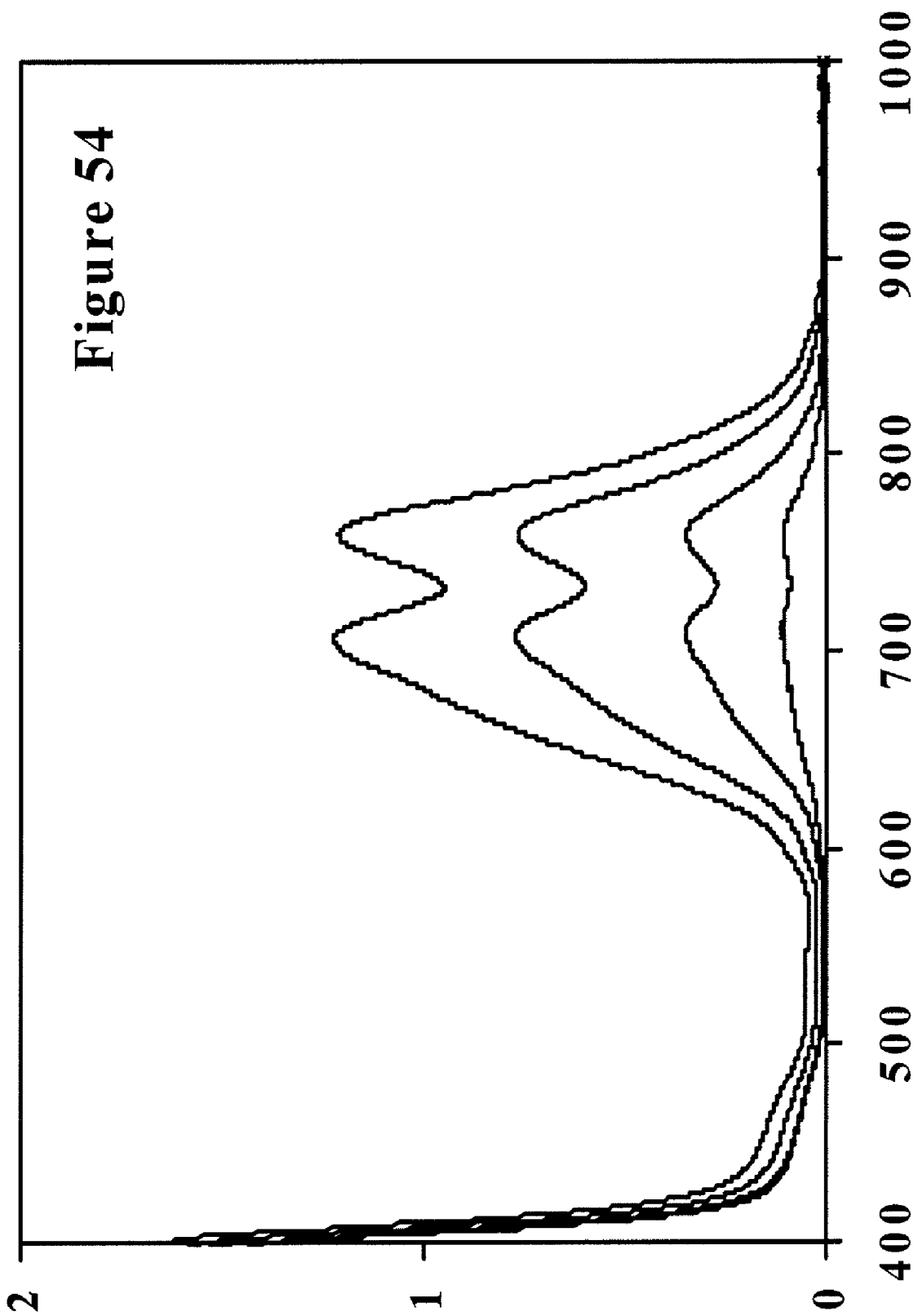
Figure 55:
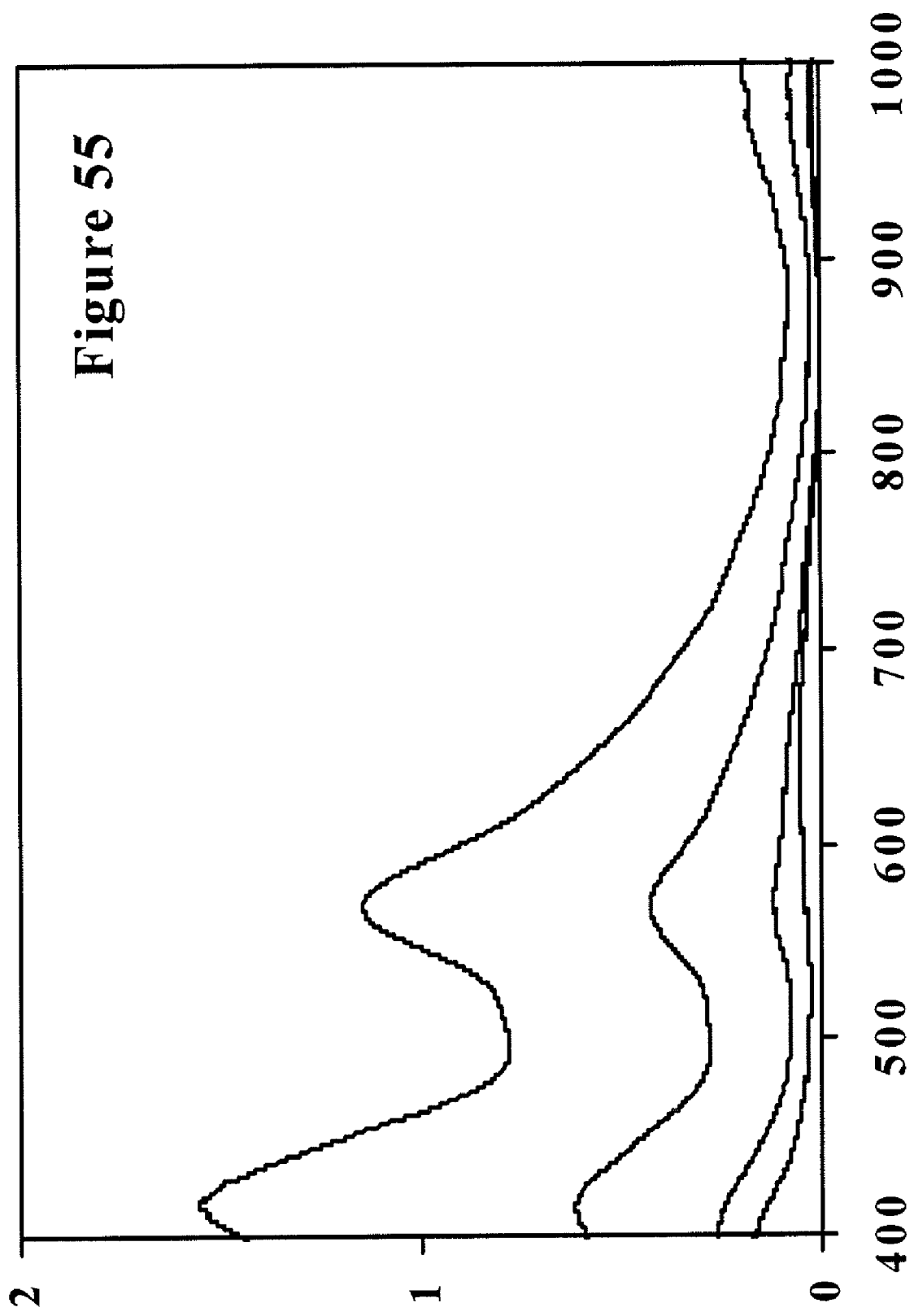
Figure 56:
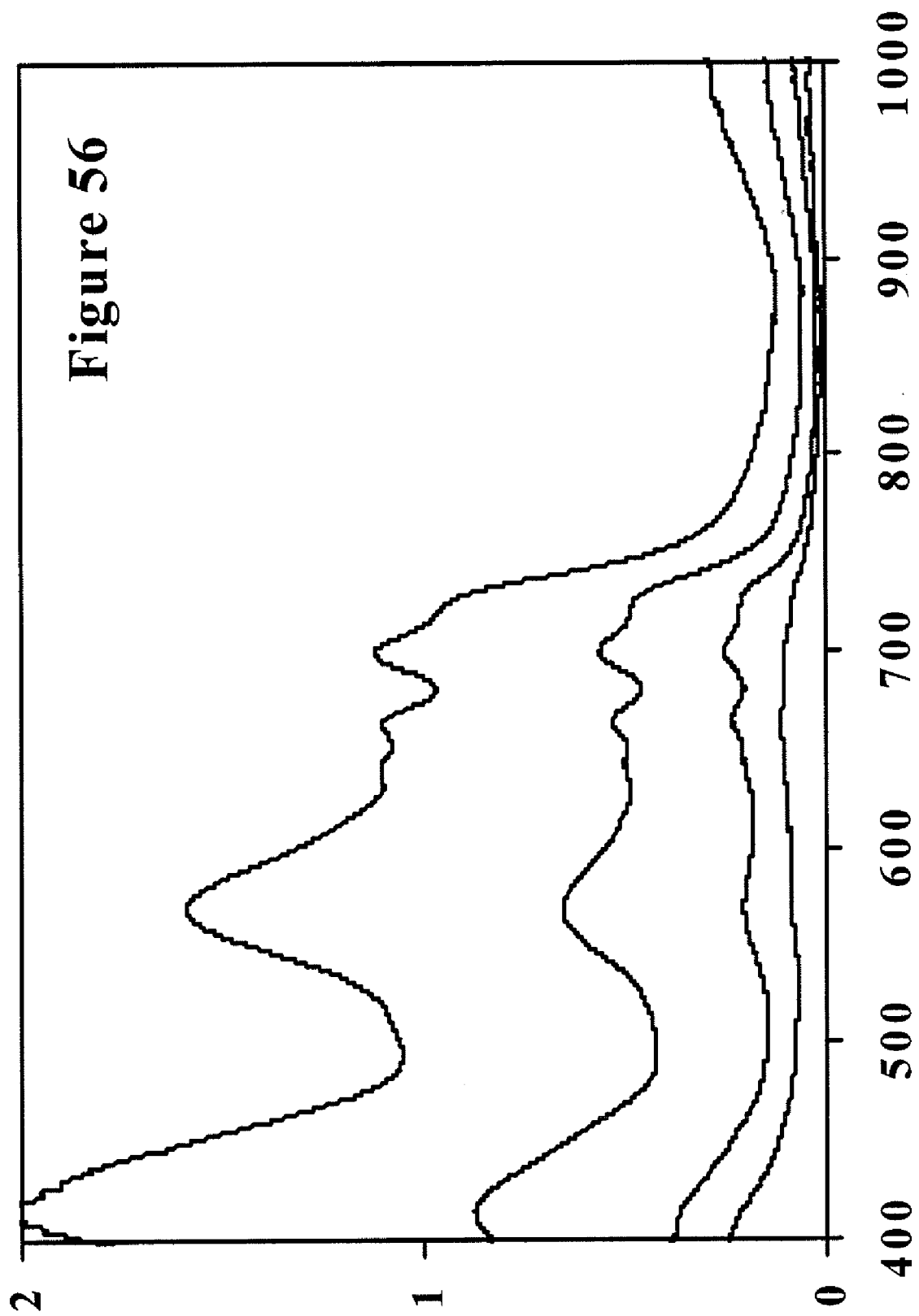
Figure 57:
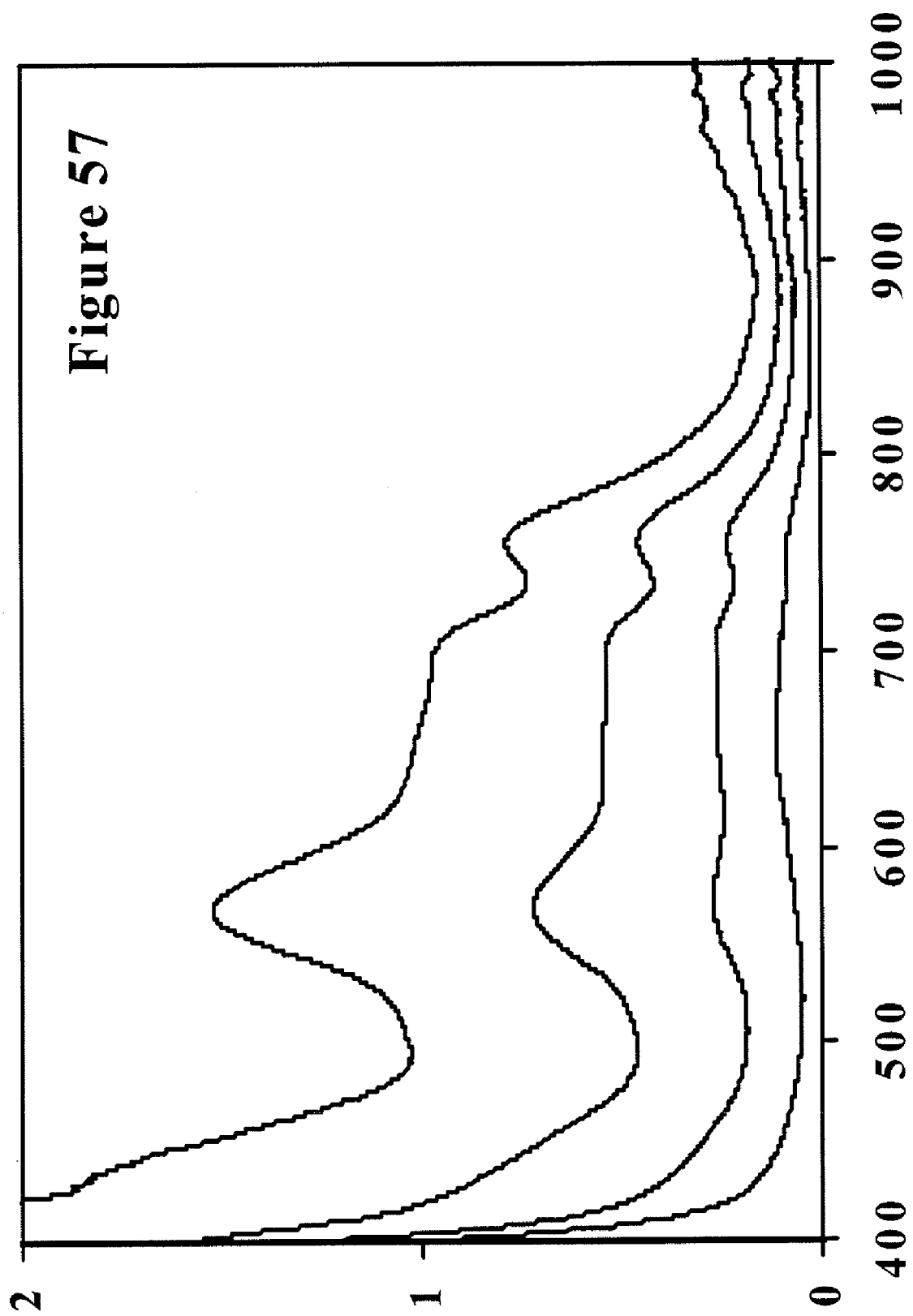
Figure 58:
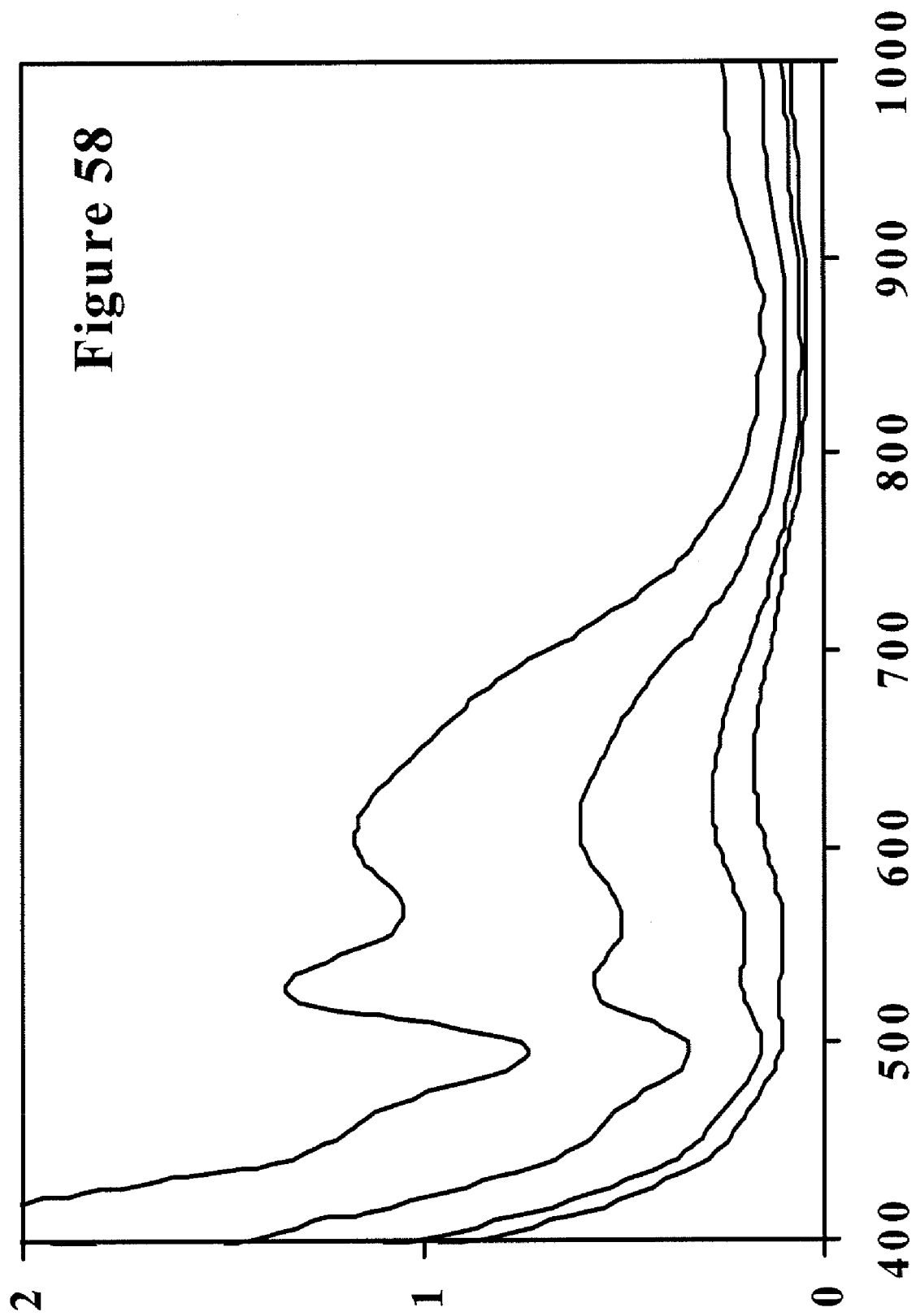
FIG. 58 is the spectral data for Example 294.

The present application also discloses the use of the inherent or the thermally induced short wavelength absorbing ability of LETC systems like those involving nickel ions and bromide ions. As seen in FIGS. 1 and 54, LETC systems like these provide outstanding absorption of short wavelength light especially at higher temperatures. These LETC systems or layers may be used to protect layers that are more vulnerable to combined thermal and photodegradation. Also some of these layers with Ni(II) and bromide are inherently photostable on their own so they are better suited to being exposed to sunlight and acting as barriers in front of many other more UV sensitive LETC systems.

UV barriers were found to be effective in extending the useful life of LETC systems. In particular, when a thermochromic like that of FIG. 52 was laminated between pieces of plain glass, the laminate had less than 2% haze as measured based on the amount of scattering of transmitted light. After 500 hours of exposure to 0.55 watts per square meter at 340 nm from a xenon arc lamp in a chamber with a black panel temperature of greater than 80 C, a gray hazy precipitate formed gave the laminate a haze level over 10%. A laminate was prepared with three polymer layers between two sheets of plain glass. The polymer layers were: 1) a UV barrier layer containing Tinuvin® 326 in PVB that cutoff wavelengths of light less than 390 nm; 2) a poly(ester-terephthalate) separator; and 3) a layer of the same type of thermochromic system as above. After this laminate was exposed with the UV barrier facing the xenon arc lamp, almost no gray hazy precipitate formed in the TC layer, the haze level was less than 5% and the overall TC performance remained nearly unchanged.

Separators and Pre-Lamination

Separator layers may be desirable in multilayer thermochromic systems to prevent intermixing of the thermochromic materials. It is particularly useful for the separator layer to have an index of refraction close to that of the polymers used in the thermochromic layer so that reflective losses will be minimized. For example, poly(vinyl butyral) is an often used polymer for a LETC layer and it is reported to have an index of refraction from 1.485 to 1.490. When the LETC layer is contained in a layer of poly(vinyl butyral), plastic materials with good index of refraction match that may be used as chemical separators or diffusion barrier layers between LETC layers may be selected from the following Table:

TABLE 5

| Polymer | Refractive Index |
| --- | --- |
| Poly(4-methyl-1-pentene) | 1.463 |
| Poly(vinyl propionate) | 1.466 |
| Poly(vinyl acetate) | 1.467 |
| Poly(vinyl methyl ether) | 1.467 |
| Poly(ethylene succinate) | 1.474 |
| Cellulose acetate butyrate | 1.475 |
| Cellulose acetate | 1.475 |
| Ethylene/vinyl acetate copolymer-40% vinyl acetate | 1.476 |
| Ethyl cellulose | 1.479 |
| Poly(methyl acrylate) | 1.479 |
| Poly(oxymethylene) | 1.480 |
| Ethylene/vinyl acetate copolymer-33% vinyl acetate | 1.482 |
| Poly(n-butyl methacrylate) | 1.483 |
| Ethylene/vinyl acetate copolymer-28% vinyl acetate | 1.485 |
| Poly(methyl methacrylate) | 1.489 |
| Polypropylene, isotactic | 1.490 |
| Methyl cellulose | 1.497 |
| Poly(vinyl alcohol) | 1.500 |
| Poly(vinyl methyl ketone) | 1.500 |
| Poly(ethylene glycol dimethacrylate) | 1.506 |
| Poly(isobutylene) | 1.510 |
| Polyethylene, low density | 1.510 |

Other, useful separators include polycarbonates, poly(ester terephthalates) and other polyesters, especially those polycarbonates and polyesters that are hydrophobic or poor at solubilizing salts. In addition, crosslinked or highly crystalline materials may be used as separators or diffusion barriers. For example poly(vinyl alcohol) is reasonably hydrophilic but in the absence of water it is a good barrier because of a high degree of order due to strong hydrogen bonding. Crosslinking in a separator in general may also be effective in the prevention of diffusion or migration of non-ionic ligands like pyridines, imidazoles and phosphines. Alternatively, non-ionic ligands may be attached to a polymer in the LETC layer or may be modified with the attachment of polar or ionic substituents so they are less likely to diffuse through a separator. For example 1-hydroxyethybenzimidazole and a benzimidazole substituted with a quaternary ammonium group are less likely to diffuse through a hydrophobic, polymeric, separator layer than an alkyl substituted benzimidazole like 1-EtBIMZ.

An alternative type of separator may be provided by a thermoset type of adhesive that is used to bond multiple LETC layers together. The adhesive forming system may contain reactive groups which optionally form bonds directly to a polymer in the LETC layer. For example the adhesive may contain isocyanate groups which are part of a polyurethane adhesive which covalently bond also to hydroxyl groups of a hydroxyl group containing polymer on the surface of a LETC layer and make the surface of the layer less permeable in the process. Other adhesive systems include epoxies, silicones and acrylates. When multi-layer thermochromic systems are used or when a separate UV barrier layer is used to protect a thermochromic layer, it may be desirable to prepare a pre-laminate. This pre-laminate may be prepared by an in-line process by co-extruding the thermochromic layer(s), optional barrier layer and the separator layer(s) at the same time, and the layers may be bonded together while the polymer layers are still hot from the extruder dies. Alternatively, the layers may be extruded together in a multi-manifold die to produce a barriers, TC layers and separator in an intimately bonded stack.

A pre-laminate may also be prepared in an off-line process in which a barrier layer is bonded to one or more thermochromic layers with one or more separator layers. Alternatively, two or more thermochromic layers may be pre-laminated together with one or more separator layers in an off line process. In the off line process, an advantage has been realized with the use of separator layers that have one or both of their surfaces pretreated, activated or excited to promote adhesion between the separator layer and the UV barrier and/or thermochromic layers. The pre-laminates made with pretreated, activated or excited surfaces on the separator layer are easier to use in subsequent lamination between sheets of glass or plastic since the layers stay together and behave essentially as a single layer. Pretreating, activating or exciting the surface dramatically decreases issues with de-lamination during years of use of LETC window panes. The separator surfaces may be pretreated, activated or excited by glow discharge, plasma or corona treatment process in vacuum, inert atmosphere or in air. Alternately, pretreatment with ozone may be provided in an oxygen atmosphere.

Although, a separator or diffusion barrier layer is primarily used to prevent intermixing of the materials from individual thermochromic layers when there are multiple thermochromic layers present, they may also act as barriers to UV light. This allows the separator to protect underlying layers from UV exposure. Also, UV absorbing materials, like those described in the additives section of this patent, may be more compatible with the separator layer than a layer containing a LETC system. This is especially true given that some UV absorbers/stabilizers like hydroxyphenylbenzotriazoles may have undesirable interactions with transition metal ions.

Also, the separator may contribute to the structural integrity and shatter resistance of the window. In this case the separator function may be provided by a relatively thick film or sheet of plastic. With multiple thermochromic layers and one or more, thick separator layers the overall window laminate may even become hurricane, explosion, theft, vandalism and/or bullet resistant.

Seals

Seals are of interest especially for LETC layers which are sensitive to oxygen, water and/or environmental contaminants. For example, systems involving iodide, systems involving phosphine compounds and systems involving both iodide and phosphine compounds benefit from seals that minimize the ingress of oxygen in the layers containing these systems. An edge seal may be provided when the LETC layer is laminated between sheets of glass or sheets of plastic. The edge seal should cover the edge of the laminate around the entire perimeter to provide a barrier for ingress of materials into the LETC layer. The edge seal may be a thermoplastic, a thermoset, a rubber, a metallized tape or combinations thereof. Useful thermoset seal materials are urethanes and epoxies. Suitable seals are epoxy systems disclosed for use as perimeter seals in U.S. Pat. No. 6,665,107, the contents of which are hereby incorporated by reference. Useful thermoplastic seal materials are good barrier polymers like poly (vinyl alcohol), poly(vinylidene chloride), (polyvinylidene fluoride), EVOH, and certain rubbers. Thermoplastic or thermoset systems overlayed with an impermeable metal foil or tape are useful edge seal systems especially when the LETC systems contain ligands like iodide or phosphine compounds they are or are not used as ligands.

Color and Color Coordinates

See "Principles of Color Technology, $2^{nd}$ Edition", F. W. Billmeyer Jr. and M. Saltzman, John Wiley and Sons, Inc. (1981) for a discussion of color and color coordinates including definitions of Y, L*, a*, b* and c*. The variation of c* with temperature is herein referred to as the color sweep or shift of the LETC system. Generally, it is useful to have small variations in c* i.e. small color sweep or shifts with temperature. Many useful systems or combinations of systems have both small c* values and small amount of color sweep as discussed below.

For the use of LETC systems in applications like energy saving windows, especially, SRT™ Windows, there is a demand for certain colors. While fixed tint windows which are gray, green, blue and bronze are in widespread use, the most desirable color, (or lack thereof), for variable tint windows is gray. This is especially true when the window is or is able to become heavily tinted as the view through a heavily tinted gray window maintains the same color rendition for objects viewed through the window as is maintained with a lightly tinted or nearly colorless window. Also it is highly desirable for the daylighting that comes in through the window to be color neutral so that people and objects illuminated by that light have a normal appearance. Disclosed herein are interesting systems with a green, blue or bronze appearance when lightly tinted which change to gray when heavily tinted. These systems and those that are close to gray at all tint levels are particularly useful.

LETC systems with absorbance peaks throughout the visible and/or NIR are disclosed herein. However, just a few special, single composition systems that are reasonably gray have been found. A few more combinations of two compositions or layers of LETC materials have been discovered that provide good gray appearance throughout the entire temperature range of intended use. Many more combinations involving three compositions or layers have been discovered that provide good gray appearance. Gray systems are illustrated in the Examples Section of this disclosure.

Useful LETC systems are those that not only maintain a consistent gray appearance throughout a large temperature range; they also have a large change in visible light and/or total solar absorption. Single layer LETC systems are disclosed herein, which have a c* of less than 25 throughout the temperature range of 25 C to 85 C and still have a change in Y from greater than 70 at 25 C to less than 15 at 85 C. Some of the two layer LETC systems have a c* of less than 21 throughout the temperature range of 25 to 85 C and still have a change in Y from greater than 75 at 25 C to less than 15 at 85 C. Some of the three layer LETC systems have a c* of less than 15 and still have a change in Y from greater than 80 at 25 C to less than 15 at 85 C. These systems have minimal color shift over the active range of these novel TC systems.

Some of the multilayer systems have the added advantage that they also provide reversibly variable transmission in the NIR as well as the visible. However, the more compositions required the more complicated and expensive the product becomes. Thus the systems that provide broad spectral attenuation and gray appearance with one or at most two layers are special.

Applications

A preferable use for our LETC layers is as part of an SRT™ window package. Many configurations are possible for such windows. A few configurations are:

1) A LETC layer that is laminated between sheets of tempered or heat strengthened glass, wherein this laminate serves as the center pane of a triple pane window. Preferably, in this configuration, there is one or more than one low-e coating between the LETC layer and the interior of the vehicle or building in which the window is installed.
2) A LETC system is contained in a free standing plastic sheet or is contained in a polymer layer which is laminated between two plastic sheets and is used as the center pane of a triple pane window. The interior pane of the triple pane window preferably has a low-e coating on the surface facing the LETC system.
3) A LETC layer is laminated between sheets of edge treated glass and is used as the exterior pane of a double pane window. Either one or both of the glass surfaces in contact with the gas space of the double pane has a low-e coating.
4) A LETC layer is bonded to a sheet of tempered or heat strengthened glass and a layer of plastic film is bonded to the LETC layer. This pane is used as the exterior pane of a double pane window with the plastic film in contact with the gas space or this pane is used as the center pane of a triple pane window. A pane with a low-e layer is used as the interior pane in either case and the low-e layer is oriented to face the pane with the LETC layer.
5) A LETC layer is laminated between a sheet of NIR absorbing glass and the uncoated side of a sheet of glass coated with a low emissivity coating, which coating has substantial NIR absorption character. This laminate is used as the exterior pane of a double pane window with the low emissivity coating in contact with the gas space of the double pane window.
6) A LETC layer that is laminated between a first sheet of tempered or heat strengthened glass and the uncoated side of a second sheet of tempered or heat strengthened glass coated with a hard coat low emissivity coating. This laminate is used as the interior pane of a double pane window, wherein the hard coat low emissivity coating is in contact with the interior of the vehicle or building in which the window is installed.

Many more examples are given in our co-pending application on window structures.

SRT™ windows may be used in a variety of applications such as variable light absorption windows for residential and commercial buildings including skylights and atrium glazing and variable light absorption windows for boats, ships, aircraft and motor vehicles including moon roofs and sun roofs. The windows may include artful designs of different colored LETC systems like a variable light transmission stained glass window.

When a triple pane window is constructed with the LETC system as part of the center pane, there are two interfaces in contact with a gas for each pane, giving a total of six interfaces. The reflection from each of these interfaces will add up and may become objectionable. Thus we have discovered an advantage to placing anti-reflection coating on one or more surfaces in the window package.

LETC systems may be used to prepare variable reflectance mirrors by placing LETC layer on a reflector or on a substrate coated with a reflector. The LETC layer may be protected by laminating the layer between a transparent substrate and a reflector coated substrate. The reflector may be used as a resistive heater to heat the LETC layer and thus vary the reflectance of the mirrors.

LETC systems may be used as a means to monitor the temperature in various environments as long as the transmission change of the system can be measured or observed. Temperature determination may range from visual comparisons to full spectral measurements. This is a particularly useful means of monitoring temperature at the tip of a fiber optic cable that may be used for, among other things, as a catheter for insertion into a body.

An SRT™ window may be used to monitor the intensity and directness of sunlight, as both the transmission and the temperature of the thermochromic layer change with sunlight intensity in a reproducible manner.

LETC systems may be used to display information in devices where certain regions are heated or the active LETC layer is patterned in a manner such that individual segments may be heated. Heating may be provided by resistive heating or by selective light exposure by a light source such as a laser or other source providing a focused light beam or localized heating.

While our best understanding of these TC processes involves changes in concentrations of MLC's, we have discovered and herein describe many thermochromic systems that have a reversible, net increase in their abilities to absorb light energy in the visible and/or NIR range as the temperature of the system is increased, no matter what the explanation.

EXAMPLES

Table 6 gives the formulations of liquid solution LETC systems for Examples 1-46. In each case, the solution was prepared by dissolving the materials in 5 milliliters of γ-BL. In each example, some of the solution was placed in a 1 cm borosilicate cuvette, a small stir bar was placed in the cuvette and the cuvette was placed in the sample beam of a Shimadzu UV-3101PC spectrophotometer. The solution was stirred and heated and the temperature was monitored with a thermocouple immersed in the solution in the cuvette. A similar, unheated 1 cm cuvette containing only the solvent was placed in the reference beam of the spectrophotometer. In each example the absorption spectrum of the solution was measured from 350 nm to 1150 nm at 25 C and then the solution was heated to 45 C and the spectrum was measured. Then the solution was heated to 65 C and the spectrum was measured and so on at 85 C and 105 C. FIGS. 1-46 correspond, numerically, to Examples 1-46. The Figures show the spectrum measured at 25 C, at 45 C, at 65 C, at 85 C and at 105 C for the solutions described in these Examples. In each case the spectrum with the lowest absorbance corresponds to 25 C, the next highest absorbance spectrum corresponds to 45 C and so on such that the spectrum with highest absorbance peaks in each Figure corresponds that measured at 105 C. In all the FIGS. 1-46, the x axis, (horizontal axis), gives the wavelengths in nanometers and the y axis, (vertical axis), gives the absorbance values. For the examples in Table 6, the molarity values were calculated based on an assumed 5 ml total solution volume. Volume changes due to components dissolved in the 5 ml of γ-BL were not considered.

TABLE 6

| Type | Materials in LETC System | Conc. (molarity) |
|---|---|---|
| *Example 1 - FIG. 1* | | |
| HeL | TBABr | 0.21 |
| LeL | TMOLP | 0.19 |
| Metal | Ni(ClO$_4$)$_2$—6H$_2$O | 0.02 |
| *Example 2 - FIG. 2* | | |
| HeL | TEACl—H$_2$O | 0.2 |
| LeL | TMOLP | 0.51 |
| Metal | Ni(ClO$_4$)$_2$—6H$_2$O | 0.02 |
| *Example 3 - FIG. 3* | | |
| HeL | TBAI | 0.2 |
| LeL | TMOLP | 0.022 |
| Metal | Co(BF$_4$)$_2$—6H$_2$O | 0.002 |
| Metal | Ni(ClO$_4$)$_2$—6H$_2$O | 0.002 |
| *Example 4 - FIG. 4* | | |
| HeL | TBAI | 0.15 |
| HeL | CF$_3$COOLi | 0.35 |
| LeL | TMOLP | 0.16 |
| Metal | Co(BF$_4$)$_2$—6H$_2$O | 0.01 |
| *Example 5 - FIG. 5* | | |
| HeL | TBABr | 0.12 |
| HeL | 2,2'-ethane-1,2-diyldipyridine | 0.04 |
| LeL | NPG | 2.05 |
| Metal | Ni(ClO$_4$)$_2$—6H$_2$O | 0.04 |
| *Example 6 - FIG. 6* | | |
| HeL | LiBr | 0.05 |
| HeL | Ph$_3$P | 0.2 |
| LeL | TMOLP | 1.27 |
| Metal | Co(BF$_4$)$_2$—6H$_2$O | 0.01 |
| *Example 7 - FIG. 7* | | |
| HeL | TEACl—H$_2$O | 0.16 |
| HeL | Ph$_3$P | 0.2 |
| LeL | EG | 1.9 |
| Metal | Ni(NO$_3$)$_2$—6H$_2$O | 0.02 |
| *Example 8 - FIG. 8* | | |
| HeL | TBABr | 0.06 |
| HeL | N-Bu-di(1-MeBIMZ-2-yl-methyl)amine | 0.02 |
| LeL | TMOLP | 0.095 |
| Metal | Ni(ClO$_4$)$_2$—6H$_2$O | 0.02 |
| *Example 9 - FIG. 9* | | |
| HeL | TBAI | 0.02 |
| HeL | Ph$_3$P | 0.1 |
| LeL | TMOLP | 0.35 |
| Metal | Co(BF$_4$)$_2$—6H$_2$O | 0.002 |
| *Example 10 - FIG. 10* | | |
| EXM | ZnCl$_2$ | 0.3 |
| HeL | TEACl—H$_2$O | 0.2 |
| LeL | Glycerol | 0.013 |
| Metal | Cu(NO$_3$)$_2$—2.5H$_2$O | 0.0025 |
| Metal | Co(BF$_4$)$_2$—6H$_2$O | 0.012 |
| *Example 11 - FIG. 11* | | |
| EXM | ZnCl$_2$ | 0.32 |
| HeL | TEACl—H2O (TEACl) | 0.09 |
| Metal | Cu(NO$_3$)$_2$—2.5H$_2$O | 0.01 |
| *Example 12 - FIG. 12* | | |
| HeL | TTCTD | 0.02 |
| LeL | 2-methyl-1,3-propanediol | 0.38 |
| Metal | Ni(ClO$_4$)$_2$—6H2O | 0.01 |
| *Example 13 - FIG. 13* | | |
| HeL | TBABr | 0.1 |
| HeL | 2,2'-propane-2,2-diylbis(1-propyl-1H-benzimazole) | 0.04 |
| LeL | TMOLP | 0.18 |
| Metal | Ni(ClO$_4$)$_2$—6H$_2$O | 0.02 |
| *Example 14 - FIG. 14* | | |
| HeL | LiBr | 0.2 |
| LeL | NPG | 0.86 |
| Metal | Ni(NO$_3$)$_2$—6H$_2$O | 0.021 |
| *Example 15 - FIG. 15* | | |
| HeL | Ph$_3$P | 0.3 |
| LeL | NPG | 1.23 |
| Complex | NiBr$_2$(Ph$_3$P)$_2$ | 0.01 |
| *Example 16 - FIG. 16* | | |
| HeL | Ph$_3$P | 0.044 |
| HeL | LiBr | 0.16 |
| LeL | EG | 1.3 |
| Metal | Ni(NO$_3$)$_2$—6H$_2$O | 0.02 |
| *Example 17 - FIG. 17* | | |
| HeL | N-propyl-N-pyridin-2-ylpyridin-2-amine | 0.015 |
| HeL | LiBr | 0.2 |
| HeL | 4-tert-butylpyridine | 0.01 |
| LeL | TMOLP | 0.29 |
| Metal | Ni(ClO$_4$)$_2$—6H$_2$O | 0.02 |
| *Example 18 - FIG. 18* | | |
| HeL | LiBr | 0.2 |
| HeL | N-propyl-N-pyridin-2-ylpyridin-2-amine | 0.025 |
| LeL | TMOLP | 0.15 |
| Metal | Ni(ClO$_4$)$_2$—6H$_2$O | 0.04 |
| *Example 19 - FIG. 19* | | |
| HeL | TBABr | 0.04 |
| LeL | NPG | 1.33 |
| Complex | NiBr$_2$[2,2'-propane-2,2-diylbis(1-pentyl-1H-benzimidazole)]$_2$ | 0.04 |
| Solvent | γ-GB | |
| *Example 20 - FIG. 20* | | |
| HeL | TBA(4-MeOPh)$_2$PO$_2$ | 0.05 |
| LeL | TMOLP | 1.51 |
| LeL | Di-TMOLP | 0.17 |
| Metal | Co(BF$_4$)$_2$—6H$_2$O | 0.01 |
| *Example 21 - FIG. 21* | | |
| HeL | TBABr | 0.015 |
| HeL | 2-mercapto-5-methylbenzimidazole | 0.005 |
| LeL | TMOLP | 0.031 |
| Metal | Ni(ClO$_4$)$_2$—6H$_2$O | 0.005 |
| *Example 22 - FIG. 22* | | |
| HeL | poly(2-vinylpyridine) | 0.12 |
| HeL | LiBr | 0.2 |
| LeL | EG | 0.95 |
| Metal | Ni(NO$_3$)$_2$—6H$_2$O | 0.02 |
| *Example 23 - FIG. 23* | | |
| HeL | TBABr | 0.08 |
| HeL | 2-mercapto-1-methylimidazole | 0.1 |
| LeL | TMOLP | 0.31 |
| Metal | Ni(ClO$_4$)$_2$—6H$_2$O | 0.02 |
| *Example 24 - FIG. 24* | | |
| HeL | TBABr | 0.08 |
| LeL | TMOLP | 0.95 |
| Metal | Co(BF$_4$)$_2$—6H$_2$O | 0.005 |
| *Example 25 - FIG. 25* | | |
| HeL | choline chloride | 0.1 |
| LeL | TMOLP | 2.34 |
| Metal | Co(BF$_4$)$_2$—6H$_2$O | 0.01 |
| *Example 26 - FIG. 26* | | |
| HeL | TBABr | 0.06 |
| HeL | 1-Et-BIMZ | 0.0602 |
| LeL | NPG | 1.54 |
| Metal | Ni(ClO$_4$)$_2$—6H$_2$O | 0.02 |

TABLE 6-continued

| Type | Materials in LETC System | Conc. (molarity) |
|---|---|---|
| *Example 27 - FIG. 27* | | |
| HeL | TBAI | 0.04 |
| LeL | TMOLP | 0.07 |
| Complex | $NiI_2(Ph_3P)_2$ | 0.005 |
| *Example 28 - FIG. 28* | | |
| HeL | TBABr | 0.08 |
| HeL | 2,2'-propane-2,2-diyl(1H-benzothiazole) | 0.04 |
| LeL | TMOLP | 0.064 |
| Metal | $Ni(ClO_4)_2—6H_2O$ | 0.02 |
| *Example 29 - FIG. 29* | | |
| HeL | 6-methyl-2,2'-dipyridyl | 0.02 |
| HeL | LiBr | 0.16 |
| LeL | TMOLP | 0.23 |
| Metal | $Ni(ClO_4)_2—6H_2O$ | 0.02 |
| *Example 30 - FIG. 30* | | |
| HeL | 6,6'-dimethyl-2,2'-dipyridyl | 0.02 |
| HeL | LiBr | 0.2 |
| LeL | TMOLP | 1.21 |
| Metal | $Ni(ClO_4)_2—6H_2O$ | 0.02 |
| *Example 31 - FIG. 31* | | |
| HeL | TBAI | 0.2 |
| HeL | LiBr | 0.04 |
| LeL | EG | 0.3 |
| Metal | $Ni(NO_3)_2—6H_2O$ | 0.02 |
| R/O | Oxford Blue | 0.0037 |
| *Example 32 - FIG. 32* | | |
| HeL | $CF_3COOLi$ | 0.35 |
| HeL | TEAI | 0.15 |
| LeL | EG | 0.6 |
| Metal | $Co(BF_4)_2—6H_2O$ | 0.01 |
| R/O | Ruby Red | 0.0025 |
| *Example 33 - FIG. 33* | | |
| HeL | TBABr | 0.061 |
| HeL | Di-(2-picolyl)amine | 0.024 |
| LeL | TMOLP | 0.066 |
| Metal | $Ni(ClO_4)_2—6H_2O$ | 0.02 |
| *Example 34 - FIG. 34* | | |
| LeL | N-propyl-N-pyridin-2-ylpyridin-2-amine | 0.27 |
| Complex | $Ni(diisobutyldithiophosphinate)_2$ | 0.02 |
| *Example 35 - FIG. 35* | | |
| HeL | $Ph_3P$ | 0.06 |
| HeL | TBAI | 0.06 |
| HeL | $CF_3COOLi$ | 0.35 |
| LeL | NPG | 0.5 |
| Metal | $Co(BF_4)_2—6H_2O$ | 0.02 |
| *Example 36 - FIG. 36* | | |
| HeL | TBABr | 0.1 |
| HeL | 6-methyl-N-phenyl-N-pyridin-2-ylpyridin-2-amine | 0.02 |
| LeL | NPG | 1.52 |
| Metal | $Ni(ClO_4)_2—6H_2O$ | 0.02 |
| *Example 37 - FIG. 37* | | |
| HeL | TBABr | 0.1 |
| HeL | 1-ethyl-N-methyl-N-pyridin-2-yl-1H-benzimidazol-2-amine | 0.02 |
| LeL | NPG | 0.47 |
| Metal | $Ni(ClO_4)_2—6H_2O$ | 0.02 |
| *Example 38 - FIG. 38* | | |
| HeL | TBABr | 0.1 |
| HeL | N-[(1-methyl-1H-benzimidazol-2-yl)methyl]-N-pyridin-2ylpyridin-2-amine | 0.02 |
| LeL | NPG | 0.61 |
| Metal | $Ni(ClO_4)_2—6H_2O$ | 0.02 |

TABLE 6-continued

| Type | Materials in LETC System | Conc. (molarity) |
|---|---|---|
| *Example 39 - FIG. 39* | | |
| HeL | TBABr | 0.1 |
| HeL | N,N,N',N'-tetramethyl-1,3-propanediamine | 0.02 |
| LeL | NPG | 1.85 |
| Metal | $Ni(ClO_4)_2—6H_2O$ | 0.02 |
| *Example 40 - FIG. 40* | | |
| HeL | TBABr | 0.1 |
| HeL | N-pyridin-2-ylpyridin-2-amine | 0.008 |
| HeL | N-ethyl-N-(pyridine-2ylmethyl)pyridin-2-amine | 0.005 |
| LeL | NPG | 0.59 |
| Metal | $Ni(ClO_4)_2—6H_2O$ | 0.02 |
| *Example 41 - FIG. 41* | | |
| HeL | TBABr | 0.2 |
| HeL | N-pyridin-2-yl-N-(pyridin-2-ylmethyl)pyridin-2-amine | 0.04 |
| LeL | NPG | 0.089 |
| Metal | $Ni(ClO_4)_2—6H_2O$ | 0.02 |
| *Example 42 - FIG. 42* | | |
| HeL | TBAI | 0.009 |
| HeL | 4-(3-PhPr)Pyr | 0.003 |
| LeL | TMOLP | 0.014 |
| Metal | $(TBA)_2NiI_4$ | 0.003 |
| Additive | $Ph_3P$ | 0.001 |
| Additive | Tinuvin ® 405 | 0.003 |
| *Example 43 - FIG. 43* | | |
| HeL | TBABr | 0.1 |
| HeL | 2-pyridin-2-ylethanamine | 0.02 |
| LeL | NPG | 0.74 |
| Metal | $Ni(ClO_4)_2—6H_2O$ | 0.02 |
| *Example 44 - FIG. 44* | | |
| HeL | TBABr | 0.1 |
| HeL | 6-methyl-N-[(6-methylpyridin-2-yl)methyl]-N-pyridin-2-ylpyridin-2-amine | 0.02 |
| LeL | NPG | 1.21 |
| Metal | $Ni(ClO_4)_2—6H_2O$ | 0.02 |
| *Example 45 - FIG. 45* | | |
| HeL | TBABr | 0.1 |
| HeL | N-(6-methylpyridin-2-ylmethyl)pyridin-2-amine | 0.02 |
| LeL | NPG | 1.49 |
| Metal | $Ni(ClO_4)_2—6H_2O$ | 0.02 |
| *Example 46 - FIG. 46* | | |
| HeL | potassium hydrotris(3,5-dimethylpyrazol-1-yl)borate | 0.005 |
| HeL | TBABr | 0.026 |
| LeL | TMOLP | 0.026 |
| Metal | $Ni(ClO_4)_2—6H_2O$ | 0.005 |

Examples of Gray Combinations

Some of the single layer LETC systems we have discovered, which have a c* of less than 25 throughout the range of 25 C to 85 C with a Y from greater than 70 at 25 C and less than 15 at 85 C are listed in Table 7. These are c* and Y values for the LETC system alone and not for other components like substrates that might be part of a window package. Each example in Table 7 is based on a formulation given by the entry from Table 27. The spectra used to calculate c* and Y is the given percentage of the spectra obtained when heating a solution of the formulation given in Table 27. LETC systems with the characteristic given in Table 7 can be achieved either by using the percentage of the formulation from Table 27 or by keeping the formulation the same and changing the path length or layer thickness of the system. It is also possible to achieve similar results with these systems for a wide variety of concentrations and path lengths. Thus information from liquid solution based LETC systems with large path lengths can be used to design thinner polymer layer based systems with similar change in white light transmission, similar colors and similar color sweep or shift with temperature.

TABLE 7

| Example # | % of Entry of Table 27 | 25 C. Y\|a*\|b*\|c* | 45 C. Y\|a*\|b*\|c* | 65 C. Y\|a*\|b*\|c* | 85 C. Y\|a*\|b*\|c* |
|---|---|---|---|---|---|
| 47 | 80% of 925 | 75.6\|−10.6\|−4.7\|11.6 | 60.0\|−2.9\|−2.0\|3.5 | 33.9\|11.9\|−2.2\|12.1 | 14.9\|22.3\|−7.2\|23.4 |
| 48 | 105% of 708 | 74.8\|−18.3\|−4.6\|18.8 | 61.6\|−15.9\|−8.2\|17.9 | 36.4\|−9.3\|−14.4\|17.2 | 14.9\|−0.1\|−16.0\|16.0 |
| 49 | 89% of 733 | 72.3\|−18.3\|1.4\|18.4 | 59.2\|−14.1\|4.4\|14.8 | 34.8\|−4.3\|5.9\|7.3 | 14.7\|4.8\|3.9\|6.2 |
| 50 | 82% of 827 | 73.2\|−10.4\|−6.4\|12.3 | 57.0\|−9.0\|−7.6\|11.8 | 32.8\|−3.9\|−9.1\|9.9 | 14.7\|4.4\|−4.0\|5.9 |
| 51 | 78% of 830 | 75.4\|−9.3\|−4.7\|10.4 | 56.7\|−7.8\|−6.8\|10.4 | 30.9\|−4.0\|−9.9\|10.7 | 14.8\|−1.5\|−3.6\|3.9 |
| 52 | 80% of 829 | 76.1\|−7.7\|−3.6\|8.5 | 56.4\|−4.1\|−9.2\|10.0 | 31.1\|3.1\|−16.9\|17.1 | 14.9\|9.1\|−15.8\|18.2 |

For examples of two layer systems, the spectra in FIGS. 1-32, were combined in various combinations and each combination was checked to see if it met certain performance criteria with regard to color and range of transmission. Combinations made by adding various amounts of the spectra from just two LETC layers are given below. These combinations met the criteria of c* less than 20 throughout the range of 25 C to 85 C with a Y from greater than 75 at 25 C and less than 15 at 85 C. These are values for the LETC system alone and not for other components like substrates that might be part of a window package. In practice one can reliably predict the combined spectrum of two or more systems by simply adding the spectra of two separate systems at each temperature of interest. Since the TC systems are, or would, be in separate layers, it is not surprising that the absorption spectra of light passing through the layers would be a simple sum of the separate absorption spectra. From the summed absorption spectra one can calculate the overall white light transmittance, Y, and the color coordinates, (see Principles of Color Technology, $2^{nd}$ Edition", F. W. Billmeyer Jr. and M. Saltzman, John Wiley and Sons, Inc. (1981)).

For examples of three layer systems, the spectra in FIGS. 1-46, were combined in various combinations and the combinations were checked to see if they met certain performance criteria with regard to color and range of transmission. Many combinations gave good values for Y and c* when adding various amounts of the spectra from three LETC layers. Some representative results made are given below. These combinations met the criteria of c* less than 10 throughout the range of 25 C to 85 C with a Y from greater than 80 at 25 C and less than 15 at 85 C. These are values for the LETC system alone and not for other components like substrates that might be part of window package.

TABLE 8

| Ex. # | % of Figure | % of Figure | 25 C. Y\|a*\|b*\|c* | 45 C. Y\|a*\|b*\|c* | 65 C. Y\|a*\|b*\|c* | 85 C. Y\|a*\|b*\|c* |
|---|---|---|---|---|---|---|
| 53 | 66% of 2 | 86% of 12 | 87.3\|−1.0\|3.1\|3.3 | 70.0\|5.9\|5.3\|7.9 | 38.3\|11.5\|3.2\|12.0 | 14.7\|14.0\|−2.8\|14.3 |
| 54 | 32% of 3 | 56% of 20 | 89.6\|−4.7\|9.6\|10.7 | 72.8\|−6.6\|2.5\|7.1 | 38.3\|−4.4\|−11.6\|12.4 | 14.7\|5.5\|−13.7\|14.8 |
| 55 | 60% of 4 | 54% of 12 | 84.3\|−1.2\|8.0\|8.0 | 65.0\|1.2\|3.9\|4.1 | 35.4\|5.6\|−4.3\|7.0 | 14.8\|10.5\|−10.6\|14.9 |
| 56 | 24% of 5 | 28% of 27 | 91.2\|−4.5\|5.5\|7.1 | 70.8\|−2.4\|6.4\|6.9 | 37.4\|5.1\|2.2\|5.6 | 14.6\|13.8\|−0.2\|13.8 |
| 57 | 28% of 5 | 16% of 31 | 88.8\|−7.5\|8.8\|11.5 | 69.2\|−8.2\|11.4\|14.0 | 36.9\|−5.8\|13.7\|14.9 | 14.5\|4.0\|10.2\|11.0 |
| 58 | 34% of 5 | 62% of 33 | 78.8\|−7.8\|6.2\|10.0 | 60.8\|−10.9\|9.8\|14.6 | 33.0\|−8.8\|0.8\|8.9 | 15.0\|−3.1\|−12.7\|13.1 |
| 59 | 36% of 5 | 10% of 23 | 90.7\|−8.5\|8.4\|11.9 | 69.1\|−10.1\|9.6\|14.0 | 35.7\|−10.3\|4.8\|11.4 | 14.7\|−4.0\|−9.7\|10.4 |
| 60 | 38% of 5 | 34% of 9 | 90.4\|−8.0\|8.6\|11.8 | 68.5\|−8.9\|8.3\|12.2 | 35.3\|−5.7\|−3.0\|6.4 | 14.8\|−0.9\|−14.2\|14.3 |

TABLE 9

| Ex. # | % of Figure | % of Figure | % of Figure | 25 C. Y\|a*\|b*\|c* | 45 C. Y\|a*\|b*\|c* | 65 C. Y\|a*\|b*\|c* | 85 C. Y\|a*\|b*\|c* |
|---|---|---|---|---|---|---|---|
| 61 | 10% of 1 | 25% of 5 | 30% of 27 | 90.2\|−5.3\|5.9\|7.9 | 68.7\|−3.6\|6.6\|7.6 | 34.5\|2.7\|1.8\|3.3 | 12.4\|9.6\|−1.2\|9.7 |
| 62 | 10% of 1 | 20% of 26 | 35% of 27 | 89.8\|−2.3\|−0.5\|2.3 | 66.7\|0.2\|−4.3\|4.3 | 33.2\|4\|−8\|8.9 | 14.2\|7.5\|−0.1\|7.5 |
| 63 | 15% of 1 | 100% of 6 | 95% of 12 | 80.3\|−2.2\|3.7\|4.3 | 59.8\|−2.8\|1.9\|3.4 | 32.5\|3\|1.8\|3.5 | 14.1\|9.3\|3.2\|9.8 |
| 64 | 20% of 1 | 35% of 4 | 60% of 36 | 85.6\|−4.2\|8\|9 | 63.9\|0\|7\|7 | 32.1\|6.9\|2.4\|7.3 | 14.7\|8.4\|−4.7\|9.6 |
| 65 | 25% of 1 | 65% of 2 | 80% of 12 | 86.4\|−2.7\|3.3\|4.3 | 69.1\|2.4\|4.6\|5.2 | 37.7\|5.7\|1.2\|5.8 | 14.5\|8.2\|−5.5\|9.9 |
| 66 | 25% of 1 | 30% of 36 | 60% of 41 | 82.6\|−0.7\|−1.8\|2 | 66.9\|−0.1\|−0.5\|0.5 | 36\|3.1\|−1.7\|3.5 | 14.6\|6.2\|−7.7\|9.9 |
| 67 | 30% of 1 | 65% of 44 | 40% of 46 | 81.5\|−6.8\|4.9\|8.4 | 58.2\|−4.3\|8.7\|9.7 | 28.5\|2.5\|9\|9.3 | 14.3\|6.2\|6.8\|9.2 |
| 68 | 35% of 1 | 30% of 12 | 65% of 41 | 81.6\|0.5\|−3.4\|3.5 | 67.6\|0.5\|−2.7\|2.7 | 37.9\|2.2\|−3.4\|4.1 | 14.4\|6.9\|−7.2\|10 |
| 69 | 45% of 1 | 15% of 23 | 85% of 39 | 82.2\|−2.8\|1.5\|3.2 | 63.8\|0.8\|1.7\|1.8 | 36.4\|1.8\|7.8\|8 | 14.8\|8.6\|0.4\|8.6 |
| 70 | 45% of 1 | 50% of 39 | 50% of 45 | 84.6\|−4.9\|3.9\|6.3 | 65\|−1.8\|7.2\|7.4 | 35.1\|9.4\|9.9 | 14.3\|7.1\|4.9\|8.7 |
| 71 | 50% of 1 | 90% of 12 | 100% of 24 | 82.8\|0.5\|3.3\|3.3 | 63.3\|2.4\|3\|4 | 34.2\|4.7\|2.2\|5.2 | 14.7\|9.1\|3\|9.6 |
| 72 | 55% of 1 | 15% of 7 | 65% of 36 | 86.1\|−6.9\|5.1\|8.6 | 63.7\|−2.4\|5\|5.5 | 31.4\|5.8\|1.6\|6 | 14.7\|8.5\|−4\|9.5 |
| 73 | 55% of 1 | 60% of 9 | 90% of 39 | 81\|−2.3\|1.9\|3 | 62.5\|1.9\|0.8\|2 | 35.8\|5.8\|0.5\|5.8 | 14.7\|9.2\|0.3\|9.2 |
| 74 | 55% of 1 | 30% of 14 | 70% of 36 | 87.4\|−6.8\|6.7\|9.5 | 66\|−1.8\|9.6\|9.8 | 33.1\|4.2\|8.7\|9.7 | 14.8\|3.1\|2\|3.7 |
| 75 | 95% of 1 | 15% of 13 | 65% of 36 | 83.4\|−6.6\|5.3\|8.5 | 62.2\|−0.7\|6.6\|6.6 | 31\|8\|5.6\|9.7 | 14.5\|9.4\|1.3\|9.5 |
| 76 | 95% of 1 | 10% of 28 | 65% of 36 | 82.1\|−5.4\|3.8\|6.6 | 60.8\|0.5\|4\|4.1 | 31\|8.3\|2.7\|8.7 | 15\|9.3\|−1.4\|9.4 |
| 77 | 95% of 1 | 5% of 32 | 65% of 36 | 81.7\|−5\|5.6\|7.5 | 60.3\|−0.5\|7.1\|7.1 | 30.7\|5.7\|6.5\|8.7 | 14.8\|6.3\|2.8\|6.9 |
| 78 | 95% of 1 | 65% of 36 | 15% of 37 | 82.7\|−7.8\|5.3\|9.4 | 61.7\|−2.1\|6.6\|6.9 | 30.7\|6.9\|5.2\|8.6 | 14\|9.6\|0.1\|9.6 |
| 79 | 100% of 1 | 5% of 19 | 70% of 36 | 84.7\|−7.9\|6.1\|9.9 | 63.4\|−2.5\|7.9\|8.3 | 32\|5.9\|7.7\|9.7 | 14.9\|7.6\|3.7\|8.4 |
| 80 | 20% of 2 | 65% of 37 | 30% of 45 | 80.4\|−5.9\|4.2\|7.3 | 64.2\|−2.3\|7.5\|7.9 | 34.5\|4.8\|7.5\|8.9 | 14.8\|9.4\|3\|9.9 |
| 81 | 25% of 2 | 15% of 23 | 85% of 39 | 83.6\|−1.5\|1.5\|2.1 | 65.3\|2.8\|1.9\|3.4 | 37\|3\|7.4\|8 | 14.6\|8.7\|−2\|8.9 |
| 82 | 25% of 2 | 35% of 36 | 50% of 41 | 84.1\|−1\|−0.6\|1.2 | 67.9\|0.3\|0.8\|0.8 | 35.9\|2.4\|−1.5\|2.8 | 14.5\|8.6\|−9.1\|9.8 |
| 83 | 25% of 2 | 55% of 39 | 45% of 45 | 85.6\|−3.1\|3.3\|4.5 | 66.2\|1.1\|5.6\|5.7 | 35.6\|5.7\|5.6\|8 | 14.1\|9.1\|−1.3\|9.2 |
| 84 | 30% of 2 | 60% of 9 | 90% of 39 | 82.6\|−0.6\|2\|2.1 | 64.3\|4.4\|1.1\|4.5 | 36.5\|7.6\|−0.2\|7.6 | 14.5\|9.7\|−2.2\|9.9 |
| 85 | 30% of 2 | 45% of 18 | 20% of 27 | 81.8\|−7.9\|−1\|8 | 66.4\|−4.8\|3\|5.6 | 37\|0\|6.4\|6.4 | 14.4\|3.2\|7.9\|8.5 |
| 86 | 30% of 2 | 25% of 27 | 50% of 37 | 83.2\|−3.8\|2.8\|4.7 | 67.9\|−0.6\|4.4\|4.4 | 37.6\|4.9\|3.8\|6.2 | 15\|8.9\|3.3\|9.5 |
| 87 | 35% of 2 | 10% of 7 | 70% of 36 | 87.8\|−5\|5.4\|7.4 | 65.5\|0.9\|6.7\|6.7 | 31.8\|8.2\|3.6\|8.9 | 14\|8.5\|−3.5\|9.2 |
| 88 | 35% of 2 | 35% of 12 | 45% of 44 | 86.4\|−4.4\|5.2\|6.8 | 64.2\|−1.9\|9.5\|9.7 | 32.5\|0.7\|9.9\|10 | 14.6\|2.2\|6.3\|6.7 |
| 89 | 35% of 2 | 75% of 12 | 30% of 16 | 87.1\|−5.3\|4.9\|7.2 | 68.7\|−3.5\|8.2\|8.9 | 37.2\|−2.9\|9.5\|10 | 14.5\|−1.7\|8\|8.1 |
| 90 | 45% of 2 | 15% of 31 | 40% of 43 | 83\|−5.4\|3.2\|6.2 | 64.4\|0.4\|3.8\|3.8 | 34.8\|2.9\|7.7\|8.3 | 14.7\|3.9\|9.7\|9.8 |
| 91 | 45% of 2 | 10% of 32 | 55% of 36 | 81.6\|0.5\|5.4\|5.4 | 60.7\|5.2\|6.8\|8.6 | 31\|7.4\|3.8\|8.3 | 14.5\|4.1\|−2.9\|5.1 |
| 92 | 45% of 2 | 35% of 36 | 40% of 40 | 83.4\|−6.1\|6.4\|8.9 | 61\|1.1\|9.9\|9.9 | 30.6\|4.2\|6.9\|8.1 | 14.6\|−0.7\|−2.1\|2.2 |
| 93 | 50% of 2 | 10% of 13 | 65% of 36 | 87.3\|−4\|5.3\|6.7 | 66.8\|2.2\|7.4\|7.7 | 33.3\|8\|4.8\|9.4 | 14.8\|6.1\|−2.7\|6.7 |
| 94 | 50% of 2 | 10% of 19 | 65% of 36 | 87.9\|−5\|6.3\|8 | 67.2\|1.3\|8.5\|8.6 | 33.5\|7.4\|5.9\|9.5 | 14.6\|4\|−2\|6.7 |
| 95 | 70% of 2 | 80% of 12 | 5% of 45 | 87.2\|−1.8\|3\|3.4 | 69.7\|3.9\|6.6\|7.4 | 37.6\|7\|6.2\|9.4 | 14.2\|7.8\|1.8\|8 |
| 96 | 75% of 2 | 5% of 9 | 80% of 12 | 87.3\|−1.9\|3\|3.4 | 70.2\|3.4\|6\|6.9 | 38.4\|5.9\|4\|7.2 | 14.6\|6.9\|−1.6\|7.1 |
| 97 | 75% of 2 | 5% of 11 | 80% of 12 | 86.8\|−2.8\|4.7\|5.5 | 69.8\|2.6\|7.4\|7.9 | 38.1\|5.7\|4.7\|7.4 | 14.5\|7.5\|−2.3\|7.9 |
| 98 | 80% of 2 | 70% of 12 | 5% of 31 | 86.7\|−3.1\|4.5\|5.4 | 69.9\|0.2\|7.7\|7.7 | 37.9\|−1.1\|9.6\|9.7 | 14.1\|−0.8\|5\|5.1 |
| 99 | 10% of 3 | 35% of 12 | 80% of 17 | 80.2\|−7.7\|−2.3\|8 | 66\|−7.9\|−2.1\|8.2 | 37.3\|−4.2\|−4.1\|5.8 | 14\|6.3\|−4.1\|7.5 |
| 100 | 10% of 3 | 70% of 13 | 40% of 16 | 81.4\|−6.7\|7.2\|9.8 | 63.8\|−5.6\|5.5\|7.8 | 33.1\|−1.3\|−0.7\|1.5 | 14.5\|−0.7\|−5.1\|5.2 |
| 101 | 15% of 3 | 50% of 9 | 30% of 26 | 89\|−6.9\|4.7\|8.3 | 65.2\|−7.1\|−0.2\|7.1 | 32\|−5.6\|−5.7\|8 | 14.9\|−1.8\|3.7\|4.1 |
| 102 | 15% of 3 | 50% of 20 | 30% of 45 | 89.3\|−3.9\|7.7\|8.7 | 70.2\|−7\|6.4\|9.5 | 35.5\|−9.8\|0.2\|9.8 | 14.2\|−6.1\|−2.3\|6.5 |
| 103 | 25% of 3 | 65% of 13 | 100% of 24 | 80.3\|−1.6\|9.5\|9.7 | 63.6\|−0.5\|5.4\|5.5 | 33.3\|3.7\|−1.7\|4.1 | 14.8\|6.9\|0.2\|6.9 |
| 104 | 25% of 3 | 55% of 20 | 5% of 31 | 88.9\|−4.2\|9\|9.9 | 72\|−7.1\|3.7\|8 | 37.9\|−8.6\|−5\|9.9 | 14.6\|−0.3\|−4.9\|4.9 |
| 105 | 30% of 3 | 65% of 14 | 35% of 28 | 80.7\|−2.7\|7.2\|7.7 | 64.3\|1.2\|3.8\|4 | 36.3\|2.9\|−2.5\|3.8 | 14.4\|1.8\|−4.7\|5 |
| 106 | 45% of 3 | 50% of 25 | 25% of 28 | 80\|−3.7\|8.4\|9.2 | 61.8\|−6.7\|1.6\|6.9 | 33.8\|−5\|−2.2\|5.5 | 14.4\|5\|8\|9.7 |
| 107 | 10% of 4 | 20% of 5 | 30% of 27 | 90.9\|−4.2\|6.2\|7.5 | 69.9\|−3\|6.8\|7.4 | 36.8\|2.1\|3.3\|3.9 | 14.1\|8.6\|1.7\|8.8 |
| 108 | 10% of 4 | 10% of 22 | 60% of 44 | 84.2\|−7.3\|6.7\|9.9 | 58.9\|−7.7\|6.4\|10 | 28.7\|−5.8\|0.2\|5.8 | 14.9\|−3.9\|−7.1\|8.1 |
| 109 | 25% of 4 | 30% of 36 | 40% of 44 | 85.2\|−4.9\|7.9\|9.3 | 60.7\|−2.5\|9.4\|9.8 | 29.1\|3\|6.3\|7 | 13.8\|5.3\|0.1\|5.3 |
| 110 | 25% of 4 | 50% of 37 | 35% of 45 | 80.6\|−5.6\|6.8\|8.8 | 62.6\|−3.9\|9.1\|9.9 | 32.8\|1.5\|8.4\|8.5 | 13.8\|6.4\|1\|7.2 |
| 111 | 25% of 4 | 40% of 45 | 45% of 45 | 85.2\|−3.3\|6.1\|6.9 | 65.4\|−1.1\|7.1\|7.2 | 35.4\|2.9\|7.4\|7.9 | 14.7\|1.9\|7.2 |
| 112 | 30% of 4 | 60% of 9 | 75% of 39 | 81.8\|−0.7\|5.2\|5.3 | 62.6\|2\|3.5\|4 | 35.4\|4.3\|2.2\|4.8 | 15\|7.2\|2\|7.5 |
| 113 | 30% of 4 | 20% of 10 | 55% of 36 | 81.7\|−1.8\|8.5\|8.7 | 60.7\|0.7\|9.2\|9.2 | 30.8\|6.4\|7.2\|9.6 | 14.2\|7.2\|3.6\|8.1 |
| 114 | 30% of 4 | 15% of 12 | 55% of 40 | 80.1\|−4.7\|8.1\|9.3 | 57.3\|2.6\|9.3\|9.7 | 29.8\|7.7\|4.9\|9.1 | 15\|5.5\|−3.4\|6.5 |
| 115 | 30% of 4 | 55% of 13 | 30% of 45 | 81.7\|−1.6\|7.1\|7.3 | 62.6\|1.5\|7.9\|8 | 31.9\|6.5\|7\|9.6 | 14.3\|5.5\|4.8\|7.3 |
| 116 | 35% of 4 | 55% of 36 | 20% of 42 | 84.7\|−4.8\|8.3\|9.6 | 64.1\|−0.8\|9\|9 | 32.7\|6.1\|7\|9.3 | 14.9\|7.6\|2.5\|8 |
| 117 | 40% of 4 | 40% of 9 | 45% of 43 | 81.1\|−3.6\|5.4\|6.4 | 59.9\|2.3\|2.2\|3.2 | 31.7\|9.2\|−3.2\|9.7 | 14.9\|9.3\|−3\|9.7 |
| 118 | 40% of 4 | 50% of 12 | 25% of 35 | 80.3\|1.7\|9.5\|9.7 | 62.4\|3.4\|8.5\|9.1 | 34.4\|5.8\|6.5\|8.7 | 14.1\|8.1\|4.3\|9.2 |
| 119 | 40% of 4 | 35% of 18 | 20% of 45 | 80.5\|−8.2\|4.1\|8.9 | 63\|−8.4\|5.3\|9.9 | 34.5\|−7.1\|4.1\|8.2 | 14.8\|−4.8\|0.3\|4.8 |
| 120 | 40% of 4 | 30% of 19 | 25% of 27 | 86.2\|−3.6\|9.2\|9.9 | 67.9\|−2.4\|8.1\|8.4 | 36.7\|0.8\|5.8\|5.9 | 14.1\|4.5\|6.1\|7.6 |
| 121 | 55% of 4 | 10% of 8 | 55% of 12 | 83.1\|−1.8\|8.5\|8.7 | 64\|0.6\|8.1\|8.1 | 34.9\|5\|4.8\|6.9 | 14.8\|9.5\|1.4\|9.6 |
| 122 | 55% of 4 | 50% of 12 | 5% of 31 | 84.2\|−1.7\|8.6\|8.8 | 65.2\|−0.1\|7.1\|7.1 | 35.6\|2.2\|6.1\|6.5 | 14.7\|6.4\|4.6\|7.9 |
| 123 | 55% of 4 | 55% of 12 | 20% of 33 | 80.9\|−1.4\|7.6\|7.7 | 62.6\|0\|7.2\|7.2 | 34.5\|3.4\|4\|5.3 | 14.7\|7.4\|1.2\|7.5 |
| 124 | 60% of 4 | 10% of 9 | 55% of 12 | 84\|−1.3\|8.7\|8.8 | 64.5\|0.5\|6.3\|6.3 | 34.7\|3.5\|1.5\|3.8 | 14.3\|6.5\|−1\|6.6 |
| 125 | 60% of 4 | 50% of 12 | 5% of 23 | 84.3\|−2\|9.1\|9.3 | 65\|−1.7\|8.2\|8.4 | 35.3\|−2.4\|8.3\|8.7 | 14.7\|0.1\|4.8\|4.8 |
| 126 | 10% of 5 | 10% of 12 | 55% of 44 | 86.9\|−5.8\|6.3\|8.6 | 62\|−3.7\|9.2\|9.9 | 30.2\|2.7\|5.6\|6.2 | 14.3\|8.4\|−1.5\|8.5 |
| 127 | 10% of 5 | 55% of 12 | 35% of 16 | 88.3\|−6.8\|5.8\|8.9 | 68.5\|−5.7\|7.7\|9.6 | 36.8\|−1.9\|5.6\|5.9 | 14.9\|3.8\|1.2\|4 |
| 128 | 15% of 5 | 20% of 25 | 35% of 27 | 90.4\|−3\|4.1\|5.1 | 70.2\|−5.6\|5\|7.5 | 37.4\|−6.3\|4.4\|7.7 | 14.8\|−0.3\|7\|7 |
| 129 | 15% of 5 | 5% of 27 | 45% of 44 | 88\|−6.3\|6.4\|9 | 63.7\|−5.2\|8.1\|9.6 | 31.4\|0\|2.1\|2.1 | 14.5\|5.2\|−6.9\|8.7 |
| 130 | 15% of 5 | 20% of 28 | 45% of 45 | 83.8\|−2.4\|4.2\|4.8 | 62.6\|0.7\|7.4\|7.5 | 32.6\|5.6\|7.8\|9.6 | 14.3\|7.7\|4.1\|8.8 |
| 131 | 20% of 5 | 10% of 6 | 35% of 29 | 90.4\|−4.2\|5.5\|6.9 | 69.9\|−3.7\|7.3\|8.2 | 36.3\|0.7\|6.2\|6.2 | 13.4\|7.3\|6.5\|9.8 |
| 132 | 20% of 5 | 30% of 9 | 35% of 18 | 83.6\|−9.4\|3.3\|10 | 65\|−7.2\|6.5\|9.6 | 34.7\|0.9\|4.4\|4.5 | 14.2\|8.4\|0.7\|8.4 |
| 133 | 25% of 5 | 10% of 28 | 15% of 31 | 85.5\|−4.9\|6.8\|8.3 | 65.5\|−4\|7.7\|8.7 | 34.9\|−1.3\|9.3\|9.4 | 14.1\|6.6\|6.5\|9.3 |
| 134 | 25% of 5 | 10% of 31 | 10% of 32 | 82.1\|−1.6\|7.6\|7.7 | 61\|−0.9\|7.6\|7.6 | 32.1\|0.6\|4.1\|4.2 | 13.6\|7.2\|−2.8\|7.8 |
| 135 | 30% of 5 | 15% of 9 | 15% of 27 | 91\|−6\|6.9\|9.1 | 70.1\|−5.3\|7.1\|8.9 | 36.8\|0.1\|−0.4\|0.4 | 14.9\|6.5\|−6.9\|9.4 |
| 136 | 30% of 6 | 30% of 14 | 75% of 36 | 87.3\|−4.9\|7\|8.6 | 64.8\|−1.7\|9.5\|9.7 | 31.8\|3.3\|9.1\|9.7 | 14.3\|2.5\|3.5\|4.3 |

TABLE 9-continued

| Ex. # | % of Figure | % of Figure | % of Figure | 25 C. Y\|a*\|b*\|c* | 45 C. Y\|a*\|b*\|c* | 65 C. Y\|a*\|b*\|c* | 85 C. Y\|a*\|b*\|c* |
|---|---|---|---|---|---|---|---|
| 137 | 30% of 6 | 25% of 27 | 55% of 37 | 80.9\|-3.7\|2.8\|4.6 | 64.5\|-2.9\|3.1\|4.2 | 35.5\|2.5\|3\|3.9 | 14.7\|8.7\|4.9\|9.9 |
| 138 | 35% of 6 | 15% of 16 | 75% of 36 | 86.1\|-6.1\|6.7\|9 | 63.2\|-4.4\|8.9\|9.9 | 31.2\|0.8\|9.5\|9.5 | 14.8\|1.7\|6.5\|6.7 |
| 139 | 35% of 6 | 35% of 18 | 45% of 36 | 80.3\|-7.4\|1.3\|7.5 | 60.5\|-3.4\|3.2\|4.7 | 31.5\|5.1\|4.2\|6.6 | 14.6\|9.5\|2\|9.7 |
| 140 | 50% of 6 | 75% of 36 | 10% of 39 | 84.6\|-3.7\|5.4\|6.5 | 61.5\|-0.5\|5.7\|5.7 | 30.4\|6.9\|5.4\|8.8 | 14.5\|9.7\|2.2\|9.9 |
| 141 | 55% of 6 | 5% of 34 | 75% of 36 | 82.4\|-5.3\|7.8\|9.4 | 59.8\|-3.3\|8.4\|9 | 30.1\|3\|8.5\|9 | 15\|5\|6.3\|8.1 |
| 142 | 55% of 6 | 70% of 36 | 10% of 43 | 83.9\|-4.2\|5\|6.6 | 60.5\|-0.9\|4.7\|4.8 | 29.8\|6.7\|3.6\|7.6 | 14.5\|9.2\|0.8\|9.2 |
| 143 | 65% of 6 | 85% of 12 | 20% of 16 | 83.1\|-3.9\|4.6\|6 | 63\|-5.6\|5.3\|7.7 | 34.2\|-3.6\|7.5\|8.4 | 14.4\|0.9\|9.9\|10 |
| 144 | 80% of 6 | 75% of 12 | 20% of 40 | 80.1\|-2.5\|4.5\|5.1 | 58.5\|-1.1\|4.7\|4.8 | 31.3\|4\|5.1\|6.4 | 14.3\|8.3\|5.2\|9.8 |
| 145 | 85% of 6 | 10% of 7 | 80% of 12 | 82.1\|-2.5\|3.2\|4.1 | 61.6\|-3.9\|0\|3.9 | 33.5\|1\|-3.5\|3.6 | 14.6\|8.5\|-4.9\|9.8 |
| 146 | 100% of 6 | 5% of 10 | 90% of 12 | 80\|-1.2\|3.8\|4 | 59.9\|-2.6\|2.1\|3.4 | 33.1\|2.5\|1.9\|3.1 | 14.6\|8.8\|3\|9.3 |
| 147 | 100% of 6 | 85% of 12 | 5% of 20 | 81.4\|-1.5\|3.3\|3.6 | 61.3\|-3\|0.4\|3 | 33.7\|2\|-2\|2.9 | 14.9\|8.9\|-2.3\|9.2 |
| 148 | 10% of 7 | 20% of 36 | 55% of 44 | 86.2\|-6\|6\|8.5 | 60.7\|-3.9\|8.9\|9.7 | 29\|2.4\|7.1\|7.5 | 14.5\|6.5\|2.4\|6.9 |
| 149 | 10% of 7 | 35% of 40 | 40% of 44 | 82.7\|-6.8\|6.3\|9.3 | 57.3\|-2.4\|9.6\|9.9 | 28.2\|2.3\|7.4\|7.7 | 14.9\|2.1\|0.9\|2.3 |
| 150 | 15% of 7 | 10% of 14 | 70% of 40 | 80.1\|-7.4\|6.5\|9.9 | 55.8\|0.4\|8.7\|8.7 | 28.3\|4.7\|3.4\|5.8 | 15\|0.5\|-7\|7 |
| 151 | 20% of 7 | 35% of 39 | 50% of 45 | 86.3\|-5.3\|4.3\|6.9 | 65.1\|-4\|6.6\|7.7 | 34.1\|0.3\|6.9\|6.9 | 14.3\|6.4\|3\|7.1 |
| 152 | 20% of 7 | 65% of 40 | 5% of 45 | 80.3\|-7.5\|6.2\|9.7 | 55.7\|-0.3\|8.1\|8.1 | 28\|4.4\|3.9\|5.9 | 14.9\|1.2\|-4.2\|4.4 |
| 153 | 25% of 7 | 40% of 9 | 75% of 13 | 80.4\|-1.6\|4.4\|4.7 | 61.1\|1.6\|3.4\|3.8 | 31.1\|8.2\|0.7\|8.2 | 15\|7.4\|3.5\|8.2 |
| 154 | 25% of 7 | 60% of 9 | 75% of 39 | 82.4\|-2.7\|2.4\|3.6 | 61.6\|-0.4\|-0.3\|0.6 | 33.7\|2.4\|-3.1\|3.9 | 14.3\|8.2\|-2.8\|8.6 |
| 155 | 30% of 7 | 15% of 31 | 45% of 39 | 83.3\|-5\|3.2\|5.9 | 63.4\|-4.7\|-0.3\|4.7 | 34.6\|-4.6\|0.4\|4.6 | 13.8\|6.2\|-1.1\|6.3 |
| 156 | 30% of 7 | 25% of 33 | 55% of 36 | 82.7\|-5.9\|4.5\|7.4 | 60.9\|-3.5\|5.9\|6.8 | 30.2\|4.5\|3.6\|5.7 | 14.5\|9.3\|0\|9.3 |
| 157 | 30% of 7 | 40% of 36 | 25% of 45 | 87.6\|-6.8\|5.7\|8.9 | 64.3\|-4.9\|7.4\|8.9 | 31.3\|1.2\|6.8\|6.9 | 14\|4.9\|4.4\|6.6 |
| 158 | 35% of 7 | 10% of 8 | 50% of 36 | 85.8\|-6.9\|5.2\|8.6 | 62.7\|-4.3\|4.8\|6.4 | 30.8\|3.1\|0.4\|3.2 | 14.6\|8.2\|-5\|9.6 |
| 159 | 35% of 7 | 15% of 9 | 55% of 36 | 86.9\|-6.4\|5.4\|8.4 | 63\|-3.7\|4.7\|5.9 | 30.1\|3.6\|1.4\|3.9 | 13.8\|7.3\|-1\|7.4 |
| 160 | 40% of 7 | 40% of 12 | 10% of 31 | 86\|-5.6\|4.4\|7.2 | 65.5\|-5.9\|3.8\|7 | 34.9\|-4.4\|6.6\|8 | 14.6\|5.2\|8.2\|9.7 |
| 161 | 40% of 7 | 55% of 12 | 50% of 21 | 86.2\|-5.2\|3.5\|6.3 | 65\|-3.5\|1.2\|3.7 | 34.5\|1.4\|-2.8\|3.1 | 14.9\|8.9\|-3.3\|9.5 |
| 162 | 45% of 7 | 20% of 8 | 45% of 12 | 83.5\|-6.7\|4.4\|8 | 62.2\|-6.4\|4.6\|7.9 | 32.7\|-2.4\|0.9\|2.6 | 14.4\|6.6\|-2.7\|7.1 |
| 163 | 25% of 8 | 20% of 26 | 35% of 40 | 80.9\|-6.6\|3.4\|7.5 | 55.8\|-0.7\|3.9\|4 | 26.8\|5.9\|-2.7\|6.5 | 14.4\|5.5\|-7.3\|9.2 |
| 164 | 30% of 8 | 30% of 12 | 55% of 20 | 83.7\|-0.6\|3.8\|3.9 | 64.2\|-1.4\|4.9\|5.1 | 32.8\|-1.7\|-2.2\|2.8 | 14.3\|2.6\|-7.8\|8.3 |
| 165 | 30% of 8 | 55% of 14 | 45% of 43 | 81.2\|-7\|4.6\|8.3 | 61.6\|0.3\|8.2\|8.2 | 33.2\|7\|3.4\|7.8 | 14.8\|6.2\|-7.3\|9.5 |
| 166 | 50% of 8 | 5% of 10 | 30% of 26 | 80\|-7.3\|2.7\|7.8 | 56.3\|-7.6\|3.5\|8.4 | 27.6\|-6.7\|-2.9\|7.3 | 14.8\|-6.4\|-3.6\|7.4 |
| 167 | 50% of 8 | 5% of 17 | 30% of 26 | 80.8\|-8\|2\|8.2 | 57\|-8.2\|2.4\|8.5 | 28\|-7.1\|-4.3\|8.3 | 14.9\|-6.2\|-5.5\|8.3 |
| 168 | 50% of 8 | 30% of 26 | 5% of 35 | 80.1\|-7.1\|3.1\|7.7 | 56.4\|-7.2\|3.8\|8.1 | 27.6\|-6.3\|-2.3\|6.7 | 14.7\|-6.4\|-3.1\|7.1 |
| 169 | 50% of 8 | 30% of 26 | 5% of 37 | 80.5\|-7.7\|2.4\|8.1 | 56.6\|-7.1\|2.8\|7.6 | 27.4\|-4.4\|-4\|5.9 | 14.4\|-2.3\|-5.4\|5.9 |
| 170 | 50% of 8 | 30% of 26 | 5% of 38 | 80.8\|-7.9\|2.6\|8.3 | 57\|-7.8\|3\|8.3 | 27.9\|-6.4\|-3.8\|7.5 | 14.9\|-5.9\|-5.2\|7.9 |
| 171 | 50% of 8 | 30% of 26 | 5% of 39 | 80.9\|-7.4\|2.2\|7.7 | 56.8\|-6.6\|2.2\|6.9 | 27.7\|-4\|-4.9\|6.3 | 14.7\|-2\|-6.6\|6.9 |
| 172 | 50% of 8 | 30% of 26 | 5% of 43 | 80.5\|-7.6\|2.1\|7.9 | 55.9\|-6\|2.1\|6.4 | 26.7\|-2.1\|-5.2\|5.6 | 14\|0.4\|-6.7\|6.7 |
| 173 | 55% of 8 | 5% of 14 | 30% of 26 | 80.6\|-8.3\|3.2\|8.9 | 56.7\|-8.5\|5\|9.9 | 27.6\|-8\|-0.7\|8.1 | 14.6\|-8.8\|-1.7\|8.9 |
| 174 | 15% of 9 | 30% of 12 | 90% of 38 | 80.2\|-5.8\|6.1\|8.4 | 65.6\|-3.9\|6.5\|7.6 | 37.1\|0.7\|3.2\|3.2 | 13.9\|5.6\|-3.4\|6.6 |
| 175 | 15% of 9 | 80% of 13 | 40% of 16 | 80.2\|-4.9\|5.5\|7.4 | 62.1\|-4.5\|5.3\|6.9 | 31.9\|-3.1\|1.2\|3.3 | 15\|-7.3\|-1.4\|7.5 |
| 176 | 15% of 9 | 5% of 24 | 95% of 41 | 80.3\|2.2\|-5.3\|5.7 | 68.4\|-2.9\|-2.9\|4.1 | 39.3\|-9.3\|-1.3\|9.4 | 14.9\|-8.6\|-4.1\|9.5 |

For Examples 177 and 178, the molarity values were calculated based on an assumed 5 ml total solution volume. Volume changes due to components dissolved in the 5 ml of solvent were not considered.

Example 177

A solution was prepared which was 0.004M $FeBr_2$ and 6.39M water in γ-BL. The solution was placed in a cuvette and the absorption spectra were measured at various temperatures against a cuvette containing only γ-BL. The absorbance values at several values of $\lambda_{max}$ and temperatures values are given below:

TABLE 10

| $\lambda_{max}$ | 25 C. | 45 C. | 65 C. | 85 C. |
|---|---|---|---|---|
| 470 | 0.71 | 1.25 | 2.72 | 5.00 |
| 606 | 0.09 | 0.10 | 0.13 | 0.12 |
| 712 | 0.03 | 0.03 | 0.06 | 0.06 |
| 780 | 0.02 | 0.03 | 0.05 | 0.07 |

Example 178

A solution was prepared which was 0.004M $FeBr_2$, 6.4M water and 0.02M di(pentaerythritol) in γ-BL. The solution was placed in a cuvette and the absorption spectra were measured at various temperatures against a cuvette containing only γ-BL. The absorbance values at several values of $\lambda_{max}$ and temperatures values are given below:

TABLE 11

| $\lambda_{max}$ | 25 C. | 45 C. | 65 C. | 85 C. |
|---|---|---|---|---|
| 402 | 0.88 | 1.37 | 2.87 | 5.00 |
| 471 | 0.29 | 0.80 | 2.32 | 5.00 |
| 607 | 0.04 | 0.04 | 0.04 | 0.07 |

Examples 177 and 178 disclose systems which show an interesting case for thermochromic activity with Fe(II) going to what is believed to be the HeMLC form $FeBr_4^{2-}$ on heating.

Exchange Metal Examples 179 to 188: In each case the solution was prepared by dissolving the materials in 5 milliliters of the solvent listed. Some of the solution was placed in a 1 cm borosilicate cuvette, a small stir bar was placed in the cuvette and the cuvette was placed in the sample beam of a Shimadzu UV-3101 PC spectrophotometer. The solution was stirred and heated and the temperature was monitored with a thermocouple immersed in the solution in the cuvette. A similar, unheated 1 cm cuvette containing only the solvent was placed in the reference beam of the spectrophotometer. The absorbance, $A_L$, at a lower temperature, $T_L$, and the absorbance, $A_H$, at a higher temperature, $T_H$, for various wavelengths of maximum absorbance, $\lambda_{max}$, are given for Examples 179 to 188 involving exchange metals in Table 12. For examples 179 to 188, the molarity values were calculated based on an assumed 5 ml total solution volume. Volume changes due to components dissolved in the 5 ml of solvent were not considered.

Each solution was cycled back and forth between hot and cold several times and the amount of TC activity remained consistent. On cooling the solution decreased back to its original color and appearance and the absorbance decreased back to its original level.

Example 179

A dark blue solution was prepared in γ-BL containing 0.01M $Co(BF_4)_2:6H_2O$ and 0.15M tri-n-butylphosphine oxide. Making the solution 0.039M in $Zn(CF_3SO_3)_2$ caused it to change to light purple. On heating, the solution turned progressively darker blue.

Example 180

A green solution was prepared in propylene carbonate containing 0.01M
$Co(BF_4)_2:6H_2O$ and 0.34M NaI. Making the solution 0.113M in $Zn(CF_3SO_3)_2$ caused it to change to nearly colorless. On heating, the solution turned progressively darker green. A significant portion of the change in absorbance of this system takes place in the near infrared.

Example 181

A purple solution was prepared in γ-BL containing 0.01M $Co(BF_4)_2:6H_2O$ and 0.032M 2,2'-ethane-1,2-diylbis(1-benzyl-1H-benzimidazole). Making the solution 0.016M in $Zn(CF_3SO_3)_2$ caused it to change to light purple. On heating, the solution turned progressively darker purple.

Example 182

A dark blue solution was prepared in γ-BL containing 0.01M $Co(BF_4)_2:6H_2O$ and 0.10M tetrabutylammonium thiocyanate. Making the solution 0.044M in $Zn(CF_3SO_3)_2$ caused it to change to light purple. On heating, the solution turned blue and became progressively darker blue.

Example 183

A dark blue solution was prepared in γ-BL containing 0.01M $CoBr_2$ and 0.064M $TBA[(4-MeOPh)_2PO_2]$. Making the solution 0.036M in $Zn(CF_3SO_3)_2$ caused it to change to light purple. On heating, the solution turned blue and became progressively darker blue.

Example 184

A dark red solution was prepared in γ-BL containing 0.002M $NiI_2$ and 0.12M NaI. Making the solution 0.037M in $Zn(CF_3SO_3)_2$ caused it to change to light yellow. On heating, the solution turned progressively darker orange-red. On cooling the solution changed back to its original light yellow appearance and the absorbance decreased back to its original level.

Example 185

A bright green solution was prepared in γ-BL containing 0.00125M $Cu(NO_3)_2:2.5H_2O$, 0.006M $Co(BF_4)_2:6H_2O$ and 0.095M $TEACl:H_2O$. Addition of some $ZnCl_2$ caused the solution to change to dark blue green. Further addition of $ZnCl_2$ until the solution was 0.145M in $ZnCl_2$ caused the solution to turn very light tan. On heating, the solution turned progressively darker blue green.

Example 186

A blue solution was prepared in γ-BL containing 0.022M $Ni(NO_3)_2:6H_2O$ and 0.18M $TEACl:H_2O$. Making the solution 0.1M in $MnCl_2$ caused it to change to light green. On heating, the solution turned progressively darker green and the absorbance, in a 1 cm cuvette, increased at certain wavelengths and decreased at another wavelength as shown in Table 12.

Example 187

A blue solution was prepared in γ-BL containing 0.02M $Ni(ClO_4)_2:6H_2O$ and 0.20 M TBABr. Making the solution 0.19M in $MnBr_2$ caused it to change to yellow. On heating, the solution turned green and became progressively darker green.

Example 188

A light red solution was prepared in γ-BL containing 0.01 M $Cu(NO_3)_2:2.5H_2O$, 0.09 M $TEACl:H_2O$ and 0.32 M $ZnCl_2$. On heating, the solution turned progressively darker red.

TABLE 12

| EXM Example | $\lambda_{max}\|A_L\|T_L\|A_H\|T_H$ | $\lambda_{max}\|A_L\|T_L\|A_H\|T_H$ | $\lambda_{max}\|A_L\|T_L\|A_H\|T_H$ |
|---|---|---|---|
| 179 | 548\|0.17\|25\|0.66\|85 | 586\|0.17\|25\|0.87\|85 | 635\|0.15\|25\|1.01\|85 |
| 180 | 383\|0.93\|25\|5.0\|85 | 745\|0.28\|25\|3.07\|85 | |
| 181 | 528\|0.32\|25\|0.63\|85 | 561\|0.41\|25\|0.89\|85 | 597\|0.26\|25\|0.66\|85 |
| 182 | 564\|0.10\|25\|0.27\|85 | 620\|0.112\|25\|0.48\|85 | 640\|0.102\|25\|0.48\|85 |
| 183 | 533\|0.19\|25\|0.49\|85 | 589\|0.20\|25\|0.73\|85 | 641\|0.25\|25\|0.98\|85 |
| 184 | 517\|0.09\|25\|1.00\|85 | 724\|0.01\|25\|0.14\|85 | |
| 185 | 475\|0.22\|25\|0.87\|85 | 585\|0.093\|25\|0.61\|85 | 680\|0.166\|25\|1.10\|85 |
| 186 | 444\|0.68\|25\|0.49\|85 | 619\|0.25\|25\|1.0\|85 | 705\|0.34\|25\|0.83\|85 |
| 187 | 470\|1.57\|25\|1.51\|85 | 649\|0.34\|25\|1.75\|85 | 719\|0.28\|25\|0.99\|85 |
| 188 | 470\|0.22\|25\|1.34\|85 | 853\|0.72\|25\|0.76\|85 | |

A variety of polymers may be used as part of LETC system. The use of several of these polymers to make films that were then used to make laminates is described in the following examples. The absorbances at several temperature for the laminated made from the systems of Examples 189-214 are shown in Table 13.

Example 189

A LETC layer of cellulose acetate butyrate, ($M_w$ c.a. 200,000; content: 17% butyryl, 29.5% acetyl, 1.5% hydroxyl), containing 0.1 molal $CoCl_2$, 2.6 molal LiCl and 3.2 molal $ZnCl_2$ was solvent cast from 2-butanone onto a sheet of glass. After the solvent was removed, another sheet of glass was pressed onto the layer to give a layer thickness of 0.043 cm.

Example 190

A LETC layer of poly(vinyl alcohol-co-ethylene), (content: 27 mole % ethylene), containing 0.2 molal $NiBr_2:xH_2O$, 2.0 molal TBABr, 0.2 molal 4-(3-PhPr)Pyr and 1.0 molal TMOLP was solvent cast from 50% water-50% n-propanol onto a sheet of glass. After the solvent was removed, another sheet of glass was pressed onto the layer to give a layer thickness of 0.078 cm.

Example 191

A LETC system in a urethane layer was prepared by mixing 28.9 wt % molten TMOLP 7.2 wt % g-BL 14.5 wt % diethyleneglycol and 49.4 wt % Bayer Desmodur® N-3200 to give a isocyanate to hydroxyl ratio of 0.3 to 1. This polyurethane forming solvent system was made 0.12 molal in $CoBr_2$ and 0.47 molal in LiBr. The layer was allowed to cure between sheets of glass to give a layer thickness of 0.078 cm.

Example 192

A LETC system in a urethane layer was prepared by mixing 31.2 wt % molten TMOLP 15.6 wt % diethyleneglycol and 53.2 wt % Bayer Desmodur® N-3200 to give a isocyanate to hydroxyl ratio of 0.3 to 1. This polyurethane forming solvent system was made 0.06 molal in $CoBr_2$ and 0.50 molal in LiBr. The layer was allowed to cure between sheets of glass to give a layer thickness of 0.075 cm.

Example 193

A LETC system in a urethane layer was prepared by mixing 42.8 wt % molten TMOLP and 57.2 wt % Bayer Desmodur® N-3200 to give a isocyanate to hydroxyl ratio of 0.33 to 1. This polyurethane forming solvent system was made 0.11 molal in $CoBr_2$, 0.46 molal in LiBr and 0.23 molal N-propyl-2,2'-dipyridylamine. The layer was allowed to cure between sheets of glass to give a layer thickness of 0.090 cm.

Example 194

A LETC system in a urethane layer was prepared by mixing 32.1 wt % molten TMOLP, 16.0 wt % γ-BL and 51.9 wt % Bayer Desmodur® N-3200 to give a isocyanate to hydroxyl ratio of 0.4 to 1. This polyurethane forming solvent system was made 0.13 molal in $NiBr_2:xH_2O$ and 0.92 molal in TBABr. The layer was allowed to cure between sheets of glass to give a layer thickness of 0.075 cm.

Example 195

A LETC system in a urethane layer was prepared by mixing 33.9 wt % molten TMOLP, 11.3 wt % dimethylphthalate and 54.8 wt % Bayer Desmodur® N-3200 to give a isocyanate to hydroxyl ratio of 0.4 to 1. This polyurethane forming solvent system was made 0.10 molal in $NiCl_2:6H_2O$, 0.65 molal in TBACl and 0.18 molal 4-tert-butylpyridine. The layer was allowed to cure between sheets of glass to give a layer thickness of 0.075 cm.

Example 196

A LETC system in a urethane layer was prepared by mixing 27.2 wt % molten TMOLP, 6.8 wt % dimethylphthalate and 66.0 wt % Bayer Desmodur® N-3200 to give a isocyanate to hydroxyl ratio of 0.6 to 1. This polyurethane forming solvent system was made 0.11 molal in $Ni(NO_3)_2:6H_2O$, 1.10 molal in TBAI and 0.11 molal 4-tert-butylpyridine. The layer was allowed to cure between sheets of glass to give a layer thickness of 0.075 cm.

Example 197

A LETC system in a urethane layer was prepared by mixing 28.4 wt % molten TMOLP, 14.2 wt % γ-BL and 57.4 wt % Bayer Desmodur® N-3200 to give a isocyanate to hydroxyl ratio of 0.5 to 1. This polyurethane forming solvent system was made 0.25 molal in $NiBr_2:xH_2O$, 0.82 molal in TBABr and 0.51 molal 2-(2-dimethylaminoethyl)pyridine. The layer was allowed to cure between sheets of glass to give a layer thickness of 0.075 cm.

Example 198

A LETC system in a urethane layer was prepared by mixing 27.2 wt % molten TMOLP, 6.8 wt % dimethylphthalate and 66.0 wt % Bayer Desmodur® N-3200 to give a isocyanate to hydroxyl ratio of 0.6 to 1. This polyurethane forming solvent system was made 0.11 molal in $Ni(NO_3)_2:6H_2O$, 0.03 molal $Co(NO_3)_2:6H_2O$ and 1.10 molal in TBAI. The layer was allowed to cure between sheets of glass to give a layer thickness of 0.063 cm.

Example 199

A LETC layer of hydroxypropylcellulose, ($M_w$ c.a. 80,000), containing 0.10 molal $CoBr_2$, 2.0 molal LiBr, 0.22 molal N—Pr-DPamine and 4.0 molal TMOLP was solvent cast from n-propanol onto a sheet of glass. After the solvent was removed, another sheet of glass was pressed onto the layer to give a layer thickness of 0.048 cm.

Example 200

A LETC layer of hydroxypropylcellulose, ($M_w$ c.a. 80,000), containing 0.10 molal $NiBr_2:xH_2O$, 4.0 molal LiBr and 2.0 molal TMOLP was solvent cast from n-propanol onto a sheet of glass. After the solvent was removed, another sheet of glass was pressed onto the layer to give a layer thickness of 0.053 cm.

Example 201

A LETC layer of hydroxypropylcellulose, ($M_w$ c.a. 80,000), containing 0.40 molal $NiBr_2:xH_2O$, 4.0 molal LiBr, 0.44 molal N—Pr-DPamine and 0.50 molal TMOLP was solvent cast from n-propanol onto a sheet of glass. After the solvent was removed, another sheet of glass was pressed onto the layer to give a layer thickness of 0.053 cm.

Example 202

A LETC layer of hydroxypropylcellulose, ($M_w$ c.a. 80,000), containing 0.40 molal $NiBr_2:xH_2O$, 2.0 molal TBABr, 1.2 molal 1-MeBIMZ and 1.75 molal TMOLP was solvent cast from n-propanol onto a sheet of glass. After the solvent was removed, another sheet of glass was pressed onto the layer to give a layer thickness of 0.058 cm.

Example 203

A LETC layer of hydroxypropylcellulose, ($M_w$ c.a. 80,000), containing 0.07 molal $NiI_2:6H_2O$, 1.0 molal LiI, 0.35 molal $Ph_3P$ and 0.7 molal TMOLP was solvent cast from n-propanol onto a sheet of glass. After the solvent was removed, another sheet of glass was pressed onto the layer to give a layer thickness of 0.050 cm.

Example 204

A LETC layer of poly(methyl methacrylate), ($M_w$ 996,000), containing 0.10 molal $Ni(NO_3)_2:6H_2O$ and 2.0 molal TBAI was solvent cast from 2-butanone onto a sheet of glass. After the solvent was removed, another sheet of glass was pressed onto the layer to give a layer thickness of 0.030 cm.

Example 205

A LETC layer of linear poly(2-vinylpyridine), ($M_w$ ca. 40,000), containing 0.60 molal $Ni(NO_3)_2:6H_2O$, 4.0 molal LiBr and 4.0 molal TMOLP was solvent cast from ethanol onto a sheet of glass. After the solvent was removed, another sheet of glass was pressed onto the layer to give a layer thickness of 0.048 cm.

Example 206

A LETC layer of poly(vinyl acetate), ($M_w$ ca. 167,000), containing 0.40 molal $Ni(NO_3)_2:6H_2O$, 4.0 molal LiBr and 3.0 molal TMOLP was solvent cast from ethanol onto a sheet of glass. After the solvent was removed, another sheet of glass was pressed onto the layer to give a layer thickness of 0.060 cm.

Example 207

A LETC layer of poly(vinyl alcohol), ($M_w$ 13,000-23,000; 87-89% hydrolyzed), containing 0.40 molal $Ni(NO_3)_2:6H_2O$, 4.0 molal LiBr and 3.0 molal TMOLP was solvent cast from water onto a sheet of glass. After the solvent was removed, another sheet of glass was pressed onto the layer to give a layer thickness of 0.055 cm.

Example 208

A LETC layer of poly(vinyl alcohol), ($M_w$ 13,000-23,000; 87-89% hydrolyzed), containing 0.20 molal $CoBr_2$ and 0.81 molal LiBr was solvent cast from water onto a sheet of glass. After the solvent was removed, another sheet of glass was pressed onto the layer to give a layer thickness of 0.060 cm.

Example 209

A LETC layer of poly(vinyl alcohol), ($M_w$ 13,000-23,000; 87-89% hydrolyzed), containing 0.20 molal $CoBr_2$, 0.81 molal LiBr and 1.0 molal NPG was solvent cast from water onto a sheet of glass. After the solvent was removed, another sheet of glass was pressed onto the layer to give a layer thickness of 0.078 cm.

Example 210

A LETC layer of poly(vinyl alcohol), ($M_w$ 13,000-23,000; 87-89% hydrolyzed), containing 0.20 molal $CoBr_2$, 0.81 molal LiBr and 1.0 molal 1,3-butanediol was solvent cast from water onto a sheet of glass. After the solvent was removed, another sheet of glass was pressed onto the layer to give a layer thickness of 0.078 cm.

Example 211

A LETC layer of poly(vinyl alcohol), ($M_w$ 13,000-23,000; 87-89% hydrolyzed), containing 0.40 molal $NiBr_2:xH_2O$, 4.0 molal TBABr and 0.5 molal 1,3-butanediol was solvent cast from water onto a sheet of glass. After the solvent was removed, another sheet of glass was pressed onto the layer to give a layer thickness of 0.088 cm.

Example 212

A LETC layer of poly(vinyl alcohol), ($M_w$ 13,000-23,000; 87-89% hydrolyzed), containing 0.40 molal $NiCl_2:6H_2O$ and 4.0 molal choline chloride was solvent cast from water onto a sheet of glass. After the solvent was removed, another sheet of glass was pressed onto the layer to give a layer thickness of 0.088 cm.

Example 213

A LETC layer of poly(N-vinylpyrrolidone), ($M_w$ ca. 55,000), containing 0.20 molal $CoBr_2$, 2.0 molal LiBr, 2.0 molal N-propyl-2,2'-dipyridylamine and 4.0 molal TMOLP was solvent cast from ethanol onto a sheet of glass. After the solvent was removed, another sheet of glass was pressed onto the layer to give a layer thickness of 0.053 cm.

Example 214

A LETC layer of poly(N-vinylpyrrolidone), ($M_w$ ca. 55,000), containing 0.40 molal $Ni(NO_3)_2:6H_2O$, 4.0 molal LiBr and 2.0 molal TMOLP was solvent cast from ethanol onto a sheet of glass. After the solvent was removed, another sheet of glass was pressed onto the layer to give a layer thickness of 0.050 cm.

TABLE 13

Absorbance Values as a Function of Temperature at a $\lambda_{max}$ in nm

| Ex. # | $\lambda_{max}$ | 25 C. | 45 C. | 65 C. | 85 C. |
|---|---|---|---|---|---|
| 189 | 671 | 0.06 | 0.11 | 0.20 | 0.40 |
| 190 | 633 | 0.16 | 0.38 | 0.73 | 1.23 |
| 191 | 700 | 0.70 | 1.57 | 2.38 | 3.17 |
| 192 | 700 | 0.38 | 1.22 | 2.04 | 2.73 |
| 193 | 638 | 0.04 | 0.20 | 0.55 | 1.12 |
| 194 | 698 | 0.10 | 0.34 | 0.71 | 1.17 |
| 195 | 555 | 0.04 | 0.20 | 0.36 | 0.82 |
| 196 | 524 | 0.04 | 0.52 | 1.46 | 2.81 |
| 197 | 526 | 0.03 | 0.14 | 0.39 | 0.71 |
| 198 | 508 | 0.02 | 0.15 | 0.53 | 1.66 |
|  | 782 | 1.60 | 1.90 | 1.96 | 2.10 |
| 199 | 642 | 0.08 | 0.31 | 0.64 | 1.01 |
| 200 | 700 | 0.17 | 0.39 | 0.83 | 1.36 |

TABLE 13-continued

Absorbance Values as a Function of Temperature at a $\lambda_{max}$ in nm

| Ex. # | $\lambda_{max}$ | 25 C. | 45 C. | 65 C. | 85 C. |
|---|---|---|---|---|---|
| 201 | 498 | 0.11 | 0.47 | 0.77 | 1.03 |
| 202 | 600 | 0.15 | 0.49 | 1.02 | 1.49 |
| 203 | 561 | 0.17 | 0.32 | 0.67 | 1.33 |
| 204 | 506 | 0.13 | 0.33 | 0.96 | 1.98 |
| 205 | 552 | 0.11 | 0.24 | 0.43 | 0.60 |
| 206 | 698 | 0.13 | 0.28 | 0.52 | 0.96 |
| 207 | 665 | 0.10 | 0.25 | 0.55 | 0.88 |
| 208 | 702 | 0.65 | 0.66 | 1.00 | 1.87 |
| 209 | 701 | 0.30 | 0.41 | 0.87 | 1.73 |
| 210 | 701 | 0.31 | 0.44 | 1.19 | 1.90 |
| 211 | 705 | 0.11 | 0.37 | 0.73 | 1.20 |
| 212 | 653 | 0.26 | 0.64 | 1.35 | 2.08 |
| 213 | 642 | 0.17 | 0.48 | 1.12 | 1.62 |
| 214 | 703 | 0.13 | 0.28 | 0.56 | 0.84 |

Examples of various LETC system prepared by solvent casting with various types of PVB are given in Table 14. The Butvar® and Solutia® type PVB's are available from Solutia Incorporated of Saint Louis, Mo. The CCP B-1776 is available from Chang Chun Petrochemical Co. Ltd. of Taipei, Taiwan. The Aldrich PVB is available from Aldrich Chemical Company of Milwaukee, Wis. The numbers in front of the materials in the table are molal concentration with the PVB being the main solvent in each case. Satisfactory to excellent LETC layers were obtained with these various samples.

Examples 226 to 278 in Table 15 involve extrusion with various LETC systems which comprise Butvar® B-90 as solid polymer solvent. Extrusions were made with a Brabender conical twin screw extruder with counter rotating screws. In example 263 the powders were first extruded as rope and the rope was chopped into pellets. The pellets were fed back into the extruder and a very uniform film was produced for thickness or gage and for uniformity of composition and coloration, i.e. uniform optical density when heated as part of a laminate between sheets of glass. Laminates were made, from each film placed between two pieces of plain glass, in a heated platen press or by heating in a heated vacuum bag. All of the laminates showed good thermochromic activity when heated by various means and good durability when exposed to sunlight, especially those containing stabilizer additives. When films were extruded from formulations, where the metal ions were added as a complex, it was easier to maintain constant feed of the powders into the extruder and there was an improvement in the uniformity of the extruded film. Laminates that were prepared from films made from powders dried before feeding into the extruder, (see Notes in Table 15), showed improved performance and had better durability during sunlight exposure.

TABLE 14

| Ex. # | Metal Salt | HeL(1) | HeL(2) | LeL(1) | PVB Type | Hydroxyl Content |
|---|---|---|---|---|---|---|
| 215 | 0.4 m NiBr$_2$ xH$_2$0 | 2.02 m TBABr | | 1.75 m TMOLP | Butvar® B-72 | 17.5-20.0% wt |
| 216 | 0.4 m NiBr$_2$ xH$_2$0 | 2.02 m TBABr | | 1.75 m TMOLP | Butvar® B-74 | 17.5-20.0% wt |
| 217 | 0.4 m NiBr$_2$ xH$_2$0 | 2.02 m TBABr | | 1.75 m TMOLP | Butvar® B-76 | 11.0-13.0% wt |
| 218 | 0.4 m NiBr$_2$ xH$_2$0 | 2.02 m TBABr | | 1.75 m TMOLP | Butvar® B-79 | 10.5-13.0% wt |
| 219 | 0.4 m NiBr$_2$ xH$_2$0 | 2.02 m TBABr | | 1.75 m TMOLP | Butvar® B-90 | 18.0-20.0% wt |
| 220 | 0.4 m NiBr$_2$ xH$_2$0 | 2.02 m TBABr | | 1.75 m TMOLP | Butvar® B-98 | 18.0-20.0% wt |
| 221 | 0.07 m NiI$_2$(Ph$_3$P)$_2$ | 0.7 m TBAI | 0.2 m PPh3 | 0.4 m TMOLP | Solutia® RA-41 | N/A |
| 222 | 0.07 m NiI$_2$(Ph$_3$P)$_2$ | 0.7 m TBAI | 0.2 m PPh3 | 0.4 m TMOLP | Solutia® DMJ1 | N/A |
| 223 | 0.07 m NiI$_2$ xH$_2$0 | 0.75 m TBAI | | | Butvar® SBTG | N/A |
| 224 | 0.07 m NiI$_2$ xH$_2$0 | 0.75 m TBAI | | | CCP B-1776 | N/A |
| 225 | 0.07 m NiI$_2$ xH$_2$0 | 0.75 m TBAI | | | Aldrich 18,2567 | N/A |

TABLE 15

Extruder Examples

| Ex. # | Metal Salt/Complex | HєL | HєL | LєL | Additive(s)* | Note |
|---|---|---|---|---|---|---|
| 226 | 0.20 m NiBr₂ xH₂0 | 2.0 m TBABr | | 0.50 m TMOLP | | |
| 227 | 0.07 m NiI₂ xH₂0 | 0.7 m TBAI | 0.35 m Ph₃P | 0.40 m TMOLP | | |
| 228 | 0.07 m NiI2 xH₂0 | 0.75 m TBAI | | | | |
| 229 | 0.20 m NiBr₂ xH₂0 | 2.0 m TBABr | 0.60 m 1-MeBIMZ | 1.25 m TMOLP | | |
| 230 | 0.07 m NiI₂ xH₂0 | 0.75 m TBAI | | | | |
| 231 | 0.20 m CoBr₂ | 0.81 m LiBr | | 2.09 m TMOLP | | |
| 232 | 0.07 m Co(NO₃)₂ 6H₂O | 0.70 m TBAI | 0.70 m Ph₃P | 1.0 m TMOLP | | |
| 233 | 0.20 m NiBr₂ xH₂0 | 0.60 m TBABr | 0.40 m 1-MeBIMZ | 0.50 m TMOLP | | |
| 234 | 0.10 m CoBr₂ | 0.60 m TBABr | | 1.75 m TMOLP | | |
| 235 | 0.20 m NiBr₂ xH₂0 | 0.60 m TBABr | 0.40 m 1-MeBIMZ | 3.50 m NPG | | |
| 236 | 0.20 m NiBr₂ xH₂0 | 0.60 m TBABr | 0.40 m 1-MeBIMZ | 3.0 m NPG | | dried |
| 237 | 0.20 m NiBr₂ xH₂0 | 0.60 m TBABr | 0.40 m 1-MeBIMZ | 3.22 m NPG | | |
| 238 | 0.07 m NiBr₂ xH₂0 | 0.7 m TBAI | 0.35 m Ph₃P | 0.40 m TMOLP | | |
| 239 | 0.20 m NiBr₂ xH₂0 | 0.60 m TBABr | 0.40 m 1-EtBIMZ | 1.93 m NPG | | |
| 240 | 0.10 m NiBr₂ xH₂0 | 0.60 m TBABr | 0.40 m 1-EtBIMZ | 2.5 m NPG | | |
| 241 | 0.10 m NiBr₂ xH₂0 | 0.80 m TBABr | 0.80 m Ph₃P | 0.80 m TMOLP | | |
| 242 | 0.07 m NiI₂(Ph₃P)₂ | 0.70 m TBAI | 0.20 m Ph₃P | 0.40 m TMOLP | | |
| 243 | 0.17 m Ni(1-EtBIMZ)₂Br₂ | 0.60 m TBABr | 0.06 m 1-EtBIMZ | 1.93 m NPG | | |
| 244 | 0.07 m NiI₂(Ph₃P)₂ | 0.70 m TBAI | 0.20 m Ph₃P | 2.5 m NPG | | |
| 245 | 0.10 m CoBr₂ | 0.60 m TBABr | | 2.25 m TMOLP | 0.50% Tinuvin 326 | |
| 246 | 0.20 m NiBr₂ xH₂0 | 2.0 m TBABr | | 1.00 m TMOLP | | |
| 247 | 0.17 m Ni(1-EtBIMZ)₂Br₂ | 1.00 m LiBr | | 1.75 m NPG | | |
| 248 | 0.17 m Ni(1-EtBIMZ)₂Br₂ | 1.00 m LiBr | | 0.50 m TMOLP | | |
| 249 | 0.20 m NiI₂(Ph₃P)₂ | 1.00 m TBAI | 0.40 m 1-EtBIMZ | 0.50 m TMOLP | | |
| 250 | 0.10 m CoBr₂ | 0.60 m TBABr | 0.20 m PPh3 | 2.25 m TMOLP | | |
| 251 | 0.07 m NiI₂(Ph₃P)₂ | 0.70 m TBAI | 0.20 m Ph₃P | 0.40 m TMOLP | | |
| 252 | 0.17 m Ni(1-EtBIMZ)₂Br₂ | 0.60 m TBABr | | 1.93 m NPG | | |
| 253 | 0.20 m Ni(1-EtBIMZ)₂Br₂ | 0.60 m TBABr | | 0.50 m TMOLP | | |
| 254 | 0.07 m NiI₂(Ph₃P)₂ | 0.70 m TBAI | 0.20 m Ph₃P | 0.40 m TMOLP | 0.14% Tinuvin 144 | |
| 255 | 0.20 m Ni(1-EtBIMZ)₂Br₂ | 0.60 m TBABr | | 1.93 m NPG | 0.47% Tinuvin 405 | |
| 256 | 0.10 m CoBr₂ | 0.60 m TBABr | | 2.25 m TMOLP | 0.52% Tinuvin 405 | |
| 257 | 0.07 m NiI₂(Ph₃P)₂ | 0.70 m TBAI | 0.20 m Ph₃P | 0.40 m TMOLP | 0.49% Tinuvin 144 | dried |
| 258 | 0.20 m NiBr₂ xH₂0 | 2.0 m TBABr | | 0.50 m TMOLP | 0.50% Tinuvin 405 | |
| 259 | 0.20 m NiBr₂ xH₂0 | 2.0 m TBABr | | 4.00 m NPG | 0.41% Tinuvin 405 | |
| 260 | 0.07 m NiI₂(Ph₃P)₂ | 0.70 m TBAI | 0.20 m Ph₃P | 0.40 m TMOLP | 0.49% Tinuvin 144 | dried |
| 261 | 0.20 m Ni(1-EtBIMZ)₂Br₂ | 0.60 m TBABr | | 1.93 m NPG | 0.47% Tinuvin 405 | |

TABLE 15-continued

Extruder Examples

| Ex. # | Metal Salt/Complex | HeL | HeL | LeL | Additive(s)* | Note |
|---|---|---|---|---|---|---|
| 262 | 0.20 m Ni(1-EtBIMZ)$_2$Br$_2$ | 0.60 m TBABr | | 1.93 m NPG | 0.42% Tinuvin 405 10% Plasticizer** | |
| 263 | 0.20 m Ni(1-EtBIMZ)$_2$Br$_2$ | 0.60 m TBABr | | 1.93 m NPG | 0.47% Tinuvin 405 | from pellets |
| 264 | 0.07 m NiI$_2$(Ph$_3$P)$_2$ | 0.70 m TBAI | 0.20 m Ph$_3$P | 0.60 m TMOLP | 0.48% Tinuvin 144 | dried |
| 265 | 0.20 m Ni(1-EtBIMZ)$_2$Br$_2$ | 0.60 m TBABr | | 1.93 m NPG | 0.47% Tinuvin 405 | dried |
| 266 | 0.20 m NiBr$_2$ xH$_2$0 | 2.0 m TBABr | | 1.25 m TMOLP | 0.50% Tinuvin 326 | dried |
| 267 | 0.20 m Ni(1-EtBIMZ)$_2$Br$_2$ | 0.60 m TBABr | | 1.93 m NPG | 0.47% Tinuvin 405 | dried |
| 268 | 0.20 m NiBr$_2$ xH$_2$0 | 2.0 m TBABr | | 1.25 m TMOLP | 0.50% Tinuvin 326 | dried |
| 269 | 0.07 m NiI$_2$(Ph$_3$P)$_2$ | 0.70 m TBAI | 0.20 m Ph$_3$P | 0.60 m TMOLP | 0.48% Tinuvin 144 | dried |
| 270 | 0.07 m NiI$_2$(Ph$_3$P)$_2$ | 0.70 m TBAI | 0.20 m Ph$_3$P | 0.60 m TMOLP | 0.50% Tinuvin 144 | dried |
| 271 | 0.20 m Ni(1-EtBIMZ)$_2$Br$_2$ | 0.60 m TBABr | | 1.93 m NPG | 0.50% Tinuvin 326 | |
| 272 | 0.20 m Ni(1-EtBIMZ)$_2$Br$_2$ | 0.60 m TBABr | | 1.93 m NPG | 0.50% Tinuvin 144 | dried |
| 273 | 0.20 m NiBr$_2$ xH$_2$0 | 2.0 m TBABr | | 1.25 m TMOLP | 0.50% Tinuvin 144 | dried |
| 274 | | | | | 0.50% Tinuvin 326 | |
| 275 | 0.07 m NiI$_2$(Ph$_3$P)$_2$ | 0.70 m TBAI | 0.20 m Ph$_3$P | 0.50 m TMOLP | 0.50% Tinuvin 144 | dried |
| 276 | 0.07 m NiI$_2$(Ph$_3$P)$_2$ | 0.70 m TBAI | 0.20 m Ph$_3$P | 0.50 m TMOLP | 0.50% Tinuvin 144 | dried |
| 277 | | | | | 0.50% Tinuvin 326 | |
| 278 | 0.20 m Ni(1-EtBIMZ)$_2$Br$_2$ | 0.60 m TBABr | | 1.93 m NPG | 0.50% Tinuvin 144 | dried |

*% given as weight % of total formulation
**plasticizer = triethyleneglycol-bis(2-ethylhexonate)

FIGS. 51 to 57 relate to Examples 279 to 285. The figures show the spectra measured at 25 C, 45 C, 65 C and 85 C with an Ocean Optics 2000 diode array spectrometer. For each spectrum in FIGS. 51 to 58, the absorbance spectrum of a reference sample, made with the same type of float glass and a plain piece of PVB film, was subtracted out. Thus the spectral data are for the LETC films alone. In each case the spectrum with the lowest absorbance corresponds to 25 C, the next highest absorbance spectrum corresponds to 45 C and so on such that the spectrum with highest absorbance peaks in each figure corresponds to that measured at 85 C. In all the FIGS. 51 to 58, the x axis, (horizontal axis), gives the wavelengths in nanometers and the y axis, (vertical axis), gives the absorbance values.

Example 279

A physically blended mixture of powders was made by stirring 38 grams of Ni(PPh$_3$)$_2$I$_2$, 165 grams of TBAI, 4.4 grams of Tinuvin® 144, 33 grams of PPh$_3$ and 34 grams of TMOLP into 633 grams of PVB, (Butvar® B-90). This mixture was extruded to give a LETC film which varied from about 0.03 microns to about 0.09 centimeters thick. A piece of this film that was 0.031 centimeters thick was used to laminate two sheets of plain float glass together. The laminate was very light tan in color and changed to dark red on heating. The spectrum of the laminate was measured at 25 C, 45 C, 65 C and 85 C. By subtracting out a reference sample, the spectral data for the film alone were calculated and plotted in FIG. 51.

Example 280

A physically blended mixture of powders was made by stirring 71.5 grams of Ni(1-EtBIMZ)$_2$Br$_2$, 139.5 grams of TBABr, 5.0 grams of Tinuvin® 405 and 144 grams of NPG into 715 grams of PVB, (Butvar® B-90). This mixture was extruded to give a LETC film which varied from about 0.04 to about 0.09 centimeters thick. A piece of this film that was 0.060 centimeters thick was used to laminate two sheets of plain float glass together. The laminate was light blue in color and changed to dark blue on heating. The spectrum of the laminate was measured at 25 C, 45 C, 65 C and 85 C. By subtracting out a reference sample, the spectral data for the film alone were calculated and plotted in FIG. 52.

Example 281

A physically blended mixture of powders was made by stirring 6.99 grams of CoBr$_2$, 60.1 grams of TBABr and 73.6 grams of TMOLP into 313.0 grams of PVB powder, (Butvar® B-90). This mixture was extruded to give a LETC film which varied from about 0.04 to about 0.09 centimeters thick. A piece of this film that was 0.054 centimeters thick was used to laminate two sheets of plain float glass together. The laminate was nearly colorless and changed to light blue on heating. The spectrum of the laminate was measured at 25 C, 45 C, 65 C and 85 C. By subtracting out a reference sample, the spectral data for the film alone were calculated and plotted in FIG. 53.

Example 282

A physically blended mixture of powders was made by stirring 33.0 grams of $NiBr_2.xH_2O$, 388.1 grams of TBABr, 5.7 grams of Tinuvin® 326, 5.7 grams of Tinuvin® 144 and 100.9 grams of TMOLP into 600.7 grams of PVB powder, (Butvar® B-90). This mixture was extruded to give film which varied from about 0.04 to about 0.11 centimeters thick. A piece of this film that was 0.098 centimeters thick was used to laminate two sheets of plain float glass together. The laminate was light green and changed to light blue on heating. The spectrum of the laminate was measured at 25 C, 45 C, 65 C and 85 C. By subtracting out a reference sample, the spectral data for the film alone were calculated and plotted in FIG. 54.

Example 283

A multilayer laminate was made with a 350 micron thick layer similar to the material of example 279 and a 460 micron thick layer similar to the material of example 280. Prior to lamination, a 100 micron film of poly(ester terephthalate) was placed between the PVB films and the 3 layers of film stack was laminated between 2 sheets of plain float glass. The spectrum of the laminate was measured at 25 C, 45 C, 65 C and 85 C. By subtracting out a reference sample, the spectral data for the film stack alone were calculated and plotted in FIG. 55. The values of L*, a*, b* and Y for films making up the laminate are given in the Table 16 at various temperatures.

TABLE 16

| | Temperature (C.) | | | |
|---|---|---|---|---|
| | 25 C. | 45 C. | 65 C. | 85 C. |
| Y | 91.5 | 79.7 | 45.6 | 12.4 |
| a* | −4.1 | −4.0 | −2.5 | 1.9 |
| b* | 4.0 | 5.6 | 8.4 | 12.3 |
| c* | 5.7 | 6.8 | 8.8 | 12.5 |

Example 284

A multilayer laminate was made with a 350 micron thick layer similar to the material of example 279, a 520 micron thick layer similar to the material of example 280 and a 220 micron thick layer similar to the material of example 281. Prior to lamination, 200 micron thick films of poly(ester terephthalate) were place between the films of PVB and the 5 layers of film stack was laminated between 2 sheets of plain float glass. The spectrum of the laminate was measured at 25 C, 45 C, 65 C and 85 C. By subtracting out a reference sample, the spectral data for the film stack alone were calculated and plotted in FIG. 56. The values of L*, a*, b* and Y for films making up the laminate are given in the Table 17 at various temperatures.

TABLE 17

| | Temperature (C.) | | | |
|---|---|---|---|---|
| | 25 C. | 45 C. | 65 C. | 85 C. |
| Y | 82.8 | 66.0 | 29.0 | 5.3 |
| a* | −5.0 | −6.6 | −7.9 | −6.7 |
| b* | 5.2 | 6.0 | 6.1 | 7.2 |
| c* | 7.2 | 8.9 | 10.0 | 9.8 |

Example 285

A multilayer laminate was made with a 430 micron thick layer similar to the material of example 279, a 300 micron thick layer similar to the material of example 280 and a 590 micron thick layer of the material from example 282. Prior to lamination, 200 micron thick films of polycarbonate were place between the films of PVB and the 5 layers of film stack was laminated between 2 sheets of plain float glass. The spectrum of the laminate was measured at 25 C, 45 C, 65 C and 85 C. By subtracting out a reference sample, the spectral data for the film stack alone were calculated and plotted in FIG. 57. The values of L*, a*, b* and Y for films making up the laminate are given in the Table 18 at various temperatures.

TABLE 18

| | Temperature (C.) | | | |
|---|---|---|---|---|
| | 25 C. | 45 C. | 65 C. | 85 C. |
| Y | 85.9 | 58.1 | 25.4 | 5.8 |
| a* | −8.0 | −8.5 | −8.6 | −5.2 |
| b* | 6.3 | 6.9 | 5.7 | 8.7 |
| c* | 10.2 | 11.0 | 10.3 | 10.1 |

Example 286

Three laminates were prepared by laminating a film stack like that disclosed in Example 285, except that poly(ester-terephthalate) film was used for the separators. These laminates were used as the center panes of a triple pane insulated glass units. The insulated glass units were each placed on a box to simulate a vertically glazed, window unit in a building. In each window unit, the pane that was closest to the interior of the box had a Solarban® 60, low-e coating on the surface that faced the center pane, thermochromic laminate. Solarban® 60 is available from PPG of Pittsburgh, Pa. The exterior pane in each case was clear, i.e. plain glass. The air space between the exterior pane and the thermochromic laminate was 0.38 inches and the air space between the thermochromic laminate and low-e coated pane was 0.5 inches.

The window units were placed outdoors and exposed to sunlight. One of the window units was oriented to face east, one faced south and the third faced west. During the day the directness of sunlight on each window varied with the time of day as the earth rotated. The east facing window was observed to tint to a dark gray appearance in the morning, the south facing window tinted dark gray in during midday and west facing window darkened to very dark gray in the late afternoon and evening. The experiment was conducted on a sunny day in Michigan in August. The visible, white light transmission value, Y, of each laminate had previously been measured as a function of the temperature of that laminate. The temperature of each laminate was measured and recorded throughout the day. The temperature measurements were used to calculate the visible, white light transmission changes throughout the day due to sunlight exposure.

Figure 50:
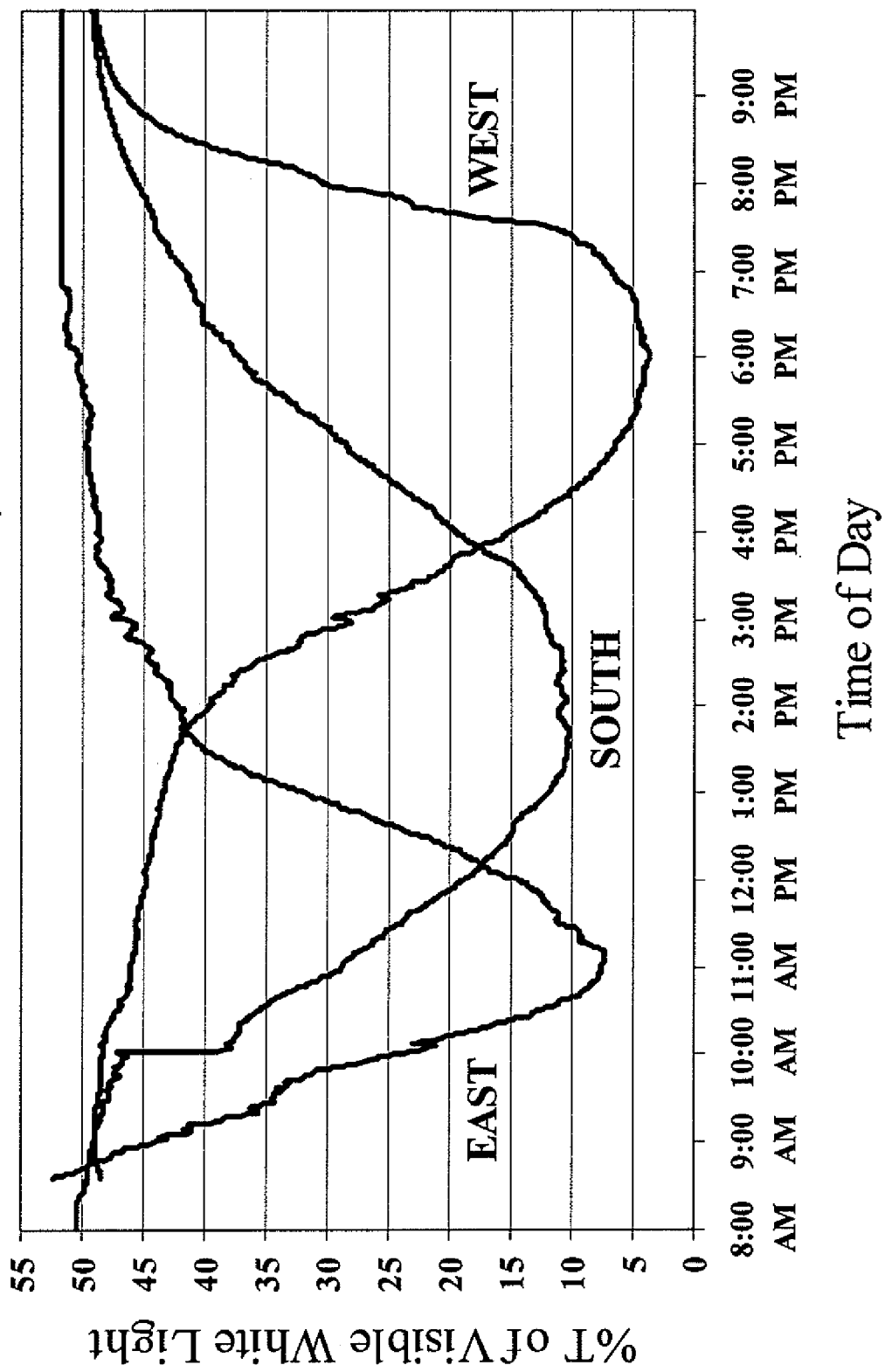
FIG. 50 is a plot of Transmission of SRT™ vertically positioned windows based on time of day and direction.
Figure 51:
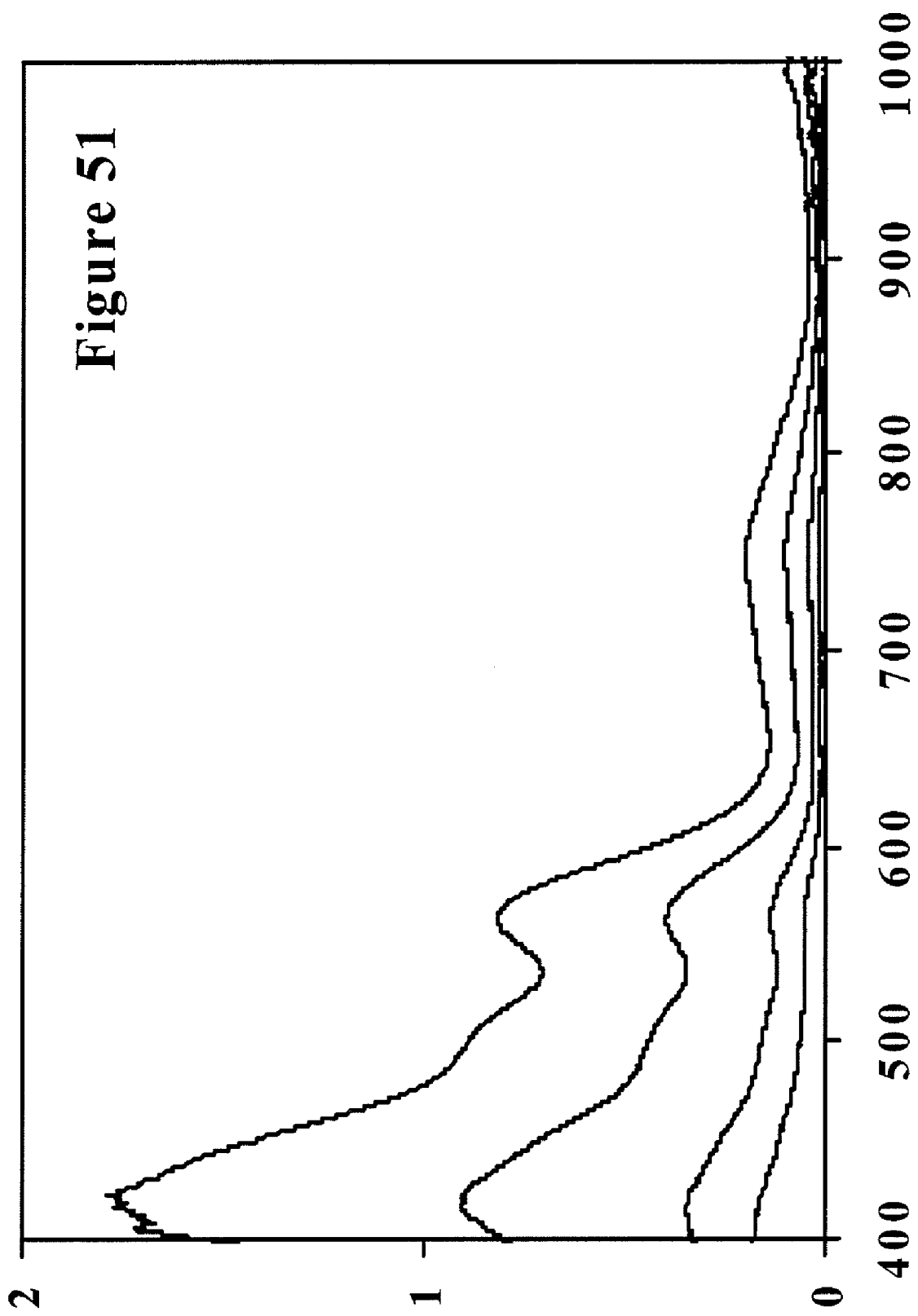
FIG. 51-57 are absorption spectra for the systems described in Examples 279-285, respectively.
Figure 52:
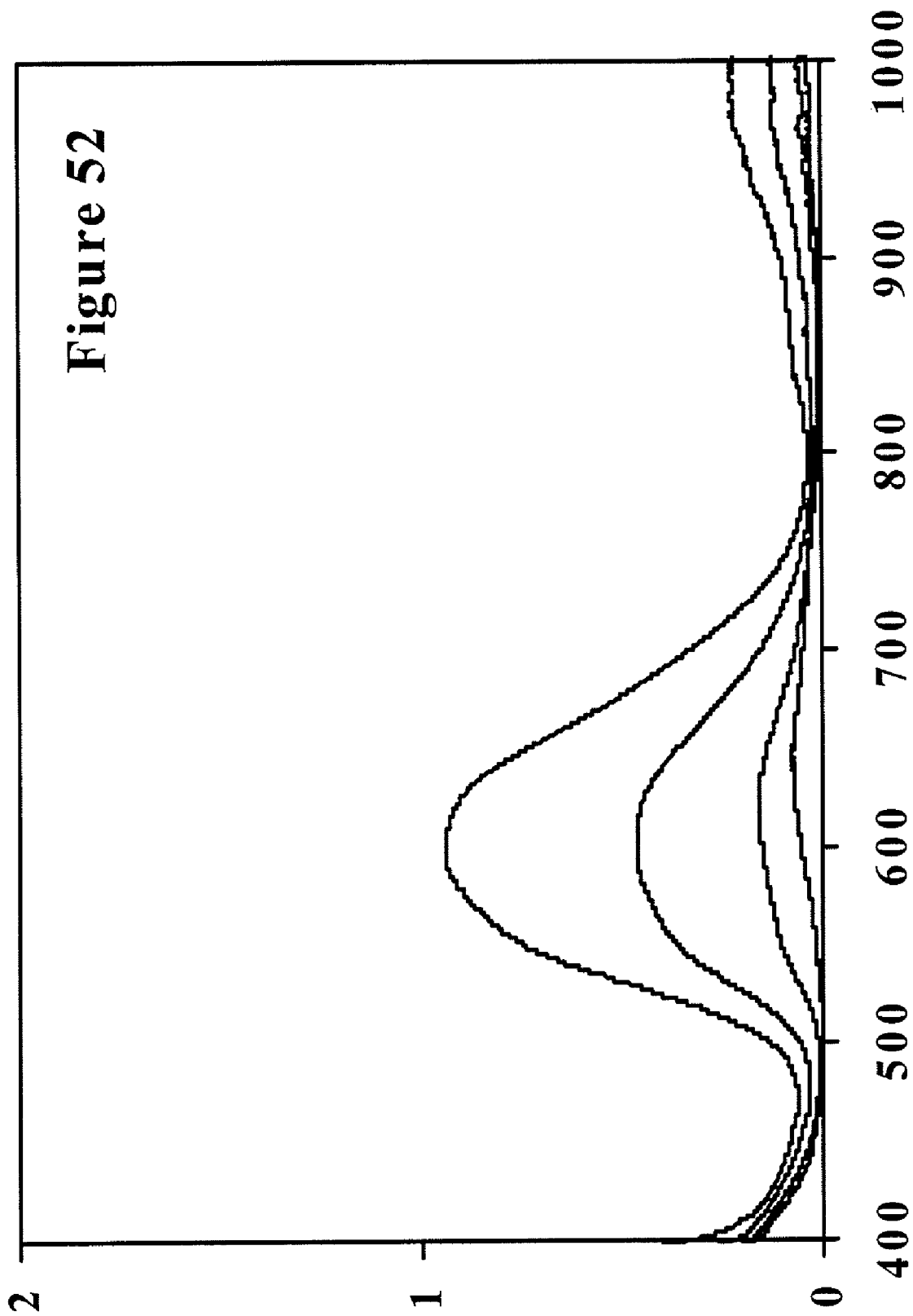
Figure 53:
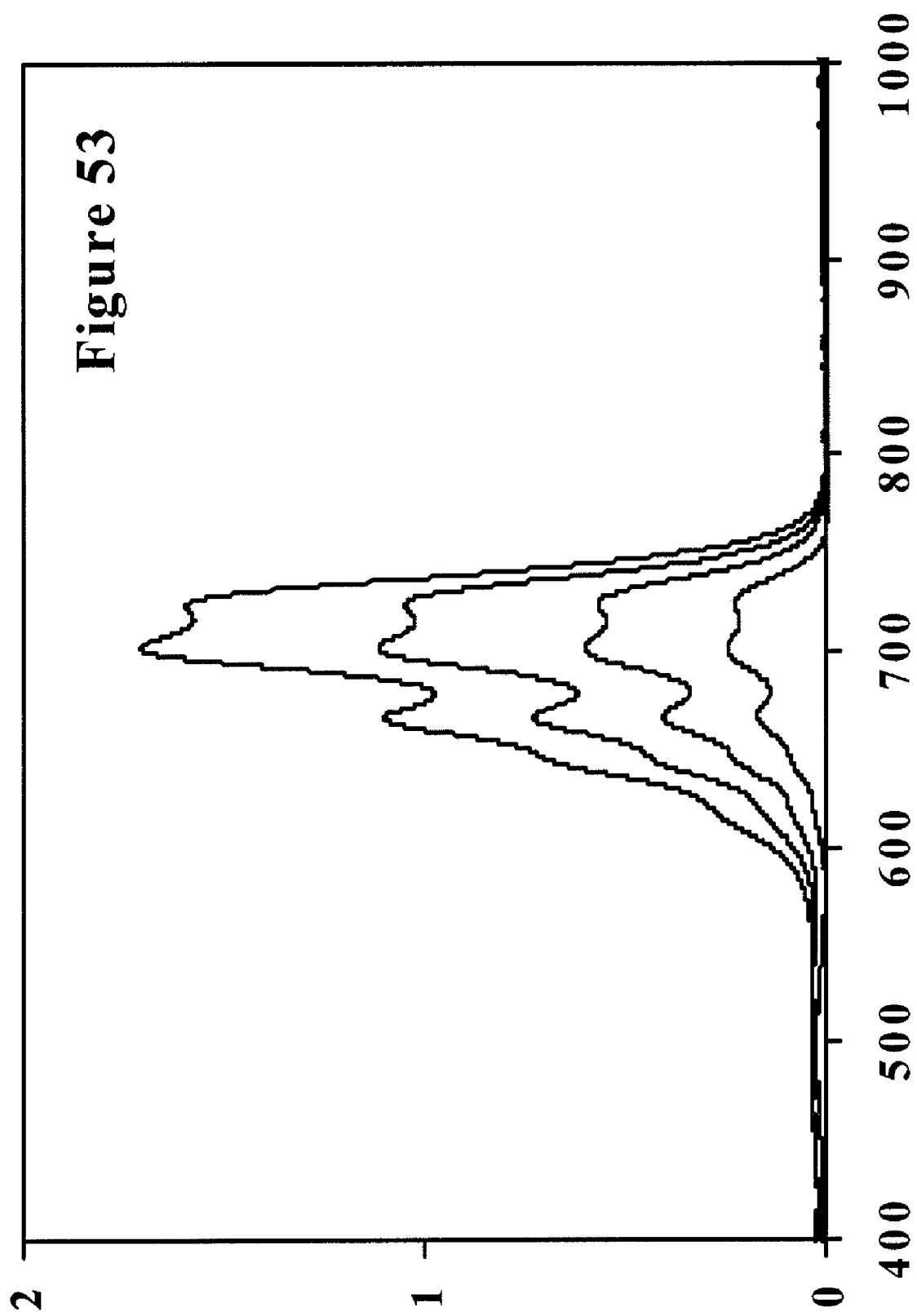

The calculated transmission data are plotted as a function the time of day for each of the thermochromic laminates in FIG. 50. The curves in FIG. 50 show the remarkable sunlight responsiveness of our LETC systems in our SRT™ configurations. This kind of response allows the windows to darken and provide energy savings any time of the day, any day of the year and at any location or orientation on a building or vehicle. This response is just due to the directness of the sunlight and the window tint just to the level desired to relieve heat load and glare, while still provide significant daylighting. Similar sunlight induced thermochromic tinting has been observed on numerous occasions for triple pane units and even double pane units glazed into a building. Occupants of the building experienced relief from heat load and glare during direct sunlight exposure of the windows.

In Examples 287 to 293, LETC layers were prepared by extrusion with the following composition:

0.07 m $NiI_2(Ph_3P)_2$ 0.7 m TBAI 0.2 m $Ph_3P$ 0.4 m TMOLP 0.49 wt % Tinuvin® 144 in Butvar® B-90 PVB

The layers were treated as described below and the durability of the laminates was tested for long term exposure at 80 C. Tables 19 to 25 give the measured absorbance values at 25 C and 85 C at 425 nm and 565 nm as a function of time for the laminate of the LETC layer in an 80 C oven in the dark.

Example 287

The LETC layer was exposed to room humidity for 24 hours and then was laminated between two pieces of glass and the edge was sealed with epoxy. The absorbance data in Table 19 show a significant increase in the absorbances at both wavelength and both measured temperatures as a result of heat exposure.

TABLE 19

| Hours at 80 C. | Absorbance 425 nm\|25 C. | Absorbance 425 nm\|85 C. | Absorbance 565 nm\|25 C. | Absorbance 565 nm\|85 C. |
|---|---|---|---|---|
| 0 | 0.10 | 1.17 | 0.06 | 0.57 |
| 409 | 0.19 | 2.06 | 0.08 | 1.03 |
| 1035 | 0.38 | 2.68 | 0.14 | 1.36 |
| 2591 | 0.80 | 2.70 | 0.25 | 1.38 |

Example 288

A piece of the LETC layer was laminated between pieces of glass shortly after the layer was extruded but without pre-drying the layer. The laminate was not scaled. The measured absorbances irreversibly increased with time at 80 C in the center of the laminate, as shown by the data in Table 20. Also, the unsealed edges of the layer turned colorless and then yellow and showed no thermochromic activity.

TABLE 20

| Hours at 80 C. | Absorbance 425 nm\|25 C. | Absorbance 425 nm\|85 C. | Absorbance 565 nm\|25 C. | Absorbance 565 nm\|85 C. |
|---|---|---|---|---|
| 0 | 0.17 | 2.85 | 0.09 | 1.40 |
| 362 | 0.42 | 3.10 | 0.16 | 2.06 |
| 1130 | 0.82 | max | 0.29 | 2.52 |
| 2998 | 1.32 | max | 0.42 | 2.60 | max ≈ 3.5 absorbance units

Example 289

A piece of the LETC layer was vacuum dried at room temperature for about 20 hours before lamination. The edge of the laminate was sealed with epoxy. This amount of drying had little impact on stability as seen by the irreversible absorbance increases over time in the Table 21.

TABLE 21

| Hours at 80 C. | Absorbance 425 nm\|25 C. | Absorbance 425 nm\|85 C. | Absorbance 565 nm\|25 C. | Absorbance 565 nm\|85 C. |
|---|---|---|---|---|
| 0 | 0.18 | 1.60 | 0.07 | 0.73 |
| 409 | 0.39 | 2.65 | 0.12 | 1.59 |
| 1035 | 0.81 | 2.66 | 0.27 | 1.92 |
| 2591 | 1.72 | 2.82 | 0.57 | 1.90 |

Example 290

A piece of the LETC layer was extruded where all of the components were pre-dried prior to extrusion. The layer produced by extrusion was stored in vacuum over desiccant. This pre and post dried layer was laminated between pieces of glass and the edges were sealed with epoxy. The measured absorbance values given in Table 22 show much greater stability for thermochromic activity on exposure to 80 C.

TABLE 22

| Hours at 80 C. | Absorbance 425 nm\|25 C. | Absorbance 425 nm\|85 C. | Absorbance 565 nm\|25 C. | Absorbance 565 nm\|85 C. |
|---|---|---|---|---|
| 0 | 0.23 | 1.82 | 0.10 | 0.87 |
| 640 | 0.23 | 1.85 | 0.09 | 0.85 |
| 1701 | 0.33 | 1.71 | 0.09 | 0.77 |
| 2393 | 0.39 | 1.69 | 0.09 | 0.72 | experiment in Example 290 was repeated in another extrusion run the resulting laminate also showed improved stability as shown in the Table 23.

TABLE 23

| Hours at 80 C. | Absorbance 425\|25 C. | Absorbance 425\|85 C. | Absorbance 565\|25 C. | Absorbance 565\|85 C. |
|---|---|---|---|---|
| 0 | 0.14 | 1.38 | 0.07 | 0.67 |
| 502 | 0.16 | 1.36 | 0.07 | 0.63 |
| 766 | 0.18 | 1.36 | 0.07 | 0.64 |
| 1847 | 0.19 | 1.45 | 0.07 | 0.65 |

Example 292

A thermochromic layer was prepared by solvent casting a thermochromic layer from n-propanol. The layer contained:
0.07 m $NiI_2(ph_3P)_2$
0.7 m TBAI
0.2 $mPh_3P$
0.4 m TMOLP
in Butvar® B-90 PVB the molal value were only with respect to the amount of PVB, but the entire LETC layer was made 15 weight % in triethyleneglycol bis(2-ethylhexanoate). As part of the solvent casting process the layer was thoroughly dried at 80 C under nitrogen. The layer was laminated between pieces of glass and edge sealed with epoxy. The laminate showed improved stability during storage at 80 C as shown by the absorbance values in Table 24.

TABLE 24

| Hours at 80 C. | Absorbance 425 nm\|25 C. | Absorbance 425 nm\|85 C. | Absorbance 565 nm\|25 C. | Absorbance 565 nm\| 85 C. |
|---|---|---|---|---|
| 0 | 0.17 | 1.99 | 0.11 | 0.94 |
| 2247 | 0.30 | 2.09 | 0.13 | 0.99 |
| 2967 | 0.33 | 2.10 | 0.14 | 1.02 |
| 3687 | 0.35 | 1.81 | 0.14 | 0.86 |

Example 293

A thermochromic layer like that in Example 292 was prepared except the triethyleneglycol bis(2-ethylhexanoate) content of the layer was 20 weight %. The laminate again showed improved stability during storage at 80 C as shown by the absorbance values in Table 25.

TABLE 25

| Hours at 80 C. | Absorbance 425 nm\|25 C. | Absorbance 425 nm\|85 C. | Absorbance 565 nm\|25 C. | Absorbance 565 nm\| 85 C. |
|---|---|---|---|---|
| 0 | 0.22 | 2.40 | 0.14 | 1.18 |
| 2247 | 0.27 | 2.34 | 0.15 | 1.09 |
| 2967 | 0.27 | 2.15 | 0.15 | 1.07 |
| 3687 | 0.28 | 1.91 | 0.15 | 0.90 |

Example 294

Thermochromic layers with the following compositions:

| Composition A | Composition B |
|---|---|
| 0.1 m $(TBA)_2NiI_4$ | 0.2 m $(TBA)_2NiBr_4$ |
| 0.11 m 4-(3-PhPr)Pyr | 0.4 m 1-butylimidazole |
| 0.3 m TBAI | 0.2 m TBABr |
| 0.005 m $Ph_3P$ | 0.5 m NPG |
| 0.07 m TMOLP | in Butvar ® B-90 |
| 1 wt % Tinuvin ® 405 | in Butvar ® B-90 | were prepared by extrusion. A 0.03 cm thick layer with Composition A was placed on one side of a separator that was 0.0076 cm thick layer of poly(ester terephthalate) which was excited on both sides by glow-discharge and labeled as Southwall "HB3/75 Glow 2-sided" available from Southwall Technologies Inc. of Palo Alto, Calif. Two layers with Composition B, totaling 0.09 cm thick, were placed on the other side of the separator. The polymer layer stack was placed between sheets of clear, plain, soda-lime float glass and a laminate was formed in a heated vacuum bag. The spectrum of the laminate was measured at 25 C, 45 C, 65 C and 85 C. By subtracting out a reference sample, the spectral data for the film stack alone were calculated and plotted in FIG. 58. The values of L*, a*, b* and Y for films making up the laminate are given in the Table 26 at various temperatures.

TABLE 26

| | Temperature (C.) | | | |
|---|---|---|---|---|
| | 25 C. | 45 C. | 65 C. | 85 C. |
| Y | 75.6 | 61.1 | 29.8 | 7.9 |
| a* | −12.7 | −13.9 | −11.8 | −5.1 |
| b* | 16.2 | 12.4 | 5.7 | 4.4 |
| c* | 20.5 | 18.3 | 13.1 | 6.7 |

The information in Table 27 along with the key section of Table 27 give the formulations of liquid solution LETC systems for Examples 295-1025. In each case the solution was prepared by dissolving the materials indicated in 5 milliliters of the solvent listed at the heading of each section of Table 27. In each example, some of the solution was placed in a 1 cm borosilicate cuvette, a small stir bar was placed in the cuvette and the cuvette was placed in the sample beam of a Shimadzu UV-3101 PC spectrophotometer. The solution was stirred and heated and the temperature was monitored with a thermocouple immersed in the solution in the cuvette. A similar, unheated 1 cm cuvette containing only the solvent was placed in the reference beam of the spectrophotometer. The absorption spectrum was measured at various temperatures and the wavelengths of maximum absorbance, $\lambda_{max}$, and the absorbance at these values of $\lambda_{max}$ were recorded for each temperature of interest. Table 27 shows the LETC performance at various temperatures for selected values of $\lambda_{max}$ in a format $\lambda_{max}|A_L|T_L|A_H|T_H$. $A_L$ is the absorbance measured at a lower temperature, $T_L$, and $A_H$ is the absorbance measured at a higher temperature, $T_H$, at the $\lambda_{max}$ indicated. For the examples in Table 27, the molarity values were calculated based on an assumed 5 ml total solution volume. Volume changes due to components dissolved in the 5 ml of solvent were not considered.

In Table 27 the Solvent May Act as Part or all of the L∈L.

Each solution was cycled back and forth between hot and cold and the amount of TC activity appeared remained consistent, i.e. on cooling the solution decreased back to its original color and appearance.

The key section also gives the synthesis for all the materials used in LETC systems that are not commercially available.

TABLE 27

| Ex.# | [M] | M | [LeL] | LeL | [HeL] | HeL | Lmax\|A\|T\|Ah\|Th | Lmax\|A\|T\|Ah\|Th | Lmax\|A\|T\|Ah\|Th |
|---|---|---|---|---|---|---|---|---|---|
| | | | | | Solvent = 1,3-Butanediol | | | | |
| 295 | 0.025 | Mi | | | 0.09 | Hga | 596\|0.156\|25\|1.843\|85 | 677\|0.172\|25\|2.988\|85 | |
| | | | | | Solvent = 3-Hydroxypropionitrile | | | | |
| 296 | 0.01 | Mo | | | 0.034 | Hik | 591\|0.152\|25\|1.1\|85 | 628\|0.13\|25\|1.033\|85 | 680\|0.17\|25\|1.396\|85 |
| | | | | | Solvent = Diethylene glycol | | | | |
| 297 | 0.01 | Mo | | | 0.2 | Hfx | 532\|0.37\|25\|0.595\|85 | 570\|0.362\|25\|0.704\|85 | |
| 298 | 0.012 | Mh | | | 0.16 | Hfz | 618\|0.21\|25\|1.051\|85 | 675\|0.224\|25\|1.344\|85 | 700\|0.244\|25\|1.473\|85 |
| 299 | 0.01 | Mo | | | 0.11 | Hfy | 535\|0.297\|25\|0.526\|85 | 571\|0.252\|25\|0.581\|85 | |
| | | | | | Solvent = e-Caprolactone | | | | |
| 300 | 0.01 | Mo | 0.92 | Lbg | 0.1 | Hiu | 537\|0.309\|25\|0.635\|85 | | |
| 301 | 0.01 | Mh | 0.03 | Lu | 0.27 | Hfz | 665\|0.054\|25\|1.05\|85 | 701\|0.046\|25\|1.582\|85 | 724\|0.045\|25\|1.745\|85 |
| 302 | 0.01 | Mo | 2.6 | Lbg | 0.15 | Hgh | 533\|0.333\|25\|0.933\|85 | 573\|0.285\|25\|1.254\|85 | |
| 303 | 0.01 | Mo | 1 | Lbg | 0.1 | Hjx | 546\|0.19\|25\|0.446\|85 | 585\|0.127\|25\|0.539\|85 | 632\|0.083\|25\|0.486\|85 |
| 304 | 0.01 | Mo | 0.19 | Lbg | 0.1 | Hgi | 532\|0.226\|25\|0.722\|85 | 570\|0.158\|25\|0.981\|85 | |
| | | | | | Solvent = Ethylene Glycol | | | | |
| 305 | 0.01 | Mo | | | 2 | Hfx | 532\|0.339\|25\|0.67\|85 | 570\|0.307\|25\|0.826\|85 | |
| 306 | 0.01 | Mo | | | 1 | Hfx | 530\|0.232\|25\|0.412\|85 | 570\|0.185\|25\|0.468\|85 | |
| 307 | 0.01 | Mi | | | 0.02 / 0.022 | Hdy / Hga | 570\|0.371\|25\|0.969\|85 | 648\|0.47\|25\|1.592\|85 | |
| 308 | 0.01 | Mh | | | 0.03 / 0.079 | Hdy / Hfz | 594\|0.21\|25\|0.763\|85 | 650\|0.247\|25\|1.169\|85 | |
| 309 | 0.01 | Mh | | | 0.02 / 0.37 | Hdy / Hhv | 630\|0.188\|25\|0.966\|85 | 665\|0.24\|25\|1.314\|85 | 700\|0.156\|25\|0.837\|85 |
| 310 | 0.01 | Mi | | | 0.03 | Hdy | 570\|0.256\|25\|0.68\|85 | 648\|0.245\|25\|0.937\|85 | |
| | | | | | Solvent = Gamma Butyrolactone | | | | |
| 311 | 0.02 | Mak | 0.18 | Lbw | 0.2 | Hfz | 705\|1.467\|25\|3.47\|85 | 756\|1.467\|25\|3.372\|85 | |
| 312 | 0.02 | Mak | 0.32 | Lao | 0.2 | Hfz | 672\|0.111\|25\|2.099\|85 | 704\|0.133\|25\|2.583\|85 | 756\|0.107\|25\|2.444\|85 |
| 313 | 0.02 | Mak | 0.21 | Lcg | 0.2 | Hfz | 352\|1.061\|25\|5\|85 | 704\|0.175\|25\|2.012\|85 | 756\|0.154\|25\|1.958\|85 |
| 314 | 0.02 | Mak | 0.35 | Le | 0.2 | Hfz | 705\|0.706\|25\|3.621\|85 | 755\|0.703\|25\|3.539\|85 | |
| 315 | 0.02 | Mal | 0.78 | Lbs | 0.06 | Hje | 617\|0.045\|25\|1.136\|85 | 653\|0.075\|25\|1.026\|85 | 703\|0.1\|25\|1.062\|85 |
| 316 | 0.01 | Mo | 2.2 | Lck | 0.04 / 0.05 | Hgz / Hje | 565\|0.122\|25\|1.046\|85 | 639\|0.163\|25\|2.038\|85 | |
| 317 | 0.01 | Mo | 2.24 | Lck | 0.1 / 0.02 | Hei / Hje | 596\|0.085\|25\|0.843\|85 | 633\|0.072\|25\|0.804\|85 | 675\|0.074\|25\|0.99\|85 |
| 318 | 0.02 | Mal | 0.28 | Lck | 0.003 / 0.2 / 0.003 | Hbt / Hfz / Hbb | 541\|0.085\|25\|0.496\|85 | 665\|0.118\|25\|0.591\|85 | 757\|0.051\|25\|0.467\|85 |
| 319 | 0.02 | Mal | 0.12 | Lck | 0.31 / 0.1 | Hbj / Hij | 651\|0.086\|25\|1.49\|85 | 702\|0.086\|25\|1.342\|85 | 749\|0.059\|25\|1.031\|85 |
| 320 | 0.02 | Mal | 0.33 | Lck | 0.01 / 0.02 / 0.2 | Hbu / Hdp / Hfz | 521\|0.039\|25\|0.474\|85 | 630\|0.257\|25\|1.738\|85 | 987\|0.073\|25\|0.263\|85 |
| 321 | 0.02 | Mak | 1.3 | Lbg | 0.16 / 0.044 | Hfz / Hke | 640\|0.175\|25\|1.777\|85 | 680\|0.188\|25\|1.676\|85 | 1026\|0.104\|25\|0.801\|85 |
| 322 | 0.02 | Mal | 0.15 | Lck | 0.01 / 0.2 | Hbu / Hfz | 520\|0.067\|25\|0.999\|85 | 702\|0.252\|25\|1.556\|85 | 758\|0.212\|25\|1.553\|85 |
| 323 | 0.02 | Mal | 0.23 | Lck | 0.02 / 0.2 | Hra / Hij | 521\|0.34\|25\|2.698\|85 | 651\|0.181\|25\|0.652\|85 | 998\|0.161\|25\|0.994\|85 |
| 324 | 0.01 | Mo | 2.9 | Lck | 0.02 / 0.07 | Hgz / Hje | 567\|0.059\|25\|0.647\|85 | 643\|0.061\|25\|1.361\|85 | |
| 325 | 0.02 | Mal | 0.15 | Lck | 0.02 / 0.2 | Hde / Hfz | 483\|0.053\|25\|0.295\|85 | 703\|0.112\|25\|0.92\|85 | 755\|0.078\|25\|0.888\|85 |
| 326 | 0.02 | Mak | 0.43 | Le | 0.2 | Hfz | 705\|0.377\|25\|3.119\|85 | 756\|0.366\|25\|3.053\|85 | |
| 327 | 0.02 | Mak | 0.86 | Lbg | 0.1 / 0.04 | Hcb / Hje | 577\|0.151\|25\|0.839\|85 | 617\|0.205\|25\|0.962\|85 | 657\|0.232\|25\|0.849\|85 |
| 328 | 0.02 | Mal | 0.23 | Lck | 0.2 / 0.2 | Hcs / Hfz | 664\|0.123\|25\|1.556\|85 | 705\|0.131\|25\|1.763\|85 | 753\|0.108\|25\|1.649\|85 |
| 329 | 0.02 | Mal | 0.21 | Lck | 0.3 / 0.06 | Har / Hij | 573\|0.119\|25\|2.144\|85 | 624\|0.262\|25\|1.744\|85 | 990\|0.069\|25\|0.604\|85 |
| 330 | 0.02 | Mal | 0.41 | Lck | 0.02 / 0.06 | Hcr / Hij | 588\|0.115\|25\|0.662\|85 | 646\|0.137\|25\|0.59\|85 | |
| 331 | 0.01 | Mo | 2.4 | Lbg | 0.15 / 0.1 | Hgh / Hir | 535\|0.364\|25\|1.071\|85 | 573\|0.324\|25\|1.443\|85 | |
| 332 | 0.04 | Mak | 1.7 | Lbg | 0.02 / 0.32 / 0.12 | Hea / Hfz / Hhh | 505\|0.097\|25\|1.193\|85 | 635\|0.361\|25\|1.563\|85 | 985\|0.182\|25\|0.85\|85 |
| 333 | 0.01 | Mo | 3.3 | Lbf | 0.1 | Hfl | 535\|0.266\|25\|1.164\|85 | 580\|0.264\|25\|1.679\|85 | |
| 334 | 0.01 | Mo | 3 | Lck | 0.02 / 0.05 | Hdp / Hje | 598\|0.338\|25\|1.895\|85 | 634\|0.385\|25\|2.272\|85 | 662\|0.329\|25\|2.231\|85 |
| 335 | 0.02 | Mal | 0.27 | Lck | 0.05 / 0.1 | Hcp / Hij | 682\|0.105\|25\|1.783\|85 | 725\|0.095\|25\|1.902\|85 | |

TABLE 27-continued

| Ex.# | [M] | M | [LeL] | LeL | [HeL] | HeL | Lmax\|A\|T\|Ah\|Th | Lmax\|A\|T\|Ah\|Th | Lmax\|A\|T\|Ah\|Th |
|---|---|---|---|---|---|---|---|---|---|
| 336 | 0.003 | Mal | 0.1 | Lck | 0.003<br>0.03<br>0.03 | Hij<br>Hir<br>Hke | 378\|0.107\|25\|2.011\|85 | 503\|0.03\|25\|0.841\|85 | 703\|0.012\|25\|0.225\|85 |
| 337 | 0.005 | Mo | 0.28 | Lck | 0.05<br>0.1 | Hir<br>Hkf | 618\|0.064\|25\|0.609\|85 | 716\|0.086\|25\|1.703\|85 | 751\|0.047\|25\|1.251\|85 |
| 338 | 0.02 | Mak | 0.49 | Lk | 0.2 | Hfz | 705\|0.427\|25\|3.312\|85 | 757\|0.41\|25\|3.132\|85 | |
| 339 | 0.02 | Mak | 0.49 | Lbg | 0.043<br>0.057 | Hfw<br>Hfz | 657\|0.172\|25\|1.025\|85 | 691\|0.206\|25\|0.966\|85 | |
| 340 | 0.02 | Mal | 0.46 | Lck | 0.02<br>0.2 | Hbv<br>Hfz | 555\|0.083\|25\|0.64\|85 | 636\|0.139\|25\|0.83\|85 | 973\|0.066\|25\|0.286\|85 |
| 341 | 0.01 | Mo | 2.4 | Lck | 0.1<br>0.05 | Hgz<br>Hje | 565\|0.101\|25\|1.039\|85 | 635\|0.113\|25\|1.893\|85 | |
| 342 | 0.02 | Mak | 0.78 | Lbg | 0.044<br>0.1 | Hn<br>Hje | 625\|0.243\|25\|1.782\|85 | 650\|0.257\|25\|1.739\|85 | 698\|0.228\|25\|1.357\|85 |
| 343 | 0.02 | Mak | 0.62 | Lh | 0.2 | Hfz | 669\|0.136\|25\|2.047\|85 | 705\|0.175\|25\|2.464\|85 | 758\|0.15\|25\|2.283\|85 |
| 344 | 0.01 | Mo | 2.6 | Lbg | 0.15<br>0.02 | Hgh<br>Hje | 593\|0.258\|25\|1.46\|85 | | |
| 345 | 0.02 | Mak | 0.53 | Lcm | 0.2 | Hfz | 668\|0.603\|25\|1.81\|85 | 704\|0.855\|25\|2.216\|85 | 756\|0.844\|25\|2.096\|85 |
| 346 | 0.01 | Mal | 0.13 | Lck | 0.02<br>0.1<br>0.02 | Hdm<br>Hir<br>Hke | 400\|0.267\|25\|5\|85 | 518\|0.043\|25\|3.299\|85 | 700\|0.064\|25\|0.794\|85 |
| 347 | 0.02 | Mal | 0.51 | Lbs | 0.04 | Hje | 580\|0.03\|25\|0.597\|85 | 616\|0.049\|25\|0.708\|85 | 703\|0.105\|25\|0.56\|85 |
| 348 | 0.02 | Mal | 1.05 | Lck | 0.04<br>0.2 | Hr<br>Hij | 583\|0.091\|25\|0.807\|85 | 630\|0.134\|25\|0.663\|85 | 990\|0.061\|25\|0.24\|85 |
| 349 | 0.02 | Mal | 0.25 | Lck | 0.04<br>0.1 | Hdo<br>Hfz | 636\|0.137\|25\|1.21\|85 | | |
| 350 | 0.02 | Mal | 1.29 | Lck | 0.02<br>0.2 | Hgr<br>Hfz | 514\|0.459\|25\|3.008\|85 | 885\|0.111\|25\|0.638\|85 | 1000\|0.215\|25\|1.151\|85 |
| 351 | 0.01 | Mo | 1.49 | Lck | 0.05<br>0.1 | Hgh<br>Hje | 594\|0.103\|25\|1.006\|85 | 630\|0.146\|25\|1.64\|85 | 694\|0.159\|25\|1.932\|85 |
| 352 | 0.02 | Mal | 0.041 | Lck | 0.02<br>0.02 | Hra<br>Hir | 550\|0.196\|25\|1.38\|85 | 612\|0.182\|25\|0.87\|85 | 1017\|0.096\|25\|0.406\|85 |
| 353 | 0.01 | Mo | 1.7 | Lck | 0.1 | Heh | 557\|0.349\|25\|0.615\|85 | 588\|0.283\|25\|0.53\|85 | |
| 354 | 0.02 | Mal | 0.16 | Lck | 0.04<br>0.02<br>0.2 | Hbt<br>Hfe<br>Hir | 563\|0.091\|25\|2.186\|85 | 665\|0.114\|25\|1.69\|85 | 930\|0.04\|25\|0.635\|85 |
| 355 | 0.002 | Mal | 0.006 | Lck | 0.02 | Hir | 515\|0.044\|25\|1.116\|85 | 724\|0.009\|25\|0.166\|85 | |
| 356 | 0.02 | Mal | 0.13 | Lck | 0.02<br>0.04 | Hdi<br>Hij | 356\|0.226\|25\|2.272\|85 | 645\|0.083\|25\|0.305\|85 | |
| 357 | 0.02 | Mal | 0.21 | Lck | 0.2<br>0.02 | Hfz<br>Hgm | 525\|0.193\|25\|1.464\|85 | 1010\|0.223\|25\|0.572\|85 | |
| 358 | 0.01 | Mh | 2.4 | Lck | 4 | Hhh | 595\|0.296\|25\|1.496\|85 | 628\|0.357\|25\|1.994\|85 | 649\|0.379\|25\|2.119\|85 |
| 359 | 0.0045 | Mq | 0.0137 | Lu | 0.21 | Hfz | 500\|0.153\|25\|0.933\|85 | 740\|1.337\|25\|0.927\|85 | |
| 360 | 0.02 | Mak | 2.5 | Lbg | 0.06<br>0.1 | Hfc<br>Hje | 583\|0.173\|25\|1.018\|85 | 645\|0.118\|25\|0.83\|85 | 970\|0.061\|25\|0.357\|85 |
| 361 | 0.01 | Mo | 0.55 | Lbg | 0.16<br>0.04 | Hgi<br>Hiu | 525\|0.173\|25\|0.406\|85 | 568\|0.078\|25\|0.466\|85 | |
| 362 | 0.01 | Mo | 0.16 | Lck | 0.1<br>0.1 | Hgi<br>Hkf | 533\|0.046\|25\|0.231\|85 | 578\|0.024\|25\|0.269\|85 | |
| 363 | 0.02 | Mak | 1 | Lbw | 0.2 | Hfz | 705\|1.219\|25\|2.861\|85 | 756\|1.217\|25\|2.746\|85 | |
| 364 | 0.01 | Mo | 2.4 | Lbg | 0.02<br>0.15 | Hfz<br>Hgh | 532\|0.337\|25\|0.904\|85 | 577\|0.275\|25\|1.274\|85 | |
| 365 | 0.02 | Mal | 0.14 | Lck | 0.2<br>0.04 | Hfz<br>Hgx | 496\|0.164\|25\|1.644\|85 | 556\|0.188\|25\|0.823\|85 | 954\|0.155\|25\|0.638\|85 |
| 366 | 0.02 | Mak | 1.05 | Lc | 0.2 | Hfz | 662\|0.385\|25\|1.917\|85 | 704\|0.539\|25\|2.1\|85 | 755\|0.511\|25\|1.911\|85 |
| 367 | 0.005 | Mo | 0.27 | Lbg | 0.35<br>0.15 | Hgi<br>Hjg | 608\|0.144\|25\|0.88\|85 | 648\|0.144\|25\|0.949\|85 | 777\|0.182\|25\|1.029\|85 |
| 368 | 0.01 | Mo | 2.6 | Lbg | 0.04<br>0.15 | Hfz<br>Hgh | 534\|0.324\|25\|0.916\|85 | 590\|0.221\|25\|1.232\|85 | |
| 369 | 0.02 | Mal | 0.89 | Lbs | 0.08 | Hje | 621\|0.058\|25\|1.439\|85 | 653\|0.091\|25\|1.48\|85 | 704\|0.115\|25\|1.515\|85 |
| 370 | 0.003 | Mal | 0.065 | Lck | 0.03<br>0.03 | Hir<br>Hjr | 418\|0.061\|25\|2.127\|85 | 563\|0.026\|25\|0.925\|85 | 745\|0.014\|25\|0.241\|85 |
| 371 | 0.01 | Mo | 1.52 | Lck | 0.08 | Hil | 554\|0.098\|25\|1.562\|85 | 589\|0.102\|25\|2.1\|85 | 638\|0.111\|25\|2.528\|85 |
| 372 | 0.02 | Mal | 0.18 | Lck | 0.01<br>0.2<br>0.02 | Hbu<br>Hfz<br>Hje | 515\|0.041\|25\|0.813\|85 | 689\|0.161\|25\|1.269\|85 | 744\|0.119\|25\|1.237\|85 |
| 373 | 0.002<br>0.002 | Mo<br>Mal | 0.022 | Lck | 0.2 | Hir | 508\|0.05\|25\|2.194\|85 | 781\|2.785\|25\|2.71\|85 | 884\|0.003\|25\|0.274\|85 |
| 374 | 0.02 | Mak | 0.4 | Lbg | 0.1<br>0.02 | Hfz<br>Hec | 665\|0.145\|25\|0.663\|85 | 705\|0.164\|25\|0.763\|85 | 755\|0.131\|25\|0.71\|85 |
| 375 | 0.02 | Mal | 0.69 | Lck | 0.3 | Hje | 617\|0.055\|25\|1.144\|85 | 654\|0.087\|25\|1.779\|85 | 704\|0.093\|25\|1.796\|85 |
| 376 | 0.02 | Mal | 0.15 | Lck | 0.2 | Hcn | 670\|0.226\|25\|0.743\|85 | | |
| 377 | 0.02 | Mak | 5.2 | Lbg | 0.16<br>0.16 | Hfo<br>Hfz | 415\|0.959\|25\|5\|85 | 590\|0.094\|25\|0.364\|85 | 872\|0.051\|25\|0.283\|85 |
| 378 | 0.02 | Mal | 0.12 | Lck | 0.005<br>0.2 | Hdp<br>Hir | 521\|0.201\|25\|5\|85 | 707\|0.141\|25\|1.589\|85 | 875\|0.062\|25\|0.223\|85 |

TABLE 27-continued

| Ex.# | [M] | M | [LeL] | LeL | [HeL] | HeL | Lmax\|A\|T\|Ah\|Th | Lmax\|A\|T\|Ah\|Th | Lmax\|A\|T\|Ah\|Th |
|---|---|---|---|---|---|---|---|---|---|
| 379 | 0.01 | Mo | 0.33 | Lbg | 0.35 / 0.15 | Hgi / Hjg | 609\|0.247\|25\|1.746\|85 | 649\|0.248\|25\|1.869\|85 | 776\|0.312\|25\|1.974\|85 |
| 380 | 0.002 / 0.002 | Mo / Mal | 0.086 | Lck | 0.2 / 0.02 | Hir / Hke | 561\|0.143\|25\|1.562\|85 | 724\|1.26\|25\|1.575\|85 | 778\|2.266\|25\|2.519\|85 |
| 381 | 0.02 | Mal | 0.38 | Lck | 0.2 | Hja | 618\|0.283\|25\|2.15\|85 | 666\|0.359\|25\|1.963\|85 | 1014\|0.155\|25\|0.488\|85 |
| 382 | 0.01 | Mo | 2.1 | Lbg | 0.069 / 0.066 | Hiu / Hjx | 535\|0.213\|25\|0.591\|85 | 567\|0.179\|25\|0.68\|85 | |
| 383 | 0.02 | Mak | 0.2 / 0.16 | Lm / Lck | 0.2 | Hfz | 669\|0.125\|25\|1.477\|85 | 705\|0.151\|25\|1.876\|85 | 757\|0.129\|25\|1.828\|85 |
| 384 | 0.02 | Mak | 2.3 | Lbg | 0.04 / 0.2 | Hfo / Hje | 588\|0.231\|25\|1.387\|85 | 647\|0.208\|25\|1.357\|85 | 1050\|0.115\|25\|0.544\|85 |
| 385 | 0.02 | Mal | 0.041 | Lck | 0.02 / 0.04 | Hra / Hir | 551\|0.345\|25\|2.741\|85 | 936\|0.097\|25\|0.648\|85 | 1017\|0.111\|25\|0.729\|85 |
| 386 | 0.02 | Mal | 0.13 | Lck | 0.1 / 0.06 | Hrc / Hij | 581\|0.42\|25\|2.247\|85 | 641\|0.588\|25\|1.881\|85 | 1005\|0.113\|25\|0.791\|85 |
| 387 | 0.02 | Mal | 0.15 | Lck | 0.2 / 0.02 | Hfz / Hgt | 500\|0.186\|25\|1.101\|85 | 563\|0.239\|25\|0.574\|85 | 757\|0.176\|25\|0.715\|85 |
| 388 | 0.02 | Mak | 0.041 | Laz | 0.2 | Hfz | 705\|0.488\|25\|2.129\|85 | 757\|0.461\|25\|2.088\|85 | |
| 389 | 0.02 | Mak | 0.47 | Le | 0.2 | Hfz | 705\|0.24\|25\|2.912\|85 | 757\|0.226\|25\|2.837\|85 | |
| 390 | 0.02 | Mal | | | 0.1 / 0.4 / 0.069 | Hgz / Hij / Hke | 502\|0.049\|25\|0.539\|85 | 694\|0.089\|25\|0.767\|85 | 1020\|0.167\|25\|0.48\|85 |
| 391 | 0.02 | Mak | 0.71 | Lac | 0.2 | Hfz | 663\|0.081\|25\|1.853\|85 | 703\|0.095\|25\|2.176\|85 | 755\|0.081\|25\|2.05\|85 |
| 392 | 0.02 | Man | 0.33 | Lck | 0.1 / 0.25 | Hfz / Hhh | 560\|0.168\|45\|0.978\|85 | 635\|0.248\|45\|1.232\|85 | 984\|0.088\|45\|0.413\|85 |
| 393 | 0.02 | Mal | 0.24 | Lck | 0.02 / 0.2 / 0.01 | Hdp / Hfz / Hgz | 504\|0.046\|25\|0.52\|85 | 631\|0.352\|25\|2.164\|85 | 1129\|0.1\|25\|0.52\|85 |
| 394 | 0.02 | Mal | 0.33 | Lck | 0.02 / 0.21 | Hdj / Hfz | 650\|0.116\|25\|1.222\|85 | 756\|0.052\|25\|0.347\|85 | |
| 395 | 0.02 | Mak | 0.53 | Lcj | 0.2 | Hfz | 663\|0.48\|25\|2.113\|85 | 703\|0.626\|25\|2.259\|85 | 755\|0.614\|25\|2.121\|85 |
| 396 | 0.02 | Mal | 0.11 | Lck | 0.14 / 0.1 | Hcz / Hfz | 668\|0.185\|25\|0.544\|85 | 700\|0.186\|25\|0.571\|85 | 750\|0.128\|25\|0.476\|85 |
| 397 | 0.01 | Mal | 0.064 | Lck | 0.01 / 0.1 | Hdp / Hir | 460\|0.233\|25\|5\|85 | 521\|0.127\|25\|5\|85 | 700\|0.068\|25\|1.603\|85 |
| 398 | 0.02 | Mal | 0.23 | Lck | 0.003 / 0.2 / 0.008 | Hbt / Hfz / Hbb | 530\|0.136\|25\|0.861\|85 | 660\|0.206\|25\|0.751\|85 | 757\|0.082\|25\|0.635\|85 |
| 399 | 0.003 | Mal | 0.12 | Lck | 0.03 / 0.03 | Hir / Hju | 416\|0.075\|25\|1.589\|85 | 559\|0.037\|25\|0.649\|85 | 744\|0.014\|25\|0.167\|85 |
| 400 | 0.02 | Mak | 0.36 | Lbh | 0.2 | Hfz | 668\|0.144\|25\|1.607\|85 | 704\|0.196\|25\|1.964\|85 | 757\|0.183\|25\|1.896\|85 |
| 401 | 0.02 | Mal | 0.26 | Lck | 0.1 | Hee | 404\|0.16\|25\|0.087\|85 | 653\|0.094\|25\|1.612\|85 | 705\|0.099\|25\|1.632\|85 |
| 402 | 0.02 | Man | 0.26 | Lck | 0.28 / 0.2 | Hds / Hfz | 650\|0.14\|25\|0.456\|85 | | |
| 403 | 0.02 | Mal | 0.6 | Lck | 0.2 / 0.08 | Hcn / Hik | 398\|0.455\|25\|5\|85 | 647\|0.082\|25\|1.526\|85 | 700\|0.088\|25\|1.522\|85 |
| 404 | 0.02 | Mal | 0.069 | Lck | 0.2 / 0.04 | Hcs / Hfz | 378\|0.287\|25\|3.703\|85 | 654\|0.066\|25\|0.564\|85 | 721\|0.06\|25\|0.485\|85 |
| 405 | 0.02 | Mal | 0.12 | Lck | 0.1 / 0.1 | Hbj / Hij | 605\|0.035\|25\|0.598\|85 | 662\|0.057\|25\|1.134\|85 | 754\|0.043\|25\|1.135\|85 |
| 406 | 0.01 | Mh | 0.03 | Lu | 0.97 | Hfz | 518\|0.619\|25\|0.411\|85 | 701\|0.25\|25\|3.312\|85 | 724\|0.281\|25\|3.888\|85 |
| 407 | 0.02 | Mal | 0.26 | Lck | 0.04 / 0.2 | Hfd / Hij | 643\|0.149\|25\|1.19\|85 | 693\|0.152\|25\|1.302\|85 | 750\|0.079\|25\|0.742\|85 |
| 408 | 0.01 | Mo | 2.21 | Lck | 0.05 / 0.1 | Hes / Hke | 594\|0.173\|25\|1.61\|85 | 663\|0.146\|25\|1.799\|85 | 694\|0.16\|25\|1.967\|85 |
| 409 | 0.02 | Mak | 0.94 | Lah | 0.2 | Hfz | 665\|0.334\|25\|2.266\|85 | 704\|0.461\|25\|2.626\|85 | 754\|0.445\|25\|2.468\|85 |
| 410 | 0.01 | Me | 1.23 | Lbs | 0.3 | Hke | 433\|1.477\|25\|5\|45 | 615\|0.081\|25\|0.771\|85 | 922\|0.072\|25\|0.658\|85 |
| 411 | 0.02 | Mak | 0.16 | Lck | 0.2 | Hfz | 704\|0.139\|25\|1.824\|85 | 756\|0.117\|25\|1.765\|85 | |
| 412 | 0.01 | Mo | 0.13 | Lck | 0.034 | Hhj | 602\|0.13\|25\|1.139\|85 | 622\|0.113\|25\|1.123\|85 | 661\|0.093\|25\|1.01\|85 |
| 413 | 0.02 | Mal | 0.45 | Lck | 0.01 / 0.4 / 0.12 | Hea / Hfz / Hhh | 500\|0.117\|25\|1.096\|85 | 640\|0.257\|25\|0.913\|85 | 995\|0.139\|25\|0.627\|85 |
| 414 | 0.01 | Mo | 1.68 | Lck | 0.02 / 0.1 | Hbu / Hfz | 596\|0.109\|25\|1.705\|85 | 646\|0.127\|25\|2.929\|85 | |
| 415 | 0.01 | Mo | 1 | Lck | 0.1 | Hfz | 641\|0.06\|25\|1.451\|85 | 669\|0.093\|25\|2.223\|85 | 700\|0.132\|25\|3.402\|85 |
| 416 | 0.02 | Mak | 0.37 | Lbg | 0.08 / 0.2 | Hfw / Hir | 533\|0.112\|25\|3.621\|85 | 738\|0.19\|25\|0.931\|85 | |
| 417 | 0.02 | Mak | 1.04 | Li | 0.2 | Hfz | 665\|0.676\|25\|2.34\|85 | 706\|0.879\|25\|2.641\|85 | 755\|0.829\|25\|2.413\|85 |
| 418 | 0.02 | Mal | 0.31 | Lck | 0.1 / 0.06 | Har / Hij | 578\|0.139\|25\|2.143\|85 | 624\|0.245\|25\|1.795\|85 | 990\|0.074\|25\|0.592\|85 |
| 419 | 0.02 | Mak | 0.47 | Lae | 0.2 | Hfz | 667\|0.168\|25\|2.305\|85 | 704\|0.233\|25\|2.812\|85 | 756\|0.214\|25\|2.67\|85 |
| 420 | 0.04 | Mal | 0.41 | Lck | 0.02 / 0.2 | Hbs / Hje | 485\|0.035\|25\|0.999\|85 | 652\|0.248\|25\|1.824\|85 | 704\|0.206\|25\|1.759\|85 |
| 421 | 0.02 | Mal | 0.14 | Lck | 0.01 / 0.2 | Hew / Hfz | 503\|0.032\|25\|0.191\|85 | 703\|0.291\|25\|1.917\|85 | 757\|0.257\|25\|1.877\|85 |
| 422 | 0.02 | Man | 0.14 | Lck | 0.04 / 0.1 | Hbs / Hje | 486\|0\|25\|0.45\|85 | 829\|0\|25\|0.192\|85 | 939\|0\|25\|0.277\|85 |

TABLE 27-continued

| Ex.# | [M] | M | [LeL] | LeL | [HeL] | HeL | Lmax\|A\|T\|Ah\|Th | Lmax\|A\|T\|Ah\|Th | Lmax\|A\|T\|Ah\|Th |
|---|---|---|---|---|---|---|---|---|---|
| 423 | 0.02 | Mal | 0.33 | Lck | 0.01<br>0.01<br>0.2 | Hbt<br>Hbu<br>Hfz | 529\|0.048\|25\|0.719\|85 | 630\|0.152\|25\|0.593\|85 | 973\|0.076\|25\|0.37\|85 |
| 424 | 0.02 | Mal | 0.18 | Lck | 0.2<br>0.01 | Hfz<br>Hbb | 522\|0.101\|25\|1.025\|85 | 703\|0.193\|25\|1.05\|85 | 757\|0.136\|25\|1.043\|85 |
| 425 | 0.01 | Mo | 1.29 | Lck | 0.06 | Hit | 552\|0.115\|25\|1.428\|85 | 590\|0.12\|25\|1.969\|85 | 637\|0.129\|25\|2.269\|85 |
| 426 | 0.02 | Mak | 0.3 | Lbg | 0.04<br>0.2 | Hhl<br>Hir | 506\|0.056\|25\|2.086\|85 | 815\|0.057\|25\|0.38\|85 | |
| 427 | 0.02 | Mal | 0.52 | Lck | 0.02<br>0.1 | Hr<br>Hij | 555\|0.035\|25\|0.346\|85 | 621\|0.088\|25\|0.502\|85 | 695\|0.079\|25\|0.281\|85 |
| 428 | 0.02 | Mak | 0.13 | Lch | 0.2 | Hfz | 671\|0.354\|25\|2.247\|85 | 704\|0.504\|25\|2.896\|85 | 757\|0.491\|25\|2.823\|85 |
| 429 | 0.02 | Mal | 0.55 | Lck | 0.2 | Hje | 653\|0.085\|25\|1.419\|85 | 704\|0.087\|25\|1.429\|85 | |
| 430 | 0.01 | Mo | 0.062 | Lck | 0.1<br>0.1 | Hgi<br>Hkf | 534\|0.099\|25\|0.547\|85 | 579\|0.116\|25\|0.737\|85 | 610\|0.13\|25\|0.654\|85 |
| 431 | 0.02 | Mal | 0.35 | Lck | 0.12<br>0.21 | Hfd<br>Hij | 639\|0.167\|25\|1.417\|85 | 676\|0.156\|25\|1.369\|85 | 1030\|0.112\|25\|0.649\|85 |
| 432 | 0.02 | Mal | 0.23 | Lck | 0.02<br>0.02<br>0.2 | Hbt<br>Hfz<br>Hir | 565\|0.093\|25\|1.374\|85 | 650\|0.116\|25\|1.081\|85 | |
| 433 | 0.01 | Mo | 3.3 | Lck | 1<br>0.1 | Hdp<br>Hfz | 597\|0.101\|25\|1.829\|85 | 647\|0.135\|25\|3.039\|85 | |
| 434 | 0.02 | Mak | 0.18 | Lbg | 0.01<br>0.01<br>0.2 | Hfz<br>Hga<br>Hir | 780\|0.161\|25\|1.04\|85 | | |
| 435 | 0.01 | Mo | 0.48 | Lck | 0.35<br>0.1<br>0.15 | Hgi<br>Hhh<br>Hjg | 569\|0.091\|25\|0.862\|85 | 648\|0.164\|25\|2.027\|85 | 687\|0.105\|25\|1.42\|85 |
| 436 | 0.003 | Mal | 0.082 | Lck | 0.03<br>0.09 | Hir<br>Hke | 418\|0.168\|25\|5\|85 | 561\|0.076\|25\|1.922\|85 | 745\|0.022\|25\|0.475\|85 |
| 437 | 0.02 | Mak | 0.31 | Lcl | 0.2 | Hfz | 663\|0.302\|25\|2.372\|85 | 704\|0.443\|25\|3.065\|85 | 756\|0.429\|25\|2.96\|85 |
| 438 | 0.02 | Mak | 0.21 | Lbg | 0.33<br>0.062 | Hir<br>Hiu | 502\|0.201\|25\|1.582\|85 | 820\|0.118\|25\|0.347\|85 | |
| 439 | 0.01 | Mo | 1.23 | Lck | 0.1 | Hio | 549\|0.133\|25\|1.098\|85 | 589\|0.132\|25\|1.531\|85 | 636\|0.138\|25\|1.724\|85 |
| 440 | 0.02 | Mak | 0.57 | La | 0.2 | Hfz | 662\|0.081\|25\|1.811\|85 | 703\|0.115\|25\|2.258\|85 | 756\|0.097\|25\|2.132\|85 |
| 441 | 0.11<br>0.005 | Eg<br>Mo | | | 0.06<br>0.011 | Hdy<br>Hje | 568\|0.087\|25\|0.465\|85 | 655\|0.098\|25\|0.853\|85 | |
| 442 | 0.02 | Mal | 0.12 | Lck | 0.01<br>0.2 | Hdp<br>Hjg | 521\|0.171\|25\|5\|85 | 704\|0.095\|25\|2.402\|85 | 1191\|0.08\|25\|0.503\|85 |
| 443 | 0.003 | Mal | 0.055 | Lck | 0.006<br>0.03 | Hfo<br>Hir | 410\|0.106\|25\|0.878\|85 | 500\|0.046\|25\|0.398\|85 | 555\|0.042\|25\|0.367\|85 |
| 444 | 0.02 | Mak | 0.15 | Lci | 0.2 | Hfz | 705\|0.435\|25\|3.022\|85 | 754\|0.416\|25\|2.925\|85 | |
| 445 | 0.02 | Mak | 1 | Lbg | 0.02<br>0.16 | Hea<br>Hfz | 498\|0.107\|25\|1.238\|85 | 880\|0.097\|25\|0.366\|85 | 997\|0.148\|25\|0.532\|85 |
| 446 | 0.011 | Mak | 0.79 | Lbg | 0.046<br>0.25 | Hfz<br>Hhh | 560\|0.026\|25\|0.602\|85 | 634\|0.127\|25\|0.758\|85 | 978\|0.037\|25\|0.261\|85 |
| 447 | 0.009 | Mak | 1.5 | Lbg | 0.11<br>0.052 | Hfz<br>Hjy | 370\|0.663\|25\|5\|85 | 640\|0.068\|25\|0.495\|85 | 696\|0.071\|25\|0.45\|85 |
| 448 | 0.01 | Mal | 0.11 | Lck | 0.03<br>0.005<br>0.1 | Har<br>Hff<br>Hir | 443\|0.115\|25\|5\|85 | 512\|0.028\|25\|1.679\|85 | 602\|0.114\|25\|1.302\|85 |
| 449 | 0.02 | Mak | 0.68 | Lbg | 0.02<br>0.1 | Hfw<br>Hfz | 650\|0.142\|25\|1.207\|85 | 693\|0.176\|25\|1.134\|85 | 1205\|0.116\|25\|0.288\|85 |
| 450 | 0.02 | Mal | 0.11 | Lck | 0.2<br>0.02 | Hfz<br>Hgx | 496\|0.24\|25\|1.986\|85 | 555\|0.18\|25\|0.98\|85 | 757\|0.256\|25\|0.98\|85 |
| 451 | 0.02 | Mak | 0.59 | Laj | 0.2 | Hfz | 668\|0.268\|25\|2.396\|85 | 705\|0.36\|25\|2.844\|85 | 755\|0.344\|25\|2.693\|85 |
| 452 | 0.02 | Mal | 0.02 | Lav | 0.4 | Hfz | 328\|0.894\|25\|3.022\|85 | 704\|0.248\|25\|0.477\|85 | 756\|0.223\|25\|0.454\|85 |
| 453 | 0.01 | Mal | 0.21 | Lck | 0.04<br>0.1<br>0.01 | Hfz<br>Hir<br>Hke | 377\|0.388\|25\|5\|85 | 446\|0.142\|25\|2.831\|85 | 680\|0.058\|25\|0.64\|85 |
| 454 | 0.02 | Mak | 0.47 | Lck | 0.2 | Hes | 653\|0.077\|25\|1.741\|85 | 705\|0.082\|25\|1.744\|85 | |
| 455 | 0.003 | Mal | 0.054 | Lck | 0.03<br>0.012 | Hir<br>Hke | 418\|0.097\|25\|2.535\|85 | 562\|0.046\|25\|1.094\|85 | 745\|0.019\|25\|0.282\|85 |
| 456 | 0.02 | Mal | 0.28 | Lck | 0.02<br>0.2 | Hbu<br>Hfz | 521\|0.034\|25\|1.118\|85 | 860\|0.048\|25\|0.355\|85 | 970\|0.072\|25\|0.474\|85 |
| 457 | 0.01 | Mi | 0.03 | Lu | 0.1 | Hga | 501\|0.49\|25\|0.317\|85 | 634\|0.274\|25\|1.313\|85 | 695\|0.413\|25\|2.282\|85 |
| 458 | 0.01 | Mo | 2.34 | Lck | 0.1 | Hes | 592\|0.052\|25\|0.861\|85 | 667\|0.133\|25\|2.307\|85 | 692\|0.146\|25\|2.592\|85 |
| 459 | 0.02 | Mal | 0.37 | Lck | 0.04<br>0.1 | Hbt<br>Hje | 521\|0.167\|25\|0.756\|85 | 613\|0.185\|25\|1.082\|85 | 698\|0.096\|25\|0.524\|85 |
| 460 | 0.01 | Mo | 0.94 | Lck | 0.04<br>0.1 | Hgh<br>Hhh | 548\|0.153\|25\|0.671\|85 | 587\|0.103\|25\|0.573\|85 | |
| 461 | 0.01 | Mo | 1.7 | Lck | 0.02<br>0.1 | Hfz<br>Hjy | 538\|0.335\|25\|0.674\|85 | 610\|0.292\|25\|0.843\|85 | 652\|0.27\|25\|0.823\|85 |
| 462 | 0.02 | Mal | 0.3 | Lck | 0.04<br>0.1 | Hdh<br>Hje | 570\|0.197\|25\|1.752\|85 | 610\|0.283\|25\|2.127\|85 | 1121\|0.118\|25\|0.512\|85 |
| 463 | 0.01 | Mo | 0.71 | Lck | 0.04 | Hfj | 535\|0.017\|25\|0.353\|85 | 585\|0.005\|25\|0.379\|85 | 631\|0.002\|25\|0.335\|85 |
| 464 | 0.02 | Mal | 0.06 | Lck | 0.06 | Hij | 659\|0.09\|25\|1.078\|85 | 705\|0.117\|25\|1.223\|85 | 754\|0.1\|25\|1.175\|85 |

TABLE 27-continued

| Ex.# | [M] | M | [LeL] | LeL | [HeL] | HeL | Lmax\|A\|T\|Ah\|Th | Lmax\|A\|T\|Ah\|Th | Lmax\|A\|T\|Ah\|Th |
|---|---|---|---|---|---|---|---|---|---|
| 465 | 0.02 | Mal | 0.29 | Lck | 0.1<br>0.06 | Hah<br>Hij | 576\|0.154\|25\|2.084\|85 | 846\|0.057\|25\|0.238\|85 | 993\|0.094\|25\|0.605\|85 |
| 466 | 0.02 | Mal | 0.16 | Lck | 0.02<br>0.2 | Hbu<br>Hfz | 519\|0.106\|25\|1.749\|85 | 853\|0.072\|25\|0.542\|85 | 968\|0.102\|25\|0.723\|85 |
| 467 | 0.002 | Mak | 0.07 | Lbm | 0.32 | Hjg | 506\|0\|25\|0.698\|85 | 856\|0\|25\|0.103\|85 | |
| 468 | 0.02 | Mal | 0.28 | Lck | 0.2<br>0.02<br>0.02 | Hfz<br>Hgm<br>Hje | 519\|0.118\|25\|1.628\|85 | 870\|0.064\|25\|0.345\|85 | 1010\|0.115\|25\|0.667\|85 |
| 469 | 0.04 | Mal | 0.46 | Lck | 0.013<br>0.013<br>0.2 | Hbt<br>Hea<br>Hje | 483\|0.095\|25\|0.901\|85 | 652\|0.2\|25\|1.636\|85 | 704\|0.198\|25\|1.496\|85 |
| 470 | 0.01 | Mo | 0.23 | Lck | 0.36 | Hcx | 547\|0.146\|25\|0.639\|85 | | |
| 471 | 0.02 | Mal | 0.064 | Lck | 0.1<br>0.02<br>0.2 | Hiu<br>Hbf<br>Hij | 496\|0.113\|25\|1.402\|85 | 758\|0.194\|25\|0.573\|85 | 991\|0.101\|25\|0.47\|85 |
| 472 | 0.02 | Mal | 0.59 | Lck | 0.02<br>0.08 | Hrb<br>Hij | 557\|0.185\|25\|1.642\|85 | 595\|0.265\|25\|1.913\|85 | 1010\|0.123\|25\|0.701\|85 |
| 473 | 0.02 | Mal | 0.14 | Lck | 0.2<br>0.02 | Hfz<br>Hgw | 502\|0.143\|25\|1.583\|85 | 560\|0.138\|25\|0.703\|85 | 757\|0.2\|25\|0.91\|85 |
| 474 | 0.01 | Mal | 0.49 | Ly | 0.02 | Hv | 410\|0.072\|25\|0.411\|85 | 503\|0.056\|25\|1.174\|85 | |
| 475 | 0.02 | Mal | 0.29 | Lck | 0.0405<br>0.06 | Haj<br>Hij | 553\|0.084\|25\|1.417\|85 | 608\|0.172\|25\|1.749\|85 | 1000\|0.073\|25\|0.425\|85 |
| 476 | 0.02 | Mal | 2 | Lbs | 0.0402<br>0.06 | Haj<br>Hij | 590\|0.099\|25\|1.646\|85 | 629\|0.139\|25\|1.389\|85 | 990\|0.089\|25\|0.473\|85 |
| 477 | 0.01 | Mal | 0.22 | Lck | 0.07<br>0.07 | Hij<br>Hke | 640\|0.117\|25\|1.213\|85 | 676\|0.112\|25\|1.154\|85 | 1030\|0.068\|25\|0.553\|85 |
| 478 | 0.02 | Mal | 1 | Lbg | 0.0402<br>0.06 | Haj<br>Hij | 560\|0.091\|25\|1.691\|85 | 608\|0.183\|25\|1.932\|85 | 988\|0.091\|25\|0.494\|85 |
| 479 | 0.005 | Mf | 0.072 | Lck | 0.04 | Hir | 417\|0.161\|25\|3.369\|85 | 562\|0.072\|25\|1.427\|85 | 745\|0.023\|25\|0.359\|85 |
| 480 | 0.007 | Maj | 0.128 | Lck | 0.07<br>0.035 | Hir<br>Hke | 416\|0.215\|25\|5\|85 | 562\|0.096\|25\|2.567\|85 | 745\|0.035\|25\|0.639\|85 |
| 481 | 0.01 | Mal | 0.35 | Lbg | 0.02 | Hv | 409\|0.08\|25\|0.471\|85 | 505\|0.06\|25\|1.308\|85 | |
| 482 | 0.01 | Mal | 0.65 | Lbs | 0.02 | Hv | 408\|0.069\|25\|0.455\|85 | 503\|0.042\|25\|1.351\|85 | |
| 483 | 0.02 | Mal | 0.35 | Lck | 0.1<br>0.06 | Hay<br>Hij | 575\|0.1\|25\|1.933\|85 | 618\|0.207\|25\|1.634\|85 | 990\|0.066\|25\|0.544\|85 |
| 484 | 0.01 | Mal | 1.19 | Lcs | 0.02 | Hv | 408\|0.063\|25\|0.822\|85 | 504\|0.05\|25\|2.629\|85 | |
| 485 | 0.02 | Mal | 0.61<br>0.47 | Lbs<br>Lcs | 0.02 | Hv | 408\|0.115\|25\|0.616\|85 | 503\|0.033\|25\|1.63\|85 | |
| 486 | 0.01 | Mal | 0.16 | Lao | 0.02 | Hv | 409\|0.058\|25\|0.295\|85 | 503\|0.028\|25\|0.808\|85 | |
| 487 | 0.005 | Mal | 0.27 | Lbs | 0.01 | Hv | 408\|0.058\|25\|0.386\|85 | 503\|0.127\|25\|1.239\|85 | |
| 488 | 0.005 | Mal | 0.28 | Lbg | 0.01 | Hv | 408\|0.033\|25\|0.224\|85 | 503\|0.028\|25\|0.664\|85 | |
| 489 | 0.01 | Mal | 0.0401 | Lck | 0.02 | Hv | 405\|0.063\|25\|0.313\|85 | 503\|0.115\|25\|0.976\|85 | |
| 490 | 0.005 | Mf | 0.07 | Lck | 0.04 | Hir | 417\|0.103\|25\|2.619\|85 | 561\|0.045\|25\|1.125\|85 | 745\|0.016\|25\|0.29\|85 |
| 491 | 0.01 | Mac | 0.12 | Lck | | | 585\|0.162\|25\|1.137\|85 | 627\|0.17\|25\|0.982\|85 | 994\|0.057\|25\|0.298\|85 |
| 492 | 0.01 | Mac | 0.12<br>0.03 | Lck<br>Lcs | | | 586\|0.175\|25\|0.857\|65 | 622\|0.183\|25\|0.768\|65 | 996\|0.058\|25\|0.231\|65 |
| 493 | 0.0101 | Mal | 0.37 | Lck | 0.01<br>0.25 | Haj<br>Hij | 639\|0.182\|25\|1.573\|85 | 679\|0.157\|25\|1.41\|85 | 1194\|0.093\|25\|0.326\|85 |
| 494 | 0.005 | Mb | 0.07 | Lck | 0.04 | Hir | 405\|0.17\|25\|2.215\|85 | 498\|0.071\|25\|1.088\|85 | 539\|0.056\|25\|0.871\|85 |
| 495 | 0.02 | Mac | 0.2 | Lck | | | 582\|0.227\|25\|2.062\|85 | 621\|0.27\|25\|1.83\|85 | 995\|0.096\|25\|0.559\|85 |
| 496 | 0.02 | Mal | 0.61 | Lbs | 0.02 | Hv | 408\|0.135\|25\|0.772\|85 | 504\|0.092\|25\|2.172\|85 | |
| 497 | 0.01 | Mo | 0.85 | Lck | 0.2<br>0.04 | Hfe<br>Hfz | 620\|0.069\|25\|1.38\|85 | 680\|0.134\|25\|2.591\|85 | 703\|0.154\|25\|2.929\|85 |
| 498 | 0.02 | Mal | 0.354 | Lck | 0.1<br>0.06 | Hc<br>Hij | 580\|0.114\|25\|1.758\|85 | 623\|0.211\|25\|1.466\|85 | 995\|0.068\|25\|0.498\|85 |
| 499 | 0.02 | Mal | 0.317 | Lck | 0.1<br>0.06 | Ham<br>Hij | 577\|0.106\|25\|1.701\|85 | 625\|0.234\|25\|1.426\|85 | 990\|0.068\|25\|0.475\|85 |
| 500 | 0.02 | Mal | 0.347 | Lck | 0.1<br>0.06 | Haj<br>Hij | 578\|0.117\|25\|1.83\|85 | 625\|0.215\|25\|1.547\|85 | 993\|0.069\|25\|0.509\|85 |
| 501 | 0.01<br>0.015 | Mao<br>Mal | 0.15 | Lck | 0.027 | Hgm | 491\|0.497\|25\|1.5\|85 | 1038\|0.176\|25\|0.102\|85 | |
| 502 | 0.01 | Mal | 0.097 | Lck | 0.01<br>0.08 | Ha<br>Hij | 530\|0.065\|25\|0.442\|85 | 702\|0.058\|25\|0.783\|85 | 755\|0.047\|25\|0.739\|85 |
| 503 | 0.02 | Mal | 0.082 | Lck | 0.06<br>0.06 | Ho<br>Hij | 658\|0.061\|25\|0.629\|85 | 704\|0.062\|25\|0.694\|85 | 753\|0.048\|25\|0.641\|85 |
| 504 | 0.02 | Mal | 0.34 | Lck | 0.02<br>0.06 | Hm<br>Hij | 554\|0.121\|25\|2.072\|85 | 591\|0.115\|25\|1.567\|85 | 1032\|0.083\|25\|0.602\|85 |
| 505 | 0.02 | Mal | 0.077 | Lck | 0.02<br>0.16 | Hm<br>Hir | 598\|0.159\|25\|2.34\|85 | 646\|0.157\|25\|1.902\|85 | 1057\|0.08\|25\|0.519\|85 |
| 506 | 0.02 | Mal | 2 | Lbs | 0.0405<br>0.06 | Haj<br>Hij | 590\|0.131\|25\|1.66\|85 | 626\|0.166\|25\|1.454\|85 | 986\|0.099\|25\|0.478\|85 |
| 507 | 0.02 | Mal | 0.66 | Lck | 0.02<br>0.04 | Hm<br>Hje | 534\|0.153\|25\|1.39\|85 | 565\|0.12\|25\|1.162\|85 | 1010\|0.089\|25\|0.486\|85 |
| 508 | 0.01 | Mal | 3.3 | Laq | 0.2 | Hij | 655\|0.326\|25\|1.277\|65 | 706\|0.333\|25\|1.267\|65 | 750\|0.268\|25\|1.048\|65 |
| 509 | 0.02 | Mal | 0.47 | Lbg | 0.02 | Hv | 407\|0.16\|25\|0.586\|85 | 503\|0.05\|25\|1.542\|85 | |
| 510 | 0.02 | Mal | 0.094 | Lci | 0.02 | Hv | 408\|0.1\|25\|0.554\|85 | 503\|0.138\|25\|1.581\|85 | |
| 511 | 0.02 | Mal | 0.0784 | Lch | 0.02 | Hv | 408\|0.084\|25\|0.442\|85 | 504\|0.109\|25\|1.249\|85 | |

TABLE 27-continued

| Ex.# | [M] | M | [LeL] | LeL | [HeL] | HeL | Lmax\|A\|T\|Ah\|Th | Lmax\|A\|T\|Ah\|Th | Lmax\|A\|T\|Ah\|Th |
|---|---|---|---|---|---|---|---|---|---|
| 512 | 0.02 | Mal | 0.067 | Lcg | 0.02 | Hv | 408\|0.076\|25\|0.378\|85 | 503\|0.092\|25\|1.04\|85 | |
| 513 | 0.02 | Mal | 0.446 | Lac | 0.02 | Hv | 408\|0.166\|25\|0.895\|85 | 503\|0.153\|25\|2.595\|85 | |
| 514 | 0.02 | Mal | 0.44 | Lt | 0.02 | Hv | 412\|0.168\|25\|1\|85 | 503\|0.165\|25\|2.961\|85 | |
| 515 | 0.02 | Mal | 1.1 | Lw | 0.02 | Hv | 414\|0.372\|25\|1.361\|85 | 503\|0.356\|25\|3.871\|85 | |
| 516 | 0.02 | Mal | 0.33 | Ly | 0.02 | Hv | 410\|0.208\|25\|1.044\|85 | 503\|0.315\|25\|3.145\|85 | |
| 517 | 0.01 | Mac | 1 | Lbs | | | 578\|0.128\|25\|1.254\|85 | 617\|0.133\|25\|1.105\|85 | 985\|0.067\|25\|0.352\|85 |
| 518 | 0.02 | Mal | 0.038 | Lck | 0.16 0.02 | Ho Hij | 555\|0.12\|25\|0.669\|85 | 600\|0.121\|25\|0.567\|85 | 686\|0.094\|25\|0.282\|85 |
| 519 | 0.02 | Mal | 0.04 | Lck | 0.04 0.2 | Hir Hka | 529\|0.174\|25\|4.758\|85 | 773\|0.053\|25\|0.803\|85 | 847\|0.033\|25\|0.7\|85 |
| 520 | 0.01 | Mal | 3.4 0.3 | Laq Lbs | 0.02 | Hv | 415\|0.093\|25\|0.681\|85 | 505\|0.15\|25\|2.004\|85 | |
| 521 | 0.02 | Mal | 0.027 | Lck | 0.02 0.1 | Hak Hij | 515\|0.038\|25\|0.16\|85 | 705\|1.023\|25\|2.086\|85 | 756\|1.031\|25\|2.076\|85 |
| 522 | 0.01 | Mal | 0.019 | Lbt | 0.02 | Hv | 510\|0.149\|25\|0.318\|85 | | |
| 523 | 0.02 | Mal | 1.01 | Lbg | 0.0602 0.06 | Haj Hij | 586\|0.161\|25\|2.455\|85 | 847\|0.034\|25\|0.248\|85 | 985\|0.103\|25\|0.687\|85 |
| 524 | 0.02 | Mal | 1.54 | Lbs | 0.0602 0.06 | Haj Hij | 579\|0.176\|25\|2.898\|85 | 845\|0.032\|25\|0.282\|85 | 988\|0.125\|25\|0.817\|85 |
| 525 | 0.02 | Mal | 1.5 | Lbs | 0.061 0.06 | Hat Hij | 560\|0.073\|25\|1.671\|85 | 600\|0.111\|25\|1.799\|85 | 996\|0.101\|25\|0.519\|85 |
| 526 | 0.02 | Mal | 0.03 | Lck | 0.02 0.04 | Hao Hij | 522\|0.065\|25\|0.348\|85 | 657\|0.15\|25\|0.628\|85 | 753\|0.106\|25\|0.566\|85 |
| 527 | 0.005 | Mf | 0.07 | Lck | 0.04 | Hir | 417\|0.144\|25\|3.517\|85 | 562\|0.064\|25\|1.535\|85 | 745\|0.023\|25\|0.388\|85 |
| 528 | 0.02 | Mal | 0.2 | Lck | 0.04 0.1 | Has Hij | 545\|0.088\|25\|1.568\|85 | 603\|0.232\|25\|2.185\|85 | 967\|0.069\|25\|0.539\|85 |
| 529 | 0.02 | Mal | 0.078 | Lck | 0.04 0.08 | Hcg Hij | 366\|0.439\|25\|5\|85 | 645\|0.189\|25\|1.001\|85 | 692\|0.181\|25\|0.982\|85 |
| 530 | 0.02 | Mal | 0.21 | Lck | 0.05 0.06 | Hfr Hij | 593\|0.321\|25\|2.967\|85 | 998\|0.121\|25\|0.689\|85 | |
| 531 | 0.005 | Mo | 0.5 | Lck | 0.02 | Hij | 618\|0.037\|25\|0.743\|85 | 639\|0.047\|25\|0.838\|85 | 702\|0.1\|25\|1.855\|85 |
| 532 | 0.02 | Mal | 0.063 | Lck | 0.08 0.06 | Hk Hij | 523\|0.062\|25\|0.171\|85 | 658\|0.142\|25\|1.219\|85 | 701\|0.118\|25\|1.215\|85 |
| 533 | 0.005 | Mal | 0.018 | Lck | 0.015 0.005 0.025 | Haj Hir Hke | 390\|0.12\|25\|1.602\|85 | 440\|0.018\|25\|1.226\|85 | 604\|0.041\|25\|0.228\|85 |
| 534 | 0.02 | Mal | 0.12 | Lck | 0.08 0.08 | Hae Hij | 668\|0.082\|25\|0.821\|85 | 705\|0.08\|25\|0.876\|85 | 745\|0.059\|25\|0.713\|85 |
| 535 | 0.02 | Mal | 0.066 | Lck | 0.024 0.061 | Heu Hij | 432\|0.191\|25\|1.063\|85 | 718\|0.089\|25\|0.339\|85 | |
| 536 | 0.02 | Mal | 0.84 | Lbs | 0.02 0.08 | Heu Hij | 430\|0.163\|25\|0.916\|85 | 704\|0.11\|25\|0.329\|85 | |
| 537 | 0.02 | Mal | 0.11 | Lck | 0.052 0.061 | Hfs Hij | 543\|0.118\|25\|1.241\|85 | 601\|0.258\|25\|1.697\|85 | 970\|0.087\|25\|0.44\|85 |
| 538 | 0.005 | Mf | 0.07 | Lck | 0.04 | Hhv | 418\|0.105\|25\|2.972\|85 | 563\|0.052\|25\|1.309\|85 | 745\|0.018\|25\|0.327\|85 |
| 539 | 0.02 | Mal | 0.12 | Lck | 0.024 0.06 | Hhb Hij | 435\|0.967\|25\|2.949\|85 | 717\|0.301\|25\|0.877\|85 | |
| 540 | 0.01 | Me | 0.24 | Lck | 0.3 | Hke | 432\|0.952\|25\|4.559\|65 | 632\|0.118\|25\|0.692\|85 | 944\|0.065\|25\|0.366\|85 |
| 541 | 0.02 | Mal | 0.078 | Lck | 0.05 0.06 | Hau Hij | 547\|0.073\|25\|1.188\|85 | 607\|0.242\|25\|1.837\|85 | 978\|0.079\|25\|0.424\|85 |
| 542 | 0.01 | Mal | 0.9 | Lbs | 0.02 0.04 | Hai Hij | 360\|0.175\|25\|5\|85 | 636\|0.057\|25\|0.993\|85 | 689\|0.059\|25\|0.757\|85 |
| 543 | 0.01 | Mal | 0.051 | Lck | 0.02 0.04 | Hbl Hir | 532\|0.168\|25\|2.041\|85 | 602\|0.094\|25\|0.882\|85 | 929\|0.048\|25\|0.547\|85 |
| 544 | 0.01 | Mal | 0.38 | Lae | 0.02 | Hv | 408\|0.085\|25\|0.525\|85 | 503\|0.086\|25\|1.597\|85 | |
| 545 | 0.01 | Mal | 0.42 | Lk | 0.02 | Hv | 408\|0.069\|25\|0.331\|85 | 503\|0.036\|25\|0.94\|85 | |
| 546 | 0.01 | Mal | 0.034 | Lbl | 0.2 | Hij | 706\|0.566\|25\|1.358\|85 | 757\|0.576\|25\|1.323\|85 | |
| 547 | 0.01 | Mal | 0.32 | Lbh | 0.02 | Hv | 404\|0.075\|25\|0.241\|85 | 503\|0.022\|25\|0.61\|85 | |
| 548 | 0.01 | Mal | 0.53 | Lh | 0.02 | Hv | 404\|0.067\|25\|0.264\|85 | 503\|0.021\|25\|0.726\|85 | |
| 549 | 0.02 | Mal | 0.087 | Lck | 0.04 0.05 | Hx Hij | 465\|0.255\|25\|0.684\|85 | 633\|0.128\|25\|0.332\|85 | 750\|0.125\|25\|0.263\|85 |
| 550 | 0.01 | Mal | 0.26 | Lck | 0.01 0.03 0.021 | Haj Hij Hje | 615\|0.103\|25\|0.9\|85 | 664\|0.094\|25\|0.723\|85 | |
| 551 | 0.01 | Mal | 0.72 | Lbs | 0.01 0.041 | Hai Hij | 361\|0.29\|25\|5\|85 | 642\|0.071\|25\|0.827\|85 | 696\|0.069\|25\|0.617\|85 |
| 552 | 0.02 | Mal | 0.21 | Lck | 0.02 0.04 0.4 | Haj Hij Hke | 621\|0.182\|25\|1.511\|85 | 937\|0.07\|25\|0.618\|85 | 1022\|0.089\|25\|0.607\|85 |
| 553 | 0.005 | Mo | 0.95 | Lck | 0.08 | Hij | 618\|0.024\|25\|0.697\|85 | 668\|0.051\|25\|1.496\|85 | 701\|0.071\|25\|2.299\|85 |
| 554 | 0.01 | Mal | 3.68 0.01 | Laq Lck | 0.02 | Hv | 418\|0.295\|25\|0.691\|85 | 504\|0.928\|25\|2.072\|85 | |
| 555 | 0.01 | Mal | 5.62 | Lbo | 0.02 | Hv | 406\|0.076\|25\|0\|85 | 503\|0.038\|25\|0\|85 | |
| 556 | 0.01 | Mal | 0.032 | Lq | 0.02 | Hv | 405\|0.207\|25\|0.43\|85 | 501\|0.13\|25\|0.656\|85 | |
| 557 | 0.005 | Mo | 0.54 | Lck | 0.025 | Hij | 618\|0.038\|25\|0.78\|85 | 640\|0.049\|25\|0.899\|85 | 701\|0.102\|25\|2.025\|85 |
| 558 | 0.005 | Mo | 0.6 | Lck | 0.03 | Hij | 618\|0.038\|25\|0.779\|85 | 640\|0.047\|25\|0.918\|85 | 701\|0.099\|25\|2.088\|85 |

TABLE 27-continued

| Ex.# | [M] | M | [LeL] | LeL | [HeL] | HeL | Lmax\|A\|T\|Ah\|Th | Lmax\|A\|T\|Ah\|Th | Lmax\|A\|T\|Ah\|Th |
|---|---|---|---|---|---|---|---|---|---|
| 559 | 0.02 | Mal | 0.15 | Lck | 0.081<br>0.1 | Hx<br>Hij | 467\|0.393\|25\|0.986\|85 | 580\|0.109\|25\|0.464\|85 | 750\|0.164\|25\|0.33\|85 |
| 560 | 0.01 | Mal | 0.097 | Lck | 0.021<br>0.083 | Ha<br>Hij | 527\|0.148\|25\|0.661\|85 | 700\|0.08\|25\|0.747\|85 | 754\|0.068\|25\|0.68\|85 |
| 561 | 0.02 | Mal | 0.099 | Lck | 0.045<br>0.042 | Hat<br>Hij | 558\|0.157\|25\|1.366\|85 | 615\|0.25\|25\|1.868\|85 | 1016\|0.084\|25\|0.407\|85 |
| 562 | 0.01 | Mo | 1 | Lck | 0.04<br>0.04 | Haj<br>Hiu | 548\|0.417\|25\|1.042\|85 | | |
| 563 | 0.01 | Mal | 1.16 | Lcc | 0.02 | Hv | 504\|0.043\|25\|0.723\|85 | | |
| 564 | 0.005 | Mo | 0.7 | Lck | 0.041 | Hij | 618\|0.03\|25\|0.761\|85 | 671\|0.06\|25\|1.425\|85 | 700\|0.084\|25\|2.157\|85 |
| 565 | 0.02 | Mal | 1.21 | Lck | 0.02<br>0.2 | Hdy<br>Hfz | 503\|0.156\|25\|1.349\|85 | 883\|0.05\|25\|0.333\|85 | 991\|0.081\|25\|0.548\|85 |
| 566 | 0.02 | Mak | 0.13 | Lbv | 0.2 | Hfz | 353\|1.034\|25\|5\|65 | 704\|0.18\|25\|1.753\|85 | 757\|0.158\|25\|1.698\|85 |
| 567 | 0.02 | Mak | 0.2 | Lbg | 0.03<br>0.01<br>0.2 | Hfz<br>Hga<br>Hir | 745\|0.246\|25\|1.65\|85 | | |
| 568 | 0.02 | Mak | 0.13 | Lck | 0.2 | Hfz | 354\|0.683\|25\|5\|65 | 704\|0.128\|25\|2.066\|85 | 756\|0.103\|25\|1.993\|85 |
| 569 | 0.002 | Mo | 0.43 | Lck | 0.02<br>0.02 | Hfo<br>Hir | 393\|0.05\|25\|0.847\|85 | 441\|0.044\|25\|0.859\|85 | 746\|0.01\|25\|0.412\|85 |
| 570 | 0.017 | Mal | 0.295 | Lck | 0.39 | Hij | 542\|0.027\|25\|0.114\|85 | 706\|0.367\|25\|2.943\|85 | 757\|0.367\|25\|2.92\|85 |
| 571 | 0.02 | Mal | 0.28 | Lck | 0.1 | Hes | 403\|0.155\|25\|0.101\|85 | 654\|0.079\|25\|1.247\|85 | 704\|0.083\|25\|1.252\|85 |
| 572 | 0.01 | Mo | 1.1 | Lbg | 0.064 | Hgh | 528\|0.311\|25\|0.682\|85 | 574\|0.211\|25\|0.854\|85 | |
| 573 | 0.02 | Mal | 0.25 | Lck | 0.16<br>0.04 | Hac<br>Hik | 576\|0.151\|25\|0.529\|85 | 645\|0.168\|25\|0.543\|85 | |
| 574 | 0.01 | Mal | 0.381 | Lbh | 0.2 | Hij | 353\|0.38\|25\|5\|55 | 705\|0.084\|25\|1.546\|85 | 757\|0.08\|25\|1.536\|85 |
| 575 | 0.02 | Mak | 0.48 | Lbg | 0.04<br>0.12<br>0.2 | Hfz<br>Hhh<br>Hir | 585\|0.127\|25\|1.443\|85 | 650\|0.313\|25\|1.543\|85 | 989\|0.066\|25\|0.465\|85 |
| 576 | 0.01 | Mo | 0.079 | Lav | 0.1 | Hfz | 562\|0.42\|25\|0.425\|85 | 665\|0.156\|25\|0.835\|85 | 725\|0.188\|25\|1.249\|85 |
| 577 | 0.02 | Mak | 0.52 | Ly | 0.2 | Hfz | 669\|0.259\|25\|2.665\|85 | 703\|0.337\|25\|3.312\|85 | 755\|0.315\|25\|3.132\|85 |
| 578 | 0.01 | Mal | 0.27 | Lck | 0.1<br>0.02<br>0.02 | Hir<br>Hje<br>Hke | 413\|0.124\|25\|2.277\|85 | 590\|0.033\|25\|0.407\|85 | 650\|0.047\|25\|0.49\|85 |
| 579 | 0.02 | Mal | 2.09 | Lbs | 0.1<br>0.06 | Har<br>Hij | 570\|0.11\|25\|1.948\|85 | 627\|0.171\|25\|1.558\|85 | 984\|0.099\|25\|0.58\|85 |
| 580 | 0.02 | Mal | 1.38 | Lck | 0.0057<br>0.2 | Hs<br>Hij | 400\|2.04\|25\|1.413\|85 | 493\|0.851\|25\|0.266\|85 | |
| 581 | 0.002 | Mak | | | 0.32<br>0.012 | Hir<br>Hjx | 374\|1.837\|25\|5\|85 | 500\|0.418\|25\|1.755\|85 | 780\|0.143\|25\|0.375\|85 |
| 582 | 0.002 | Mal | 0.006 | Lck | 0.02<br>0.1 | Hir<br>Hkf | 385\|0.472\|25\|2.007\|85 | 506\|0.013\|25\|0.695\|85 | 723\|0.01\|25\|0.189\|85 |
| 583 | 0.02 | Mal | 0.51 | Lck | 0.2 | Hje | 654\|0.081\|25\|1.607\|85 | 704\|0.085\|25\|1.623\|85 | |
| 584 | 0.02 | Mak | 0.8 | Lbg | 0.06<br>0.1 | Hfw<br>Hfz | 652\|0.137\|25\|1.229\|85 | 694\|0.167\|25\|1.135\|85 | 1205\|0.117\|25\|0.306\|85 |
| 585 | 0.02 | Mak | 0.8 | Lap | 0.2 | Hfz | 667\|0.126\|25\|1.682\|85 | 703\|0.186\|25\|1.966\|85 | 756\|0.18\|25\|1.864\|85 |
| 586 | 0.02 | Mak | 0.13 | Lch | 0.2 | Hfz | 669\|0.336\|25\|2.283\|85 | 704\|0.474\|25\|2.914\|85 | 757\|0.458\|25\|2.837\|85 |
| 587 | 0.02 | Mal | 0.36 | Lck | 0.2<br>0.02 | Hfz<br>Hgu | 513\|0.377\|25\|2.22\|85 | 640\|0.195\|25\|0.568\|85 | 957\|0.159\|25\|0.777\|85 |
| 588 | 0.02 | Mal | 0.26 | Lck | 0.1<br>0.06 | Hab<br>Hij | 591\|0.22\|25\|1.285\|85 | 648\|0.248\|25\|1.134\|85 | 1027\|0.109\|25\|0.348\|85 |
| 589 | 0.02 | Mal | 0.14 | Lck | 0.07<br>0.2 | Hha<br>Hfz | 534\|0.093\|25\|0.303\|85 | 704\|0.193\|25\|1.075\|85 | 756\|0.177\|25\|1.056\|85 |
| 590 | 0.02 | Mal | 0.086 | Lck | 0.04<br>0.1 | Har<br>Hir | 511\|0.096\|25\|5\|85 | 602\|0.185\|25\|2.824\|85 | 660\|0.225\|25\|2.649\|85 |
| 591 | 0.02 | Mal | 0.21 | Lck | 0.2<br>0.02 | Hfz<br>Hbb | 521\|0.082\|25\|1.318\|85 | 850\|0.065\|25\|0.524\|85 | 953\|0.095\|25\|0.574\|85 |
| 592 | 0.02 | Mak | 0.25 | Lb | 0.2 | Hfz | 704\|0.391\|25\|3.312\|85 | 757\|0.376\|25\|3.136\|85 | |
| 593 | 0.02 | Mal | 0.1 | Lck | 0.1<br>0.09 | Hy<br>Hfz | 669\|0.097\|25\|0.979\|85 | 704\|0.096\|25\|1.155\|85 | 756\|0.074\|25\|1.112\|85 |
| 594 | 0.02 | Mal | 0.1 | Lck | 0.09<br>0.1 | Hfz<br>Hhd | 670\|0.007\|25\|0.799\|85 | 704\|0.017\|25\|0.955\|85 | 756\|0.008\|25\|0.923\|85 |
| 595 | 0.01 | Mo | 2.28 | Lck | 0.02<br>0.1 | Hbt<br>Hfz | 594\|0.205\|25\|2.035\|85 | 644\|0.357\|25\|3.633\|85 | 1082\|0.044\|25\|0.282\|85 |
| 596 | 0.01 | Mo | 0.5 | Lck | 0.1<br>0.02 | Hfz<br>Hbf | 586\|0.187\|25\|0.92\|85 | 655\|0.184\|25\|1.596\|85 | |
| 597 | 0.01 | Mo | 1.52 | Lck | 0.08<br>0.045 | Hil<br>Hiu | 554\|0.132\|25\|1.594\|85 | 607\|0.155\|25\|2.294\|85 | 637\|0.172\|25\|2.565\|85 |
| 598 | 0.0052 | Mo | 1.3 | Lck | 0.04<br>0.04<br>0.04 | Hil<br>Hhj<br>Hik | 554\|0.043\|25\|0.827\|85 | 590\|0.041\|25\|1.104\|85 | 637\|0.043\|25\|1.31\|85 |
| 599 | 0.005<br>0.02 | Mo<br>Mal | 0.28 | Lck | 0.02<br>0.2 | Hnr<br>Hij | 525\|0.297\|25\|2.396\|85 | 724\|3.305\|25\|3.227\|85 | 996\|0.183\|25\|0.908\|85 |
| 600 | 0.01 | Mo | 1.52 | Lck | 0.1<br>0.01 | Hfz<br>Hbb | 586\|0.178\|25\|1.428\|85 | 630\|0.262\|25\|2.428\|85 | |
| 601 | 0.02 | Mal | 0.17 | Lck | 0.2<br>0.02 | Hfz<br>Haz | 526\|0.25\|25\|1.567\|85 | 760\|0.103\|25\|0.353\|85 | 966\|0.124\|25\|0.595\|85 |
| 602 | 0.02 | Mak | 0.85 | Lbu | 0.2 | Hfz | 667\|0.423\|25\|1.951\|85 | 705\|0.623\|25\|2.39\|85 | 755\|0.62\|25\|2.252\|85 |

TABLE 27-continued

| Ex.# | [M] | M | [LeL] | LeL | [HeL] | HeL | Lmax\|A\|Tl\|Ah\|Th | Lmax\|A\|Tl\|Ah\|Th | Lmax\|A\|Tl\|Ah\|Th |
|---|---|---|---|---|---|---|---|---|---|
| 603 | 0.01 | Mo | 1.3 | Lbg | 0.009 | Hgc | 546\|0.194\|25\|0.346\|85 | 588\|0.17\|25\|0.47\|85 | 632\|0.16\|25\|0.48\|85 |
| 604 | 0.01 | Mo | 4.67 | Lbg | 0.1 0.038 | Hbz Hje | 593\|0.143\|25\|0.71\|85 | 681\|0.142\|25\|1.106\|85 | |
| 605 | 0.005 | Mal | 0.034 | Lck | 0.015 | Hhc | 530\|0.15\|25\|1.195\|85 | 694\|0.029\|25\|0.237\|85 | |
| 606 | 0.02 | Mal | 0.94 | Lbs | 0.1 | Hje | 620\|0.081\|25\|1.639\|85 | 653\|0.121\|25\|1.857\|85 | 704\|0.144\|25\|1.894\|85 |
| 607 | 0.02 | Mak | 0.28 | Lbg | 0.117 0.071 | Hfz Hhl | 667\|0.172\|25\|1.56\|85 | 705\|0.237\|25\|1.842\|85 | 756\|0.216\|25\|1.733\|85 |
| 608 | 0.02 | Mak | 1.1 | Lbg | 0.04 0.1 | Hcb Hje | 620\|0.229\|25\|1.563\|85 | 649\|0.246\|25\|1.451\|85 | |
| 609 | 0.01 | Mo | 2.1 | Lbg | 0.033 0.066 | Hiu Hjx | 534\|0.178\|25\|0.499\|85 | 570\|0.131\|25\|0.571\|85 | |
| 610 | 0.01 | Mal | 0.503 | Lao | 0.2 | Hij | 353\|0.195\|25\|5\|85 | 704\|0.045\|25\|1.165\|85 | 756\|0.035\|25\|1.13\|85 |
| 611 | 0.02 | Mal | 0.14 | Lck | 0.2 0.2 | Hha Hfz | 531\|0.149\|25\|0.466\|85 | 703\|0.164\|25\|0.744\|85 | 757\|0.152\|25\|0.736\|85 |
| 612 | 0.02 | Mal | 0.18 | Lck | 0.04 0.1 | Hbl Hij | 503\|0.17\|25\|1.783\|85 | 658\|0.08\|25\|0.528\|85 | 984\|0.084\|25\|0.65\|85 |
| 613 | 0.02 | Mal | 0.16 | Lck | 0.02 0.2 | Hbl Hij | 504\|0.169\|25\|0.804\|85 | 705\|0.214\|25\|2.173\|85 | 757\|0.202\|25\|2.14\|85 |
| 614 | 0.02 | Mal | 0.16 | Lck | 0.02 0.15 | Hbl Hij | 504\|0.12\|25\|1.009\|85 | 704\|0.085\|25\|1.247\|85 | 756\|0.069\|25\|1.202\|85 |
| 615 | 0.02 | Mal | 0.32 | Lck | 0.02 0.08 | Hrc Hje | 558\|0.053\|25\|0.623\|85 | 617\|0.09\|25\|0.832\|85 | 702\|0.098\|25\|0.749\|85 |
| 616 | 0.02 | Mal | 0.4 | Lck | 0.1 0.06 | Hav Hij | 589\|0.112\|25\|0.75\|85 | 648\|0.177\|25\|0.636\|85 | 1032\|0.083\|25\|0.227\|85 |
| 617 | 0.02 | Mal | 0.49 | Lck | 0.1 0.06 | Hab Hij | 591\|0.081\|25\|0.645\|85 | 650\|0.138\|25\|0.567\|85 | 1038\|0.075\|25\|0.2\|85 |
| 618 | 0.01 | Mal | 0.598 | Lbg | 0.2 | Hij | 667\|0.065\|25\|1.259\|85 | 705\|0.089\|25\|1.748\|85 | 757\|0.083\|25\|1.722\|85 |
| 619 | 0.01 | Mo | 0.86 | Lck | 0.04 0.04 | Hbl Hij | 573\|0.227\|25\|1.584\|85 | 633\|0.316\|25\|2.775\|85 | 699\|0.07\|25\|1.287\|85 |
| 620 | 0.0202 | Mal | 0.933 | Lck | 1.034 | Hij | 673\|0.105\|25\|1.841\|85 | 706\|0.123\|25\|2.41\|85 | 757\|0.11\|25\|2.401\|85 |
| 621 | 0.01 | Mal | 0.1 | Laz | 0.2 | Hij | 668\|0.085\|25\|0.472\|85 | 703\|0.095\|25\|0.642\|85 | 756\|0.08\|25\|0.634\|85 |
| 622 | 0.02 | Mal | 0.349 | Lck | 0.395 | Hij | 670\|0.119\|25\|1.872\|85 | 707\|0.152\|25\|2.612\|85 | 757\|0.14\|25\|2.601\|85 |
| 623 | 0.02 | Mal | 0.099 | Lck | 0.1 0.082 | Haq Hij | 664\|0.104\|25\|1.169\|85 | 705\|0.093\|25\|1.205\|85 | 750\|0.069\|25\|1.012\|85 |
| 624 | 0.01 | Mal | 0.0492 | Lck | 0.04 | Hij | 658\|0.036\|25\|0.548\|85 | 705\|0.042\|25\|0.635\|85 | 754\|0.035\|25\|0.609\|85 |
| 625 | 0.01 | Mal | 0.0303 | Lck | 0.0304 | Hij | 654\|0.061\|25\|0.671\|85 | 707\|0.084\|25\|0.649\|85 | 753\|0.074\|25\|0.615\|85 |
| 626 | 0.01 | Mal | 0.154 | Lck | 0.2 | Hij | 669\|0.101\|25\|1.154\|85 | 705\|0.141\|25\|1.606\|85 | 757\|0.138\|25\|1.606\|85 |
| 627 | 0.01 | Mal | 0.0399 0.437 | Laz Lbs | 0.2 | Hij | 353\|0.098\|25\|3.282\|85 | 704\|0.064\|25\|0.396\|85 | 757\|0.049\|25\|0.381\|85 |
| 628 | 0.01 | Mal | 0.694 | Ly | 0.2 | Hij | 669\|0.074\|25\|1.429\|85 | 705\|0.095\|25\|1.907\|85 | 756\|0.088\|25\|1.879\|85 |
| 629 | 0.01 | Mal | 2 | Lcs | 0.2 | Hij | 667\|0.028\|25\|0.899\|65 | 706\|0.031\|25\|1.258\|65 | 756\|0.027\|25\|1.215\|65 |
| 630 | 0.02 | Mal | 0.324 | Lck | 0.1 0.06 | Hdt Hij | 577\|0.119\|25\|2.009\|85 | 625\|0.261\|25\|1.681\|85 | 989\|0.067\|25\|0.551\|85 |
| 631 | 0.02 | Mal | 2.35 | Lcs | 0.1 0.06 | Hdt Hij | 575\|0.139\|25\|2.067\|65 | 625\|0.198\|25\|1.688\|65 | 982\|0.081\|25\|0.56\|65 |
| 632 | 0.02 | Mal | 0.064 | Lck | 0.04 0.08 | Hbn Hij | 530\|0.308\|25\|1.322\|85 | 705\|0.234\|25\|1.338\|85 | 756\|0.213\|25\|1.256\|85 |
| 633 | 0.01 | Mh | 1.4 | Lck | 0.1 0.04 | Hij Hil | 566\|0.189\|25\|1.598\|85 | 589\|0.221\|25\|1.982\|85 | 634\|0.273\|25\|2.523\|85 |
| 634 | 0.02 | Mal | 0.23 | Lck | 0.02 0.2 | Hbt Hir | 564\|0.056\|25\|1.372\|85 | 660\|0.082\|25\|1.015\|85 | 930\|0.036\|25\|0.378\|85 |
| 635 | 0.01 | Mal | 0.34 | Lck | 0.16 0.08 | Hr Hij | 565\|0.089\|25\|0.666\|85 | 624\|0.132\|25\|0.502\|85 | 985\|0.045\|25\|0.201\|85 |
| 636 | 0.01 | Mo | 0.76 | Lbg | 0.039 0.033 | Hir Hiu | 587\|0.088\|25\|0.626\|85 | 653\|0.029\|25\|0.533\|85 | 747\|0.018\|25\|0.536\|85 |
| 637 | 0.02 | Mak | 0.52 | Le | 0.2 | Hfz | 704\|0.212\|25\|2.578\|85 | 756\|0.197\|25\|2.485\|85 | |
| 638 | 0.01 | Mal | 0.18 | Lck | 0.01 0.1 0.02 | Hbt Hir Hke | 403\|0.229\|25\|5\|85 | 562\|0.055\|25\|1.843\|85 | 681\|0.043\|25\|0.643\|85 |
| 639 | 0.02 | Mak | 1.01 | Lai | 0.2 | Hfz | 668\|0.279\|25\|2.181\|85 | 704\|0.39\|25\|2.543\|85 | 756\|0.39\|25\|2.432\|85 |
| 640 | 0.01 | Mal | 0.021 | Lck | 0.05 0.053 | Hbj Hir | 503\|0.197\|25\|3.871\|85 | 535\|0.174\|25\|3.789\|85 | 723\|0.049\|25\|0.677\|85 |
| 641 | 0.01 | Mal | 0.075 | Lck | 0.03 0.05 | Hcp Hir | 492\|0.464\|25\|4.127\|65 | 761\|0.095\|25\|1.151\|85 | 817\|0.054\|25\|0.995\|85 |
| 642 | 0.02 | Mal | 0.16 | Lck | 0.08 | Hcp | 581\|0.157\|25\|0.526\|85 | | |
| 643 | 0.02 | Mal | 0.16 | Lck | 0.02 0.1 | Hbl Hij | 503\|0.102\|25\|1.153\|85 | 700\|0.063\|25\|0.512\|85 | 985\|0.067\|25\|0.426\|85 |
| 644 | 0.01 | Mh | 1.32 | Lck | 0.04 | Hil | 554\|0.096\|25\|1.353\|65 | 590\|0.108\|25\|1.836\|65 | 637\|0.126\|25\|2.243\|65 |
| 645 | 0.02 | Mak | 0.53 | Lad | 0.2 | Hfz | 668\|0.259\|25\|2.489\|85 | 704\|0.34\|25\|3.018\|85 | 756\|0.321\|25\|2.885\|85 |
| 646 | 0.01 | Mal | 0.036 | Lck | 0.03 0.1 0.1 | Har Hir Hke | 385\|0.893\|25\|5\|65 | 569\|0.128\|25\|3.114\|85 | 1032\|0.055\|25\|0.606\|85 |
| 647 | 0.01 | Mo | 1.38 | Lck | 0.1 0.02 | Hij Hil | 572\|0.134\|25\|1.695\|85 | 626\|0.19\|25\|2.573\|85 | 664\|0.184\|25\|2.73\|85 |
| 648 | 0.005 | Mal | 0.013 | Lck | 0.05 0.05 0.02 | Har Hir Hke | 385\|0.25\|25\|5\|85 | 603\|0.064\|25\|0.9\|85 | 668\|0.066\|25\|0.695\|85 |

TABLE 27-continued

| Ex.# | [M] | M | [LeL] | LeL | [HeL] | HeL | Lmax\|A\|T\|Ah\|Th | Lmax\|A\|T\|Ah\|Th | Lmax\|A\|T\|Ah\|Th |
|---|---|---|---|---|---|---|---|---|---|
| 649 | 0.02 | Mal | 0.069 | Lck | 0.02 0.1 | Had Hij | 496\|0.038\|25\|0.201\|85 | 704\|0.105\|25\|0.875\|85 | 756\|0.071\|25\|0.838\|85 |
| 650 | 0.02 | Mal | 0.35 | Lck | 0.04 0.14 | Hcq Hij | 531\|0.132\|25\|0.471\|85 | 650\|0.188\|25\|0.449\|85 | 701\|0.143\|25\|0.446\|85 |
| 651 | 0.01 | Mo | 0.24 | Lck | 0.047 | Hii | 542\|0.299\|25\|0.406\|85 | 586\|0.149\|25\|0.364\|85 | 632\|0.079\|25\|0.316\|85 |
| 652 | 0.02 | Mal | 0.6 | Lck | 0.02 0.041 | Heo Hje | 535\|0.296\|25\|1.443\|85 | 571\|0.358\|25\|1.643\|85 | 990\|0.184\|25\|0.677\|85 |
| 653 | 0.0202 | Mal | 0.186 | Lck | 0.214 | Hij | 673\|0.134\|25\|1.933\|85 | 705\|0.169\|25\|2.54\|85 | 757\|0.158\|25\|2.534\|85 |
| 654 | 0.0201 | Mal | 0.115 | Lck | 0.106 | Hij | 671\|0.08\|25\|1.195\|85 | 706\|0.092\|25\|1.556\|85 | 756\|0.078\|25\|1.535\|85 |
| 655 | 0.02 | Mal | 0.38 | Lck | 0.08 0.08 | Hcp Hik | 645\|0.164\|25\|2.304\|85 | 684\|0.172\|25\|2.236\|85 | |
| 656 | 0.01 | Mal | 0.295 | Lcn | 0.02 | Hv | 411\|0.091\|25\|0.172\|85 | 503\|0.03\|25\|0.261\|85 | |
| 657 | 0.01 | Mo | 0.59 | Lck | 0.01 0.02 | Hh Hfz | 442\|2.133\|25\|2.384\|85 | 638\|0.344\|25\|2.292\|85 | 670\|0.386\|25\|2.875\|85 |
| 658 | 0.01 0.01 | Mao Mal | 0.063 | Lbd | 0.01 | Hgm | 491\|0.153\|25\|0.612\|85 | | |
| 659 | 0.02 | Mal | 0.1 | Lck | 0.15 0.1 | Heg Hij | 608\|0.107\|25\|1.057\|85 | 700\|0.136\|25\|1.781\|85 | 751\|0.094\|25\|1.374\|85 |
| 660 | 0.02 | Mal | 0.098 | Lck | 0.55 0.103 | Hl Hij | 606\|0.052\|25\|0.676\|85 | 656\|0.066\|25\|1.02\|85 | 702\|0.069\|25\|1.065\|85 |
| 661 | 0.01 | Mal | 0.16 | Lbd | 0.02 | Hv | 418\|0.14\|25\|0.498\|85 | 505\|0.051\|25\|1.145\|85 | |
| 662 | 0.02 | Mal | 2.26 | Lbs | 0.1 0.2 | Hab Hij | 595\|0.148\|25\|1.746\|85 | 645\|0.175\|25\|1.526\|85 | 1025\|0.097\|25\|0.479\|85 |
| 663 | 0.02 | Mal | 0.29 | Lck | 0.04 0.16 0.1 | Haj Hco Hij | 426\|0.368\|25\|2.736\|85 | 626\|0.217\|25\|2.307\|85 | 1012\|0.08\|25\|0.437\|85 |
| 664 | 0.02 | Mal | 0.18 | Lck | 0.1 0.061 | Hco Hij | 421\|0.249\|25\|5\|85 | 683\|0.072\|25\|1.408\|85 | 731\|0.061\|25\|1.504\|85 |
| 665 | 0.02 | Mal | 2.84 | Lbd | 0.06 0.06 | Haj Hij | 560\|0.043\|25\|1.066\|85 | 616\|0.075\|25\|1.458\|85 | 1014\|0.047\|25\|0.297\|85 |
| 666 | 0.01 | Mal | 1.26 | Lbs | 0.02 0.6 | Hje Hke | 570\|0.135\|25\|0.928\|85 | 640\|0.111\|25\|0.699\|85 | 908\|0.101\|25\|0.627\|85 |
| 667 | 0.02 | Mal | 2.39 | Lbd | 0.06 0.06 | Haj Hij | 557\|0.069\|25\|1.305\|85 | 615\|0.108\|25\|1.866\|85 | 1010\|0.055\|25\|0.381\|85 |
| 668 | 0.02 | Mal | 0.36 | Lck | 0.04 0.5 | Hje Hke | 589\|0.112\|25\|1.037\|85 | 643\|0.124\|25\|0.98\|85 | 954\|0.056\|25\|0.436\|85 |
| 669 | 0.01 | Mo | 0.057 | Lck | 0.49 0.02 | Hca Hir | 575\|0.282\|25\|0.898\|85 | 595\|0.284\|25\|0.929\|85 | 747\|0.838\|25\|2.671\|85 |
| 670 | 0.02 | Mal | 0.052 | Lck | 0.085 0.06 | Hct Hij | 655\|0.175\|25\|1.455\|85 | 702\|0.209\|25\|1.365\|85 | 746\|0.177\|25\|1.144\|85 |
| 671 | 0.01 | Mal | 0.27 | Lbq | 0.02 | Hv | 413\|0.14\|25\|0.635\|85 | 504\|0.067\|25\|1.647\|85 | |
| 672 | 0.002 | Mal | 0.0024 | Lck | 0.004 0.02 0.2 | Hdm Hir Hkf | 391\|0.162\|25\|2.315\|85 | 458\|0.042\|25\|1.139\|85 | 521\|0.024\|25\|0.646\|85 |
| 673 | 0.02 | Mak | 0.2 | Lbg | 0.02 0.2 | Hfz Hir | 794\|0.138\|25\|1.217\|85 | | |
| 674 | 0.02 | Mak | 0.16 | Lcg | 0.2 | Hfz | 703\|0.172\|25\|2.084\|85 | 756\|0.15\|25\|2.035\|85 | |
| 675 | 0.01 | Mo | 0.2 | Lck | 0.04 | Hrc | 506\|0.491\|25\|2.868\|85 | 578\|0.074\|25\|0.35\|85 | |
| 676 | 0.003 | Mal | 0.065 | Lck | 0.03 0.03 | Hir Hjr | 418\|0.135\|25\|3.871\|85 | 505\|0.059\|25\|1.723\|85 | 563\|0.061\|25\|1.696\|85 |
| 677 | 0.01 0.01 | Mao Mal | 0.77 | Lbs | 0.02 | Hgm | 493\|0.188\|25\|0.998\|85 | | |
| 678 | 0.01 | Mo | 0.47 0.5 | Lck Lco | 0.06 | Hgh | 536\|0.175\|25\|0.782\|85 | 576\|0.127\|25\|1.022\|85 | 612\|0.085\|25\|0.798\|85 |
| 679 | 0.02 | Mal | 0.095 | Lck | 0.52 0.04 | Hej Hij | 608\|0.102\|25\|0.962\|85 | 637\|0.144\|25\|1.06\|85 | 700\|0.15\|25\|0.706\|85 |
| 680 | 0.02 | Mak | 0.32 | Lbg | 0.02 0.2 | Hfw Hir | 531\|0.072\|25\|2.947\|85 | 760\|0.128\|25\|0.69\|85 | |
| 681 | 0.02 | Mal | 0.14 | Lck | 0.06 0.1 | Hns Hij | 631\|0.158\|25\|1.704\|85 | 694\|0.14\|25\|1.205\|85 | 1194\|0.087\|25\|0.417\|85 |
| 682 | 0.02 | Mal | 0.095 | Lck | 0.02 0.06 | Hnm Hij | 450\|0.229\|25\|1.754\|85 | 544\|0.083\|25\|0.368\|85 | 781\|0.091\|25\|0.466\|85 |
| 683 | 0.01 | Mal | 1.13 | Lcz | 0.02 | Hv | 419\|0.095\|25\|0.327\|85 | 503\|0.059\|25\|0.762\|85 | |
| 684 | 0.02 | Mal | 0.11 | Lck | 0.02 0.06 | Hnm Hja | 414\|0.57\|25\|1.294\|85 | 662\|0.323\|25\|0.454\|85 | |
| 685 | 0.02 | Mal | 0.6 | Ldc | 0.02 0.024 | Hnt Hje | 536\|0.135\|25\|0.429\|85 | | |
| 686 | 0.01 | Mo | 0.74 | Lck | 0.01 0.011 | Hnm Hij | 538\|0.342\|25\|0.545\|85 | 604\|0.318\|25\|0.979\|85 | 625\|0.282\|25\|0.912\|85 |
| 687 | 0.01 | Mo | 1.36 | Lck | 0.1 0.01 | Hfz Hgm | 568\|24\|0.509\|85 | 647\|24\|1.599\|85 | 665\|24\|1.654\|85 |
| 688 | 0.01 | Mo | 1.8 | Lck | 0.01 0.03 | Han Hje | 572\|0.631\|25\|1.491\|85 | 658\|0.837\|25\|2.36\|85 | 683\|0.917\|25\|2.589\|85 |
| 689 | 0.01 | Mal | 0.48 | Lck | 0.05 0.03 | Hrc Hij | 506\|0.025\|25\|0.345\|85 | | |
| 690 | 0.02 | Mal | 0.31 | Lck | 0.1 0.061 | Hdv Hij | 595\|0.126\|25\|0.95\|85 | 655\|0.145\|25\|0.787\|85 | 1039\|0.084\|25\|0.287\|85 |

TABLE 27-continued

| Ex.# | [M] | M | [LeL] | LeL | [HeL] | HeL | Lmax\|A\|T\|Ah\|Th | Lmax\|A\|T\|Ah\|Th | Lmax\|A\|T\|Ah\|Th |
|---|---|---|---|---|---|---|---|---|---|
| 691 | 0.02 | Mal | 0.38 | Lck | 0.04<br>0.2 | Hgz<br>Hje | 485\|0.04\|25\|0.536\|85 | 653\|0.131\|25\|0.807\|85 | 705\|0.081\|25\|0.774\|85 |
| 692 | 0.02 | Mal | 0.085 | Lck | 0.05<br>0.08 | Hdf<br>Hij | 608\|0.241\|25\|1.376\|85 | 642\|0.23\|25\|1.462\|85 | 697\|0.175\|25\|1.244\|85 |
| 693 | 0.04 | Mal | 0.24 | Lck | 0.02<br>0.2 | Hhb<br>Hij | 433\|0.877\|25\|2.641\|85 | 706\|0.32\|25\|1.681\|85 | 755\|0.269\|25\|1.59\|85 |
| 694 | 0.04 | Mal | 2.05 | Lbs | 0.04<br>0.12 | Hbt<br>Hij | 548\|0.087\|25\|2.455\|85 | 611\|0.155\|25\|2.471\|85 | 970\|0.107\|25\|1.142\|85 |
| 695 | 0.02 | Mal | 0.74 | Lck | 0.0102<br>0.3 | Hm<br>Hij | 555\|0.11\|25\|1.417\|85 | 595\|0.107\|25\|1.064\|85 | 1036\|0.08\|25\|0.43\|85 |
| 696 | 0.04 | Mal | 0.56 | Lck | 0.026<br>0.015<br>0.3 | Hbt<br>Hhb<br>Hij | 426\|0.548\|25\|1.684\|85 | 545\|0.16\|25\|0.927\|85 | 630\|0.207\|25\|1.048\|85 |
| 697 | 0.005 | Ma | 0.045 | Lck | 0.025<br>0.015 | Hir<br>Hke | 390\|0.243\|25\|5\|85 | 510\|0.037\|25\|1.862\|85 | 670\|0.054\|25\|0.674\|85 |
| 698 | 0.04 | Mal | 0.31 | Lck | 0.025<br>0.015<br>0.2 | Hgm<br>Hhb<br>Hij | 430\|0.612\|25\|1.849\|85 | 521\|0.144\|25\|0.739\|85 | 700\|0.237\|25\|0.627\|85 |
| 699 | 0.01 | Mal | 0.095 | Lbs | 0.058<br>0.04 | Hai<br>Hij | 556\|0.045\|25\|0.848\|85 | 619\|0.082\|25\|1.268\|85 | 987\|0.045\|25\|0.267\|85 |
| 700 | 0.01 | Mal | 0.92 | Lbs | 0.127<br>0.04 | Hai<br>Hij | 556\|0.043\|25\|1.085\|85 | 602\|0.076\|25\|1.238\|85 | 986\|0.049\|25\|0.351\|85 |
| 701 | 0.005 | Mf | 0.77 | Lbs | 0.005<br>0.05<br>0.016 | Haj<br>Hir<br>Hke | 412\|0.232\|25\|4.519\|85 | 560\|0.059\|25\|3.114\|85 | 735\|0.033\|25\|0.979\|85 |
| 702 | 0.02 | Mal | 0.14 | Lck | 0.2<br>0.02 | Hfz<br>Hbf | 498\|0.067\|25\|1.162\|85 | 866\|0.074\|25\|0.366\|85 | 994\|0.101\|25\|0.437\|85 |
| 703 | 0.02 | Mal | 0.35 | Lck | 0.04<br>0.2 | Hdp<br>Hfz | 630\|0.244\|25\|2.617\|85 | 1134\|0.075\|25\|0.581\|85 | |
| 704 | 0.02 | Mal | 0.16 | Lck | 0.037<br>0.12 | Hff<br>Hij | 661\|0.104\|25\|1.956\|85 | 694\|0.118\|25\|2.037\|85 | 734\|0.105\|25\|1.924\|85 |
| 705 | 0.01 | Mo | | | 0.35<br>0.01 | Hgi<br>Hjg | 535\|0.457\|25\|1.126\|85 | 571\|0.56\|25\|1.776\|85 | 600\|0.463\|25\|1.681\|85 |
| 706 | 0.01 | Mal | 0.25 | Lck | 0.04<br>0.1<br>0.02 | Hfz<br>Hir<br>Hke | 377\|0.3\|25\|3.008\|65 | 679\|0.048\|25\|0.649\|85 | 1046\|0.035\|25\|0.294\|85 |
| 707 | 0.01 | Mo | 1.21 | Lck | 0.2<br>0.04 | Hfz<br>Hgp | 590\|0.104\|25\|1.002\|85 | 663\|0.131\|25\|3.084\|85 | 698\|0.042\|25\|2.706\|85 |
| 708 | 0.04 | Mal | 0.37 | Lck | 0.021<br>0.05<br>0.13 | Hbs<br>Hhh<br>Hje | 487\|0.042\|25\|0.927\|85 | 632\|0.263\|25\|1.018\|85 | 945\|0.098\|25\|0.528\|85 |
| 709 | 0.02 | Mak | 1.3 | Lcs | 0.2 | Hfz | 706\|0.535\|25\|3.47\|65 | 756\|0.507\|25\|3.232\|65 | |
| 710 | 0.02 | Mak | 0.75 | Lag | 0.2 | Hfz | 667\|0.08\|25\|1.514\|85 | 705\|0.104\|25\|1.769\|85 | 756\|0.089\|25\|1.659\|85 |
| 711 | 0.005 | Mal | 0.015 | Lck | 0.005<br>0.05 | Hci<br>Hir | 395\|0.073\|25\|2.736\|85 | 513\|0.02\|25\|1.833\|85 | 819\|0.006\|25\|0.237\|85 |
| 712 | 0.01 | Mal | 0.17 | Lck | 0.005<br>0.02<br>0.1 | Hbt<br>Hfz<br>Hir | 652\|0.094\|25\|0.841\|85 | 1025\|0.051\|25\|0.376\|85 | |
| 713 | 0.02 | Mak | | | 0.056<br>0.051 | Hjf<br>Hjg | 555\|0.108\|25\|0.418\|85 | 625\|0.067\|25\|0.289\|85 | |
| 714 | 0.02 | Mal | 0.25 | Lck | 0.2<br>0.02 | Hfz<br>Hez | 514\|0.051\|25\|0.225\|85 | 700\|0.098\|25\|0.306\|85 | 756\|0.059\|25\|0.259\|85 |
| 715 | 0.02 | Mal | 0.15 | Lck | 0.02<br>0.2 | Hcw<br>Hfz | 665\|0.099\|25\|0.302\|85 | 702\|0.108\|25\|0.392\|85 | 756\|0.084\|25\|0.373\|85 |
| 716 | 0.02 | Mak | 1.51 | Lab | 0.2 | Hfz | 658\|0.308\|25\|1.376\|85 | 705\|0.394\|25\|1.314\|85 | 755\|0.391\|25\|1.221\|85 |
| 717 | 0.02 | Mak | 0.18 | Lch | 0.2 | Hfz | 669\|0.167\|25\|1.857\|85 | 704\|0.221\|25\|2.38\|85 | 757\|0.201\|25\|2.319\|85 |
| 718 | 0.01 | Mo | 0.86 | Lck | 0.01<br>0.6 | Hje<br>Hkf | 597\|0.369\|25\|1.154\|85 | 647\|0.598\|25\|1.756\|85 | 667\|0.718\|25\|1.948\|85 |
| 719 | 0.003 | Mal | 0.024 | Lck | 0.03<br>0.006 | Hir<br>Hjy | 395\|0.036\|25\|0.642\|85 | 500\|0.01\|25\|0.307\|85 | 735\|0.012\|25\|0.081\|85 |
| 720 | 0.01 | Mo | 0.67 | Lck | 1<br>0.049 | Hhh<br>Hir | 620\|0.221\|25\|2.573\|85 | 648\|0.261\|25\|3.539\|85 | 687\|0.179\|25\|2.798\|85 |
| 721 | 0.01 | Mo | 0.07 | Lbg | 0.15 | Hgi | 532\|0.277\|25\|0.96\|85 | 575\|0.221\|25\|1.391\|85 | |
| 722 | 0.02 | Mal | 0.26 | Lck | 0.01<br>0.01<br>0.2 | Hbu<br>Hdp<br>Hfz | 521\|0.028\|25\|0.628\|85 | 632\|0.319\|25\|1.6\|85 | 981\|0.065\|25\|0.304\|85 |
| 723 | 0.01 | Mo | 0.55 | Lck | 0.12 | Hwq | 550\|0.076\|25\|0.359\|85 | 583\|0.097\|25\|0.478\|85 | 636\|0.126\|25\|0.612\|85 |
| 724 | 0.002 | Mal | 0.0054 | Lck | 0.02<br>0.4 | Hir<br>Hkf | 380\|0.138\|25\|1.248\|85 | 500\|0.012\|25\|0.202\|85 | 680\|0.034\|25\|0.162\|85 |
| 725 | 0.02 | Mal | 0.44 | Lck | 0.04<br>0.1 | Hdp<br>Hje | 565\|0.087\|25\|1.517\|85 | 607\|0.155\|25\|1.771\|85 | 1108\|0.077\|25\|0.438\|85 |
| 726 | 0.005 | Maf | 0.11 | Lck | 0.2 | Hke | 430\|0.24\|25\|2.002\|85 | 635\|0.032\|25\|0.28\|85 | 1025\|0.02\|25\|0.136\|85 |
| 727 | 0.02 | Mak | 0.69 | Lbg | 0.1<br>0.1 | Hcb<br>Hfz | 655\|0.241\|25\|1.589\|85 | 688\|0.258\|25\|1.464\|85 | |
| 728 | 0.02 | Mal | 0.47 | Lck | 0.04<br>0.1 | Hdm<br>Hen | 606\|0.123\|25\|1.596\|85 | 652\|0.171\|25\|1.207\|85 | 1111\|0.068\|25\|0.396\|85 |

TABLE 27-continued

| Ex.# | [M] | M | [LeL] | LeL | [HeL] | HeL | Lmax\|A\|T\|Ah\|Th | Lmax\|A\|T\|Ah\|Th | Lmax\|A\|T\|Ah\|Th |
|---|---|---|---|---|---|---|---|---|---|
| 729 | 0.02 | Mal | 0.4 | Lck | 0.02 0.2 | Hbt Hja | 620\|0.377\|25\|1.306\|85 | 666\|0.531\|25\|1.33\|85 | 1009\|0.138\|25\|0.323\|85 |
| 730 | 0.005 | Mal | 0.036 | Lck | 0.015 0.005 | Hhc Hke | 528\|0.119\|25\|1.323\|85 | 708\|0.029\|25\|0.287\|85 | |
| 731 | 0.01 | Mal | 0.18 | Lck | 0.06 0.1 | Hcn Hir | 492\|0.201\|25\|5\|85 | 792\|0.023\|25\|0.809\|85 | |
| 732 | 0.02 | Mak | 1.1 | Lbg | 0.04 0.1 | Hfw Hje | 620\|0.208\|25\|1.589\|85 | | |
| 733 | 0.04 | Mak | 0.13 | Lck | 0.2 0.02 | Hfz Hbs | 505\|0.12\|25\|1.662\|85 | 702\|0.4\|25\|1.943\|85 | 755\|0.265\|25\|1.829\|85 |
| 734 | 0.02 | Mal | 0.24 | Lck | 0.02 0.06 0.04 | Har Hij Hke | 553\|0.064\|25\|0.85\|85 | 625\|0.152\|25\|1.569\|85 | 1140\|0.079\|25\|0.36\|85 |
| 735 | 0.01 | Mo | 2.3 | Lck | 0.1 0.1 | Hff Hfz | 605\|0.2\|25\|1.278\|85 | 686\|0.454\|25\|2.739\|85 | |
| 736 | 0.01 | Mo | | | 0.06 0.9 | Hga Hcv | 600\|0.214\|25\|1.988\|85 | 635\|0.179\|25\|2.254\|85 | 665\|0.148\|25\|2.395\|85 |
| 737 | 0.01 | Mo | 1.63 | Lck | 0.02 0.2 | Hij Hna | 624\|0.097\|25\|0.902\|85 | 667\|0.114\|25\|1.25\|85 | 694\|0.057\|25\|0.916\|85 |
| 738 | 0.005 | Mal | 0.03 | Lck | 0.05 0.05 | Hei Hir | 530\|0.11\|25\|2.481\|85 | 715\|0.025\|25\|0.527\|85 | |
| 739 | 0.01 | Mo | | | 0.1 0.21 | Hfz Hin | 532\|0.213\|25\|0.403\|85 | 576\|0.125\|25\|0.454\|85 | |
| 740 | 0.02 | Mak | 0.93 | Lbg | 0.02 0.1 | Hfw Hje | 623\|0.211\|25\|1.511\|85 | 654\|0.225\|25\|1.451\|85 | 697\|0.189\|25\|1.129\|85 |
| 741 | 0.01 | Mh | 0.93 | Lbg | 0.03 | Hea | 590\|0.277\|25\|1.057\|85 | 660\|0.365\|25\|2.274\|85 | |
| 742 | 0.02 | Mal | 0.25 | Lck | 0.01 0.1 | Hea Hje | 481\|0.102\|25\|0.755\|85 | 652\|0.118\|25\|0.97\|85 | 704\|0.138\|25\|1\|85 |
| 743 | 0.02 | Mak | 0.76 | Lal | 0.2 | Hfz | 664\|0.125\|25\|1.255\|85 | 703\|0.125\|25\|1.441\|85 | 755\|0.105\|25\|1.335\|85 |
| 744 | 0.007 | Mq | 0.022 | Lar | 0.12 | Hfz | 498\|0.038\|25\|0.486\|85 | 760\|2.531\|25\|2.154\|85 | |
| 745 | 0.02 | Mak | 2.16 | Lbg | 0.04 0.16 | Hfo Hfz | 626\|0.164\|25\|0.905\|85 | 680\|0.141\|25\|0.78\|85 | 1020\|0.091\|25\|0.408\|85 |
| 746 | 0.01 | Mo | 0.67 | Lck | 0.1 0.03 | Hfz Hgh | 641\|0.118\|25\|2.009\|85 | 700\|0.143\|25\|2.948\|85 | 724\|0.106\|25\|2.205\|85 |
| 747 | 0.01 | Mo | 0.2 | Lck | 0.1 | Hfi | 515\|0.189\|25\|0.494\|85 | 572\|0.137\|25\|0.512\|85 | 599\|0.106\|25\|0.46\|85 |
| 748 | 0.02 | Mal | 0.12 | Lck | 0.04 0.1 | Hqn Hij | 503\|0.135\|25\|0.901\|85 | 667\|0.084\|25\|0.366\|85 | 981\|0.087\|25\|0.366\|85 |
| 749 | 0.02 | Mal | 0.61 | Lbs | 0.02 0.1 | Htq Hij | 558\|0.09\|25\|0.786\|85 | 603\|0.111\|25\|0.876\|85 | 1002\|0.096\|25\|0.375\|85 |
| 750 | 0.02 | Mal | 0.79 | Lbs | 0.02 0.1 | Hof Hij | 551\|0.1\|25\|0.786\|85 | 611\|0.191\|25\|0.903\|85 | 992\|0.114\|25\|0.354\|85 |
| 751 | 0.02 | Mal | 0.55 | Lbs | 0.02 0.1 | Htp Hij | 417\|0.389\|25\|1.912\|85 | 503\|0.209\|25\|2.017\|85 | 948\|0.133\|25\|0.791\|85 |
| 752 | 0.01 | Mal | 0.17 | Lbs | 0.01 0.03 | Htm Hij | 533\|0.088\|25\|0.538\|85 | 706\|0.055\|25\|0.274\|85 | 950\|0.034\|25\|0.17\|85 |
| 753 | 0.02 | Mal | 0.86 | Lck | 0.02 0.1 | Hto Hij | 429\|0.135\|25\|0.957\|85 | 512\|0.087\|25\|1.063\|85 | 858\|0.046\|25\|0.396\|85 |
| 754 | 0.02 | Mal | 0.94 | Lbs | 0.012 0.2 | Hbs Hij | 414\|0.245\|25\|1.234\|85 | 503\|0.099\|25\|1.291\|85 | 704\|0.097\|25\|0.616\|85 |
| 755 | 0.02 | Mal | 0.5 | Lbs | 0.02 0.061 | Htk Hij | 564\|0.158\|25\|0.902\|85 | 597\|0.215\|25\|0.984\|85 | 1010\|0.102\|25\|0.359\|85 |
| 756 | 0.02 | Mal | 0.53 | Lbs | 0.02 0.06 | Hrl Hij | 651\|0.27\|25\|1.406\|85 | 685\|0.291\|25\|1.427\|85 | 1196\|0.14\|25\|0.343\|85 |
| 757 | 0.04 | Mal | 0.72 | Lbs | 0.027 0.2 0.011 | Hgz Hij Hja | 502\|0.134\|25\|1.576\|85 | 663\|0.262\|25\|1.566\|85 | 967\|0.206\|25\|0.725\|85 |
| 758 | 0.02 | Mal | 1.05 | Lbs | 0.1 0.1 | Hos Hij | 621\|0.06\|25\|1.543\|85 | 651\|0.084\|25\|1.7\|85 | 691\|0.091\|25\|1.529\|85 |
| 759 | 0.02 | Mal | 0.85 | Lbs | 0.06 | Hrk | 616\|0.163\|25\|1.338\|85 | 642\|0.191\|25\|1.436\|85 | 1206\|0.132\|25\|0.401\|85 |
| 760 | 0.02 | Mal | 0.3 | Lbs | 0.02 0.1 | Hpg Hij | 513\|0.132\|25\|0.584\|85 | 670\|0.189\|25\|1.473\|85 | 755\|0.208\|25\|1.724\|85 |
| 761 | 0.02 | Mat | | | | | 654\|0.168\|25\|0.568\|85 | 704\|0.182\|25\|0.49\|85 | 751\|0.164\|25\|0.454\|85 |
| 762 | 0.005 | Mal | 0.026 | Lck | 0.005 0.026 | Hur Hij | 499\|0.068\|25\|0.99\|85 | 813\|0.057\|25\|0.308\|85 | 897\|0.061\|25\|0.296\|85 |
| 763 | 0.02 | Mal | 1.49 | Lbs | 0.02 0.1 | Huj Hij | 514\|0.053\|25\|1.301\|85 | 590\|0.038\|25\|0.628\|85 | 652\|0.077\|25\|0.607\|85 |
| 764 | 0.02 | Mal | 1.21 | Lbs | 0.02 0.1 | Hui Hij | 413\|0.349\|25\|2.608\|85 | 523\|0.084\|25\|1.259\|85 | 648\|0.141\|25\|1.179\|85 |
| 765 | 0.02 | Mal | 0.74 | Lbs | 0.02 0.1 | Htd Hij | 522\|0.124\|25\|1.765\|85 | 854\|0.077\|25\|0.643\|85 | 957\|0.115\|25\|0.759\|85 |
| 766 | 0.02 | Mal | 0.089 | Lbs | 0.04 0.2 | Hst Hij | 419\|0.106\|25\|1.436\|85 | 520\|0.081\|25\|0.769\|85 | 620\|0.093\|25\|0.943\|85 |
| 767 | 0.02 | Mal | 0.59 | Lbs | 0.005 0.008 0.1 | Hou Hbs Hij | 503\|0.15\|25\|1.497\|85 | 655\|0.166\|25\|0.925\|85 | 855\|0.081\|25\|0.542\|85 |
| 768 | 0.02 | Mal | 0.09 | Lbd | 0.02 0.02 | Hgm Him | 506\|0.086\|25\|0.538\|85 | | |

TABLE 27-continued

| Ex.# | [M] | M | [LeL] | LeL | [HeL] | HeL | Lmax\|A\|T\|Ah\|Th | Lmax\|A\|T\|Ah\|Th | Lmax\|A\|T\|Ah\|Th |
|---|---|---|---|---|---|---|---|---|---|
| 769 | 0.005 | Mf | 0.11 | Lck | 0.04 | Hrm | 417\|0.078\|25\|0.896\|85 | 562\|0.033\|25\|0.422\|85 | 745\|0.01\|25\|0.127\|85 |
| 770 | 0.02 | Mal | 0.83 | Lbs | 0.02 0.05 | Huj Hij | 514\|0.144\|25\|1.786\|85 | 653\|0.118\|25\|0.701\|85 | 1011\|0.095\|25\|0.604\|85 |
| 771 | 0.02 | Mal | 0.35 | Lbs | 0.04 0.04 | Hha Hij | 530\|0.079\|25\|1.163\|85 | 649\|0.072\|25\|0.401\|85 | 960\|0.059\|25\|0.557\|85 |
| 772 | 0.02 | Mal | 1.13 | Lbs | 0.036 0.1 | Hwc Hij | 553\|0.099\|25\|1.67\|85 | 605\|0.156\|25\|2.121\|85 | 972\|0.072\|25\|0.522\|85 |
| 773 | 0.003 | Mbo | 0.022 | Lck | 0.003 0.027 0.001 | Hwc Hir Hke | 388\|0.152\|25\|2.507\|85 | 509\|0.05\|25\|1.105\|85 | 700\|0.022\|25\|0.264\|85 |
| 774 | 0.03 | Mal | 1.02 | Lbs | 0.015 0.2 | Hwa Hij | 611\|0.081\|25\|2.043\|85 | 652\|0.125\|25\|2.467\|85 | 751\|0.091\|25\|1.646\|85 |
| 775 | 0.005 | Mbn | 0.032 | Lck | | | 418\|0.153\|25\|2.358\|85 | 563\|0.061\|25\|1.04\|85 | 745\|0.02\|25\|0.261\|85 |
| 776 | 0.02 | Mal | 1.92 | Lbs | 0.02 0.1 | Hvw Hij | 553\|0.142\|25\|2.363\|85 | 591\|0.131\|25\|1.779\|85 | 1029\|0.095\|25\|0.689\|85 |
| 777 | 0.02 | Mal | 1.23 | Lbs | 0.01 0.1 | Hvn Hij | 418\|0.249\|25\|1.705\|85 | 506\|0.086\|25\|1.26\|85 | 646\|0.074\|25\|0.475\|85 |
| 778 | 0.02 | Mal | 1.38 | Lbs | 0.02 0.1 | Hvo Hij | 518\|0.058\|25\|1.609\|85 | 645\|0.072\|25\|0.489\|85 | 970\|0.05\|25\|0.628\|85 |
| 779 | 0.02 | Mal | 1.41 | Lbs | 0.02 0.1 | Hvn Hij | 506\|0.074\|25\|1.867\|85 | 633\|0.074\|25\|0.478\|85 | 950\|0.051\|25\|0.666\|85 |
| 780 | 0.02 | Mal | 1 | Lbs | 0.02 0.1 | Hou Hij | 436\|0.329\|25\|1.118\|85 | 553\|0.079\|25\|0.629\|85 | 594\|0.147\|25\|0.612\|85 |
| 781 | 0.02 | Mal | 2.6 | Lbd | 0.2 | Hij | 658\|0.085\|25\|2.734\|85 | 703\|0.104\|25\|2.231\|85 | 748\|0.098\|25\|1.587\|85 |
| 782 | 0.02 | Mal | 0.47 | Lbs | 0.02 0.1 | Hry Hij | 515\|0.118\|25\|1.294\|85 | 559\|0.117\|25\|0.876\|85 | 986\|0.124\|25\|0.561\|85 |
| 783 | 0.02 | Mal | 1.52 | Lbs | 0.02 0.1 | Hss Hij | 415\|0.224\|25\|2.428\|85 | 507\|0.074\|25\|1.894\|85 | 953\|0.047\|25\|0.676\|85 |
| 784 | 0.02 | Mal | 1.15 | Lbs | 0.008 0.15 | Haz Hij | 527\|0.074\|25\|0.966\|85 | 654\|0.07\|25\|0.694\|85 | 754\|0.063\|25\|0.62\|85 |
| 785 | 0.02 | Mal | 0.047 | Lbs | 0.04 0.2 | Hsz Hij | 502\|0.186\|25\|1.277\|85 | 701\|0.249\|25\|1.009\|85 | 957\|0.147\|25\|0.538\|85 |
| 786 | 0.02 | Mal | 0.05 | Lbs | 0.04 0.1 | Hst Hij | 520\|0.084\|25\|0.787\|85 | 603\|0.104\|25\|0.946\|85 | 974\|0.097\|25\|0.482\|85 |
| 787 | 0.02 | Mal | 0.34 | Lbs | 0.03 0.1 | Hst Hij | 520\|0.053\|25\|0.491\|85 | 604\|0.098\|25\|0.576\|85 | 976\|0.1\|25\|0.332\|85 |
| 788 | 0.02 | Mal | 0.81 | Lbs | 0.007 0.008 0.15 | Hoz Htq Hij | 497\|0.111\|25\|1.113\|85 | 558\|0.086\|25\|1.086\|85 | 642\|0.125\|25\|1.043\|85 |
| 789 | 0.02 | Mal | 1.34 | Lbs | 0.02 0.1 | Hsc Hij | 528\|0.129\|25\|1.288\|85 | 649\|0.071\|25\|0.434\|85 | 990\|0.074\|25\|0.492\|85 |
| 790 | 0.02 | Mal | 0.93 | Lbs | 0.02 0.1 | Hrz Hij | 514\|0.087\|25\|1.079\|85 | 565\|0.077\|25\|0.614\|85 | 987\|0.107\|25\|0.443\|85 |
| 791 | 0.01 | Mal | 0.088 | Lcd | 0.02 | Hv | 500\|0.093\|25\|0.821\|85 | | |
| 792 | 0.02 | Mal | 0.14 | Lbs | 0.02 0.06 | Hvm Hij | 507\|0.105\|25\|1.364\|85 | 706\|0.251\|25\|0.868\|85 | 970\|0.111\|25\|0.586\|85 |
| 793 | 0.01 | Mal | 0.72 | Lp | 0.02 | Hv | 420\|0.153\|25\|0.843\|85 | 502\|0.272\|25\|2.369\|85 | |
| 794 | 0.02 | Mal | 1.85 | Lbs | 0.02 0.1 | Hgk Hij | 538\|0.098\|25\|1.122\|85 | 860\|0.044\|25\|0.376\|85 | 967\|0.056\|25\|0.376\|85 |
| 795 | 0.01 0.01 | Mao Mal | 0.14 | Ldg | 0.02 | Hgm | 492\|0.173\|25\|0.885\|85 | | |
| 796 | 0.01 0.01 | Mao Mal | 0.069 | Ldh | 0.02 | Hgm | 492\|0.172\|25\|0.845\|85 | | |
| 797 | 0.02 | Mal | 0.083 | Lck | 0.1 0.1 | Hpj Hij | 628\|0.225\|25\|2.311\|85 | 691\|0.205\|25\|1.765\|85 | 1145\|0.099\|25\|0.51\|85 |
| 798 | 0.02 | Mal | 0.32 | Lck | 0.063 0.1 | Hij Hja | 615\|0.24\|25\|2.339\|85 | 668\|0.306\|25\|1.971\|85 | 1049\|0.165\|25\|0.518\|85 |
| 799 | 0.02 | Mal | 0.23 | Lck | 0.1 0.02 | Hij Hja | 658\|0.133\|25\|1.308\|85 | 704\|0.102\|25\|1.039\|85 | 1200\|0.118\|25\|0.24\|85 |
| 800 | 0.02 | Mal | 0.12 | Lck | 0.1 0.06 | Hnw Hij | 690\|0.068\|25\|1.214\|85 | 731\|0.061\|25\|1.261\|85 | 1242\|0.054\|25\|0.24\|85 |
| 801 | 0.02 | Mal | 0.14 | Lck | 0.1 0.06 | Hpo Hij | 646\|0.122\|25\|0.962\|85 | 693\|0.103\|25\|0.848\|85 | 1200\|0.075\|25\|0.217\|85 |
| 802 | 0.005 | Me | 1.31 | Lbs | 0.15 | Hke | 382\|0.142\|25\|1.505\|85 | 432\|0.125\|25\|1.383\|85 | 627\|0.016\|25\|0.124\|85 |
| 803 | 0.01 | Mo | 0.41 | Lck | 0.02 | Hnu | 533\|0.231\|25\|0.427\|85 | 565\|0.247\|25\|0.505\|85 | 603\|0.221\|25\|0.466\|85 |
| 804 | 0.01 | Mo | 0.055 | Lbd | 0.02 | Hv | 492\|0.195\|25\|0.433\|85 | | |
| 805 | 0.02 | Mal | 0.15 | Lck | 0.02 0.06 | Hnm Hij | 450\|0.129\|25\|1.426\|85 | 777\|0.069\|25\|0.387\|85 | |
| 806 | 0.02 | Mal | 0.39 | Lck | 0.2 0.2 | Hij Hna | 651\|0.152\|25\|2.039\|85 | 699\|0.125\|25\|1.58\|85 | 1200\|0.104\|25\|0.474\|85 |
| 807 | 0.02 | Mal | 0.097 | Lck | 0.021 0.1 | Hnd Hij | 663\|0.139\|25\|1.578\|85 | 701\|0.135\|25\|1.662\|85 | 752\|0.09\|25\|1.276\|85 |
| 808 | 0.005 | Mal | 0.1 | Lck | 0.024 0.06 | Hnh Hir | 412\|0.094\|25\|2.354\|85 | 555\|0.031\|25\|0.95\|85 | 738\|0.013\|25\|0.234\|85 |
| 809 | 0.02 | Mal | 0.077 | Lck | 0.1 0.1 | Hnf Hij | 428\|0.682\|25\|3.517\|85 | 704\|0.152\|25\|2.202\|85 | 753\|0.13\|25\|2.023\|85 |

TABLE 27-continued

| Ex.# | [M] | M | [LeL] | LeL | [HeL] | HeL | Lmax\|A\|T\|Ah\|Th | Lmax\|A\|T\|Ah\|Th | Lmax\|A\|T\|Ah\|Th |
|---|---|---|---|---|---|---|---|---|---|
| 810 | 0.01 | Mal | 0.36 | Lck | 0.02<br>0.1 | Hij<br>Hng | 405\|2.17\|25\|5\|85 | 570\|0.115\|25\|0.373\|85 | |
| 811 | 0.01 | Mal | 1.92 | Lbs | 0.3<br>0.02 | Hnh<br>Hij | 411\|1.09\|25\|5\|85 | 581\|0.123\|25\|0.582\|85 | 900\|0.04\|25\|0.151\|85 |
| 812 | 0.01<br>0.01 | Mao<br>Mal | 0.084 | Lbd | 0.02 | Hgm | 493\|0.195\|25\|0.999\|85 | | |
| 813 | 0.01 | Mo | 0.54 | Lck | 0.042<br>0.02 | Hnh<br>Hij | 636\|0.222\|25\|1.466\|85 | 704\|0.214\|25\|1.851\|85 | |
| 814 | 0.01 | Mo | 0.58 | Lck | 0.021<br>0.043 | Hij<br>Hng | 641\|0.125\|25\|1.319\|85 | 678\|0.133\|25\|1.659\|85 | 703\|0.149\|25\|1.807\|85 |
| 815 | 0.02 | Mal | 1.5 | Lbs | 0.08<br>0.02<br>0.06 | Hab<br>Haj<br>Hij | 580\|0.252\|25\|2.342\|85 | 648\|0.262\|25\|1.703\|85 | 1010\|0.131\|25\|0.662\|85 |
| 816 | 0.02 | Mal | 0.16 | Lck | 0.041<br>0.2 | Hij<br>Hna | 620\|0.257\|25\|1.501\|85 | 649\|0.274\|25\|1.465\|85 | 1110\|0.108\|25\|0.342\|85 |
| 817 | 0.02 | Mal | 1.52 | Lbs | 0.02<br>0.1 | Hss<br>Hij | 416\|0.276\|25\|2.436\|85 | 507\|0.089\|25\|1.884\|85 | 860\|0.04\|25\|0.604\|85 |
| 818 | 0.02 | Mal | 0.214 | Lck | 0.025<br>0.061 | Hri<br>Hij | 434\|0.369\|25\|1.639\|85 | 717\|0.112\|25\|0.501\|85 | |
| 819 | 0.02 | Mal | 0.65 | Lbt | 0.2 | Hrg | 560\|0.411\|25\|1.207\|85 | 723\|0.421\|25\|1.052\|85 | |
| 820 | 0.02 | Mas | 0.27 | Lbt | | | 560\|0.394\|25\|1.207\|85 | 722\|0.317\|25\|0.991\|85 | |
| 821 | 0.02 | Mal | 0.11 | Lbt | 0.2<br>0.1 | Har<br>Hij | 602\|0.502\|25\|2.307\|85 | 992\|0.218\|25\|0.614\|85 | |
| 822 | 0.02 | Mal | 0.15 | Lbt | 0.15 | Hik | 484\|0.028\|25\|0.246\|85 | 656\|0.243\|25\|2.324\|85 | 704\|0.183\|25\|2.357\|85 |
| 823 | 0.02 | Mal | 0.1 | Lbt | 0.15 | Hik | 654\|0.381\|25\|2.649\|85 | 704\|0.331\|25\|2.703\|85 | |
| 824 | 0.005<br>0.02 | Mo<br>Mal | 0.094 | Lck | 0.025<br>0.2 | Hgz<br>Hij | 503\|0.094\|25\|1.504\|85 | 642\|1.129\|25\|1.579\|85 | 964\|0.118\|25\|0.597\|85 |
| 825 | 0.02 | Mal | 0.07 | Lck | 0.1<br>0.061 | Hnv<br>Hij | 662\|0.072\|25\|0.889\|85 | 704\|0.076\|25\|0.991\|85 | 754\|0.061\|25\|0.945\|85 |
| 826 | 0.02 | Mal | 0.12 | Lck | 0.1<br>0.06 | Hnw<br>Hij | 686\|0.087\|25\|1.159\|85 | 727\|0.068\|25\|1.196\|85 | 1235\|0.054\|25\|0.232\|85 |
| 827 | 0.04 | Mal | 0.25 | Lck | 0.016<br>0.015<br>0.01 | Hbt<br>Hnm<br>Hgz | 450\|0.121\|25\|1.023\|85 | 511\|0.065\|25\|0.971\|85 | 609\|0.258\|25\|1.042\|85 |
| 828 | 0.01 | Mo | 0.8 | Lck | 0.1<br>0.05 | Hfz<br>Hgh | 617\|0.096\|25\|1.228\|85 | 665\|0.066\|25\|1.251\|85 | 697\|0.046\|25\|1.165\|85 |
| 829 | 0.04 | Mal | 0.27 | Lck | 0.016<br>0.015<br>0.015 | Hbt<br>Hbl<br>Hnm | 451\|0.128\|25\|0.844\|85 | 547\|0.125\|25\|1.115\|85 | 600\|0.208\|25\|1.085\|85 |
| 830 | 0.04 | Mal | 0.275 | Lck | 0.031<br>0.023<br>0.12 | Hbt<br>Hnm<br>Hij | 449\|0.13\|25\|1.175\|85 | 545\|0.131\|25\|1.175\|85 | 603\|0.236\|25\|1.151\|85 |
| 831 | 0.04 | Mal | 0.13 | Lck | 0.08<br>0.02<br>0.12 | Ho<br>Hnm<br>Hij | 448\|0.31\|25\|1.9\|85 | 708\|0.194\|25\|1.042\|85 | 757\|0.167\|25\|1.131\|85 |
| 832 | 0.02 | Mal | 0.13 | Lck | 0.06<br>0.06 | Hnu<br>Hij | 606\|0.221\|25\|1.056\|85 | 645\|0.221\|25\|1.068\|85 | 694\|0.125\|25\|0.912\|85 |
| 833 | 0.02 | Mal | 0.1 | Lck | 0.02<br>0.061 | Hnu<br>Hij | 598\|0.128\|25\|0.753\|85 | 653\|0.131\|25\|0.941\|85 | 700\|0.102\|25\|0.898\|85 |
| 834 | 0.04 | Mal | 0.14 | Lck | 0.02<br>0.02<br>0.12 | Hbl<br>Hnm<br>Hij | 454\|0.273\|25\|1.86\|85 | 498\|0.206\|25\|2.061\|85 | 758\|0.154\|25\|0.851\|85 |
| 835 | 0.02 | Mal | 0.18 | Lck | 0.1<br>0.062 | Hog<br>Hij | 688\|0.071\|25\|1.163\|85 | 731\|0.06\|25\|1.231\|85 | 1210\|0.067\|25\|0.238\|85 |
| 836 | 0.04 | Mal | 0.14 | Lck | 0.02<br>0.02<br>0.11 | Hbl<br>Hnm<br>Hij | 455\|0.353\|25\|1.666\|85 | 496\|0.255\|25\|1.882\|85 | 753\|0.189\|25\|0.824\|85 |
| 837 | 0.0105<br>0.0105 | Mao<br>Mal | 0.023 | Ldf | 0.021 | Hgm | 492\|0.326\|25\|1.112\|85 | | |
| 838 | 0.02 | Mal | 0.145 | Lck | 0.1<br>0.06 | Hnw<br>Hij | 677\|0.155\|25\|1.338\|85 | 715\|0.115\|25\|1.359\|85 | 1232\|0.069\|25\|0.257\|85 |
| 839 | 0.01 | Mal | 0.13 | Lck | 0.03<br>0.05<br>0.1 | Har<br>Hff<br>Hir | 376\|0.534\|25\|1.756\|85 | 632\|0.054\|25\|0.706\|85 | 793\|0.022\|25\|0.089\|85 |
| 840 | 0.02 | Mal | 0.21 | Lck | 0.01<br>0.2<br>0.01 | Hdp<br>Hfz<br>Haz | 518\|0.16\|25\|0.987\|85 | 611\|0.281\|25\|1.2\|85 | 969\|0.118\|25\|0.443\|85 |
| 841 | 0.02 | Mak | 0.16 | Lck | 0.02<br>0.1 | Hdo<br>Hfz | 635\|0.175\|25\|1.686\|85 | | |
| 842 | 0.02 | Mal | 0.39 | Lck | 0.1<br>0.06 | Hcr<br>Hij | 582\|0.247\|25\|1.578\|85 | 645\|0.26\|25\|1.186\|85 | 1015\|0.108\|25\|0.438\|85 |
| 843 | 0.02 | Mal | 0.08 | Lck | 0.06<br>0.06 | Hac<br>Hij | 610\|0.083\|25\|0.465\|85 | 660\|0.095\|25\|0.543\|85 | 700\|0.081\|25\|0.511\|85 |
| 844 | 0.02 | Mal | 0.29 | Lck | 0.01<br>0.2<br>0.015 | Hdp<br>Hfz<br>Hgz | 503\|0.027\|25\|0.589\|85 | 633\|0.165\|25\|1.083\|85 | 973\|0.079\|25\|0.288\|85 |

TABLE 27-continued

| Ex.# | [M] | M | [LeL] | LeL | [HeL] | HeL | Lmax\|A\|T\|Ah\|Th | Lmax\|A\|T\|Ah\|Th | Lmax\|A\|T\|Ah\|Th |
|---|---|---|---|---|---|---|---|---|---|
| 845 | 0.01 | Mo | 1.7 | Lck | 0.02<br>0.1 | Hfz<br>Hhh | 595\|0.215\|25\|1.623\|85 | 630\|0.307\|25\|2.391\|85 | 649\|0.347\|25\|2.637\|85 |
| 846 | 0.01 | Mo | 0.37 | Lck | 0.02<br>0.1 | Hfz<br>Hka | 642\|0.175\|25\|1.159\|85 | 699\|0.272\|25\|1.848\|85 | 750\|0.14\|25\|0.839\|85 |
| 847 | 0.02 | Mal | 0.067 | Lck | 0.02 | Hv | 395\|0.129\|25\|0.377\|85 | 500\|0.11\|25\|1.132\|85 | |
| 848 | 0.01 | Mo | 2.3 | Lck | 0.02<br>0.1 | Hea<br>Hje | 565\|0.159\|25\|0.793\|85 | 656\|0.159\|25\|1.785\|85 | |
| 849 | 0.01 | Mh | 0.019 | Lu | 0.03<br>0.15 | Hea<br>Hfz | 508\|0.618\|25\|0.507\|85 | 665\|0.149\|25\|1.125\|85 | 723\|0.122\|25\|1.005\|85 |
| 850 | 0.02 | Mal | 0.21 | Lck | 0.02<br>0.105 | Hra<br>Hik | 502\|0.449\|25\|2.075\|85 | 639\|0.228\|25\|0.742\|85 | 988\|0.196\|25\|0.85\|85 |
| 851 | 0.02 | Mak | 0.4 | Lbg | 0.08<br>0.2 | Hfz<br>Hir | 715\|0.2\|25\|1.917\|85 | 761\|0.194\|25\|2.003\|85 | |
| 852 | 0.02 | Mal | 0.59 | Lck | 0.1<br>0.1 | Har<br>Hik | 395\|0.387\|25\|0.142\|85 | 525\|0.055\|25\|1.225\|85 | 570\|0.094\|25\|1.492\|85 |
| 853 | 0.003 | Mal | 0.17 | Lck | 0.03<br>0.03 | Hir<br>Hjs | 421\|0.083\|25\|1.533\|85 | 504\|0.069\|25\|0.94\|85 | 555\|0.044\|25\|0.685\|85 |
| 854 | 0.0204 | Mal | 0.917 | Lck | 0.993 | Hij | 705\|0.115\|25\|2.152\|85 | 757\|0.102\|25\|2.143\|85 | |
| 855 | 0.01 | Mal | 0.023 | Lck | 0.032<br>0.1<br>0.1 | Har<br>Hfe<br>Hir | 389\|0.316\|25\|5\|85 | 513\|0.016\|25\|1.302\|85 | 658\|0.101\|25\|0.701\|85 |
| 856 | 0.02 | Mal | 0.19 | Lck | 0.01<br>0.2<br>0.01 | Hbu<br>Hfz<br>Hje | 518\|0.056\|25\|0.955\|85 | 695\|0.192\|25\|1.184\|85 | 753\|0.138\|25\|1.157\|85 |
| 857 | 0.01 | Mo | 1.54 | Lck | 0.1<br>0.1 | Hfz<br>Hke | 634\|0.252\|25\|2.97\|85 | 688\|0.186\|25\|2.604\|85 | 720\|0.231\|25\|3.022\|85 |
| 858 | 0.02 | Mak | 2.2 | Lbg | 0.02<br>0.16 | Hdy<br>Hfz | 503\|0.994\|25\|2.808\|85 | 885\|0.289\|25\|0.712\|85 | 990\|0.466\|25\|1.151\|85 |
| 859 | 0.02 | Mak | 0.48 | Lh | 0.2 | Hfz | 670\|0.384\|25\|2.653\|85 | 705\|0.531\|25\|3.312\|85 | 757\|0.512\|25\|3.132\|85 |
| 860 | 0.005<br>0.02 | Mo<br>Mal | 0.14 | Lck | 0.2<br>0.025 | Hfz<br>Hgz | 503\|0.096\|25\|1.678\|85 | 642\|1.279\|25\|1.648\|85 | 964\|0.124\|25\|0.67\|85 |
| 861 | 0.008 | Mi | 0.026 | Lu | 0.077 | Hga | 498\|0.408\|25\|0.274\|85 | 632\|0.241\|25\|1.085\|85 | 695\|0.368\|25\|1.892\|85 |
| 862 | 0.01 | Mo | 1 | Lbg | 0.08 | Hjx | 552\|0.246\|25\|0.691\|85 | 605\|0.191\|25\|0.905\|85 | 634\|0.184\|25\|0.942\|85 |
| 863 | 0.01 | Mal | 0.32 | Lck | 0.1<br>0.02<br>0.08 | Hir<br>Hje<br>Hke | 415\|0.23\|25\|3.61\|85 | 595\|0.062\|25\|0.738\|85 | 647\|0.077\|25\|0.85\|85 |
| 864 | 0.02 | Mal | 0.28 | Lck | 0.04<br>0.2 | Hfv<br>Hfz | 632\|0.311\|25\|3.039\|85 | 1141\|0.097\|25\|0.662\|85 | |
| 865 | 0.002 | Mal | 0.0045 | Lck | 0.02<br>0.2 | Hir<br>Hkf | 384\|0.135\|25\|1.902\|85 | 504\|0.014\|25\|0.542\|85 | 705\|0.024\|25\|0.218\|85 |
| 866 | 0.02 | Mak | 2.8 | Lbg | 0.047<br>0.087 | Hfo<br>Hje | 382\|1.625\|25\|5\|85 | 580\|0.054\|25\|0.403\|85 | 648\|0.07\|25\|0.324\|85 |
| 867 | 0.003 | Mal | 0.094 | Lck | 0.0008<br>0.03<br>0.03 | Hij<br>Hir<br>Hke | 417\|0.066\|25\|1.958\|85 | 561\|0.023\|25\|0.781\|85 | 742\|0.002\|25\|0.205\|85 |
| 868 | 0.01 | Mal | 0.023 | Lck | 0.032<br>0.1<br>0.05 | Har<br>Hfe<br>Hir | 388\|0.327\|25\|5\|85 | 509\|0.013\|25\|0.968\|85 | 602\|0.062\|25\|0.758\|85 |
| 869 | 0.003<br>0.02 | Mo<br>Mal | 0.17 | Lck | 0.01<br>0.2<br>0.01 | Hea<br>Hfz<br>Hgm | 506\|0.308\|25\|1.85\|85 | 724\|3.539\|25\|2.804\|85 | 1004\|0.289\|25\|0.813\|85 |
| 870 | 0.02 | Mak | 0.62 | Lt | 0.2 | Hfz | 668\|0.1\|25\|2.142\|85 | 704\|0.126\|25\|2.544\|85 | 756\|0.115\|25\|2.4\|85 |
| 871 | 0.01 | Mo | 0.73 | Lbg | 0.033 | Hiu | 535\|0.163\|25\|0.385\|85 | | |
| 872 | 0.01 | Mo | 0.83 | Lck | 0.1<br>0.02 | Hfz<br>Hgw | 640\|0.282\|25\|2.202\|85 | 666\|0.452\|25\|3.357\|85 | 699\|0.665\|25\|5\|85 |
| 873 | 0.0048 | Mq | 0.0137 | Lu | 0.21 | Hfz | 506\|0.139\|25\|1.122\|85 | 742\|1.473\|25\|1.069\|85 | |
| 874 | 0.02 | Mal | 0.57 | Lck | 0.02<br>0.06 | Hg<br>Hij | 525\|0.122\|25\|1.241\|85 | 640\|0.498\|25\|0.555\|85 | 1011\|0.1\|25\|0.503\|85 |
| 875 | 0.02 | Mak | 0.34 | Ld | 0.2 | Hfz | 704\|0.825\|25\|3.47\|85 | 755\|0.823\|25\|3.479\|85 | |
| 876 | 0.02 | Mal | 0.18 | Lck | 0.1<br>0.06 | Hag<br>Hij | 630\|0.2\|25\|1.451\|85 | 692\|0.152\|25\|1.022\|85 | |
| 877 | 0.02 | Mal | 1.49 | Lck | 0.02<br>0.1 | Hgr<br>Hje | 497\|0.273\|25\|1.731\|85 | 988\|0.159\|25\|0.775\|85 | 1206\|0.145\|25\|0.336\|85 |
| 878 | 0.02 | Mak | 0.27 | Lbg | 0.08<br>0.1 | Hfz<br>Hir | 710\|0.284\|25\|2\|85 | 755\|0.28\|25\|1.995\|85 | |
| 879 | 0.02 | Mal | 0.11 | Lck | 0.02<br>0.06 | Hra<br>Hij | 519\|0.349\|25\|2.904\|85 | 640\|0.195\|25\|0.614\|85 | 996\|0.157\|25\|1.079\|85 |
| 880 | 0.02 | Mal | 0.31 | Lck | 0.004<br>0.2<br>0.006 | Hbt<br>Hfz<br>Hbb | 531\|0.064\|25\|0.588\|85 | 655\|0.144\|25\|0.487\|85 | 757\|0.063\|25\|0.316\|85 |
| 881 | 0.01 | Mo | 3.88 | Lbs | 0.1 | Hfz | 618\|0.083\|25\|1.434\|85 | 672\|0.148\|25\|2.424\|85 | 700\|0.192\|25\|3.402\|85 |
| 882 | 0.01 | Mo | 1.88 | Lck | 0.02<br>0.1 | Hfv<br>Hfz | 623\|0.24\|25\|2.285\|85 | 652\|0.327\|25\|3.123\|85 | 682\|0.358\|25\|5\|85 |
| 883 | 0.02 | Mak | 0.4 | Lbg | 0.04<br>0.2 | Hfw<br>Hir | 533\|0.067\|25\|2.734\|85 | 740\|0.15\|25\|0.735\|85 | |
| 884 | 0.01 | Mo | 0.28 | Lck | 0.01<br>0.1 | Hgz<br>Hiu | 538\|0.143\|25\|0.614\|85 | | |

TABLE 27-continued

| Ex.# | [M] | M | [LeL] | LeL | [HeL] | HeL | Lmax\|A\|T\|Ah\|Th | Lmax\|A\|T\|Ah\|Th | Lmax\|A\|T\|Ah\|Th |
|---|---|---|---|---|---|---|---|---|---|
| 885 | 0.02 | Mal | 0.22 | Lck | 0.02<br>0.2 | Hdc<br>Hfz | 480\|0.077\|25\|0.274\|85 | 702\|0.109\|25\|0.495\|85 | 755\|0.065\|25\|0.446\|85 |
| 886 | 0.01 | Mal | 0.1 | Lck | 0.04<br>0.04 | Haw<br>Hij | 356\|0.697\|25\|3.443\|85 | 660\|0.051\|25\|0.33\|85 | 700\|0.04\|25\|0.31\|85 |
| 887 | 0.01 | Mo | 0.16 | Lck | 0.35<br>0.15 | Hgi<br>Hir | 563\|0.07\|25\|0.783\|85 | 650\|0.086\|25\|1.39\|85 | 777\|0.097\|25\|1.582\|85 |
| 888 | 0.02 | Mal | 0.26 | Lck | 0.02<br>0.2 | Hfv<br>Hfz | 635\|0.309\|25\|2.706\|85 | 1141\|0.105\|25\|0.594\|85 | |
| 889 | 0.02 | Mak | 0.73 | Laf | 0.2 | Hfz | 670\|0.195\|25\|2.285\|85 | 704\|0.237\|25\|2.785\|85 | 756\|0.215\|25\|2.661\|85 |
| 890 | 0.01 | Mal | 0.067 | Lck | 0.04<br>0.1 | Hdp<br>Hir | 520\|0.032\|25\|5\|85 | 680\|0.08\|25\|1.195\|85 | |
| 891 | 0.02 | Mal | 0.33 | Lbs | 0.04<br>0.1 | Hbu<br>Hes | 498\|0.111\|25\|0.558\|85 | 854\|0.085\|25\|0.2\|85 | 959\|0.13\|25\|0.301\|85 |
| 892 | 0.02 | Mak | 1.6 | Lbg | 0.16<br>0.17 | Hfz<br>Hke | 636\|0.134\|25\|1.739\|85 | 682\|0.144\|25\|1.623\|85 | 1028\|0.089\|25\|0.806\|85 |
| 893 | 0.02 | Mal | 0.12 | Lck | 0.2<br>0.04 | Hac<br>Hij | 575\|0.286\|25\|0.963\|85 | 665\|0.26\|25\|0.853\|85 | 1022\|0.136\|25\|0.339\|85 |
| 894 | 0.01 | Mo | 0.71 | Lck | 0.02<br>0.2 | Hfz<br>Hke | 634\|0.492\|25\|2.312\|85 | 688\|0.348\|25\|1.763\|85 | 721\|0.447\|25\|2.111\|85 |
| 895 | 0.001<br>0.002 | Mo<br>Mal | 0.016 | Lck | 0.1 | Hir | 510\|0.033\|25\|1.379\|85 | 755\|0.899\|25\|0.988\|85 | 782\|1.297\|25\|1.273\|85 |
| 896 | 0.02 | Mak | 0.057 | Lf | 0.2 | Hfz | 352\|0.155\|25\|5\|85 | 702\|0.058\|25\|0.53\|85 | 756\|0.025\|25\|0.502\|85 |
| 897 | 0.002 | Mak | | | 0.66<br>0.07 | Hir<br>Hjx | 368\|1.694\|25\|4.519\|85 | 496\|0.105\|25\|1.134\|85 | 725\|0.068\|25\|0.358\|85 |
| 898 | 0.02 | Mak | 0.7 | Lax | 0.2 | Hfz | 669\|0.282\|25\|2.018\|85 | 705\|0.401\|25\|2.409\|85 | 756\|0.397\|25\|2.278\|85 |
| 899 | 0.02 | Mak | 0.83 | Lbg | 0.05<br>0.17 | Hfz<br>Hke | 636\|0.196\|25\|1.461\|85 | 682\|0.203\|25\|1.36\|85 | 1026\|0.114\|25\|0.695\|85 |
| 900 | 0.02 | Mal | 0.1 | Lck | 0.02<br>0.1 | Hbc<br>Hij | 508\|0.051\|25\|0.139\|85 | 704\|0.092\|25\|0.793\|85 | 756\|0.064\|25\|0.754\|85 |
| 901 | 0.01 | Mi | 0.029 | Lu | 0.2 | Hga | 502\|0.478\|25\|0.294\|85 | 632\|0.388\|25\|1.602\|85 | 695\|0.634\|25\|2.849\|85 |
| 902 | 0.014<br>0.01 | Ek<br>Mo | | | 0.08 | Hif | 539\|0.33\|25\|0.571\|85 | 592\|0.327\|25\|0.757\|85 | 635\|0.278\|25\|0.691\|85 |
| 903 | 0.02 | Mal | 0.28 | Lck | 0.06<br>0.1 | Hbt<br>Hfz | 548\|0.097\|25\|1.134\|85 | 607\|0.143\|25\|1.18\|85 | 970\|0.07\|25\|0.503\|85 |
| 904 | 0.02 | Mak | 0.47 | Lbg | 0.2<br>0.04 | Hir<br>Hje | 625\|0.078\|25\|0.8\|85 | 657\|0.117\|25\|0.875\|85 | 704\|0.165\|25\|0.924\|85 |
| 905 | 0.02 | Mak | 0.37 | Lbg | 0.02<br>0.02<br>0.2 | Hfw<br>Hfz<br>Hir | 710\|0.197\|25\|1.117\|85 | | |
| 906 | 0.02 | Mal | 0.091 | Lck | 0.051 | Hjg | 509\|0.09\|25\|3.871\|85 | 820\|0.024\|25\|0.542\|85 | 874\|0.021\|25\|0.424\|85 |
| 907 | 0.02 | Mal | 0.086 | Lck | 0.04<br>0.1 | Har<br>Hir | 510\|0.112\|25\|5\|85 | 603\|0.187\|25\|2.856\|85 | 657\|0.214\|25\|2.689\|85 |
| 908 | 0.02 | Mak | 0.55 | Lbs | 0.2 | Hfz | 704\|0.302\|25\|3.312\|85 | 756\|0.29\|25\|3.132\|85 | |
| 909 | 0.02 | Mak | 0.48 | Lbg | 0.04<br>0.1 | Hn<br>Hfz | 653\|0.176\|25\|1.562\|85 | 700\|0.205\|25\|1.408\|85 | |
| 910 | 0.01 | Mo | 2.28 | Lck | 0.01<br>0.05 | Hbb<br>Hje | 574\|0.162\|25\|0.992\|85 | 636\|0.185\|25\|1.463\|85 | |
| 911 | 0.02 | Mal | 0.16 | Lck | 0.04<br>0.2 | Hbt<br>Hir | 563\|0.128\|25\|2.694\|85 | 664\|0.146\|25\|1.989\|85 | 930\|0.053\|25\|0.743\|85 |
| 912 | 0.02 | Mal | 0.24 | Lck | 0.2<br>0.04 | Hfz<br>Hdh | 637\|0.326\|25\|2.893\|85 | 1143\|0.117\|25\|0.665\|85 | |
| 913 | 0.002 | Mo | 0.12 | Lck | 0.02<br>0.02 | Hir<br>Hjt | 392\|0.428\|25\|2.652\|85 | 726\|0.017\|25\|0.634\|85 | 748\|0.02\|25\|0.802\|85 |
| 914 | 0.02 | Mal | 0.14 | Lck | 0.02<br>0.2 | Hdx<br>Hfz | 510\|0.202\|25\|0.477\|85 | 703\|0.334\|25\|2.229\|85 | 756\|0.321\|25\|2.192\|85 |
| 915 | 0.02 | Mal | 0.15 | Lck | 0.04<br>0.1 | Hgx<br>Hje | 481\|0.138\|25\|0.891\|85 | 653\|0.205\|25\|0.982\|85 | 703\|0.151\|25\|0.956\|85 |
| 916 | 0.01 | Mo | 0.24 | Lbs | 0.2 | Hgi | 533\|0.141\|25\|0.742\|85 | 576\|0.075\|25\|1.011\|85 | |
| 917 | 0.002 | Mal | 0.0089 | Lck | 0.004<br>0.04 | Hfw<br>Hir | 531\|0.06\|25\|0.754\|85 | 738\|0.013\|25\|0.163\|85 | |
| 918 | 0.02 | Mak | 1.21 | Lbg | 0.2 | Hje | 418\|0.245\|25\|0.116\|85 | 653\|0.097\|25\|1.7\|85 | 704\|0.128\|25\|1.712\|85 |
| 919 | 0.02 | Mal | 1.04 | Lbs | 0.3 | Hij | 675\|0.076\|25\|2.172\|85 | 705\|0.096\|25\|2.73\|85 | 756\|0.086\|25\|2.649\|85 |
| 920 | 0.02 | Mak | 0.4 | Lbg | 0.1<br>0.02 | Hfz<br>Hec | 663\|0.147\|25\|0.626\|85 | 704\|0.163\|25\|0.718\|85 | 754\|0.128\|25\|0.664\|85 |
| 921 | 0.02 | Mak | 0.19 | Lcn | 0.2 | Hfz | 704\|0.972\|25\|3.164\|85 | 757\|0.956\|25\|3.077\|85 | |
| 922 | 0.02 | Mak | 0.81 | Ls | 0.2 | Hfz | 660\|0.068\|25\|1.325\|85 | 703\|0.078\|25\|1.526\|85 | 754\|0.065\|25\|1.421\|85 |
| 923 | 0.02 | Mak | 0.075 | Lck | 0.1<br>0.02 | Hfz<br>Hbs | 501\|0.094\|25\|1.538\|85 | 856\|0.073\|25\|0.551\|85 | 948\|0.086\|25\|0.582\|85 |
| 924 | 0.01 | Mo | 1.27 | Lck | 0.05<br>0.2 | Hfz<br>Hke | 634\|0.22\|25\|2.97\|85 | 688\|0.158\|25\|2.311\|85 | 720\|0.202\|25\|2.76\|85 |
| 925 | 0.04 | Mal | 0.15 | Lck | 0.2<br>0.025 | Hfz<br>Hgz | 501\|0.107\|25\|2.23\|85 | 702\|0.261\|25\|1.529\|85 | 759\|0.173\|25\|1.499\|85 |
| 926 | 0.01 | Mo | 3.1 | Lck | 0.1<br>0.1 | Hdp<br>Hfz | 595\|0.142\|25\|1.202\|85 | 648\|0.242\|25\|2.702\|85 | |
| 927 | 0.01 | Mo | 1.38 | Lck | 0.1<br>0.1 | Hei<br>Hfz | 622\|0.226\|25\|2.31\|85 | 675\|0.39\|25\|4.409\|85 | 690\|0.412\|25\|5\|85 |
| 928 | 0.02 | Mal | 0.21 | Lck | 0.06 | Hje | 620\|0.05\|25\|0.721\|85 | 651\|0.067\|25\|0.84\|85 | 704\|0.075\|25\|0.845\|85 |

TABLE 27-continued

| Ex.# | [M] | M | [LeL] | LeL | [HeL] | HeL | Lmax\|A\|T\|Ah\|Th | Lmax\|A\|T\|Ah\|Th | Lmax\|A\|T\|Ah\|Th |
|---|---|---|---|---|---|---|---|---|---|
| 929 | 0.02 | Mak | 0.2 | Lbc | 0.2 | Hfz | 705\|0.913\|25\|2.883\|85 | 756\|0.91\|25\|2.812\|85 | |
| 930 | 0.002 | Mak | | | 0.001 | Hfz | 500\|0.085\|25\|1.426\|85 | 800\|0.035\|25\|0.376\|85 | |
| | | | | | 0.08 | Hgi | | | |
| | | | | | 0.61 | Hir | | | |
| 931 | 0.02 | Mak | 0.72 | Lbg | 0.04 | Hcb | 663\|0.174\|25\|1.274\|85 | | |
| | | | | | 0.1 | Hfz | | | |
| 932 | 0.02 | Mak | 0.49 | Lv | 0.2 | Hfz | 670\|0.212\|25\|2.176\|85 | 705\|0.274\|25\|2.734\|85 | 756\|0.254\|25\|2.626\|85 |
| 933 | 0.01 | Mo | 0.95 | Lck | 0.1 | Hjd | 641\|0.139\|25\|2.013\|85 | 700\|0.34\|25\|5\|85 | 722\|0.273\|25\|5\|85 |
| 934 | 0.04 | Mal | 0.42 | Lck | 0.01 | Hbs | 488\|0.026\|25\|0.689\|85 | 653\|0.188\|25\|1.745\|85 | 705\|0.165\|25\|1.705\|85 |
| | | | | | 0.2 | Hje | | | |
| 935 | 0.02 | Mal | 0.31 | Lck | 0.1 | Hcn | 411\|0.414\|25\|5\|85 | 683\|0.09\|25\|1.654\|85 | 736\|0.082\|25\|1.739\|85 |
| | | | | | 0.08 | Hij | | | |
| 936 | 0.01 | Mo | 1.87 | Lck | 0.02 | Hje | 533\|0.567\|25\|0.926\|85 | 606\|0.578\|25\|1.221\|85 | 658\|0.58\|25\|1.166\|85 |
| | | | | | 0.2 | Hjy | | | |
| 937 | 0.02 | Mak | 0.32 | Lj | 0.2 | Hfz | 705\|1.644\|25\|3.47\|85 | 756\|1.652\|25\|3.275\|85 | |
| 938 | 0.02 | Mak | 4.69 | Lbr | 0.2 | Hfz | 653\|0.756\|25\|2.094\|85 | 702\|0.763\|25\|1.926\|85 | 751\|0.67\|25\|1.739\|85 |
| 939 | 0.002 | Mo | 0.24 | Lck | 0.02 | Hir | 445\|0.082\|25\|1.341\|85 | 691\|0.029\|25\|0.515\|85 | 776\|0.047\|25\|0.802\|85 |
| | | | | | 0.02 | Hke | | | |
| 940 | 0.02 | Mal | 0.055 | Lck | 0.19 | Hcs | 506\|0.121\|25\|4.519\|85 | 677\|0.053\|25\|0.681\|85 | 820\|0.021\|25\|0.801\|85 |
| | | | | | 0.12 | Hir | | | |
| 941 | 0.01 | Mal | 0.064 | Lck | 0.01 | Hfv | 460\|0.205\|25\|5\|85 | 523\|0.066\|25\|5\|85 | 700\|0.043\|25\|1.161\|85 |
| | | | | | 0.1 | Hir | | | |
| 942 | 0.005 | Mo | 0.28 | Lck | 0.023 | Har | 531\|0.193\|25\|0.43\|85 | 564\|0.14\|25\|0.491\|85 | 595\|0.098\|25\|0.401\|85 |
| | | | | | 0.1 | Hgi | | | |
| 943 | 0.02 | Mak | 0.69 | Lbg | 0.01 | Hea | 500\|0.123\|25\|1.055\|85 | 558\|0.122\|25\|0.958\|85 | 636\|0.281\|25\|1.155\|85 |
| | | | | | 0.16 | Hfz | | | |
| | | | | | 0.06 | Hhh | | | |
| 944 | 0.01 | Mal | 0.023 | Lck | 0.03 | Har | 604\|0.175\|25\|2.131\|85 | 657\|0.181\|25\|1.85\|85 | 1020\|0.054\|25\|0.482\|85 |
| | | | | | 0.05 | Hir | | | |
| 945 | 0.01 | Maf | 0.54 | Lbg | 0.38 | Hcb | 650\|0.098\|25\|0.543\|85 | | |
| | | | | | 0.028 | Hfz | | | |
| 946 | 0.01 | Mal | 0.041 | Lck | 0.03 | Har | 511\|0.138\|25\|5\|85 | 595\|0.199\|25\|2.106\|85 | 670\|0.189\|25\|2.011\|85 |
| | | | | | 0.2 | Hir | | | |
| 947 | 0.02 | Mak | 0.16 | Lck | 0.2 | Hfz | 352\|0.786\|25\|5\|85 | 704\|0.158\|25\|1.993\|85 | 756\|0.134\|25\|1.934\|85 |
| 948 | 0.021 | Mak | 0.86 | Lbs | 0.2 | Hfz | 663\|0.067\|25\|1.753\|85 | 705\|0.083\|25\|1.992\|85 | 756\|0.072\|25\|1.864\|85 |
| 949 | 0.02 | Mal | 0.31 | Lck | 0.02 | Hbv | 557\|0.125\|25\|0.803\|85 | 636\|0.186\|25\|1.016\|85 | 975\|0.073\|25\|0.347\|85 |
| | | | | | 0.1 | Hfz | | | |
| 950 | 0.02 | Mal | 0.106 | Lck | 0.1 | Hfz | 657\|0.116\|25\|1.428\|85 | 701\|0.153\|25\|1.866\|85 | 756\|0.144\|25\|1.834\|85 |
| | | | | | 0.2 | Hka | | | |
| 951 | 0.02 | Mak | 1 | Lr | 0.2 | Hfz | 660\|0.176\|25\|1.955\|85 | 703\|0.244\|25\|2.197\|85 | 754\|0.227\|25\|2.031\|85 |
| 952 | 0.02 | Mal | 0.91 | Lck | 0.2 | Har | 392\|0.43\|25\|0.182\|85 | 564\|0.074\|25\|1.325\|85 | 975\|0.062\|25\|0.445\|85 |
| | | | | | 0.1 | Hik | | | |
| 953 | 0.02 | Mal | 0.24 | Lck | 0.02 | Har | 625\|0.148\|25\|1.516\|85 | | |
| | | | | | 0.06 | Hij | | | |
| | | | | | 0.02 | Hke | | | |
| 954 | 0.01 | Mo | 1.2 | Lbg | 0.04 | Hfz | 638\|0.171\|25\|1.679\|85 | 667\|0.188\|25\|1.679\|85 | 696\|0.182\|25\|1.535\|85 |
| | | | | | 0.35 | Hgi | | | |
| 955 | 0.01 | Mo | 0.93 | Lck | 0.07 | Hfz | 587\|0.222\|25\|2.024\|85 | 636\|0.283\|25\|3.35\|85 | |
| | | | | | 0.1 | Hgz | | | |
| 956 | 0.02 | Mal | 0.38 | Lck | 0.014 | Hgz | 485\|0.05\|25\|0.436\|85 | 653\|0.185\|25\|1.604\|85 | 705\|0.157\|25\|1.597\|85 |
| | | | | | 0.2 | Hje | | | |
| 957 | 0.02 | Mal | 2.77 | Lck | 0.02 | Hdz | 506\|0.235\|25\|1.783\|85 | 865\|0.068\|25\|0.418\|85 | 990\|0.15\|25\|0.75\|85 |
| | | | | | 0.2 | Hfz | | | |
| 958 | 0.01 | Mal | 0.066 | Lck | 0.02 | Hdp | 453\|0.245\|25\|5\|85 | 520\|0.066\|25\|5\|85 | 690\|0.076\|25\|1.549\|85 |
| | | | | | 0.1 | Hir | | | |
| 959 | 0.02 | Mak | 0.18 | Ldo | 0.2 | Hfz | 704\|1.259\|25\|3.539\|85 | 756\|1.236\|25\|3.419\|85 | |
| 960 | 0.02 | Mal | 0.15 | Lck | 0.2 | Hga | 484\|0.065\|25\|0.776\|85 | 641\|0.154\|25\|0.502\|85 | 705\|0.085\|25\|0.421\|85 |
| | | | | | 0.04 | Hgz | | | |
| 961 | 0.02 | Mal | 0.59 | Lck | 0.02 | Hrb | 412\|0.997\|25\|0.351\|85 | 541\|0.179\|25\|1.43\|85 | 572\|0.214\|25\|1.602\|85 |
| | | | | | 0.04 | Hje | | | |
| 962 | 0.01 | Mo | 0.03 | Lbh | 0.15 | Hgi | 535\|0.289\|25\|0.921\|85 | 572\|0.249\|25\|1.255\|85 | |
| 963 | 0.02 | Mak | 1.1 | Lbg | 0.06 | Hfw | 620\|0.302\|25\|1.78\|85 | | |
| | | | | | 0.1 | Hje | | | |
| 964 | 0.02 | Mak | 0.83 | Lw | 0.2 | Hfz | 704\|0.405\|25\|3.312\|85 | 756\|0.396\|25\|3.169\|85 | |
| 965 | 0.02 | Mak | 1.1 | Lbg | 0.16 | Hfz | 642\|0.169\|25\|1.439\|85 | 686\|0.187\|25\|1.359\|85 | 1028\|0.102\|25\|0.63\|85 |
| | | | | | 0.02 | Hke | | | |
| 966 | 0.01 | Mo | 0.95 | Lck | 0.15 | Hgh | 534\|0.151\|25\|0.795\|85 | 575\|0.108\|25\|1.058\|85 | |
| 967 | 0.02 | Mal | 0.33 | Lck | 0.01 | Hbt | 529\|0.068\|25\|0.747\|85 | 630\|0.171\|25\|0.649\|85 | 973\|0.081\|25\|0.377\|85 |
| | | | | | 0.01 | Hbu | | | |
| | | | | | 0.2 | Hfz | | | |
| 968 | 0.008 | Mo | 3.3 | Lbg | 0.12 | Hjg | 613\|0.145\|25\|1.773\|85 | 670\|0.141\|25\|1.869\|85 | 717\|0.076\|25\|1.342\|85 |
| | | | | | 0.12 | Hjx | | | |
| 969 | 0.0052 | Mo | 0.16 | Lck | 0.04 | Hhj | 615\|0.06\|25\|0.524\|85 | 661\|0.049\|25\|0.49\|85 | |
| | | | | | 0.04 | Hik | | | |
| 970 | 0.02 | Mal | 0.74 | Lck | 0.03 | Hb | 330\|0.282\|25\|2.278\|85 | 384\|2.779\|25\|1.823\|85 | 584\|0.091\|25\|0.166\|85 |
| 971 | 0.02 | Mak | 1.13 | Lbg | 0.02 | Hea | 479\|0.138\|25\|0.842\|85 | 980\|0.129\|25\|0.379\|85 | |
| | | | | | 0.16 | Hje | | | |

TABLE 27-continued

| Ex.# | [M] | M | [LeL] | LeL | [HeL] | HeL | Lmax\|A\|T\|Ah\|Th | Lmax\|A\|T\|Ah\|Th | Lmax\|A\|T\|Ah\|Th |
|---|---|---|---|---|---|---|---|---|---|
| 972 | 0.02 | Mak | | | 0.037<br>0.2 | Hcw<br>Hfz | 704\|0.313\|25\|1.023\|85 | 756\|0.31\|25\|0.981\|85 | |
| 973 | 0.02 | Mal | 0.11 | Lck | 0.02<br>0.06 | Hnr<br>Hij | 525\|0.222\|25\|2.695\|85 | 634\|0.208\|25\|0.612\|85 | 995\|0.127\|25\|1.025\|85 |
| 974 | 0.02 | Mal | 0.085 | Lck | 0.08<br>0.04 | Hff<br>Hij | 632\|0.117\|25\|1.367\|85 | 700\|0.132\|25\|1.14\|85 | |
| 975 | 0.02 | Mal | 0.14 | Lbt | 0.058 | Hs | 415\|0.912\|25\|1.7\|85 | | |
| 976 | 0.02 | Mal | 0.28 | Lck | 0.01<br>0.2<br>0.01 | Hbt<br>Hfz<br>Hgz | 509\|0.093\|25\|0.754\|85 | 620\|0.204\|25\|0.703\|85 | 970\|0.109\|25\|0.429\|85 |
| 977 | 0.01 | Mal | 0.53 | Lck | 0.01<br>0.02<br>0.01 | Hdy<br>Hir<br>Hke | 457\|0.645\|25\|5\|85 | 636\|0.066\|25\|0.476\|85 | 940\|0.05\|25\|0.535\|85 |
| 978 | 0.01 | Mo | 0.76 | Lbg | 0.019<br>0.033 | Hir<br>Hiu | 559\|0.13\|25\|0.526\|85 | 745\|0.004\|25\|0.131\|85 | |
| 979 | 0.02 | Mal | 0.093 | Lck | 0.06<br>0.52 | Hik<br>Hkh | 580\|0.078\|25\|0.837\|85 | 621\|0.152\|25\|1.207\|85 | 704\|0.207\|25\|1.101\|85 |
| 980 | 0.02 | Mal | 0.28 | Lck | 0.1 | Hje | 400\|0.187\|25\|0.11\|85 | 653\|0.092\|25\|1.293\|85 | 704\|0.095\|25\|1.308\|85 |
| 981 | 0.02 | Mal | 0.4 | Lck | 0.02<br>0.2 | Hdm<br>Hfz | 631\|0.123\|25\|1.782\|85 | 1137\|0.064\|25\|0.404\|85 | 1184\|0.063\|25\|0.383\|85 |
| 982 | 0.02 | Mal | 0.2 | Lck | 0.02<br>0.2 | Hbb<br>Hje | 500\|0.118\|25\|0.941\|85 | 705\|0.484\|25\|0.785\|85 | 937\|0.095\|25\|0.475\|85 |
| 983 | 0.01 | Mo | 2.6 | Lbg | 0.15 | Hgh | 534\|0.297\|25\|0.82\|85 | 575\|0.223\|25\|1.07\|85 | |
| 984 | 0.02 | Man | 0.32 | Lck | 0.04<br>0.12<br>0.2 | Hfz<br>Hhh<br>Hir | 585\|0.062\|25\|0.932\|85 | 648\|0.098\|25\|0.959\|85 | 993\|0.043\|25\|0.296\|85 |
| 985 | 0.02 | Mal | 0.25 | Lck | 0.04<br>0.1 | Hbt<br>Hfz | 549\|0.13\|25\|1.187\|85 | 610\|0.179\|25\|1.242\|85 | 973\|0.084\|25\|0.524\|85 |
| 986 | 0.01 | Mo | 3.22 | Lck | 0.02<br>0.05 | Hbt<br>Hje | 577\|0.252\|25\|1.706\|85 | 611\|0.369\|25\|2.47\|85 | 632\|0.337\|25\|2.343\|85 |
| 987 | 0.01 | Maf | 0.062 | Ldd | 0.062<br>0.45 | Hea<br>Hfz | 496\|0.117\|25\|0.608\|85 | 1000\|0.09\|25\|0.238\|85 | |
| 988 | 0.01 | Mo | 2.37 | Lck | 0.02<br>0.053 | Hdy<br>Hil | 550\|0.166\|25\|0.787\|85 | 588\|0.314\|25\|1.333\|85 | 637\|0.477\|25\|1.88\|85 |
| 989 | 0.02 | Mal | 0.23 | Lck | 0.02<br>0.16 | Hea<br>Hfz | 499\|0.146\|25\|2.001\|85 | 882\|0.076\|25\|0.517\|85 | 1000\|0.149\|25\|0.801\|85 |
| 990 | 0.02 | Mal | 0.14 | Lbt | 0.058 | Hs | 420\|1.062\|25\|2.789\|85 | | |
| 991 | 0.02 | Mal | 0.07 | Lf | 0.1<br>0.06 | Har<br>Hij | 588\|0.312\|25\|2.45\|85 | 622\|0.338\|25\|2.241\|85 | 994\|0.112\|25\|0.654\|85 |
| 992 | 0.002 | Mo | 0.31 | Lck | 0.02<br>0.02 | Hir<br>Hjr | 448\|0.063\|25\|1.255\|85 | 689\|0.022\|25\|0.495\|85 | 778\|0.033\|25\|0.741\|85 |
| 993 | 0.005 | Mal | 0.016 | Lck | 0.01<br>0.05 | Hfw<br>Hir | 533\|0.093\|25\|1.689\|85 | 740\|0.027\|25\|0.351\|85 | |
| 994 | 0.01 | Mo | 0.36 | Lck | 0.1<br>0.1 | Hir<br>Hkf | 373\|0.348\|25\|5\|85 | 717\|0.172\|25\|3.703\|85 | 753\|0.116\|25\|3.419\|85 |
| 995 | 0.01 | Mo | 1.19 | Lck | 0.1 | Har | 560\|0.42\|25\|0.871\|85 | | |
| 996 | 0.02 | Mak | 2.45 | Lbg | 0.053<br>0.087 | Hfo<br>Hje | 583\|0.135\|25\|0.864\|85 | 643\|0.101\|25\|0.694\|85 | 1051\|0.077\|25\|0.303\|85 |
| 997 | 0.02 | Mak | 1.9 | Lbg | 0.16<br>0.2 | Hje<br>Hke | 593\|0.134\|25\|1.575\|85 | 645\|0.171\|25\|1.627\|85 | 1070\|0.096\|25\|0.618\|85 |
| 998 | 0.01 | Mo | 1.5 | Lck | 0.02<br>0.02 | Hs<br>Hfz | 624\|0.202\|25\|1.571\|85 | 663\|0.156\|25\|1.23\|85 | 735\|0.162\|25\|1.325\|85 |
| 999 | 0.02 | Mal | 0.08 | Lck | 0.1<br>0.06 | Hac<br>Hij | 607\|0.116\|25\|0.595\|85 | 661\|0.134\|25\|0.663\|85 | 697\|0.115\|25\|0.615\|85 |
| 1000 | 0.02 | Mal | 0.22 | Lck | 0.063<br>0.06 | Hcj<br>Hik | 595\|0.101\|25\|1.059\|85 | 645\|0.129\|25\|1.126\|85 | 1100\|0.085\|25\|0.395\|85 |
| 1001 | 0.01 | Mo | 1.48 | Lck | 0.04<br>0.02 | Hik<br>Hio | 566\|0.078\|25\|0.96\|85 | 623\|0.098\|25\|1.413\|85 | 653\|0.096\|25\|1.516\|85 |
| 1002 | 0.002 | Mal | 0.0089 | Lck | 0.002<br>0.04<br>0.2 | Hdm<br>Hir<br>Hkf | 391\|0.13\|25\|2.33\|85 | 460\|0.038\|25\|1.16\|85 | 519\|0.017\|25\|0.723\|85 |
| 1003 | 0.011 | Mak | 1.6 | Lbg | 0.3<br>0.054 | Hhh<br>Hje | 537\|0.032\|25\|0.484\|85 | 606\|0.061\|25\|0.573\|85 | 975\|0.04\|25\|0.245\|85 |
| 1004 | 0.002 | Mo | 0.1 | Lck | 0.002<br>0.02 | Hci<br>Hir | 392\|0.088\|25\|2.737\|85 | 667\|0.014\|25\|0.304\|85 | 748\|0.032\|25\|0.923\|85 |
| 1005 | 0.02 | Mal | 0.14 | Lck | 0.005<br>0.2 | Hea<br>Hfz | 499\|0.23\|25\|0.987\|85 | 705\|0.254\|25\|1.78\|85 | 757\|0.238\|25\|1.759\|85 |
| 1006 | 0.01 | Mzz | 2.9 | Lbg | 0.04<br>0.15 | Hje<br>Hgh | 545\|0.334\|25\|0.969\|85 | 600\|0.295\|25\|1.612\|85 | |

Solvent = N,N-Dimethylacetamide

| 1007 | 0.01 | Mo | 1 | Lbg | 0.15 | Hgi | 533\|0.283\|25\|0.637\|85 | 577\|0.189\|25\|0.772\|85 | |

Solvent = Poly(ethylene glycol) of ~400 average molecular weight

| 1008 | 0.015 | Maf | | | 0.68 | Hfz | 666\|0.155\|25\|1.572\|85 | 703\|0.216\|25\|1.79\|85 | 757\|0.214\|25\|1.618\|85 |

TABLE 27-continued

| Ex.# | [M] | M | [LeL] | LeL | [HeL] | HeL | Lmax\|A\|Tl\|Ah\|Th | Lmax\|A\|Tl\|Ah\|Th | Lmax\|A\|Tl\|Ah\|Th |
|---|---|---|---|---|---|---|---|---|---|
| | | | | | Solvent = Propylene Carbonate | | | | |
| 1009 | 0.01 | Mo | 0.08 | Lbg | 0.15 | Hgi | 535\|0.288\|25\|0.946\|85 | 571\|0.224\|25\|1.271\|85 | |
| 1010 | 0.02 | Mak | 0.19 | Lch | 0.2 | Hfz | 704\|0.279\|25\|2.698\|85 | 757\|0.262\|25\|2.665\|85 | |
| 1011 | 0.02 | Mak | 0.18 | Lcg | 0.2 | Hfz | 704\|0.48\|25\|2.899\|85 | 756\|0.47\|25\|2.839\|85 | |
| 1012 | 0.01 | Mh | 0.03 | Lu | 0.69 | Hfz | 509\|0.542\|25\|0.529\|75 | 666\|0.807\|25\|2.686\|75 | 724\|1.392\|25\|5\|75 |
| | | | | | Solvent = Tetra(ethylene glycol) | | | | |
| 1013 | 0.01 | Mo | | | 0.2 | Hjx | 546\|0.17\|25\|0.371\|85 | 586\|0.151\|25\|0.436\|85 | 631\|0.128\|25\|0.405\|85 |
| | | | | | Solvent = 85% Gamma Butyrolactone, 15% Water by weight | | | | |
| 1014 | 0.009 | Mq | | | | | 649\|0.088\|25\|1.13\|85 | | |
| | | | | | Solvent = 76.6% Gamma Butyrolactone, 23.4% Water by weight | | | | |
| 1015 | 0.013 | Mr | | | 0.057 | Hfz | 575\|0.12\|25\|2.569\|85 | 635\|0.096\|25\|2.743\|85 | 963\|0.431\|25\|1.122\|85 |
| | | | | | Solvent = 54% Gamma Butyrolactone, 46% Water by weight | | | | |
| 1016 | 0.003 | Mq | | | 0.08 | Hfz | 580\|0.144\|25\|1.053\|85 | 636\|0.097\|25\|1.152\|85 | |
| | | | | | Solvent = 90% Gamma Butyrolactone, 10% Glycerol by weight | | | | |
| 1017 | 0.0009 | Mv | | | 0.014 | Hje | 475\|0.102\|25\|0.82\|85 | | |
| | | | | | Solvent = 83% Gamma Butyrolactone, 17% Toluene by weight | | | | |
| 1018 | 0.02 | Mak | 0.13 | Lck | 0.2 | Hfz | 704\|0.226\|25\|2.844\|85 | 756\|0.213\|25\|2.781\|85 | |
| | | | | | Solvent = 83% Diethylene Glycol, 17% Water by weight | | | | |
| 1019 | 0.016 | Mq | | | 0.18 | Hfz | 572\|0.158\|25\|1.241\|85 | 878\|0.679\|25\|1.309\|85 | 964\|0.601\|25\|1.276\|85 |
| | | | | | Solvent = 86% Diethylene Glycol, 14% Water by weight | | | | |
| 1020 | 0.008 | Mq | | | 0.188 | Hfz | 580\|0.126\|25\|1.094\|85 | 968\|0.382\|25\|0.779\|85 | |
| | | | | | Solvent = 82% Diethylene Glycol, 18% Water by weight | | | | |
| 1021 | 0.027 | Mt | | | 0.2 | Hfz | 877\|1.007\|25\|1.716\|85 | 957\|0.886\|25\|1.693\|85 | 1155\|0.566\|25\|1.201\|85 |
| | | | | | Solvent = 78% Diethylene Glycol, 22% Water by weight | | | | |
| 1022 | 0.027 | Mq | | | 0.18 | Hfz | 575\|0.123\|25\|1.277\|85 | 880\|0.938\|25\|1.957\|85 | |
| | | | | | Solvent = 94% Propylene Carbonate, 6% Water by weight | | | | |
| 1023 | 0.006 | Mq | | | | | 638\|0.213\|25\|3.299\|85 | | |
| | | | | | Solvent = 67% Poly(ethylene glycol) of ~400 average molecular weight, 33% Water by weight | | | | |
| 1024 | 0.009 | Mq | | | 0.28 | Hfz | 560\|0.157\|25\|0.898\|85 | 969\|0.402\|25\|0.693\|85 | |
| | | | | | Solvent = 84% Diethylene Glycol, 16% Water by weight | | | | |
| 1025 | 0.008 | Mq | | | 0.183 | Hfz | 575\|0.129\|25\|0.992\|85 | 968\|0.327\|25\|0.66\|85 | |

Key

The following materials were obtained from commercial sources or prepared as described below.

Ma=Bis(11-ethyl-1H-benzimidazole)diiodonickel(II)

To a flask were added 4.0 g nickel acetate tetrahydrate and 216 ml n-butanol. The mixture was heated to 70 C under nitrogen and 7.9 g 57% hydroiodic acid were added. Following distillation of 60 ml to remove water and acetic acid, 5.4 g of 1-ethylbenzimidazole were added and the reaction mixture was cooled to 15 C. The crystalline precipitate was filtered off, washed with 10 ml of 2-propanol and dried giving 4.8 g of dark green crystals.

Mb=Diiodobis(tricyclohexylphosphine)nickel(II)

To a flask were added 1.0 g nickel acetate tetrahydrate and 55 ml n-butanol. The mixture was heated to 70 C under nitrogen and 2.0 g 57% hydroiodic acid was added. Following distillation of 15 ml to remove water and acetic acid, a solution of 2.6 g of tricyclohexylphosphine in 25 ml n-butanol under nitrogen was added to the reaction mixture. Following cooling to 5 C, the crystalline precipitate was filtered, washed with 5 ml of n-butanol and dried giving 2.0 g of reddish brown crystals.

Me=Dibromobis(triphenylphosphine)nickel(II)

To a flask were added 3.0 g nickel bromide trihydrate and 75 ml n-butanol. The mixture was heated to 115 C under nitrogen and 5.8 g of triphenylphosphine were added. Following distillation of 13 ml to remove water, the reaction mixture was cooled to 22 C. The crystalline solid was filtered, washed with 5 ml of 2-propanol and dried giving 7.3 g of dark green crystals.

Mf=Diiodobis(triphenylphosphine)nickel(II)

To a flask were added 39.8 g nickel acetate tetrahydrate and 1800 ml n-butanol. The solution was heated to 70 C under nitrogen and 75.4 g 57% hydroiodic acid was added. Following distillation of 625 ml to remove water and acetic acid, a solution of 92.3 g of triphenylphosphine in 910 ml n-butanol at 70 C was added under nitrogen to the reaction mixture. Following cooling to 22 C, the crystalline solid was filtered, washed with 100 ml of 2-propanol, then 50 ml 2-propanol and dried giving 121.9 g of dark brown plates.

Mh=Cobalt (II) Bromide
Mi=Cobalt (II) Chloride
Mo=Cobalt (II) Tetrafluoroborate hexahydrate
Mq=Copper (II) Bromide
Mr=Copper (II) Bromide Dihydrate Mt=Copper (II) Chloride Dihydrate
Mv=Copper (II) Nitrate 2.5 Hydrate
Mac=Dibromobis(1-ethyl-1H-benzimidazole)nickel(II)

To a flask were added 709 g nickel bromide trihydrate and 16 L n-butanol. The mixture was heated to 90 C under nitrogen and 760 g of 1-ethylbenzimidazole were added. Following distillation of 1.9 L to remove water, the reaction mixture was cooled to 40 C. The crystalline solid was filtered, washed with IL of 2-propanol, then 500 ml of 2-propanol and dried giving 1246 g of bright blue crystals.

Maf=Nickel (II) Bromide Hexahydrate
Maj=Nickel (TI) Iodide Hexahydrate
Mak=Nickel (II) Nitrate Hexahydrate
Mal=Nickel (II) Perchlorate Hexahydrate
Man=Nickel (II) Tetrafluoroborate Hexahydrate
Mao=Bis(acetylacetonato)nickel(II)
Mas=Nickel (II) bis(diisobutyldithiophosphinate)

0.55 g Nickel(II) perchlorate hexahydrate was dissolved in 0.5 ml of water. 0.60 g of a 50% sodium di(isobutyl)dithiophosphinate water solution and another 2.5 ml water were added. A dark purple precipitate formed immediately. The precipitate was collected by vacuum filtration and washed with three 5 ml portions of water. The precipitate was dried at 50 C in a vacuum oven.

Mat=Dibromobis[2-ethyl-2-(hydroxymethyl)propane-1,3-diol]nickel(II)

To a flask were added 7.0 g of nickel acetate tetrahydrate, 130 ml of n-butanol, and 9.9 g of 48% hydrobromic acid. After distilling off 100 ml of solvent, 8.3 g of trimethylolpropane were added and the reaction mixture was cooled to 50 C. Following a slow addition of 90 ml of hexane, the mixture was cooled to 5 C and the crystalline solid was filtered, washed with 10 ml of hexane, and dried giving 11.8 g of light blue crystals.

Mbn=Tetrabutylammonium triiodo(triphenylphosphine)nickelate(II)

To a flask were added 4.2 g of nickel iodide hexahydrate and 25 ml of 2,2-dimethoxypropane. This mixture was stirred under nitrogen at 22 C for 1.5 hours, when 50 ml of diethylether were added. After stirring for several minutes, the liquids were decanted away from the solids, and the solids were rinsed twice with 25 ml of diethylether. To the solids were added 12 ml n-butanol and after heating to 40 C, the mixture was filtered. To the resulting solution, 3.7 g of tetrabutylammonium iodide were added along with 2.6 g of triphenylphosphine, and the mixture was stirred at 40 C for 16 hours. After cooling to 22 C, the product was filtered and washed with 20 ml of tert-butyl methyl ether and dried, resulting in 3.5 g of a brown solid.

Mbo=Tetrabutylammonium tetraiodonickelate(II)

To a flask were added 50 g of nickel acetate tetrahydrate, 155 g tetrabutylammonium iodide, 650 ml of n-butanol, and 136 g of 47% hydroiodic acid. The mixture was distilled under a slow stream of nitrogen until 500 ml of solvent was removed. After cooling the mixture to 50 C, 200 ml tert-butyl methyl ether were added followed by seed crystals. Following a slow addition of 600 ml of tert-butyl methyl ether, the mixture was cooled to 22 C and the solid was filtered, washed with 100 ml of tert-butyl methyl ether, and dried giving 182 g of a red solid.

Mzz=Cobalt(II) Nitrate Hexahydrate
La=1,1-Bis(hydroxymethyl)cyclopropane
Lb=1,2,4-Butanetriol
Lc=1,2-Phenylenedimethanol
Ld=1,2-Hexanediol
Le=1,2-Propanediol
Lf=Cis,cis-1,3,5-cyclohexanetriol dihydrate
Lh=1,3-Butanediol
Li=1,3-Cyclohexanediol
Lj=2,5-Bis(hydroxymethyl)-1,4-dioxane-2,5-diol
Lk=1,3-Propanediol
Lm=1,4-Dioxane
Lp=18-Crown-6
Lq=1-Ethyl-1H-benzimidazole To a flask were added 100 g benzimidazole, 44 g sodium hydroxide, 320 ml water and 480 ml tetrahydrofuran and the mixture was stirred under nitrogen. 157 g Diethyl sulfate were added slowly, maintaining a temperature of 40 C. After 2 hrs at 40 C, the reaction was quenched with slow addition of 100 ml concentrated hydrochloric acid. After washing with 150 ml hexane, the mixture was basified with 50 g sodium hydroxide and extracted with 275 ml ethyl acetate, then 225 ml ethyl acetate. The solvent was removed, leaving an orange oil, which was distilled under full vacuum to give 109.4 g clear colorless oil.

Lr=2,2,4-Trimethyl-1,3-Pentanediol
Ls=2,2-Dibutyl-1,3-Propanediol
Lt=2,2-Diethyl-1,3-Propanediol
Lu=2,2'-Bipyridine
Lv=2,3-Butanediol
Lw=2,3-Dimethyl-2,3-Butanediol
Ly=2,4-Pentanediol
Lab=2-Bromo-2-Nitro-1,3-Propanediol
Lac=2-Butyl-2-Ethyl-1,3-Propanediol
Lad=2-Ethyl-1,3-Hexanediol
Lae=2-Methyl-1,3-Propanediol
Laf=2-Methyl-2,4-Pentanediol
Lag=2-Methyl-2-Propyl-1,3-Propanediol
Lah=2-Methylenepropane-1,3-diol
Lai=2-Phenyl-1,2-Propanediol
Laj=2-Phenyl-1,3-Propanediol
Lal=Cyclohex-3-ene-1,1-diyldimethanol
Lao=3-Methyl-1,3,5-Pentanetriol
Lap=3-Phenoxy-1,2-Propanediol
Laq=3-Phenyl-1-propanol
Lar=4,4'-Dimethoxy-2,2'-bipyridine
Lav=2-[Bis(2-hydroxyethyl)amino]-2-(hydroxymethyl)propane-1,3-diol
Lax=Diethylene glycol
Laz=Di(Trimethylolpropane)
Lbc=3,3'-Oxydipropane-1,2-diol
Lbd=Dimethyl sulfoxide
Lbf=Ethanol
Lbg=Ethylene Glycol
Lbh=Glycerol
Lbl=Lithium Salicylate
Lbm=Lithium Trifluoroacetate
Lbo=Methanol
Lbq=N,N-Dimethylformamide
Lbr=2,2-Dimethylpropan-1-ol
Lbs=Neopentyl Glycol
Lbt=N-Propyl-N-pyridin-2-ylpyridin-2-amine To a flask were added 5.0 g 2,2'-dipyridiylamine, 4.9 g of pulverized potassium hydroxide and 45 ml of N,N-dimethylformamide. After stirring for 1 hour under nitrogen, the mixture was cooled to 5 C and 5.0 g of 1-iodopropane were added. The mixture was allowed to warm to 22 C and stirred for 5 hours. After quenching with 45 ml water, the product was extracted with ether and washed twice with water. Following removal of solvent, the product was purified by silica gel chromatography using 40% ethyl acetate in hexane to give 4.8 g of nearly colorless oil.

Lbu=Pentaethylene glycol
Lbv=Pentaerythritol
Lbw=Pentaerythritol ethoxylate
Lcc=Tetrahydropyran-2-methanol
Lcd=Tributylphosphine oxide
Lcg=2-(Hydroxymethyl)-2-propylpropane-1,3-diol A solution 15 ml water and 6 g sodium hydroxide was prepared in a flask and cooled to 0-5 C under nitrogen. Formaldehyde, (37%), 34.4 g, was added drop-wise with vigorous stirring, while keeping temperature below 10 C. Valeraldehyde, 10.3 g, was added in small portions. The reaction was heated to 60 C for five hours, then saturated with sodium chloride and extracted with 3×50 ml ether. The ether layer was dried over sodium sulfate, filtered and the solvent was removed. Methanol, 10 ml, was added and the solution was cooled in the freezer for 16 hours. The product was filtered off, washed with a little methanol and dried in a vacuum oven.

Lch=2-(Hydroxymethyl)-2-methylpropane-1,3-diol
Lci=2-(Hydroxymethyl)propane-1,3-diol
Lcj=2-(Hydroxymethyl)-2-nitropropane-1,3-diol
Lck=Trimethylolpropane
Lcl=Trimethylolpropane allyl ether
Lcm=Trimethylolpropane ethoxylate
Lcn=Trimethylolpropane propoxylate
Lco=Triphenylphosphine
Lcs=Water
Lcz=Tetrahydrofurfuryl alcohol
Ldc=4-(3-Phenylpropyl)pyridine
Ldd=6-Methyl-2,2'-bipyridine
Ldf=Bis(methylsulfinyl)methane To a flask were added 4.05 g of methyl(methylthio)methyl sulfoxide and 40 ml acetic acid. The mixture was cooled to 5 C under nitrogen and 3.7 ml of 30% hydrogen peroxide solution was added slowly. The mixture was allowed to warm to 22 C and stirred under nitrogen for 16 hours. After removal of most of the acetic acid, the product was purified by silica gel chromatography using 10% methanol in ethyl acetate to 20% methanol in ethyl acetate resulting in 3.0 g of a clear colorless oil as a mixture of stereo-isomers.

Ldg=Butyl sulfoxide
Ldh=Tetrahydrothiophene 1-oxide
Ldo=2-Ethyl-2-(hydroxymethyl)butane-1,4-diol To a flask were added 1.5 g diethyl ethylmalonate and 80 ml of tetrahydrofuran and the solution was cooled to 5 C. 0.38 g Sodium hydride were added in small portions and the reaction was stirred for 2 hours at 22 C. After cooling to 5 C, 1.6 g of ethyl bromoacetate were added drop wise and the reaction mixture was allowed to stir at 22 C under nitrogen for 16 hours. After quenching with a few drops of water, the solvent was removed and the crude oil was dissolved in 20 ml tert-butanol and 0.91 g sodium borohydride were added. The mixture was heated to reflux under nitrogen and 1 ml methanol was added drop wise. After stirring for 30 minutes at reflux, the mixture was cooled to 22 C and made acidic with slow addition of 3M hydrochloric acid. Following removal of solvent, the product was purified by silica gel chromatography using pure ethyl acetate resulting in a clear, colorless oil, 0.4 g.

Ha=(S)-(−)-1-(2-Diphenylphosphino-1-naphthyl)isoquinoline
Hb=[2-(Dicyclohexylphosphino)ethyl]trimethylammonium chloride
Hc=1-(3-Phenylpropyl)-1H-benzimidazole To a flask were added 5 g benzimidazole and 75 ml tetrahydrofuran under nitrogen and the solution was cooled to 10 C with stirring. 2.2 g Sodium hydride were added in small portions and the reaction was stirred for 10 minutes. 1-Bromo-3-phenylpropane was added and the reaction mixture was heated to 40 C for 5 hrs. After cooling to 5 C, the reaction was quenched with slow addition of 100 ml water. After the tetrahydrofuran was removed of by rotovap, the mixture was extracted with 100 ml ethyl acetate and washed with 25 ml water and the solvent was removed on the rotovap. The product was purified by column chromatography using 40% ethyl acetate in hexane resulting in a light yellow oil which crystallized in the freezer.

Hg=2,2'-Butane-1,1-diylbis(1-propyl-1H-benzimidazole)

2,2'-Methylenebis(1H-benzimidazole)

To a flask were added 20 g polyphosphoric acid. After heating to 90 C under nitrogen, a mixture of 5.0 g 1,2-phenylenediamine and 2.4 g malonic acid were added. The reaction mixture was heated to 180 C for 4 hours, then cooled to 150 C and poured into 40 ml water. The mixture was basified with aqueous ammonium hydroxide. After cooling to 5 C, the product was filtered off and washed with water. The solid was reslurried in 200 ml hot acetonitrile, cooled, filtered and dried leaving 2.7 g of a gray solid.

2,2'-butane-1,1-diylbis(1-propyl-1H-benzimidazole)

To a flask were added 0.79 g 2,2'-methylenebis(1H-benzimidazole) and 20 ml N,N-dimethylformamide under nitrogen. 0.42 g sodium hydride were added in portions and the mixture was stirred 20 minutes. 1.74 g 1-iodopropane were added slowly and the mixture was stirred at 22 C for 16 hrs. After quenching with the slow addition of 40 ml water, the product was extracted with ethyl acetate and washed with water. Solvent removal resulted in an oil which was purified by silica gel chromatography using 25% ethyl acetate in hexane to give 0.9 g of a light yellow oil which crystallized on standing.

Hh=1,1'-Bis(diphenylphosphino)ferrocene
Hk=1,1'-Diethyl-1H,1'H-2,2'-bibenzimidazole To a flask were added 2.0 g 1-ethyl-1H-benzimidazole and 25 ml tetrahydrofuran under nitrogen. To this solution was added 20 ml n-butyllitium (1.6M) and the mixture was heated to 60 C for 72 hours. After cooling to 22 C, the reaction was quenched with water and extracted with ethyl acetate. Following solvent removal, the product was dissolved in 8.5 ml hot ethyl acetate and 20 ml of hexane were added. After cooling to 5 C, the product precipitated and was filtered, washed with hexane, and dried giving 0.42 g pale yellow solid.

Hl=1,2-Benzisoxazole
Hm=2,2'-(1,2-Phenylene)bis(1-ethyl-1H-benzimidazole)

2,2'-(1,2-Phenylene)bis(1H-benzimidazole)

To a flask were added 50 g polyphosphoric acid. After heating to 90 C under nitrogen, a mixture of 2.7 g 1,2-phenylenediamine and 2.1 g phthalic acid were added. The reaction mixture was heated to 180 C for 4 hours, then cooled to 130 C and poured into 150 ml water. The mixture was basified with aqueous ammonium hydroxide. After cooling to 5 C, the product was filtered and washed with water. After drying, 3.3 g of a gray solid remained.

2,2'-(1,2-Phenylene)bis(1-ethyl-1H-benzimidazole)

To a flask were added 1.5 g 2,2'-(1,2-phenylene)bis(1H-benzimidazole) and 30 ml N,N-dimethylformamide and the mixture was cooled to 5 C under nitrogen. 0.48 g Sodium hydride were added in portions and the reaction mixture was stirred for 20 minutes. 1.9 g Iodoethane were added and the mixture was allowed to warm to 22 C and was stirred for 1 hour. The mixture was quenched slowly with 50 ml water and cooled to 5 C. The product was filtered and washed with water. The product was dissolved in 13 ml hot acetonitrile, cooled, filtered and washed with acetonitrile and dried resulting in 1.2 g of an off-white solid.

Hn=2,2'-ethene-1,2-diyldipyridine

Ho=2,2'-(1,2-phenylene)bis(1,3-benzothiazole)

To a flask were added 50 g polyphosphoric acid. After heating to 90 C under nitrogen, a mixture of 3.13 g 2-aminophenol and 2.1 g phthalic acid were added. The reaction mixture was heated to 140 C for 4 hours, then cooled to 90 C and poured into 150 ml water. The mixture was basified by adding sodium carbonate in small portions and the product was extracted with ethyl acetate and washed with water. Following removal of solvent, the product was dissolved in a minimum amount of hot ethanol and allowed to stand at 22 C for 72 hrs. The solid was filtered and washed with a small amount of ethanol. The product was recrystallized from 90% ethanol and dried, resulting in 2.8 g of an off-white solid.

Hr=1,2-Dimethylimidazole

Hs=1,3-Bis(diphenylphosphino)propane

Hv=1,4,8,11-Tetrathiacyclotetradecane

Hx=1,8-Naphthyridine

Hy=10-Methyl-10H-phenothiazine

Hab=1-Benzyl-2-methyl-1H-benzimidazole

To a flask were added 2.5 g 2-methylbenzimidazole, 3.9 g potassium carbonate, 60 ml N,N-dimethylformamide and the mixture was stirred under nitrogen. 3.6 g Benzyl chloride were added and the mixture was heated to 60 C for 16 hours. The reaction was quenched with 80 ml water and cooled to 22 C. The product was extracted twice with 50 ml ethyl acetate and washed with water. Following removal of solvent, the product was dissolved in 100 ml hexane and washed with two portions of water. After drying the hexane layer over sodium sulfate, the mixture was filtered and stripped down to an orange oil.

Hac=1-Benzyl-2-phenyl-1H-benzimidazole

To a flask were added 3 g 2-phenylbenzimidazole, 2.8 g potassium carbonate, 40 ml N,N-dimethylformamide and the mixture was stirred under nitrogen. 3.6 g Benzyl chloride were added and the mixture was heated to 75 C for 8 hrs. The reaction was cooled to 50 C and quenched with 40 ml of water and cooled to 5 C. The product was filtered, washed with water. The product was recrystallized by dissolving in 57 ml acetonitrile at reflux and 39 ml water were added. After cooling to 5 C, the product was filtered, washed and dried giving 3.1 g.

Had=1-Benzyl-2-pyridin-2-yl-1H-benzimidazole

To a flask were added 2.0 g 2-(2-pyridyl)benzimidazole, 1.8 g potassium carbonate, 30 ml N,N-dimethylformamide and the mixture was stirred under nitrogen at 10 C. 1.5 g benzyl chloride were added and the mixture allowed to warm to 22 C and stirred for 3 hours. Another 0.3 g benzyl chloride was added and the reaction was stirred at 22 C for another 16 hours. The reaction was quenched with 40 ml water and the product was filtered and washed with water. The product was dissolved in 10 ml ethanol and 15 ml of water were added. After cooling to 5 C, the product was filtered, washed and dried resulting in 2.4 g of off-white solid.

Hae=1-Benzyl-2-(benzylsulfanyl)-6-methyl-1H-benzimidazole

To a flask were added 2.0 g 2-mercapto-5-methylbenzimidazole, 4.2 g potassium carbonate, 30 ml N,N-dimethylformamide and 3.9 g benzyl chloride. The reaction mixture was heated to 60 C for 16 hours, then cooled to 50 C and quenched with 60 ml water and cooled to 5 C. The solid was filtered and washed with water and then recrystallized by dissolving in 50 ml hot acetonitrile and adding 10 ml of water. After cooling to 5 C, the product was filtered, washed and dried resulting in 3.5 g white solid as a mixture of the 5-methyl and 6-methyl isomers.

Hag=1-Benzyl-4-methyl-1H-benzimidazole 4-methyl-1H-benzimidazole

To a flask were added 2.0 g 2,3-diaminotoluene, 1.0 g 90% formic acid and 30 ml 5M hydrochloric acid and the mixture was heated to 90 C under nitrogen for 4 hours. After cooling to 22 C, the mixture was basified with aqueous ammonium hydroxide and the product was removed by filtration and washed with water. The product was purified by column chromatography using pure ethyl acetate resulting in 1.0 g brown solid.

1-Benzyl-4-methyl-1H-benzimidazole

To a flask were added 1.0 g 4-methyl-1H-benzimidazole, 1.6 g potassium carbonate, 25 ml N,N-dimethylformamide and the mixture was stirred under nitrogen. 1.4 g Benzyl chloride were added and the mixture was heated to 60 C for 16 hours. Another 0.4 g of benzyl chloride were added and the reaction was heated to 70 C for 24 hours. The reaction was cooled to 50 C and quenched with 50 ml water and extracted with ethyl acetate. After washing with water, the solvent was removed and the product was purified by column chromatography using a gradient from 40% ethyl acetate in hexane to 75% ethyl acetate in hexane. Following removal of the solvent, the partially crystallized product was dissolved in 20 ml acetonitrile and treated with 0.1 g activated carbon. After refluxing for 20 minutes, the mixture was filtered through celite and the solvent was removed leaving a yellow oil which crystallized on standing, 1.0 g.

Hah=1-Benzyl-1H-benzimidazole

To a flask were added 2 g benzimidazole, 3.5 g potassium carbonate, 20 ml N,N-dimethylformamide and the mixture was stirred under nitrogen. 3.2 g Benzyl chloride were added and the mixture was heated to 50 C for 16 hrs. The reaction was quenched with 40 ml water and 7 ml 3M hydrochloric acid and cooled to 5 C. The product was filtered and washed with water. The product was recrystallized by dissolving in 10 ml 2 propanol at reflux, hot filtered and 30 ml hexane were added. After cooling to 5 C, the product was filtered, washed with hexane and dried giving 1.6 g.

Hai=1-Ethyl-1H-imidazo[4,5-b]pyridine

To a flask were added 0.5 g 4-azabenzimidazole and 10 ml N,N-dimethylformamide and the mixture was cooled to 10 C under nitrogen. 0.18 g Sodium hydride were added in portions and the reaction mixture was stirred for 20 minutes. 0.71 g Diethylsulfate were added and the mixture was allowed to warm to 22 C and was stirred for 16 hours. The mixture was quenched slowly with 30 ml 1M hydrochloric acid and the aqueous layer was washed with ethyl acetate. After basification with sodium hydroxide, the product was extracted twice with ethyl acetate and dried over sodium sulfate. Following filtration and solvent removal, the product was purified by silica gel chromatography using 5% methanol in ethyl acetate to 12% methanol in ethyl acetate. 0.4 g Of an oil was obtained.

Haj=1-Ethyl-1H-benzimidazole

To a flask were added 100 g benzimidazole, 44 g Sodium hydroxide, 320 ml water and 480 ml tetrahydrofuran and the mixture was stirred under nitrogen. 157 g Diethyl sulfate were added slowly, maintaining a temperature of 40 C. After 2 hrs at 40 C, the reaction was quenched with slow addition of 100 ml concentrated hydrochloric acid. After washing with 150 ml hexane, the mixture was basified with 50 g Sodium hydroxide and extracted with 275 ml ethyl acetate, then 225 ml ethyl acetate. The solvent was removed, leaving an orange oil, which was distilled under full vacuum to give 109.4 g clear colorless oil.

Hak=1-Ethyl-2-(1,3-thiazol-4-yl)-1H-benzimidazole 5.0 g Thiabendazole and 1.31 g sodium hydroxide were added to 40 ml of tetrahydrofuran. The white slurry was stirred under nitrogen and 4.6 g of diethylsulfate was added dropwise. The mixture was stirred at 50 C for 16 hours. The mixture was quenched with 75 ml of water and then extracted with 75 ml or ethyl acetate. The organic layer was washed with 15 ml of water. Following solvent removal, an off-white solid crystallized. The solid was recrystallized from 30 ml (2:1, v/v) ethanol/water. The solid was dried under vacuum for 3 hrs at 50 C. 3.7 g of a white solid was obtained.

Ham=2-(1H-Benzimidazol-1-yl)ethanol

To a flask were added 2.3 g benzimidazole and 40 ml tetrahydrofuran and the mixture was cooled to 10 C under nitrogen. 1.0 g Sodium hydride were added in portions and the reaction mixture was stirred for 20 minutes. 4.0 g 2-Todoethanol were added and the mixture was heated to 50 C for 16 hours. The mixture was quenched slowly with 50 ml water, extracted twice with ethyl acetate and dried over sodium sulfate. Following filtration and solvent removal, the product was purified by silica gel chromatography using 25% methanol in ethyl acetate. A solid was obtained that was dissolved in a hot mixture of 10% methanol in ethyl acetate, cooled, filtered and dried giving 1.4 g white solid.

Han=2-[2-(Diphenylphosphino)phenyl]-1-methyl-1H-benzimidazole 2-(2-Bromophenyl)-1H-benzimidazole To a flask were added 80 g methanesulfonic acid and 8 g phosphorus pentoxide and the mixture was heated to 60 C under nitrogen until the solids had completely dissolved. To this solution was added 2.7 g 1,2-phenylene diamine and 5.0 g 2-bromobenzoic acid and the mixture was heated to 100 C for 30 minutes. The mixture was poured onto 300 ml ice water and basified with the addition of small portions of sodium carbonate. Following filtration of the solid and washing with water, the crude product was dissolved in 85 ml hot ethanol, filtered and 9 ml of water was added. After cooling to 5 C, the product was filtered and washed with 50% ethanol and dried, giving 3.85 g off-white solid.

2-(2-Bromophenyl)-1-methyl-1H-benzimidazole

To a flask were added 3.3 g 2-(2-bromophenyl)-1H-benzimidazole and 100 ml tetrahydrofuran and the mixture was cooled to 10 C under nitrogen. 0.63 g Sodium hydride were added in portions and the reaction mixture was stirred for 20 minutes. 2.0 g Dimethylsulfate were added and the mixture was heated to 22 C for 30 minutes. The mixture was quenched slowly with 100 ml water, extracted with ethyl acetate and then extracted into a 1M hydrochloric acid solution. The solution was washed with ethyl acetate and then basified with 3M sodium hydroxide. Following extraction with ethyl acetate and solvent removal, the solid was dissolved in a hot mixture of 20 ml hexane with 4 ml 2-propanol. After cooling to 5 C, the product was filtered, washed with hexane and dried giving 2.9 g of a white solid.

2-[2-(Diphenylphosphino)phenyl]-1-methyl-1H-benzimidazole

To an oven dried flask that was purged with nitrogen was added 1.5 g 2-(2-bromophenyl)-1-methyl-1H-benzimidazole and 50 ml dry tetrahydrofuran. The solution was cooled to −70 C and 3.9 ml of a 1.6M solution of n-butyllithium in hexanes was added drop wise. After stirring 1 hour at less than −60 C, 1.4 g chlorodiphenylphosphine was added drop wise and the mixture was allowed to warm to 22 C. The mixture was quenched with 100 ml of nitrogen-purged water and extracted with nitrogen-purged ethyl acetate. Following solvent removal, the solid was dissolved in 10 ml of hot, nitrogen-purged ethanol and 7 ml of nitrogen-purged water was added. After cooling to 5 C, the product was filtered and washed with 50% ethanol that was nitrogen-purged and dried giving 1.3 g off-white solid.

Hao=1-Methyl-1H,1'H-2,2'-bibenzimidazole 1H,1'H-2,2'-Bibenzimidazole

To a flask were added 10.8 g 1,2-phenylene diamine, 2.65 g hexachloroacetone and 50 ml ethylene glycol. The mixture was mixed and heat to 55 C under nitrogen and sonicated for 3 hours. After cooling to 22 C, the solid was filtered and washed with acetone and dried leaving 1.3 g yellow solid.

1-Methyl-1H,1'H-2,2'-bibenzimidazole

To a flask were added 1.2 g 1H,1'H-2,2'-bibenzimidazole, 0.45 g sodium hydroxide, 100 ml N,N-dimethylformamide and 1.4 g dimethylsulfate. The mixture was heated to 45 C under nitrogen for 16 hours and another 0.45 g sodium hydroxide and 2.8 g dimethylsulfate were added and the mixture was stirred at 45 C for 24 hours. Another 4.2 g of dimethylsulfate were added and the mixture was stirred at 45 C for 24 hours, then cooled to 22 C and quenched with 350 ml water. The off-white solid was filtered and washed with water. After dissolving the product in 125 ml hot ethanol, 44 ml water were added and the solution was cooled to 5 C, filtered, washed with 50% ethanol and dried leaving 0.5 g white solid.

Haq=1-Methyl-2-pyridone
Har=1-Methyl-1H-benzimidazole
Has=1-Methyl-1H-imidazole
Hat=1-Phenyl-1H-benzimidazole N-Phenylbenzene-1,2-diamine To a pressure reaction bottle was added 10 g 2-nitrodiphenylamine, 0.5 g 5% palladium on carbon and 100 ml 95% ethanol. The mixture was hydrogenated at 22 C and 40 psi hydrogen for 2 hours. Following filtration through celite and solvent removal, an oil was obtained that crystallized on standing.

1-Phenyl-1H-benzimidazole

To a flask were added crude N-phenylbenzene-1,2-diamine, 9.7 g formamidine acetate and 175 ml 2-methoxyethanol and the mixture was heated to reflux under nitrogen for 30 minutes. After cooling to 22 C, the solvent was removed and the mixture was dissolved in ethyl acetate and washed with water. Following removal of the solvent, the product was purified by silica gel chromatography using 50% ethyl acetate in hexane giving a tan oil.

Hau=1-Phenyl-1H-imidazole

Hav=2-Methyl-1-propyl-1H-benzimidazole

To a flask were added 2.0 g 2-methylbenzimidazole and 40 ml tetrahydrofuran and the mixture was cooled to 10 C under nitrogen. 0.9 g Sodium hydride were added in portions and the reaction mixture was stirred for 20 minutes. 3.9 g 1-iodopropane were added and the mixture was heated to 45 C for 6 hours. The mixture was quenched slowly with 40 ml water, extracted twice with ethyl acetate and washed with water. Following solvent removal, the product was purified by silica gel chromatography using pure ethyl acetate to 5% methanol in ethyl acetate. A pale yellow oil was obtained.

Haw=2-Phenyl-1-propyl-1H-benzimidazole

To a flask were added 3.0 g 2-phenylbenzimidazole and 60 ml tetrahydrofuran and the mixture was cooled to 10 C under nitrogen. 0.41 g Sodium hydride were added in portions and the reaction mixture was stirred for 20 minutes, then cooled to 10 C. 3.1 g 1-iodopropane were added and the mixture was heated to 55 C for 16 hours. Another 0.8 g 1-iodopropane were added and the temperature was held at 55 C for two hours. The mixture was cooled to 22 C, quenched slowly with 40 ml water, extracted with ethyl acetate and washed with water. Following solvent removal, the product was purified by silica gel chromatography using straight 67% ethyl acetate, 24% hexane and 9% methanol. An oil was obtained.

Hay=1-Propyl-1H-benzimidazole

To a flask were added 2.0 g benzimidazole, 3.5 g potassium carbonate, 4.3 g 1-iodopropane and 20 ml N,N-dimethylformamide. The mixture was heated to 45 C under nitrogen for 16 hours and then quenched with 30 ml water and the product was extracted with ethyl acetate. Following removal of the solvent, the product was purified by silica gel chromatography using 66% ethyl acetate in hexane. The brown oil was again purified by silica gel chromatography using ethyl acetate, giving a slightly yellow oil 1.5 g.

Haz=N,N-Dimethyl-2-pyridin-2-ylethanamine

Hbb=N-Methyl-2-pyridin-2-ylethanamine

Hbc=2-Pyridin-2-yl-1H-benzimidazole

Hbf=N,N-Dimethyl-1-pyridin-2-ylmethanamine

Hbj=2,1,3-Benzothiadiazole

Hbl=2,2'-Propane-2,2-diylbis(1-propyl-1H-benzimidazole)

2,2'-Propane-2,2-diylbis(1H-benzimidazole)

To a thick walled glass tube was added a mixture of 5.8 g 1,2-phenylene diamine dihydrochloride and 1.5 g malononitrile. The tube was flame-sealed under full vacuum and heated to 220 C for 1.5 hours causing the mixture to turn black. After cooling to 22 C, the black material was added to 60 ml 1M hydrochloric acid and stirred and heated to 50 C for several hours. After adding 150 mg activated carbon, the mixture was brought to reflux and filtered through celite. The clear filtrates were basified with aqueous ammonium hydroxide resulting in a cream colored solid which was filtered and washed with water. After re-slurrying the solid in hot water and filtering, the product was dried resulting in 2.5 g.

2,2'-Propane-2,2-diylbis(1-propyl-1H-benzimidazole)

To a flask were added 1.4 g 2,2'-propane-2,2-diylbis(1H-benzimidazole) and 30 ml tetrahydrofuran and the mixture was cooled to 10 C under nitrogen. 0.61 g Sodium hydride were added in portions and the reaction mixture was stirred for 20 minutes. 2.6 g 1-iodopropane were added and the mixture was stirred at 22 C for 3.5 hours. The mixture was quenched slowly with 30 ml water and stirred 16 hours. After cooling to 5 C, the solid was filtered and washed with water and purified by silica gel chromatography using 25% ethyl acetate in hexane to 50% ethyl acetate in hexane. 1.4 g of off-white solid was obtained.

Hbn=2,2'-Propane-2,2-diylbis(1,3-benzothiazole)

To a flask were added 50 g polyphosphoric acid. After heating to 70 C under nitrogen, a mixture of 3.13 g 2-aminothiophenol and 1.65 g dimethylmalonic acid was added. The reaction mixture was heated to 150 C for 2 hours, then 165 C for 3 hours. After cooling to 80 C, the mixture was poured into 100 ml water. The slurry was cooled to 5 C, filtered and the solid was washed with water. The solid was added to a mixture of 20 ml ethanol and 210 ml water at 50 C and basified with aqueous ammonium hydroxide. After cooling to 10 C, the solid was filtered and washed with water. The solid was dissolved in 50 ml hot ethanol, hot filtered and 5 ml water was added and the solution was cooled to 5 C. Following filtration, the white solid was washed with 75% ethanol and dried.

Hbs=N-Pyridin-2-ylpyridin-2-amine

Hbt=2,2'-Ethane-1,2-diyldipyridine

To a Pressure reaction bottle was added 6.9 g of 2,2'-bis (dipyridyl)ethene, 0.6 g 5% palladium on carbon, and 200 ml ethanol. The mixture was purged with hydrogen and then hydrogenated under 40 psi hydrogen for 16 hours. The catalyst was filtered off on a bed of celite. The solvent was removed and the residue was dissolved in 40 ml of hot hexane, and filtered hot. After the addition of seed crystals and cooling to 10 C, the product was filtered, washed with hexane and dried, resulting in 5.3 g of an off-white solid.

Hbu=2,2'-Methylenedipyridine

To a flask were added 5 g of 2,2'-dipyridylketone, 3.2 g of potassium hydroxide, 100 ml of diethyene glycol and 3.4 g of hydrazine hydrate. The mixture was heated to 10° C. under nitrogen for 1 hour, then heated to 150 C for 2 hours, and then 180 C for 3 hours. After cooling to 22 C, 150 ml of water were added and the mixture was extracted with 150 ml ethyl acetate. After washing the ethyl acetate layer twice with 50 ml of water, the solvent was removed and the product was purified by silica gel chromatography using 95% ethyl acetate with 5% methanol to give 1.9 g of a light yellow oil.

Hbv=2,2'-Propane-1,3-diyldipyridine

To a flask were added 93 g of 2-picoline, 21 g of 2-vinylpyridine, 1 g of sodium and a trace of hydroquinone. The mixture was heated to 130 C under nitrogen for 2 hours. After cooling to 22 C, 200 ml of water were added and the mixture was extracted with 150 ml diethyl ether. After washing the diethyl ether layer twice with 100 ml of water, and twice with 50 ml of 10% sodium sulfite, the solvent was removed and the product was purified by vacuum distillation to give 7.5 g of a light yellow oil.

Hbz=2,4,6-Trimethylpyridine

Hca=2,4-Pentanedione

Hcb=2,5-Lutidine

Hcg=1H-Benzimidazol-2-ylmethanol

Hci=2'-(Diphenylphosphino)-N,N-dimethylbiphenyl-2-amine
Hcj=2-(Diphenylphosphino)-6-methylpyridine
Hcn=2-Mercapto-1-methylimidazole
Hco=2-Mercapto-5-methylbenzimidazole
Hcp=Pyridine-2-thiol
Hcq=Pyrimidine-2-thiol
Hcr=2-Methyl-1H-benzimidazole
Hcs=2-Methylbenzothiazole
Hct=1H-Benzimidazol-2-ol
Hcv=Pyridin-2-ylmethanol
Hcw=3-(Diethylamino)-1,2-propanediol
Hcx=3,3-Dimethyl-2,4-pentanedione
Hcz=3,6-Dithia-1,8-octanediol
Hdc=3-Methyl-2,2'-bipyridine To a flask were added 1.0 g 2-bromo-3-methylpyridine and 10 ml of dry tetrahydrofuran. The solution was purged with nitrogen and 34 mg tetrakis(triphenylphosphine)palladium was added followed by 17.4 ml of a 0.5M solution of 2-pyridylzinc bromide in tetrahydrofuran. The mixture was stirred at 22 C for 24 hours, then 40 C for 72 hours. The mixture was poured into a solution of 5 g EDTA, 2 g sodium carbonate and 40 ml water. The product was extracted twice with diethylether, washed with water and dried over sodium sulfate. Following filtration and solvent removal, the product was purified by silica gel chromatography using 48% ethyl acetate, 48% hexane and 4% methanol. A slightly yellow oil remained 0.38 g.

Hde=4,4'-Dimethoxy-2,2'-bipyridine
Hdf=3,4-Dimethoxyaniline
Hdh=Phenyl(pyridin-4-yl)methanone
Hdi=N,N-Dimethylpyridin-4-amine
Hdj=4-Hydroxypyridine
Hdm=4-(3-Phenylpropyl)pyridine
Hdo=4-Pyridinecarboxaldehyde
Hdp=4-Tert-butylpyridine
Hds=5-Hydroxy-2-methylpyridine
Hdt=5-Methoxy-1-methyl-1H-benzimidazole To a flask were added 2.5 g 5-methoxybenzimidazole and 40 ml tetrahydrofuran and the mixture was cooled to 10 C under nitrogen. 0.9 g Sodium hydride were added in portions and the reaction mixture was stirred for 20 minutes. 2.6 g Dimethylsulfate were added and the mixture was allowed to warm to 22 C and was stirred for 2 hours. The mixture was quenched slowly with 50 ml water and the tetrahydrofuran was removed by distillation. The product was extracted twice with ethyl acetate and washed with water. Following solvent removal, the product was purified by silica gel chromatography using 5% methanol in ethyl acetate to 10% methanol in ethyl acetate. 2.2 g Of off-white solid was obtained. 1.6 g Of this product was dissolved in 7 ml hot toluene and 25 ml hexane were added along with a seed crystal. After cooling to 5 C, the crystalline solid was filtered, washed with hexane and dried to give 1.2 g of a white solid as a mixture of the 5-methoxy and 6-methoxy isomers.

Hdv=8-Methyl-3,4-dihydro-2H-[1,3]thiazino[3,2-a]benzimidazole

To a flask were added 2 g 2-mercapto-5-methylbenzimidazole, 4.2 g potassium carbonate, 4.0 g 1,3-diiodopropane and 60 ml N,N-dimethylformamide. The mixture was heated to 50 C under nitrogen for 5 hours and then cooled to 22 C. The reaction was quenched with 100 ml water and the product was extracted twice with ethyl acetate and washed twice with water. Following removal of the solvent, the product was recrystallized by dissolving in a hot mixture of 50 ml hexane with 10 ml 2-propanol. After cooling to 5 C, the product was filtered, washed with hexane and dried giving 0.63 g of an off-white solid.

Hdx=6,6'-Dibromo-2,2'-bipyridine
Hdy=6,6'-Dimethyl-2,2'-bipyridine
Hdz=6-Butyl-6'-methyl-2,2'-bipyridine 2-(Benzyloxy)-6-chloropyridine To a flask were added 5.0 g 6-chloro-2-hydroxypyridine, 5.3 g potassium carbonate and 75 ml N,N-dimethylformamide. After cooling to 5 C under nitrogen, 5.9 g of benzyl chloride were added drop wise and the reaction mixture was warmed to 60 C for 3 hours. After cooling to 10 C, the reaction mixture was quenched with 75 ml of water and the product was extracted with ethyl acetate and washed with water. Following solvent removal, the product was purified by silica gel chromatography using 5% ethyl acetate in hexane to give a clear colorless oil 7.9 g.

2-(Benzyloxy)-6-butylpyridine

To a flask were added 2.0 g 2-(benzyloxy)-6-chloropyridine, 5.0 ml 1-methyl-2-pyrrolidinone and 50 ml of dry tetrahydrofuran. After cooling to 5 C under nitrogen, 0.16 g iron(III) acetylacetonate were added followed by drop wise addition of 8.5 ml of a 2M solution of butylmagnesium bromide in tetrahydrofuran. After stirring for 1 hour at 22 C, the reaction was cooled to 10 C and quenched with 20 ml aqueous ammonium chloride. The mixture was diluted with water and extracted with hexane. After washing with water and removal of solvent, the product was purified by silica gel chromatography using 10% ethyl acetate in hexane to give 1.6 g of an oil.

6-Butylpyridin-2-ol

To a pressure reaction bottle were added 1.6 g 2-(benzyloxy)-6-butylpyridine, 0.2 g 5% palladium on carbon and 50 ml ethanol. The mixture was hydrogenated at 22 C and 40 psi hydrogen for 16 hours. Following filtration through celite and solvent removal, an oil was obtained that crystallized on standing to give 0.9 g.

6-Butylpyridin-2-yl trifluoromethanesulfonate

To a flask were added 0.9 g 6-butylpyridin-2-ol and 10 ml pyridine and the mixture was cooled to 10 C under nitrogen. 1.85 g trifluoromethanesulfonic anhydride were added slowly and the reaction mixture was allowed to warm to 22 C and stirred for 16 hours. After cooling to 5 C, the mixture was quenched with 20 ml of water and extracted twice with hexane. After drying over sodium sulfate, the solution was filtered and the solvent was removed. Purification by silica gel chromatography using 5% ethyl acetate in hexane resulted in 1.2 g of a clear colorless oil.

6-Butyl-6'-methyl-2,2'-bipyridine

To a flask were added 1.2 g 6-butylpyridin-2-yl trifluoromethanesulfonate, 0.36 g lithium chloride and 10 ml dry tetrahydrofuran. Addition of 12 ml of a 0.5M solution of 6-methyl-2-pyridylzinc bromide in tetrahydrofuran was followed by addition of 242 mg of tetrakis(triphenylphosphine) palladium. The reaction was heated to reflux under nitrogen for 16 hours. The reaction was cooled to 22 C and quenched by adding a solution of 6 g of ethylene diamine tetraacetic acid in 40 ml water pH adjusted to 8 with aqueous sodium bicarbonate. 50 ml Hexane and 20 ml ethyl acetate were added and the mixture was stirred for one hour before the aqueous layer was removed and the organic layer was dried over sodium sulfate. After filtration and solvent removal, the product was purified by silica gel chromatography using 5% ethyl acetate in hexane to give 0.7 g clear colorless oil.

Hea=6-Methyl-2,2'-bipyridine
Hec=Quinolin-8-ol
Hee=Acetylcholine Chloride
Heg=Anthranil
Heh=Benzimidazole
Hei=Benzothiazole
Hej=Benzoxazole
Hen=Benzyltrimethylammonium Chloride
Heo=2,2'-Ethane-1,2-diylbis(1H-benzimidazole)

To a flask were added 3 g of 1,2-phenylene diamine, 1.6 g of succinic acid, and 30 ml of 4M hydrochloric acid. The mixture was heated to reflux under nitrogen for 22 hours, and then cooled to 22 C. The solid was filtered, washed with a little water and dissolved in a warm mixture of 30 ml of acetone and 40 ml of water. Enough ammonium hydroxide was added to basify the mixture, and after cooling to 22 C, the product was filtered and washed with 20 ml of 50% acetone and dried, resulting in a light pink solid.

Hes=Choline chloride
Heu=1-Pyridin-2-yl-N-(pyridin-2-ylmethyl)methanamine
Hew=Dipyridin-2-ylmethanone
Hez=N,N'-Bis[phenylmethylene]ethane-1,2-diamine (mixture of cis/trans isomers)
Hfc=Diethylphenylphosphine
Hfd=2-(Diphenylphosphino)pyridine
Hfe=Diphenylphosphine oxide
Hff=Di-tert-butylphosphine oxide To a flask were added 1.0 g of di(tert-butyl)chlorophosphine and 5 ml of dichloromethane under nitrogen. After slow addition of 0.25 g of water, the mixture was stirred at 22 C for 30 minutes and the solvent was removed leaving a solid. After purification by sublimation, 0.9 g of a white solid was obtained.

Hfi=Ditetrabutylammonium malonate

To a flask were added 3.1 g malonic acid, 24.6 g of a 55-60% solution of tetrabutylammonium hydroxide in water, 13 ml water and 75 ml 2-propanol. After heating to 50 C under nitrogen for 1 hour, the solvent was removed and another 30 ml of 2-propanol were added and removed by distillation under reduced pressure. After drying, an oil was obtained.

Hfj=Ditetrabutylammonium phenylphosphonate

To a flask were added 2.0 g phenylphosphonic acid, 111.0 g of a 55-60% solution of tetrabutylammonium hydroxide in water and 30 ml 2-propanol. After heating to 50 C under nitrogen for 1 hour, the solvent was removed and another 30 ml of 2-propanol were added and removed by distillation under reduced pressure. After drying, a pinkish oil was obtained.

Hfl=Ditetrabutylammonium succinate

To a flask were added 3.5 g succinic acid, 26.4 g of a 55-60% solution of tetrabutylammonium hydroxide in water, 13 ml water and 75 ml 2-propanol. After heating to 50 C under nitrogen for 1 hour, the solvent was removed and another 75 ml of 2-propanol were added and removed by distillation under reduced pressure. After drying, an oil was obtained.

Hfo=Ethyldiphenylphosphine
Hfr=Imidazo[1,2-a]pyridine
Hfs=Imidazo[1,5-a]pyridine To a flask were added 2.0 g of 2-(aminomethyl)pyridine, 0.12 g of tetrabutylammonium bromide, 5.7 g of chloroform, and 30 ml 1,2-dimethoxyethane. While stirring under nitrogen, 40 ml of 40% aqueous Sodium hydroxide was added and the mixture was heated to 50 C for 4.5 hours. After cooling to 22 C, the mixture was extracted twice with ethyl acetate, and the ethyl acetate layer was dried over sodium sulfate. After filtration and solvent removal, the product was purified by silica gel chromatography using straight ethyl acetate to 5% acetonitrile in ethyl acetate resulting in a brown oil which crystallized on standing. The product was sublimed to give 0.36 g of a yellow solid.

Hfv=Isoquinoline
Hfw=Lepidine
Hfx=Lithium Acetate
Hfy=Lithium Benzoate
Hfz=Lithium Bromide
Hga=Lithium Chloride
Hgc=Lithium Diphenylphosphinate To a flask were added 1.0 g diphenylphosphinic acid, 182 mg lithium hydroxide monohydrate, 10 ml of water and 30 ml 2-propanol. The mixture was heated to 70 C under nitrogen until a clear solution was obtained. The mixture was cooled and the solvent was removed under reduced pressure and the product was slurried in a small amount of 2-propanol, filtered and washed with 2-propanol. After drying, a white solid was obtained.

Hgh=Lithium Salicylate

To a flask were added 10.0 g salicylic acid, 2.9 g lithium hydroxide monohydrate, 20 ml of water and 100 ml 2-propanol. The mixture was heated to 50 C for 1.5 hours and then cooled and the solvent was removed under reduced pressure. The product was slurried in 25 ml diethyl ether, filtered and washed with diethyl ether. After drying, 7.0 g of a white solid was obtained.

Hgi=Lithium Trifluoroacetate
Hgk=N,N,N',N'-Tetramethylpropane-1,3-diamine
Hgm=N,N,N',N'-Tetramethylethylenediamine
Hgp=N,N-Dipyridin-2-ylacetamide To a flask were added 2,2'-dipyridylamine and 12 ml acetic anhydride. The mixture was heated to 110 C under nitrogen for 5 hours and cooled to 22 C. After quenching with a slow addition of aqueous sodium bicarbonate, the mixture was made basic with the addition of small portions of sodium carbonate. The product was extracted with ethyl acetate and after removal of solvent, it was purified by silica gel chromatography using 65% ethyl acetate in hexane to give 0.8 g of an oil.

Hgr=2,9-Dimethyl-1,10-phenanthroline hydrate
Hgt=N-Methyl-N-pyridin-2-ylpyridin-2-amine To a flask were added 1.0 g 2,2'-dipyridiylamine, 1.0 g of pulverized potassium hydroxide and 15 ml of N,N-dimethylformamide. After stirring for 1 hour under nitrogen, the mixture was cooled to 5 C and 0.9 g of iodomethane were added. The mixture was allowed to warm to 22 C and stirred for 16 hours. After quenching with 15 ml water, the reaction was extracted twice with diethyl ether and washed with water. Following removal of solvent, the product was purified by silica gel chromatography using 35% ethyl acetate in hexane to give 0.16 g of an oil.

Hgu=N,6-Dimethyl-N-pyridin-2-ylpyridin-2-amine

To a flask were added 0.75 g 2-(methylamino)pyridine, 1.0 g 2-bromo-6-methylpyridine, 0.95 g sodium tert-butoxide, 0.16 g 1,1'-bis(diphenylphosphino)ferrocene and 50 ml toluene. The mixture was purged thoroughly with nitrogen and 0.14 g of tris(dibenzylideneacetone)d2-propanollladium(0)

was added and the mixture was heated to 80 C under nitrogen for 16 hours. After cooling to 22 C and quenching with 50 ml water, the product was extracted twice with ethyl acetate and washed twice with water. After filtration and solvent removal, the product was purified by silica gel chromatography using 35% ethyl acetate in hexane resulting in an orange oil. This was dissolved in 75 ml tert-butyl methyl ether and extracted into 75 ml 1M hydrochloric acid. After basification with 3M sodium hydroxide solution, the product was extracted with 75 ml tert-butyl methyl ether. Following removal of solvent, 1.1 g of a yellow oil was obtained.

Hgw=N-Octadecyl-N-pyridin-2-ylpyridin-2-amine

To a flask were added 1.0 g 2,2'-dipyridylamine, 1.0 g of pulverized potassium hydroxide and 15 ml of N,N-dimethylformamide. After stirring for 1 hour under nitrogen, the mixture was cooled to 5 C and 2.2 g of 1-iodooctadecane were added. The mixture was allowed to warm to 22 C and stirred for 16 hours, then heated to 40 C for 2 hours. After quenching with 25 ml water and cooling to 22 C, the product was filtered and washed with water. The product was dissolved in 25 ml hot ethanol with 100 mg activated carbon, stirred for 30 minutes and filtered through celite. After adding 25 ml water and cooling to 5 C, the product was filtered, washed with water and dried leaving 2.1 g light yellow solid.

Hgx=N-Phenyl-N-pyridin-2-ylpyridin-2-amine

To a flask were added 0.5 g aniline, 2.1 g 2-bromopyridine, 1.3 g sodium tert-butoxide, 0.15 g 1,1'-bis(diphenylphosphino)ferrocene and 50 ml toluene. The mixture was purged thoroughly with nitrogen and 0.12 g of tris(dibenzylideneacetone)d2-propanollladium(0) was added and the mixture was heated to 80 C under nitrogen for 48 hours. After cooling to 22 C most of the solvent was removed and the mixture was taken up in 100 ml ethyl acetate and filtered. Following solvent removal, the product was purified by silica gel chromatography using 50% ethyl acetate in hexane resulting in 0.62 g of oil which crystallized on standing.

Hgz=N-Propyl-N-pyridin-2-ylpyridin-2-amine

To a flask were added 5.0 g 2,2'-dipyridiylamine, 4.9 g of pulverized potassium hydroxide and 45 ml of N,N-dimethylformamide. After stirring for 1 hour under nitrogen, the mixture was cooled to 5 C and 5.0 g of 1-iodopropane were added. The mixture was allowed to warm to 22 C and stirred for 5 hours. After quenching with 45 ml water, the product was extracted with ether and washed twice with water. Following removal of solvent, the product was purified by silica gel chromatography using 40% ethyl acetate in hexane to give 4.8 g of nearly colorless oil.

Hha=6-Methyl-N-(6-methylpyridin-2-yl)-N-propylpyridin-2-amine

6-Methyl-N-(6-methylpyridin-2-yl)pyridin-2-amine

To a flask were added 0.76 g 6-methyl-2-aminopyridine, 1.0 g 2-bromo-6-methylpyridine, 0.95 g sodium tert-butoxide, 0.16 g 1,1'-bis(diphenylphosphino)ferrocene and 50 ml toluene. The mixture was purged thoroughly with nitrogen and 0.14 g of tris(dibenzylideneacetone)d2-propanollladium (0) was added and the mixture was heated to 80 C under nitrogen for 3 hours. After cooling to 22 C and quenching with 50 ml water, the product was extracted twice with ethyl acetate and washed twice with water. After filtration and solvent removal, the product was dissolved in 50 ml tert-butyl methyl ether and extracted into 60 ml 1M hydrochloric acid. Methanol was added and the mixture was heated to dissolve the solids and the organic layer was removed. The aqueous layer was basified with 3M sodium hydroxide solution, the product was extracted with tert-butyl methyl ether and washed with water. Following removal of solvent, an oil was obtained that was carried directly into the next step.

6-Methyl-N-(6-methylpyridin-2-yl)-N-propylpyridin-2-amine

To a flask were added 1.0 g 6-methyl-N-(6-methylpyridin-2-yl)pyridin-2-amine, 0.84 g of pulverized potassium hydroxide and 15 ml of N,N-dimethylformamide. After stirring for 1 hour under nitrogen, the mixture was cooled to 5 C and 0.85 g of 1-iodopropane were added. The mixture was allowed to warm to 22 C and stirred for 16 hours. After quenching with 15 ml water, the product was extracted twice with diethyl ether and washed with water. Following removal of solvent, the product was purified by silica gel chromatography using 10% ethyl acetate in hexane to give 11.0 g of a colorless oil.

Hhb=N,N-Bis(pyridin-2-ylmethyl)propan-1-amine

To a flask were added 1.0 g di-(2-picolyl)amine, 0.85 g of pulverized potassium hydroxide and 15 ml of N,N-dimethylformamide. After stirring for 1 hour under nitrogen, the mixture was cooled to 5 C and 1.7 g of 1-iodopropane were added. The mixture was heated to 35 C and stirred for 16 hours. After quenching with 30 ml water, the product was extracted with ethyl acetate and washed twice with water. Following removal of solvent, the product was purified by silica gel chromatography using ethyl acetate to give 0.65 g of a yellow oil.

Hhc=1-Propyl-4-pyridin-4-ylpyridinium iodide

To a flask were added 1.0 g 4,4'-dipyridyl, 1.07 g 1-iodopropane and 5 g acetonitrile and the mixture was allowed to stand at 22 C for 2 months. The liquid was decanted away from the solid and the solid was dissolved in 15 ml hot acetonitrile. After hot filtration, the solution was cooled to 5 C and filtered. After washing with acetonitrile, the product was dried leaving 0.8 g red-orange solid.

Hhd=Phenoxathiin
Hhh=Poly(2-vinylpyridine)
Hhj=Potassium O,O-diethyl thiophosphate
Hhl=Quinaldine
Hhv=Sodium Iodide
Hif=Tetrabutylammonium 3,5-Bis(trifluoromethyl)phenoxide To a flask were added 11.0 g 3,5-bis(trifluoromethyl)phenol, 1.8 g of a 55-60% solution of tetrabutylammonium hydroxide in water and 10 ml 2-propanol. After heating to 50 C under nitrogen for 1 hour, the solvent was removed and another 10 ml of 2-propanol were added and removed by distillation under reduced pressure. An oil was obtained which crystallized on standing.

Hii=Tetrabutylammonium Bis(hydroxymethyl)phosphinate

To a flask were added 0.48 g bis(hydroxymethyl)phosphinic acid, 1.6 g of a 55-60% solution of tetrabutylammonium hydroxide in water and 10 ml 2-propanol. After heating to 50 C under nitrogen for 1 hour, the solvent was removed and another 10 ml of 2-propanol were added and removed by distillation under reduced pressure. An oil was obtained.

Hij=Tetrabutylammonium Bromide
Hik=Tetrabutylammonium Chloride
Hil=Tetrabutylammonium Di(4-Methoxyphenyl)phosphinate To a flask were added 2.0 g bis(4-methoxyphenyl)phosphinic acid, 3.0 g of a 55-60% solution of tetrabutylammonium hydroxide in water, 2.0 g of water and 18 ml 2-propanol. After heating to 50 C under nitrogen for 1 hour, the solvent was removed and another 20 ml of 2-propanol were added and removed by distillation under reduced pressure. A waxy solid was obtained.

Him=Tetrabutylammonium Dibenzoylmethanate

To a flask were added 3.0 g dibenzoylmethane, 5.7 g of a 55-60% solution of tetrabutylammonium hydroxide in water and 20 ml 2-propanol. After heating to 50 C under nitrogen for 1 hour, the solvent was removed and another 20 ml of 2-propanol were added and removed by distillation under reduced pressure. After drying the product, a yellow solid was obtained.

Hin=Tetrabutylammonium Dimethylolpropionate

To a flask were added 3.0 g 2,2-bis(hydroxymethyl)propionic acid, 9.5 g of a 55-60% solution of tetrabutylammonium hydroxide in water and 40 ml 2-propanol. After heating to 50 C under nitrogen for 1 hour, the solvent was removed and another 40 ml of 2-propanol were added and removed by distillation under reduced pressure. After drying, a pale yellow oil was obtained.

Hio=Tetrabutylammonium Dimethylphosphinate

To a flask were added 11.0 g dimethylphosphinic acid, 4.5 g of a 55-60% solution of tetrabutylammonium hydroxide in water and 20 ml 2-propanol. After heating to 50 C under nitrogen for 1 hour, the solvent was removed and another 20 ml of 2-propanol were added and removed by distillation under reduced pressure. After drying, a yellow partially solidified product was obtained.

Hir=Tetrabutylammonium Iodide

Hit=Tetrabutylammonium Methylphenylphosphinate

To a flask were added 2.0 g methylphenylphosphinic acid, 5.4 g of a 55-60% solution of tetrabutylammonium hydroxide in water and 25 ml 2-propanol. After heating to 50 C under nitrogen for 1 hour, the solvent was removed and another 20 ml of 2-propanol were added and removed by distillation under reduced pressure. After drying, an oil was obtained.

Hiu=Tetrabutylammonium Nitrate

Hja=Tetrabutylammonium Thiocyanate

Hjd=Tetrabutylphosphonium Bromide

Hje=Tetraethylammonium Chloride Monohydrate

Hjf=Tetraethylammonium Diphenylphosphinate

To a flask were added 1.0 g diphenylphosphinic acid, 3.2 g of a 20% solution of tetraethylammonium hydroxide in water and 20 ml 2-propanol. After heating to 50 C under nitrogen for 1 hour, the solvent was removed and another 20 ml of 2-propanol were added and removed by distillation under reduced pressure. After drying, an oil was obtained.

Hjg=Tetraethylammonium Iodide

Hjr=Tris(4-fluorophenyl)phosphine

Hjs=Tris(4-methoxyphenyl)phosphine

Hjt=Tris(2-methylphenyl)phosphine

Hju=Tris(4-methylphenyl)phosphine

Hjx=Tributylphosphine oxide

Hjy=Tricyclohexylphosphine

Hka=Triethylphosphine sulfide

Hke=Triphenylphosphine

Hkf=Triphenylphosphine oxide

Hkh=Triphenylphosphite

Hna=Thiazolo[2,3-b]benzimidazole-3(2H)-one

Hnd=1,2,4-Triazolo[1,5-a]pyrimidine

Hnf=2-Mercaptobenzothiazole

Hng=Tribenzylphosphine

Hnh=Benzyl(diphenyl)phosphine

Hnm=N,N-Bis[(1-methyl-1H-benzimidazol-2-yl)methyl] butanamine 2-(Chloromethyl)-1-methyl-1H-benzimidazole To a pressure reaction bottle was added 4 g N-methyl-2-nitroaniline, 0.44 g 5% palladium on carbon, and 100 ml ethanol. The mixture was hydrogenated at 22 C and 40 psi hydrogen for 2 hours. Following filtration through celite, and solvent removal, a dark red oil was obtained. To this oil was added 3.7 g chloroacetic acid and 40 ml 5M hydrochloric acid. After refluxing under nitrogen for 2.5 hours, the mixture was cooled to 22 C, diluted with 200 ml water, and neutralized with solid sodium bicarbonate. The resulting solid was filtered, washed with water and dried giving 3.7 g gray solid.

N,N-Bis[(1-methyl-1H-benzimidazol-2-yl)methyl] butanamine

To a flask were added 2.0 g 2-(chloromethyl)-1-methyl-1H-benzimidazole and 40 ml N,N-dimethylformamide. 0.41 g Butylamine were added dropwise followed by dropwise addition of 1.2 g of triethylamine. The reaction mixture was heated to 50 C under nitrogen for 16 hours, and then cooled to 22 C. After dilution with 100 ml water, the solid was filtered and washed with water. The wet cake was dissolved in 20 ml of hot ethanol and 15 ml water was added. After cooling to 5 C, the solid was filtered and washed with 33% ethanol. The wet cake was dissolved in 15 ml of hot ethanol and 10 ml water was added. After cooling to 5 C, the solid was filtered and washed with 33% ethanol. The product was then purified by silica gel chromatography using 5% methanol in ethyl acetate to 10% methanol in ethyl acetate giving 0.93 g of a white solid.

Hnr=2,2'-Methylenebis(1H-benzimidazole)

To a flask were added 5 g of 1,2-phenylene diamine, 2.4 g of malonic acid, and 20 g of polyphosphoric acid. The mixture was heated to 180 C under nitrogen for 4 hours, and then cooled to 150 C. After the addition of 40 ml of water, the mixture was cooled to 22 C and neutralized with aqueous ammonium hydroxide. The solid was filtered and washed with water. After triturating the product in 200 ml of hot acetonitrile, the mixture was cooled to 22 C, filtered, washed with acetonitrile, and dried resulting in 2.7 g of a gray solid.

Hns=Indazole

Hnt=N'-[2-(Diethylamino)ethyl]-N,N-diethylethane-1,2-diamine

Hnu=2,2'-(1,3-Phenylene)bis(1-methyl-1H-benzimidazole)

To a Pressure reaction bottle was added 2.5 g of N-methyl-2-nitroaniline, 0.3 g 5% palladium on carbon, and 65 ml ethanol. The mixture was purged with hydrogen and then hydrogenated under 40 psi hydrogen for 1 hour. The catalyst was filtered off on a bed of celite. The solvent was removed and to the resulting red oil was added 70 g of polyphosphoric acid and 1.4 g of isophthalic acid. The reaction mixture was heated to 200 C under nitrogen for 3 hours, and then cooled to 150 C. After dilution with 150 ml water, the mixture was basified with sodium hydroxide. The solid was filtered, washed with water, and then dissolved in 40 ml of hot methanol with 140 mg of activated carbon. After filtration of the activated carbon, enough water was added to turn the solution cloudy, and the mixture was decanted away from a dark oil. After cooling to 5 C, more water was added causing a precipitate which was filtered and washed with water. The solid was dissolved in 26 ml of 2-propanol, filtered hot, and 10 ml of water were added. After cooling to 10 C, the solid was filtered, washed with 50% 2-propanol, and dried, resulting in 1.1 g of an off-white solid.

Hnv=3-Methylbenzothiazole-2-thione
Hnw=1-Methyl-1H-benzimidazol-2-thiol
Hof=N-(Pyridin-2-ylmethyl)pyridin-2-amine To a flask were added 4.7 g of 2-aminopyridine, 5.35 g of 2-pyridinecarboxaldehyde, and 75 ml toluene. The flask was equipped with a Dean-Stark trap and heated to reflux under nitrogen. After 16 hours, the toluene was removed and 100 ml ethanol were added followed by 2.1 g of sodium borohydride. The mixture was stirred at 22 C under nitrogen for 1 hour, and then 50 ml of water were added slowly. Following removal of the ethanol, aqueous ammonium chloride was cautiously added resulting in gas evolution. The product was extracted twice with 50 ml ethyl acetate and washed with 30 ml water. After solvent removal, the product was purified by silica gel chromatography using 5% methanol in ethyl acetate resulting in an orange oil.

Hog=2-Mercaptobenzimidazole
Hos=2-Benzylpyridine
Hou=N-Ethyl-N-(pyridin-2-ylmethyl)pyridin-2-amine To a flask were added 2.5 g N-(pyridin-2-ylmethyl)pyridin-2-amine and 40 ml N,N-dimethylformamide, and the mixture was cooled to 5 C. To this mixture was added 0.65 g of 60% sodium hydride in mineral oil in small portions, and after stirring at 5-10 C for ten minutes, 2.2 g of diethyl sulfate were added. The reaction mixture was heated to 45 C for 16 hours, then cooled to 22 C and quenched with 40 ml water. The product was extracted twice with 40 ml hexane and following removal of the solvent, the product was purified by silica gel chromatography using a gradient from 50% ethyl acetate, 49% hexane and 1% methanol to 60% ethyl acetate, 39% hexane, and 1% methanol resulting in 1.4 g of a yellow oil.

Hoz=N-(2-Ethylphenyl)-N-pyridin-2-ylpyridin-2-amine

To a flask were added 4.0 g of 2-ethylaniline, 10.7 g of 2-bromopyridine, 7.9 g of sodium tert-butoxide, and 165 ml toluene. The mixture was purged thoroughly with nitrogen and 205 mg of 2,2'-bis(diphenylphosphino)-1,1'-binaphthalenehthalene and 74 mg of palladium acetate were added. The reaction mixture was heated to 75 C for 16 hours, and then cooled to 22 C. After quenching with 100 ml water, the product was extracted with 100 ml ethyl acetate, and washed with 50 ml water. Following solvent removal, the product was purified by silica gel chromatography using a gradient from 25% ethyl acetate in hexane to 50% ethyl acetate in hexane, resulting in 7.5 g of a yellow solid.

Hpg=2,6-Pyridinedicarboxamide
Hpj=2-(1H-Pyrazol-3-yl)phenol
Hpo=2-(1-Methyl-1H-benzimidazol-2-yl)phenol To a Pressure reaction bottle was added 3.5 g of N-methyl-2-nitroaniline, 0.25 g 5% palladium on carbon, and 70 ml ethanol. The mixture was purged with hydrogen and then hydrogenated under 40 psi hydrogen for 1.5 hours. The catalyst was filtered off on a bed of celite. The solvent was removed and to the resulting red oil was added 2.9 g of salicylic acid, and a solution of 8 g of phosphorus pentoxide in 80 g of methanesulfonic acid. The reaction mixture was heated to 10° C. under nitrogen for 16 hours, and then cooled to 22 C. After dilution with 300 ml of cold water, the mixture was neutralized with sodium hydroxide. After extraction with ethyl acetate and filtration, the solvent was removed leaving an oil which partially crystallized on standing. After dissolving the product in hot 2-propanol and filtering hot, the solution was cooled to 5 C, filtered, and washed with 2-propanol. The product was purified by silica gel chromatography using a gradient from 80% ethyl acetate in hexane to straight ethyl acetate, resulting in 1.5 g of a tan solid.

Hqn=2,2'-Propane-2,2-diylbis(1-pentyl-1H-benzimidazole)

2.8 g 2,2'-Propane-2,2-diylbis(1H-benzimidazole) was added to 60 ml of N,N-dimethylformamide. 1.21 g Of a 60% sodium hydride dispersion in mineral oil was added in portions. 6.0 g Of 1-iodopentane was added and the mixture was stirred under nitrogen. After 4 hours, the reaction was quenched with 160 ml of water and then extracted with two 75 ml portions of ethyl acetate/methanol (~99:1, v/v). The combined organic layers were washed twice with 75 ml of water. The cloudy organic layer was filtered. Following solvent removal to give a brown oil, the product was purified by silica gel chromatography increasing from 25% to 50% ethyl acetate in hexane by volume over the course of the elution. 3.46 g Of a yellow oil was obtained.

Hra=2,2'-Methylenebis(1-benzyl-1H-benzimidazole)

To a flask were added 2.0 g 2,2'-methylenebis(1H-benzimidazole), 2.8 g potassium carbonate, 100 ml N,N-dimethylformamide and the mixture was stirred under nitrogen. 2.5 g benzyl chloride were added and the mixture was heated to 70 C for 16 hours. Another 0.7 g benzyl chloride was added and the reaction was heated to 70 C for another 20 hours. The reaction was cooled to 22 C, quenched with 150 ml water and the product was extracted with ethyl acetate and washed with water. Following removal of solvent, the product was recrystallized from 10 ml ethanol, then 10 ml acetonitrile with 1 ml of water. The product was filtered and dried resulting in 0.67 g tan solid.

Hrb=2,2'-Ethane-1,2-diylbis(1-benzyl-1H-benzimidazole)

To a flask were added 0.5 g 2,2'-ethane-1,2-diylbis(1H-benzimidazole), 0.7 g potassium carbonate, 30 ml N,N-dimethylformamide and the mixture was stirred under nitrogen. 0.6 g Benzyl chloride were added and the mixture was heated to 60 C for 16 hours. Another 0.5 g benzyl chloride were added and the reaction was heated to 70 C for another 20 hours and then cooled to 22 C. The reaction was quenched with 30 ml water and the product was filtered and washed with water. The product was re-slurried in 80 ml hot acetonitrile, cooled, filtered and dried resulting in 0.35 g of a white solid.

Hrc=2,2'-Methylenebis(1,3-benzothiazole)

To a flask were added 50 g polyphosphoric acid. After heating to 70 C under nitrogen, a mixture of 3.13 g 2-aminothiophenol and 1.3 g malonic acid was added. The reaction mixture was heated to 135 C for 1 hour, then 145 C for 1 hour. After cooling to 70 C, the mixture was poured into 100 ml water. The slurry was cooled to 22 C, filtered and the solid was washed with water. The solid was added to 50 ml ethanol and basified with aqueous ammonium hydroxide. After cooling to 5 C, the solid was filtered and washed with water. The solid was dissolved in 14 ml hot ethanol and 7 ml water was added and the solution was cooled to 5 C. Following filtration, the white solid was washed with 50% ethanol and dried, leaving 1.1 g.

Hrg=Tetrabutylammonium Diisobutyldithiophosphinate

To 40 ml of 2-propanol, 3.63 g diisobutyldithiophosphinic acid and 7.34 g of 55-60% by weight tetrabutylammonium hydroxide in water were added. The mixture was stirred under nitrogen for one hour. The solvent was removed by distillation. To remove residual water, 2-propanol was twice added and subsequently removed by distillation. The liquid was cooled to less than OC for 16 hours. To the precipitates that formed, a small amount of hexane was added to give a slurry.

The slurry was filtered, washed with hexane, and dried under reduced pressure yielding 6.07 g of a white solid.

Hri=N,N-Bis(pyridin-2-ylmethyl)pentan-1-amine

To 15 ml of N,N-dimethylformamide, 0.85 g potassium hydroxide, 1.0 g di(2-picolyl)amine, and 0.99 g 1-iodopentane were successively added. The mixture was stirred under nitrogen at 35 C for 2.5 hours before an additional 0.99 g 1-iodopentane were added. The mixture was then stirred for 16 hrs at 35 C under nitrogen. The reaction was quenched with 90 ml of water and extracted with two 50 ml portions of ethyl acetate. The combined organic layers were washed with two 25 ml portions of water, dried over anhydrous magnesium sulfate, and filtered. Following solvent removal, the orange oil obtained was purified by silica gel chromatography using a methanol/ethyl acetate mixed solvent system that was ramped from 0% to 10% methanol by volume during the course of the elution. An orange oil (0.98 g) was obtained.

Hrk=1-(Chloromethyl)-4-aza-1-azoniabicyclo[2.2.2]octane bromide 20 ml Of acetone, 4.0 g of 1,4-diazabicyclo[2.2.2]octane, and 20 ml of bromochloromethane, were added to a flask, capped, and stirred at room temperature. Within 45 minutes white precipitate had formed. After 3.5 hours the mixture was cooled to 0-5 C, filtered, washed with three 10 ml portions of cold acetone, and dried under reduced pressure overnight. 2.31 g Of a white solid was obtained.

Hrl=N-Methylpyridin-2-amine
Hrm=Tetraphenylphosphonium Iodide
Hry=1-Ethyl-N-methyl-N-pyridin-2-yl-1H-benzimidazol-2-amine 2-Bromo-1H-benzimidazole To a flask were added 24 ml 48% hydrobromic acid and 120 ml methanol. The mixture was cooled to 5 C and 10 g 2-mercaptobenzimidazole was added. Maintaining a temperature of less than 10 C, 41.5 g of bromine were added in small portions. The mixture was allowed to warm to 22 C, and stirred for 16 hours under nitrogen. After cooling to 5 C, the solid was filtered and then added to 50 ml methanol containing 20 ml aqueous ammonium hydroxide. The pH was adjusted to 6.5 with acetic acid, and the mixture was cooled to 5 C. The product was filtered and washed with water, and dried. A second crop was obtained by cooling the filtrates which was filtered, washed with water and dried. The combined crops resulted in 9.05 g of a solid.

2-Bromo-1-ethyl-1H-benzimidazole

To a flask were added 4 g 2-bromo-1H-benzimidazole and 60 ml tetrahydrofuran, and the mixture was cooled to 10 C. To this mixture was added 1.2 g of 60% sodium hydride in mineral oil in small portions, and after stirring at 10 C for ten minutes, 4.7 g of diethyl sulfate were added. The reaction mixture was heated to 40 C for several hours, then cooled to 22 C and quenched with 100 ml water. The product was extracted twice with 50 ml ethyl acetate and following removal of the solvent, the product was purified by silica gel chromatography using a gradient from 100% hexane to 25% ethyl acetate in hexane. An oil was obtained that crystallized on standing which was dried resulting in 4.2 g of a white solid.

1-Ethyl-N-methyl-N-pyridin-2-yl-1H-benzimidazol-2-amine

To a flask were added 11.0 g of 2-bromo-1-ethyl-1H-benzimidazole, 0.48 2-(methylamino)pyridine, 0.64 g of sodium tert-butoxide, and 25 ml toluene. The mixture was purged thoroughly with nitrogen and 250 mg of 2,2'-bis(diphenylphosphino)-1,1'-binaphthalene and 64 mg of palladium acetate were added. The reaction mixture was heated to 90 C for 16 hours, and then cooled to 22 C. After quenching with 50 ml water, the product was extracted with 20 ml ethyl acetate. The product was extracted with 30 ml of 1M hydrochloric acid, and then basified with 3M sodium hydroxide. Following extraction with 20 ml ethyl acetate, the product was purified by silica gel chromatography using a gradient from 40% ethyl acetate in hexane to 70% ethyl acetate in hexane, resulting in 0.6 g of a yellow oil which crystallized on standing. The product was recrystallized from a mixture of 5 ml hexane with 1.5 ml 2-propanol. After filtration and drying of the product, a 0.44 g of a yellow solid was obtained.

Hrz=2,2-Dimethyl-N,N-dipyridin-2-ylpropanamide

To a flask were added 2.0 g of 2,2'-dipyridylamine and 35 ml of acetonitrile. The solution was stirred under nitrogen and cooled to 5 C, when 1.5 g of triethylamine were added, followed by 1.5 g of trimethylacetyl chloride and the mixture was allowed to warm to 22 C. After 1 hour, 50 ml of water were added and the acetonitrile was removed. The product was extracted with ethyl acetate and washed with water. Following solvent removal, the product was purified by silica gel chromatography using 50% ethyl acetate in hexane, resulting in 1.8 g of an oil that solidified on standing.

Hsc=2,2-Dimethyl-N-(6-methylpyridin-2-yl)-N-pyridin-2-ylpropanamide

To a flask were added 1.06 g of di-(2-picolyl)amine and 20 ml of acetonitrile. The solution was stirred under nitrogen, when 0.7 g of triethylamine were added, followed by 1.5 g of trimethylacetyl chloride. After 1 hour, 20 ml of water were added and the acetonitrile was removed. The product was extracted with ethyl acetate and washed with water. Following solvent removal, the product was recrystallized by dissolving in 6 ml hot hexane with 0.5 ml 2-propanol. Another 2 ml hexane were added and the mixture was cooled to 5 C, filtered, washed with hexane and dried, resulting in 1.3 g of an off-white solid.

Hss=6-methyl-N-phenyl-N-pyridin-2-ylpyridin-2-amine

6-Methyl-N-phenylpyridin-2-amine

To a flask were added 2.2 g of 2-amino-6-methylpyridine, 3.1 g of bromobenzene, 2.7 g of sodium tert-butoxide, and 50 ml toluene. The mixture was purged thoroughly with nitrogen and 62 mg of 2,2'-bis(diphenylphosphino)-1,1'-binaphthalenehthalene and 22 mg of palladium acetate were added. The reaction mixture was heated to 10° C. for 16 hours, and then cooled to 22 C. After quenching with 50 ml water, the product was extracted with 20 ml ethyl acetate, and washed with 15 ml water. The product was extracted with 50 ml of 1M hydrochloric acid, and then basified with aqueous ammonium hydroxide. Following extraction with 20 ml ethyl acetate, the product was purified by silica gel chromatography using a gradient from 10% ethyl acetate in hexane to 15% ethyl acetate in hexane, resulting in 1.3 g of a yellow-orange oil.

6-Methyl-N-phenyl-N-pyridin-2-ylpyridin-2-amine

To a flask were added 18.4 g of 6-methyl-N-phenylpyridin-2-amine, 15.8 g of 2-bromopyridine, 11.5 g of sodium tert-butoxide, and 250 ml toluene. The mixture was purged thoroughly with nitrogen and 270 mg of 1,1'-bis(diphenylphosphino)ferrocene and 110 mg of palladium acetate were added. The reaction mixture was heated to 90 C for 6 hours, and then cooled to 22 C. After quenching with 100 ml water, the product was extracted with 75 ml ethyl acetate. The product was extracted with 50 ml of 1M hydrochloric acid, and then basified with sodium hydroxide. The mixture was cooled to 5 C, and the crude product was filtered and washed with water. The product was dissolved in 100 ml hot 2-propanol and treated with 0.4 g activated carbon. After hot filtration through a bed of celite, 150 ml of water was added slowly and the mixture was seeded to induce crystallization. After cooling to 5 C, the product was filtered and washed with 50 ml of 33% 2-propanol in water. The product was dried resulting in 21 g of a light tan solid.

Hst=N-Pyridin-2-yl-N-(pyridin-2-ylmethyl)pyridin-2-amine

To a flask were added 5.2 g pulverized potassium hydroxide and 35 ml dimethylsulfoxide. After adding 3.4 g 2,2'-dipyridylamine, the mixture was stirred under nitrogen for 45 minutes, when 3.3 g 2-(chloromethyl)pyridine hydrochloride was added. After stirring for 1 hour, 100 ml of water was added and the product was extracted with 60 ml of 50% ethyl acetate, 50% hexane. The organic layer was washed with 30 ml water and the solvent was removed. The residue was added to 5 ml hot ethanol, and 20 ml of water was added. After cooling to 5 C, the solid was filtered and washed with water. The product was dissolved in 20 ml hot ethanol and treated with 150 mg activated carbon. After hot filtration through celite, 40 ml of water were added and the mixture was cooled to 5 C. The product was filtered, washed with 20 ml 20% ethanol in water, and dried resulting in 2.9 g of an off-white solid.

Hsz=N-[(6-Methylpyridin-2-yl)methyl]-N-pyridin-2-ylpyridin-2-amine

To a flask were added 0.6 g pulverized potassium hydroxide and 15 ml dimethylsulfoxide. After adding 1.4 g of 2,2'-dipyridylamine, the mixture was stirred under nitrogen for 45 minutes, when 1.5 g 6-methyl-2-(bromomethyl)pyridine was added. After stirring for 1 hour, 35 ml of water was added and the product was extracted with 60 ml of 50% ethyl acetate, 50% hexane. The organic layer was washed with 30 ml water and the solvent was removed. The residue was purified by silica gel chromatography using 48% ethyl acetate, 48% hexane, and 4% methanol resulting in 2.0 g of an oil.

Htd=2-Pyridin-2-ylethanamine

Htk=N-Methyl-N-[(1-methyl-1H-benzimidazol-2-yl)methyl]pyridin-2-amine

To a flask were added 0.6 g 2-(methylamino)pyridine and 20 ml tetrahydrofuran, and the mixture was cooled to 5 C. To this mixture were added 0.26 g of 60% sodium hydride in mineral oil in small portions, and after stirring at 5-10 C for ten minutes, 1.0 g of 2-(chloromethyl)-1-methyl-1H-benzimidazole was added. The reaction mixture was heated to 45 C for 16 hours, then cooled to 22 C and quenched with 40 ml water. The product was extracted with 40 ml ethyl acetate and following removal of the solvent, the product was purified by silica gel chromatography using 63% ethyl acetate, 25% hexane and 12% methanol resulting in 0.55 g of a yellow solid.

Htm=N,N,N',N',2,2-Hexamethylpropane-1,3-diamine

Hto=6-Methyl-N-pyridin-2-ylpyridin-2-amine

To a flask were added 3.2 g of 2-amino-6-methylpyridine, 4.9 g of 2-bromopyridine, 3.5 g of sodium tert-butoxide, and 120 ml toluene. The mixture was purged thoroughly with nitrogen and 83 mg of 1,1'-bis(diphenylphosphino)ferrocene and 34 mg of palladium acetate were added. The reaction mixture was heated to 65 C for 3 hours, to 75 C for 2 hours, and then cooled to 22 C. After quenching with 75 ml of water, the product was extracted with 75 ml ethyl acetate. The product was extracted with 50 ml of 1M hydrochloric acid, and washed with 30 ml of ethyl acetate. After basifying with 3M sodium hydroxide, the product was extracted with 75 ml of ethyl acetate and washed with 30 ml of water. Following solvent removal, the product was purified by silica gel chromatography using 38% ethyl acetate, 50% hexane, and 12% methanol resulting in an orange oil.

Htp=P,P-Diphenyl-N,N-dipyridin-2-ylphosphinous amide

Htq=N-[(1-Methyl-1H-benzimidazol-2-yl)methyl]-N-pyridin-2-ylpyridin-2-amine

To a flask were added 1.1 g of 2,2'-dipyridylamine and 25 ml of N,N-dimethylformamide. To this mixture were added 0.32 g of 60% sodium hydride in mineral oil in small portions, and after stirring at 10 C for ten minutes, 1.2 g of 2-(chloromethyl)-1-methyl-1H-benzimidazole in 5 ml of N,N-dimethylformamide were added. The reaction mixture was stirred at 22 C for several hours, and then quenched with 40 ml water. The product was extracted with 50 ml ethyl acetate, and then extracted with 30 ml of 1M hydrochloric acid, and basified with 3M sodium hydroxide. Following extraction with 20 ml ethyl acetate, the product was purified by silica gel chromatography using 33% ethyl acetate, 62% hexane, and 5% methanol, resulting in an oil which crystallized on standing. After drying, 0.6 g of a yellow solid remained.

Hui=6-Methyl-N-[(6-methylpyridin-2-yl)methyl]-N-pyridin-2-ylpyridin-2-amine 2-(Bromomethyl)-6-methylpyridine To a flask containing a mixture of 15 ml of 48% hydrobromic acid and 11 ml of sulfuric acid was added 5 g of 6-methyl-2-pyridinemethanol dropwise under nitrogen. The mixture was heated to 90 C for 4 hours, and poured into 25 ml of water. After neutralization with sodium carbonate, the product was extracted with 100 ml ethyl acetate and washed with 30 ml of water. Following solvent removal, the product was purified by silica gel chromatography using 25% ethyl acetate in hexane, resulting in 6.3 g of a pink oil which solidified on storage at −5 C.

6-Methyl-N-[(6-methylpyridin-2-yl)methyl]-N-pyridin-2-ylpyridin-2-amine

To a flask were added 1.7 g pulverized potassium hydroxide and 15 ml dimethylsulfoxide. After adding 1.5 g 6-methyl-2,2'-dipyridylamine, the mixture was stirred under nitrogen for 45 minutes, when 1.6 g 2-(bromomethyl)-6-methylpyridine was added. After stirring for 1 hour, 35 ml of water was added and the product was extracted with 60 ml of 50% ethyl acetate, 50% hexane. The organic layer was washed with 30 ml water and the solvent was removed. The residue was purified by silica gel chromatography using 48% ethyl acetate, 48% hexane, and 4% methanol resulting in 1.95 g of a yellow oil.

Huj=N-(6-Methylpyridin-2-ylmethyl)pyridin-2-amine

To a flask were added 1.9 g of 2-aminopyridine, 2.4 g of 6-methyl-2-pyridinecarboxaldehyde and 45 ml toluene. The flask was equipped with a Dean-Stark trap and heated to reflux under nitrogen. After 16 hours, the toluene was removed and 40 ml ethanol were added followed by 0.83 g of sodium borohydride. The mixture was stirred at 22 C under nitrogen for 1 hour, and then 30 ml of water were added slowly. Following removal of the ethanol, 60 ml 1M hydrochloric acid was added cautiously, and the aqueous layer was washed with 20 ml ethyl acetate. After basifying with aqueous ammonium hydroxide, the product was extracted with 50 ml ethyl acetate and the solvent was removed. The product was purified by silica gel chromatography using 74% ethyl acetate, 24% hexane, and 2% methanol resulting in 1.5 g of a yellow oil that solidified on standing.

Hur=Potassium hydrotris(3,5-dimethylpyrazol-1-yl)borate
Hvm=6-Methyl-N,N-dipyridin-2-ylpyridin-2-amine To a flask were added 3.7 g of 6-methyl-N-pyridin-2-ylpyridin-2-amine, 9.4 g of 2-bromopyridine, 2.0 g of sodium carbonate, 0.05 g of copper bronze, 0.01 g of potassium bromide, and 5 ml of mesytylene. After stirring under nitrogen at 160 C for 10 hours, the mixture was cooled to 22 C, and 35 ml of water was added and the product was extracted with 75 ml ethyl acetate. After washing twice with 30 ml of water, the solvent was removed, and the product was purified by silica gel chromatography using 75% ethyl acetate, 25% hexane, and 0.01% triethylamine resulting in 3.2 g of a yellow oil.

Hvn=2-Methyl-N-(6-methylpyridin-2-yl)-N-pyridin-2-ylquinolin-8-amine

2-Methylquinolin-8-amine

To a Pressure reaction bottle was added 5.0 g of 8-nitroquinaldine, 0.5 g 5% palladium on carbon, and 150 ml ethanol. The mixture was purged with hydrogen and then hydrogenated under 40 psi hydrogen for 16 hours. The catalyst was filtered off on a bed of celite. The solvent was removed, resulting in 4.2 g of a dark oil.

2-Methyl-N-(6-methylpyridin-2-yl)quinolin-8-amine

To a flask were added 4.2 g of 2-methylquinolin-8-amine, 4.6 g of 6-methyl-2-bromopyridine, 3.3 g of sodium tert-butoxide, and 75 ml toluene. The mixture was purged thoroughly with nitrogen and 44 mg of 1,1'-bis(diphenylphosphino)ferrocene and 18 mg of palladium acetate were added. The reaction mixture was heated to 80 C for 16 hours, and then cooled to 22 C. After quenching with 100 ml of water, the product was extracted with 75 ml ethyl acetate. The product was extracted with 120 ml of 1M hydrochloric acid, and then basified with 3M sodium hydroxide. Following extraction with 75 ml of ethyl acetate and washing with 30 ml of water, the solvent was removed. The product was purified by dissolving in a hot mixture of 20 ml of 2-propanol and 5 ml of water, and after cooling to 5 C, the product was filtered, washed with 50% 2-propanol, and dried, resulting in 4.5 g of a tan solid.

2-Methyl-N-(6-methylpyridin-2-yl)-N-pyridin-2-ylquinolin-8-amine

To a flask were added 2.5 g of 2-methyl-N-(6-methylpyridin-2-yl)quinolin-8-amine, 4.7 g of 2-bromopyridine, 1.6 g of sodium carbonate, 51 mg of copper bronze, 5 mg of potassium bromide, and 3 ml of mesytylene. After stirring under nitrogen at 160 C for 16 hours, the mixture was cooled to 22 C, and 35 ml of water was added and the product was extracted with 50 ml ethyl acetate. After washing twice with 20 ml of water, the solvent was removed, and the product was purified by silica gel chromatography using 50% ethyl acetate, 50% hexane, and 0.1% triethylamine resulting in 3.0 g of a light yellow oil.

Hvo=6-Methyl-N-(6-methylpyridin-2-yl)-N-pyridin-2-ylpyridin-2-amine

6-Methyl-N-(6-methylpyridin-2-yl)pyridin-2-amine

To a flask were added 3.1 g of 2-amino-6-methylpyridine, 5.0 g of 2-bromo-6-methylpyridine, 3.6 g of sodium tert-butoxide, and 150 ml toluene. The mixture was purged thoroughly with nitrogen and 160 mg of 1,1'-bis(diphenylphosphino)ferrocene and 65 mg of palladium acetate were added. The reaction mixture was heated to 80 C for 3 hours, and then cooled to 22 C. After quenching with 100 ml of water, the product was extracted with 75 ml ethyl acetate. The product was extracted with 75 ml of 1M hydrochloric acid, and then basified with 3M sodium hydroxide. Following extraction with 75 ml of ethyl acetate and washing with 30 ml of water, the solvent was removed. The product was purified by dissolving in a minimum amount of hot 2-propanol, and after cooling to 5 C, the product was filtered, washed with cold 2-propanol, and dried, resulting in 3.3 g of a tan solid.

6-Methyl-N-(6-methylpyridin-2-yl)-N-pyridin-2-ylpyridin-2-amine

To a flask were added 2.0 g of 6-methyl-N-(6-methylpyridin-2-yl)pyridin-2-amine, 4.7 g of 2-bromopyridine, 1.6 g of sodium carbonate, 51 mg of copper bronze, 5 mg of potassium bromide, and 3 ml of mesytylene. After stirring under nitrogen at 160 C for 16 hours, the mixture was cooled to 22 C, and 35 ml of water was added and the product was extracted with 50 ml ethyl acetate. After washing twice with 20 ml of water, the solvent was removed, and the product was purified by silica gel chromatography using 60% ethyl acetate, 40% hexane, and 0.1% triethylamine resulting in 2.2 g of a yellow oil.

Hvw=2,2'-(1,2-Phenylene)bis(1-pentyl-1H-benzimidazole)

To a flask were added 1.5 g of 2,2'-(1,2-phenylene)bis(1H-benzimidazole) and 30 ml of N,N-dimethylformamide, and the mixture was cooled to 5 C. To this mixture was added 0.48 g of 60% sodium hydride in mineral oil in small portions, and after stirring at 5-10 C for 30 minutes, 2.4 g of 1-1-iodopentane were added. The reaction mixture was warmed to 22 C for and stirred for 16 hours, then quenched with 50 ml water. The product was extracted with 40 ml ethyl acetate and following removal of the solvent, the product was purified by silica gel chromatography using 25% ethyl acetate, 75% hexane and 0.1% triethylamine resulting in 2.1 g of a yellow solid.

Hwa=3-Methylpyridazine
Hwc=1-Butyl-1H-imidazole
Hwq=Hexamethylphosphoramide

What is claimed is:

1. A thermochromic system comprising a first metal ion and a second metal ion and at least one ligand that complexes with a first metal ion to form a LeMLC and that complexes with a second metal ion to form a HeMLC, wherein the thermochromic system exhibits a reversible net increase in its ability to absorb light energy in the visible and/or NIR range as the temperature of the system is increased as a result of the ligand transferring from the first metal ion to the second metal ion.

2. The thermochromic system of claim 1 wherein the system exhibits a reversible net increase in its ability to absorb light energy in the visible range.

3. The thermochromic system of claim 2 wherein the first metal ion is Zn(II) and the second metal ion is a combination of Co(II) and Ni(II).

4. The thermochromic system of claim 2 wherein the ligand is a phosphine oxide, a phosphinate or an imidazole.

5. The thermochromic system of claim 2 wherein the ligand is chloride, bromide, iodide or thiocyanate.

6. The thermochromic system of claim 1 wherein the system exhibits a reversible net increase in its ability to absorb light energy in the NIR range.

7. The thermochromic system of claim 1 wherein the first metal ion is Zn(II) or Mn(II), and the second metal ion is selected from Co(II), Ni(II) or Cu(II).

8. The thermochromic system of claim 7 wherein the first metal ion is Ni(II) and the second metal ion is Cu(II).

9. The thermochromic system of claim 7 wherein the first metal ion is Zn(II) and the second metal ion is Cu(II) or Co(II).

10. The thermochromic system of claim 9 wherein the ligand includes a halide or pseudohalide.

* * * * *